US010217117B2

(12) United States Patent
Heath

(10) Patent No.: US 10,217,117 B2
(45) Date of Patent: Feb. 26, 2019

(54) SYSTEM AND METHOD FOR SOCIAL NETWORKING INTERACTIONS USING ONLINE CONSUMER BROWSING BEHAVIOR, BUYING PATTERNS, ADVERTISEMENTS AND AFFILIATE ADVERTISING, FOR PROMOTIONS, ONLINE COUPONS, MOBILE SERVICES, PRODUCTS, GOODS AND SERVICES, ENTERTAINMENT AND AUCTIONS, WITH GEOSPATIAL MAPPING TECHNOLOGY

(76) Inventor: Stephan Heath, Littleton, CO (US)

( * ) Notice: Subject to any disclaimer, the term of this patent is extended or adjusted under 35 U.S.C. 154(b) by 1682 days.

(21) Appl. No.: 13/369,244

(22) Filed: Feb. 8, 2012

(65) Prior Publication Data

US 2013/0073473 A1 Mar. 21, 2013

Related U.S. Application Data

(63) Continuation-in-part of application No. 13/233,352, filed on Sep. 15, 2011, now abandoned, and a
(Continued)

(51) Int. Cl.
*G06Q 30/02* (2012.01)
*G06Q 30/06* (2012.01)
(Continued)

(52) U.S. Cl.
CPC ......... *G06Q 30/02* (2013.01); *G06Q 30/0201* (2013.01); *G06Q 30/0207* (2013.01);
(Continued)

(58) Field of Classification Search
CPC ...................................................... G06Q 30/02
(Continued)

(56) References Cited

U.S. PATENT DOCUMENTS 6,073,124 A 6/2000 Krishnan et al.
7,630,936 B2 12/2009 Kumar et al.
(Continued)

OTHER PUBLICATIONS

WaveMarket's crunkie puts mobile social networks on the map; location-based mobile social network application now available. (Nov. 15, 2004). PR Newswire; Retrieved from https://dialog.proquest.com; (Year: 2004).*
(Continued)

*Primary Examiner* — Eric R Netzloff
*Assistant Examiner* — Michael R Stibley
(74) *Attorney, Agent, or Firm* — Peter B. Scull; Hamilton, DeSanctis & Cha LLP

(57) ABSTRACT

Systems and methods are provided using combined technologies for social networking interactions using tracking, predicting, and implementing online consumer communications, browsing behavior, buying patterns, and advertisements and affiliate advertising and communications, for online coupons, mobile services, products, goods & services, entertainment shopping, auctions, bidding, bidding behavior, bidding results for targeting and filtering of promotions, online coupons, mobile services, products, goods & services, penny auctions or online auctions, advertisements and affiliate advertising or services on a three dimensional geospatial platform using geospatial mapping technology, company-local information, social networking, and social networking communities ("PGS-GM-CL/I-SN").

17 Claims, 32 Drawing Sheets

Related U.S. Application Data continuation-in-part of application No. 13/337,275, filed on Dec. 26, 2011, and a continuation-in-part of application No. 13/359,498, filed on Jan. 27, 2012, and a continuation-in-part of application No. 13/337,271, filed on Dec. 26, 2011, which is a continuation-in-part of application No. 13/233,352, filed on Sep. 15, 2011, now abandoned, said application No. 13/337,275 is a continuation-in-part of application No. 13/233,352, filed on Sep. 15, 2011, now abandoned.

(51) Int. Cl.
  *G06Q 30/08* (2012.01)
  *G06Q 50/00* (2012.01)

(52) U.S. Cl.
  CPC ......... *G06Q 30/0241* (2013.01); *G06Q 30/06* (2013.01); *G06Q 30/08* (2013.01); *G06Q 50/01* (2013.01)

(58) Field of Classification Search
  USPC .......................................................... 705/14
  See application file for complete search history.

(56) References Cited

U.S. PATENT DOCUMENTS

| | | | |
|---|---|---|---|
| 7,756,756 B1 | 7/2010 | Lifson | |
| 7,831,476 B2 * | 11/2010 | Foster et al. | 705/26.8 |
| 7,860,852 B2 | 12/2010 | Brunner et al. | |
| 7,908,263 B1 | 3/2011 | Palz et al. | |
| 7,933,897 B2 | 4/2011 | Jones et al. | |
| 7,970,665 B1 | 6/2011 | Lifson | |
| 7,980,466 B2 | 7/2011 | Lee et al. | |
| 8,209,220 B2 | 1/2012 | Yoshikawa et al. | |
| 2002/0055924 A1 | 5/2002 | Liming et al. | |
| 2002/0094868 A1 | 7/2002 | Tuck et al. | |
| 2003/0158796 A1 | 8/2003 | Balent | |
| 2004/0073634 A1 * | 4/2004 | Haghpassand | G06F 21/50 709/220 |
| 2005/0288959 A1 | 12/2005 | Eraker et al. | |
| 2006/0170670 A1 | 8/2006 | Burke | |
| 2006/0238380 A1 * | 10/2006 | Kimchi | G01C 21/26 340/995.1 |
| 2006/0265197 A1 | 11/2006 | Peterson et al. | |
| 2007/0143345 A1 | 6/2007 | Jones et al. | |
| 2007/0174259 A1 * | 7/2007 | Amjadi | 707/3 |
| 2007/0265006 A1 | 11/2007 | Washok et al. | |
| 2008/0307003 A1 | 2/2008 | O'Donnell et al. | |
| 2008/0140650 A1 * | 6/2008 | Stackpole | G06F 17/3087 |
| 2008/0172288 A1 | 7/2008 | Pilkalns et al. | |
| 2008/0201156 A1 | 8/2008 | Abhyanker et al. | |
| 2008/0214148 A1 * | 9/2008 | Ramer | G06F 17/30749 455/414.1 |
| 2008/0222295 A1 * | 9/2008 | Robinson | G06F 17/30867 709/227 |
| 2008/0300979 A1 | 12/2008 | Abhyanker et al. | |
| 2008/0307498 A1 * | 12/2008 | Johnson | G06F 21/6218 726/3 |
| 2009/0070129 A1 | 3/2009 | Inbar et al. | |
| 2009/0070204 A1 | 3/2009 | Clancy et al. | |
| 2009/0144144 A1 | 6/2009 | Grouf et al. | |
| 2009/0163187 A1 | 6/2009 | Terrell et al. | |
| 2009/0187486 A1 | 7/2009 | Lefenfeld et al. | |
| 2010/0042923 A1 * | 2/2010 | Barcay | G06T 17/05 715/715 |
| 2010/0094752 A1 | 4/2010 | Heath | |
| 2010/0119053 A1 | 5/2010 | Goeldi | |
| 2010/0145800 A1 | 6/2010 | Eraker et al. | |
| 2010/0198684 A1 | 8/2010 | Eraker et al. | |
| 2010/0226535 A1 | 9/2010 | Kimchi et al. | |
| 2010/0325563 A1 | 12/2010 | Goldthwaite et al. | |
| 2011/0004515 A1 | 1/2011 | Mesaros | |
| 2011/0029360 A1 | 2/2011 | Gollapalli | |
| 2011/0035284 A1 | 2/2011 | Moshfeghi | |
| 2011/0041168 A1 | 2/2011 | Murray | |
| 2011/0066615 A1 | 3/2011 | Pradhan et al. | |
| 2011/0082736 A1 | 4/2011 | Goldman et al. | |
| 2011/0173066 A1 | 7/2011 | Simmons et al. | |
| 2011/0191417 A1 | 8/2011 | Rathod | |
| 2011/0191432 A1 | 8/2011 | Layson et al. | |
| 2011/0196776 A1 | 8/2011 | Rash et al. | |
| 2011/0208724 A1 | 8/2011 | Jones et al. | |
| 2011/0231363 A1 | 9/2011 | Rathod | |
| 2011/0238762 A1 * | 9/2011 | Soni et al. | 709/206 |
| 2011/0246305 A1 | 10/2011 | Brazeau et al. | |
| 2011/0258073 A1 | 10/2011 | Lifson et al. | |
| 2011/0270701 A1 * | 11/2011 | Black et al. | 705/26.3 |
| 2011/0276396 A1 | 11/2011 | Rathod | |
| 2011/0276628 A1 | 11/2011 | Pell | |
| 2011/0313781 A1 | 12/2011 | Ho | |
| 2012/0036015 A1 | 2/2012 | Sheikh | |
| 2012/0054014 A1 | 3/2012 | Cho et al. | |
| 2012/0066037 A1 | 3/2012 | Glen | |
| 2012/0254804 A1 * | 10/2012 | Sheha | G06Q 30/02 715/834 |
| 2013/0073336 A1 | 3/2013 | Heath | |
| 2013/0073366 A1 | 3/2013 | Heath | |
| 2013/0073374 A1 | 3/2013 | Heath | |
| 2013/0073376 A1 | 3/2013 | Heath | |
| 2013/0073377 A1 | 3/2013 | Heath | |
| 2013/0073387 A1 | 3/2013 | Heath | |
| 2013/0073388 A1 | 3/2013 | Heath | |
| 2013/0073389 A1 | 3/2013 | Heath | |
| 2013/0073400 A1 | 3/2013 | Heath | |
| 2013/0268357 A1 | 10/2013 | Heath | |
| 2014/0006129 A1 | 1/2014 | Heath | |

OTHER PUBLICATIONS

Carpenter, S. (Sep. 15, 2005). Cover Story: holding a key to the city; put a cellphone to work—to locate friends, avoid traffic, find a café, sheck show times—and you mobilize your options.: Home Edition]. Los Angeles Times; Retrieved from https://dialog.proquest.com (Year: 2005).*

Augmentra: ViewRanger gives new perspective to national park mapping; new map tool for mobile phone handsets provides information on location for outdoor enthusiasts. (Oct. 3, 2005). M2 Presswire; Retrieved from https://dialog.proquest.com (Year: 2005).*

ULocate expands location-based services portfolio to include kmaps. (Nov. 28, 2005). Business Wire; Retrieved from https://dialog.proquest.com (Year: 2005).*

Microsoft introduces new version of windows live local; new capabilities include real-time traffic reporting, new ways to collect and share search results, tight integration with Microsoft office outlook and windows live messenger, and geographic expansion May 24, 2006; PR Newswire (Year: 2006).*

Map technology aids in search for housing; Brevetti, Francine. Oakland Tribune [Oakland, Calif] Jul. 18, 2005: 1. Retrieved from https://dialog.proquest.com; (Year: 2005).*

Breaking news: QUALCOMM introduces gpsOneXTRA assistance. (Feb. 12, 2007). M2 Presswire; Retrieved from https://dialog.proquest.com; (Year: 2007).*

Realty digital integrates realty digital opus with google maps. (2007). Internet Business News, , NA; Retrieved from https://dialog.proquest.com (Year: 2007).*

TruePosition announces SUPL server for A-GPS; providing a complete positioning platform to enable next-generation location based services. (Mar. 27, 2007). PR Newswire; Retrieved from https://dialog.proquest.com; (Year: 2007).*

Hippensteel, P. (2007). With iFind, location is evident. Network Computing, 18(6), 28-29; Retrieved from https://dialog.proquest.com (Year: 2007).*

LOC-AID introduces first location-enabled mobile marketing platform. (Sep. 11, 2006). Business Wire; Retrieved from https://dialog.proquest.com (Year: 2006).*

(56) References Cited

OTHER PUBLICATIONS

Skyhook upgrades location-aware browser toolbar; users can use the service to find nearby friends through location-based social networking, and advertisers can use it to pinpoint ads to users based on where they are. (2006). Information Week, , NA; (Year: 2006).*
Reality digital 'maps it out' with industry-first integration of google maps and user-generated video. (Mar. 19, 2007). Business Wire; Retrieved from https://dialog.proquest.com; (Year: 2007).*
GPS takes a global position in the portable market: Manufacturers are embedding navigation and location awareness into cell phones—and just about every other handheld device. (2007). Electronic Design, 55(10), 47; (Year: 2007).*
Google acquires mobile social network Jaiku. (2007). Online Reporter, (560), 17; Retrieved from https://dialog.proquest.com (Year: 2007).*
TruePosition: TruePosition finds favourite location based services for mobile subscribers; new research reveals clear opportunities for location based services in the UK, spain and US. (Oct. 29, 2007). M2 Presswire; Retrieved from https://dialog.proquest.com (Year: 2007).*
GyPSii Symbian development finds its nokia mobile home; new geo-location social networking platform accredited for nokia's N95 and 6110 navigator. (Nov. 23, 2007). M2 Presswire; Retrieved from https://dialog.proquest.com (Year: 2007).*
The manufacturer's road. (2008). GPS World, 19(1), 58; Retrieved from https://dialog.proquest.com (Year: 2008).*
GyPSii; GyPSii brings mobile location lifestyle to dopod users in china. (Jan. 14, 2008). China Business Newsweekly; Retrieved from https://dialog.proquest.com (Year: 2008).*
CBS teams with loopt on geobased mobile ads. (2008). EWeek, NA; Retrieved from https://dialog.proquest.com (Year: 2008).*
GyPSii launches iPhone platform. (Mar. 5, 2008). Business Wire; Retrieved from https://dialog.proquest.com (Year: 2008).*
TruePosition identifies seven key drivers for LBS success. (Apr. 1, 2008). Business Wire; Retrieved from https://dialog.proquest.com (Year: 2008).*
Q. Huang and Y. Liu, "On Geo-social network services," 2009 17th International Conference on Geoinformatics, Fairfax, VA, 2009, pp. 1-6; date of conference: Aug. 12-14, 2009; date added to IEEE Xplore Oct. 23, 2009 (Year: 2009).*
International Search Report and Written Opinion of the International Searching Authority. International Application No. PCT/US2012/036896, issued by the United States Patent Office, dated Jul. 20, 2012, Alexandria Virginia.

* cited by examiner

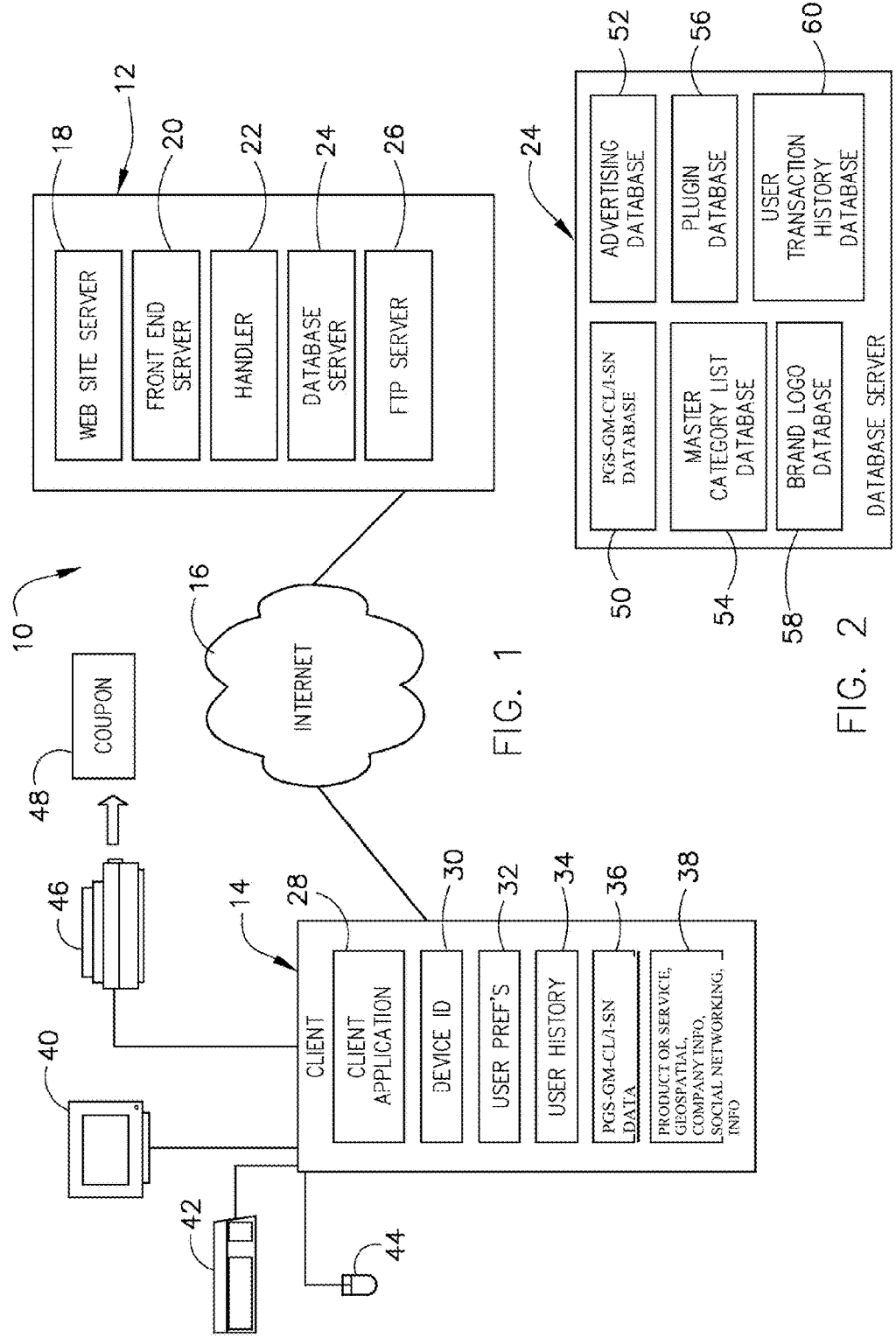

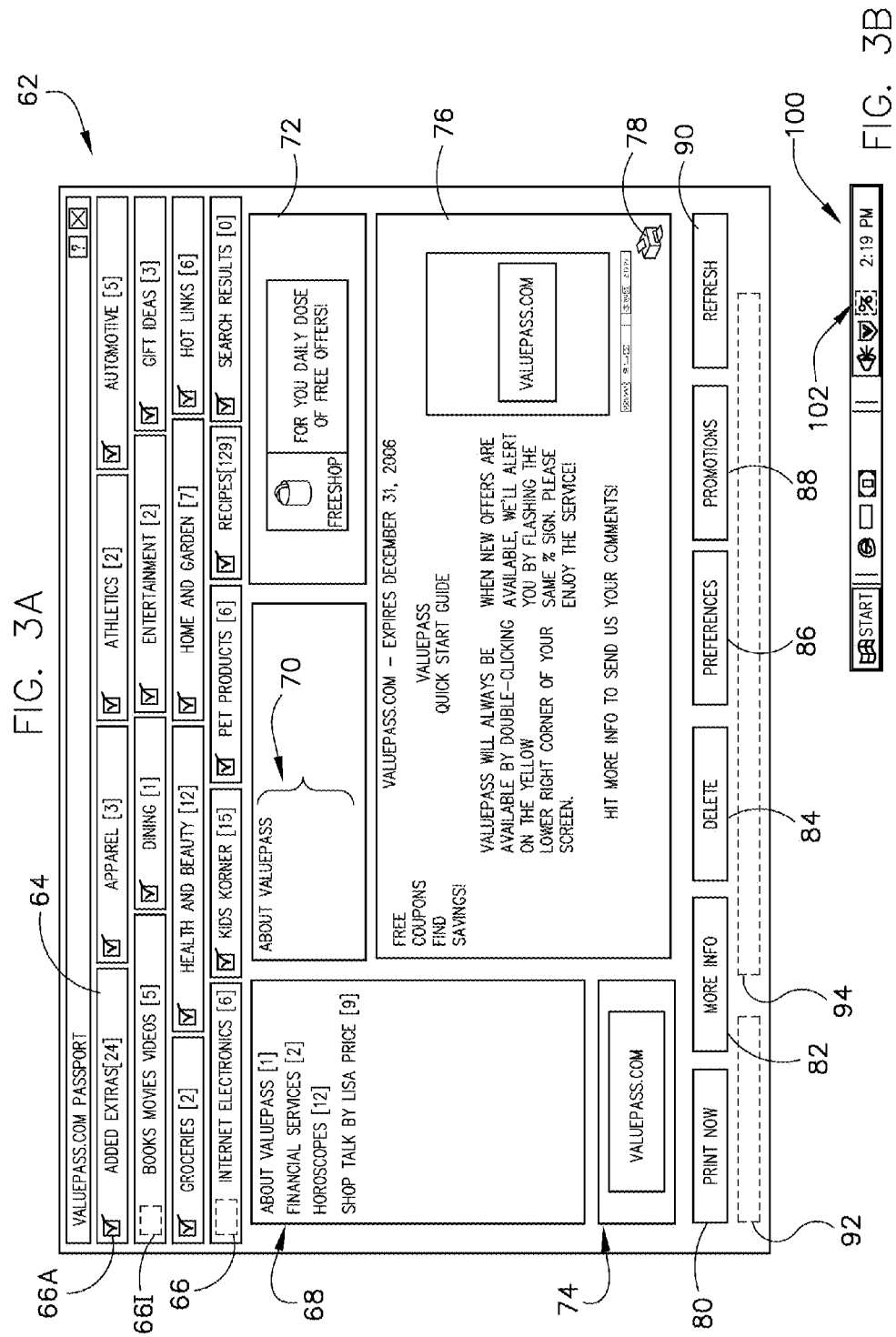

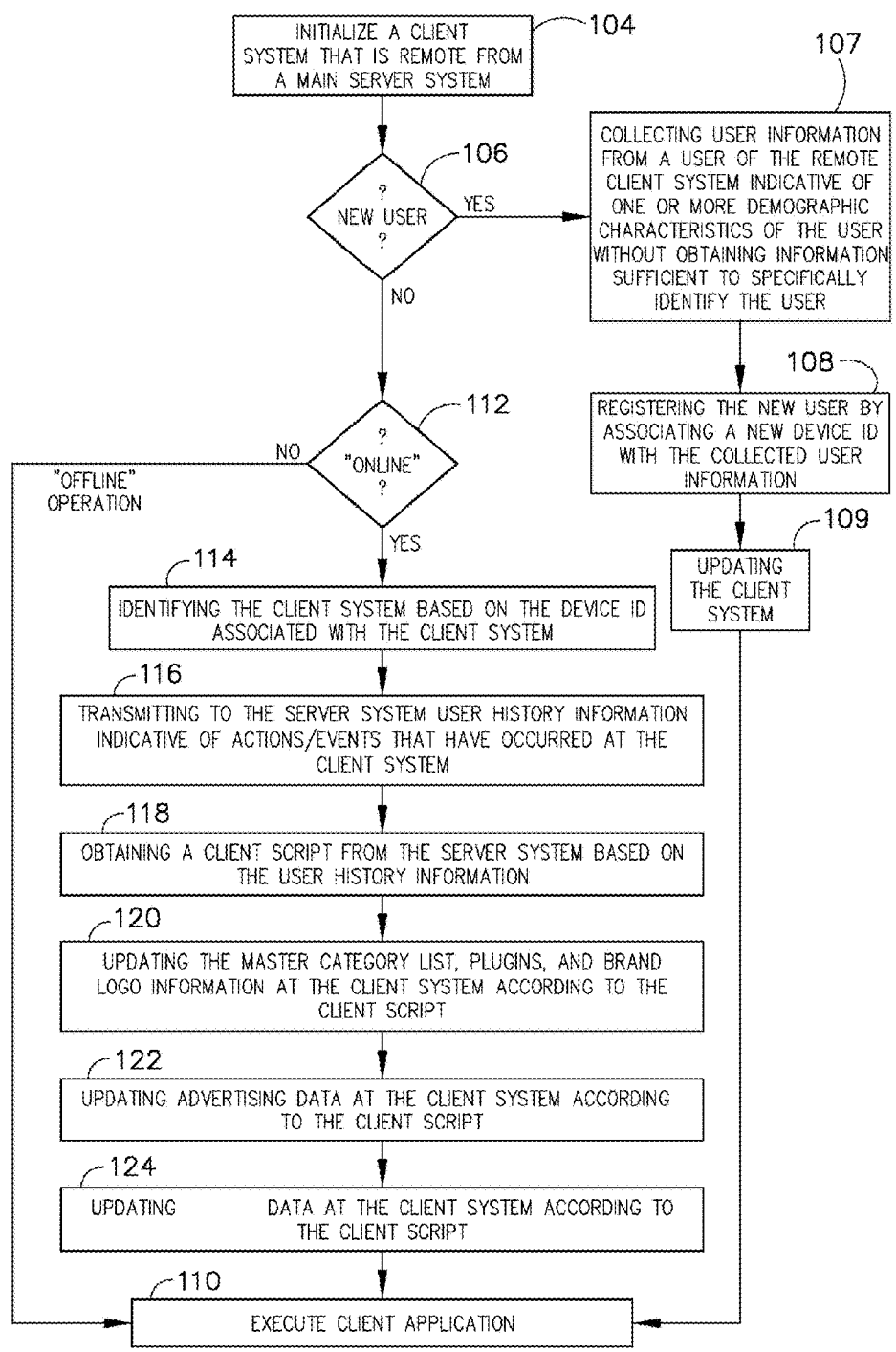

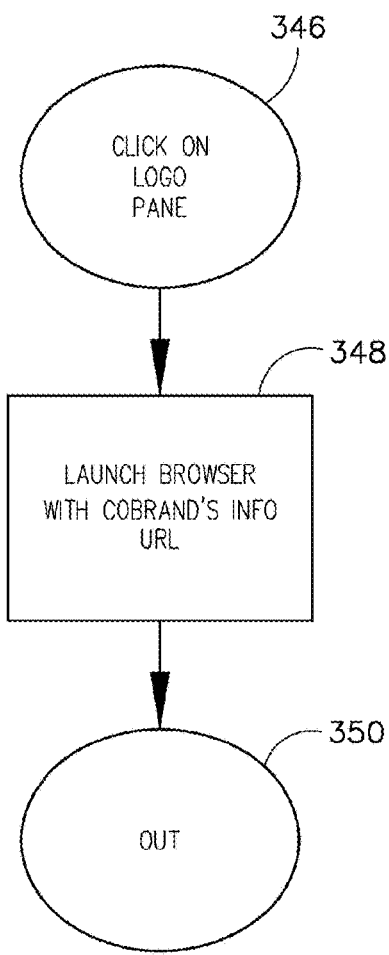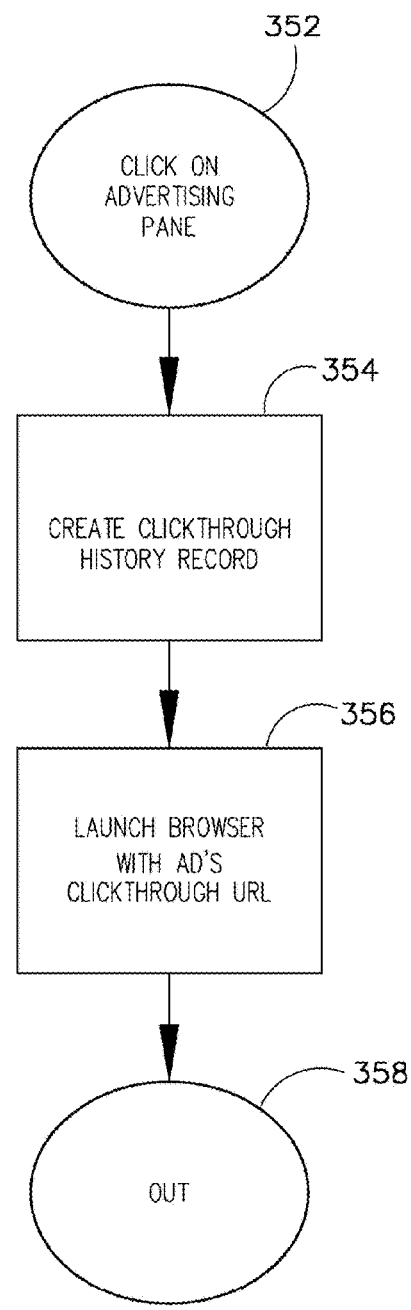

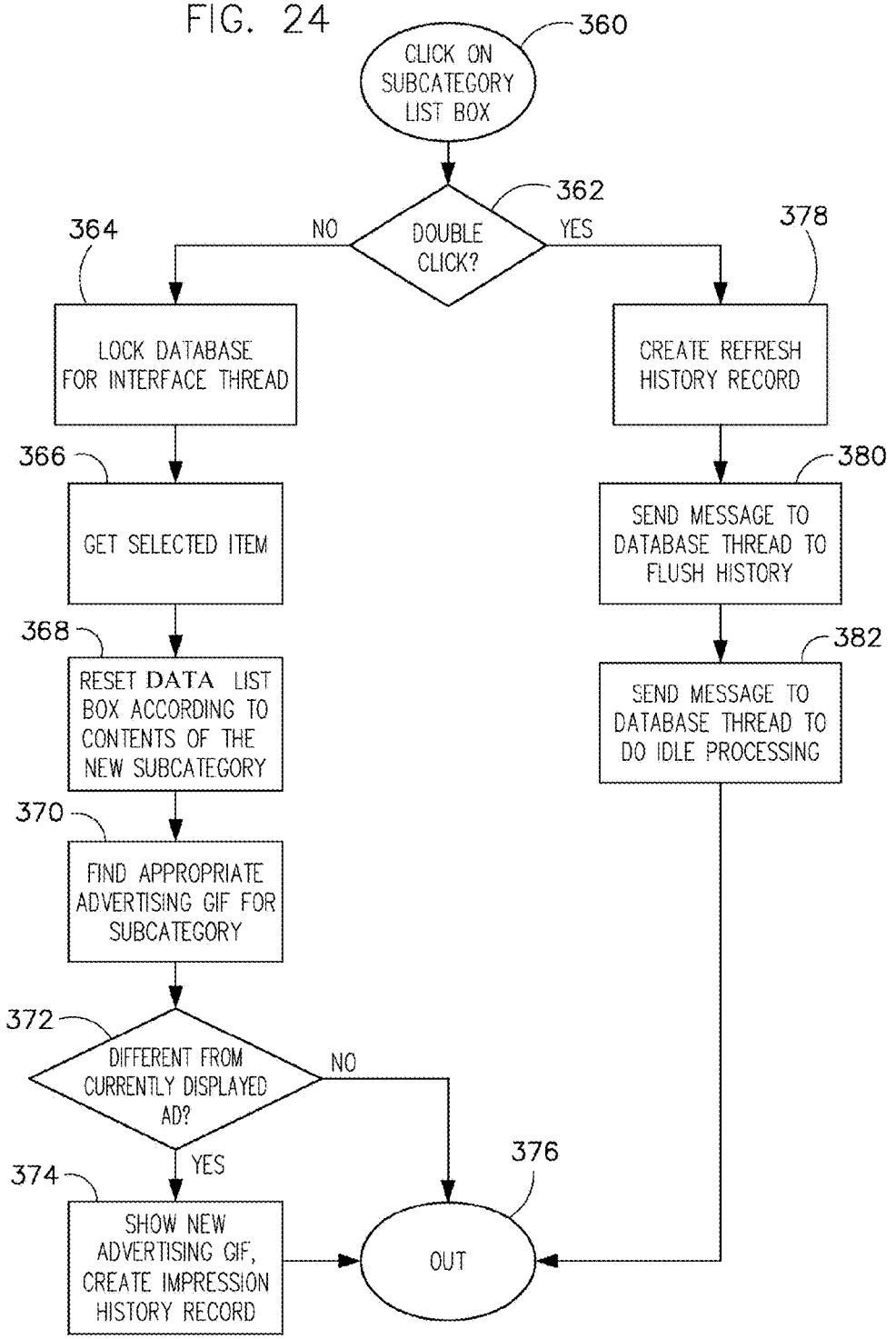

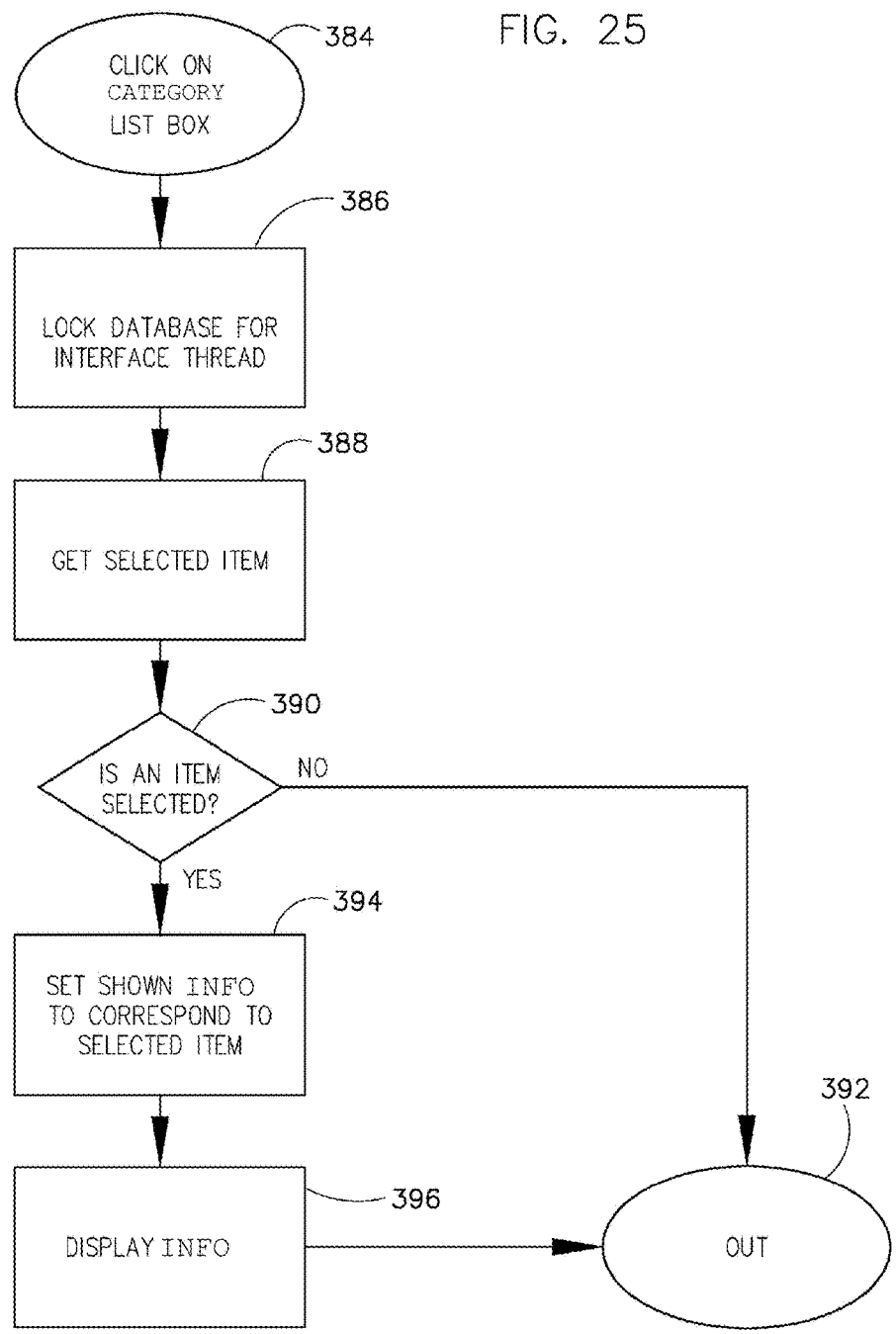

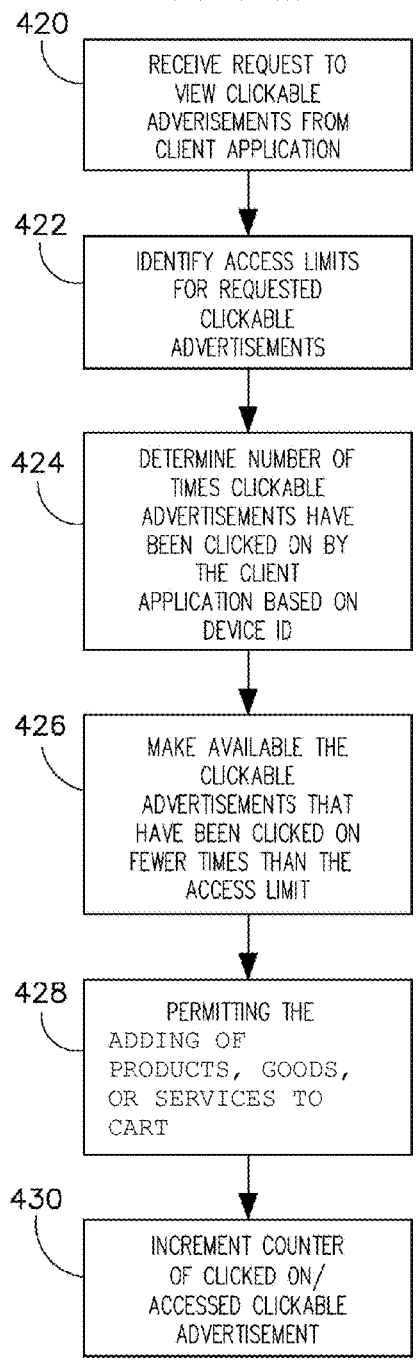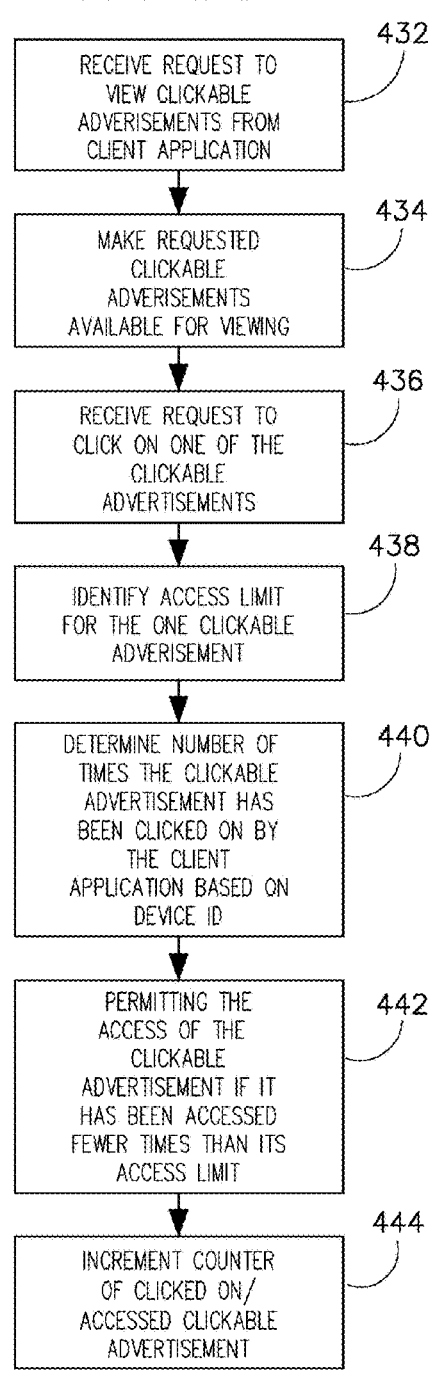

SOCIAL EARTH

PROMOTIONS, PROMOTIONS,
ONLINE COUPONS,
MOBILE SERVICES,
PRODUCTS, GOODS,
SERVICES,
ENTERTAINMENT SHOPPING,
PENNY/ONLINE AUCTIONS,
ADVERTISEMENTS/AFFILIATE
ADVERTISING,
E-COMMERCE,
SPORTS,
PERSONAL/FINANCIAL
NETWORK,
TRAVEL/HOSPITALITY
SERVICES,
REAL ESTATE
EDUCATIONAL SERVICES,
ANCILLARY SERVICES,
SERVICE PROVIDERS,
ONLINE DATING,
GAMING, RETAIL STORES,
VIRTUAL COMMUNITIES
VIRTUAL GOODS

ANALYSIS
PREDICTION
TARGET
MARKETS
CUSTOMIZED
WEBSITE
DISPLAYS

END USER'S ONLINE ACTIVITY,
LOCATION, COMMUNICATIONS,
SEARCH INQUIRIES ONLINE
COMMUNICATIONS, PURCHASING,
AND BEHAVIOR, FOR
COLLECTION AND ANALYSI USED
TO PROVIDE CUSTOMIZED
PROMOTIONAL WEBSITE
DISPLAYS OF PROMOTIONS,
PRODUCTS, GOODS AND
SERVIVCES, AND RELATED
COMPANY AND LOCAL
INFORMATION USING THREE
DIMENSIONAL AND SCALABLE
GEOSPATIAL MAPPING

FIG. 36

SYSTEM AND METHOD FOR SOCIAL NETWORKING INTERACTIONS USING ONLINE CONSUMER BROWSING BEHAVIOR, BUYING PATTERNS, ADVERTISEMENTS AND AFFILIATE ADVERTISING, FOR PROMOTIONS, ONLINE COUPONS, MOBILE SERVICES, PRODUCTS, GOODS AND SERVICES, ENTERTAINMENT AND AUCTIONS, WITH GEOSPATIAL MAPPING TECHNOLOGY

PRIORITY

This application is a continuation in part of, and claims priority to each of: U.S. application Ser. No. 13/233,352, filed 15 Sep. 2011; Ser. No. 13/337,271, filed 26 Dec. 2011; Ser. No. 13/337,275, filed 26 Dec. 2011; and Ser. No. 13/359,498, filed 27 Jan. 2012, each of which applications are entirely incorporated herein by reference. Application Ser. No. 13/359,498 is a continuation in part of and claims priority to each of Ser. No. 13/233,352; 13/337,271; and Ser. No. 13/337,275; and each of application Ser. Nos. 13/337,271 and 13/337,275 are continuations in part of and claim priority to Ser. No. 13/233,352.

FIELD OF THE INVENTION

The present invention provides in one aspect a system and method for providing combined technologies for social networking interactions using tracking, predicting, and implementing online consumer communications, browsing behavior, buying patterns, social networking, social networking communications, embedded advertisements and affiliate advertising and communications, for promotions, online coupons, mobile services, Products, Goods & Services, entertainment shopping, penny auctions or online auctions, bidding, bidding behavior, bidding results for targeting and filtering of promotions, online coupons, mobile services, Products, Goods & Services, entertainment shopping, penny auctions or online auctions, advertisements and affiliate advertising on a three dimensional geospatial platform using geospatial mapping technology, company-local information, social networking, and social networking communities ("PGS-GM-CL/I-SN").

BACKGROUND

Time and resources are wasted in the marketing of online products and services. Consumers waste time shopping in person or attempting to search for products or services online where they lack control or create suitable preferences for access to the search results. One approach taken in response to these and other shortcomings involves providing for products or services over the Internet, e.g., a system for shopping online over public computer networks such as the Internet. However, users and members of such systems stem usually must be registered, wherein registration and/or subscription by the user can provide information sufficient to identify the user, such as the users and members name, address, Internet e-mail address, and/or an identification number, using an Internet server and a user display terminal in communication therewith. There are, however, numerous shortcomings to such a system. Group buying sites leverage the power of collective bargaining, providing local product or services deals that offer savings for consumers while delivering improved sales numbers to participating merchants.

In standard GM and/or GIS systems, geographically-referenced information is maintained confidential and protected datastores by the creators and/or collectors of such data. Access to information in the datastores is controlled and provided directly by the creator and/or owner. Without knowledge of the source and/or location of particular geographically-referenced information and a password and/or certificate to access the information, the information is inaccessible. Integration of geographically-referenced information to provide an integrated interface and/or view of the information in context with a geographic map is usually performed at a user's computer using sophisticated GM and/or GIS software.

Alternatively, a user can interface with a server device managed by the creator through a client device running specialized software applications to interact with the GM and/or GIS databases of the data creators. At present access to data in a public forum is generally restricted by standard network security measures such as digest authentication and certificates. However, there are problems and shortcomings with online products or services which should also provide socially conscious information about the companies that supply the online products or services so that consumers can see where the companies and/or stores are located and can find out information about the companies, communities they are located in, what interaction and help they provide to communities and/or other economic and/or socially responsible activities, and to associate the geographical and other geospatially available information connecting also by the use of integrated social media, which combination is not current provided and/or available.

Consumers enjoy interacting with friends, acquaintances and strangers across many media channels, but that doesn't mean they trust them as a source of advertising. However, a new host of companies are connecting brands to consumers through their social connections. New web technology has created unexpected ways for advertisers to track your web activity without your knowledge enabling advertising networks to secretly monitor a user's activity across multiple websites and build detailed profiles of their behavior and interests.

Social software applications include communication tools and interactive tools. Communication tools typically handle the capturing, storing and presentation of communications, usually written but increasingly including audio and video as well. Interactive tools handle mediated interactions between a pair or group of users. They focus on establishing and maintaining a connection amount users, facilitating the mechanics of conversation and talk.

SUMMARY OF THE INVENTION

The present invention provides in one aspect a system and method for providing combined technologies for social networking interactions using tracking, predicting, and implementing online consumer communications, browsing behavior, buying patterns, social networking, social networking communications, embedded advertisements and affiliate advertising and communications, for promotions, online coupons, mobile services, Products, Goods & Services, entertainment shopping, penny auctions or online auctions, bidding, bidding behavior, bidding results for targeting and filtering of promotions, online coupons, mobile services, Products, Goods & Services, entertainment shopping, penny auctions or online auctions, advertisements and affiliate advertising on a three dimensional geospatial platform using geospatial mapping technology, company-local information, social networking, and social networking communities ("PGS-GM-CL/I-SN").

The invention can provide such system or method can include surveillance and web bot software technologies via a mobile device or computer for tracking online consumer behavior and data, cookies, embedded advertisements and affiliate advertising, predicting online consumer behavior and buying patterns by monitoring online activity, location, online communications, search inquiries, social networking, social plugins, promotions, social applications, entertainment shopping, penny auctions or online auctions, advertisements and affiliate advertising, purchasing, behavior and buying patterns, consumer address books and contact lists, blogs, chat rooms, friends, acquaintances and strangers, instant messaging, text chat, internet forum, service providers, travel and hospitality services, real estate, educational services, ancillary services (as defined herein) and delivery system for behavior targeting and filtering of promotions, online coupons, mobile services, Products, Goods & Services, entertainment shopping, penny auctions or online auctions, advertisements and affiliate advertising, and service providers business centers and affiliates for related company information on a three dimensional geospatial platform using multi-dimensional and scalable geospatial mapping associated with entities providing and/or members of the service and/or social networking.

The present invention provides in one aspect of a system and method for providing combined technologies for social networking interactions using tracking, online surveillance and web bot software technologies via a mobile device or computer. Such social networking interactions can be generated or provided based on tracking online consumer behavior and data, cookies, embedded advertisements and affiliate advertising, predicting online consumer behavior patterns, monitoring online activity, location, online communications, search inquiries for Products, Goods & Services, transaction history, consumer address books and contact lists, search inquiries for social networking activities, social plugins, promotions, social applications, entertainment shopping, penny auctions or online auctions, advertisements and affiliate advertising, purchasing, behavior, buying patterns and other criteria, consumer address books & contact lists, blogs, chat rooms, friends, instant messaging, text chat, internet forum, service providers, travel and hospitality services, real estate (e.g. vacant land, residential, commercial, recreational, retail, shopping malls, hotels, motels, golf courses, resorts, marinas, industrial, vacation, time shares, condominiums, multifamily, and other types of real estate, etc.), educational services, ancillary services e.g. (e.g. brokers, agents, relocation services, internet marketing, concierge, transportation, entertainment, travel and hospitality services, lenders, appraisers, education, developers, contractors, inspectors, home improvements/remodeling, basement designs, landscaping, home warranties, insurance, indoor and outdoor furniture, fixtures, windows, siding, roofing, heating/cooling, solar, plumbing, electrical, mechanical, and similar types) and delivery system for behavior targeting and filtering of promotions, online coupons, mobile services, Products, Goods & Services, entertainment shopping, penny auctions or online auctions, advertisements and affiliate advertising and service providers, business centers and affiliates on a three dimensional geospatial platform using multi-dimensional and scalable geospatial mapping associated with entities providing and/or members of the service and/or social networking and social networking communities for a geospatial website (accessible via a mobile device or computer) for a multidimensional representation of information and/or scalable versions of web and mobile device content for an infrastructure and global platform that provides users and members and businesses of all types and sizes with access to broad markets for the delivery of promotions, online coupons, mobile services, Products, Goods & Services, entertainment shopping, penny auctions or online auctions, advertisements and affiliate advertising, e-commerce, media and entertainment, sports, personal and financial network, travel and hospitality services, real estate, educational services, ancillary services, service providers, social networking, social networking communities, online dating, gaming, retail stores, virtual communities and virtual goods, information about microloans or microcredit, humanitarian aid and support other worldly causes through charitable donations or sustainable gifts for those in need (collectively referred to as "Products, Goods & Services" as any product or service or subgroup thereof) through combined Products, Goods, and Services with Geospatial Mapping/Company-Local Information/Social Networking/Communities ("PGS-GM-CL/I-SN") on a three dimensional geospatial platform using geospatial mapping technology. One example of an aspect of the invention is a geospatial website that aggregates, inter alia promotions, online coupons, mobile services, Products, Goods & Services, entertainment shopping, penny auctions or online auctions, advertisements and affiliate advertising from merchants and sellers from around the world and/or showcases them in their actual, physical location on the websites live view of Earth in combination with social networking and/or socially conscious information and/or activities.

The present invention addresses problems and/or shortcomings of prior online products and services, which should also provide socially conscious information about the companies that supply the online products and services so that consumers can see where the companies and/or stores are located and can find out information about the companies, communities they are located in, what interaction and help they provide to communities and/or other economic and/or socially responsible activities, and to associate the geographical and other geospatially available information connecting also by the use of integrated social media, which combination is not current provided and/or available.

As users and members and/or subscribers of the website, (e.g., "Social Shoppers") shop the world for promotions, online coupons, mobile services, Products, Goods & Services, entertainment shopping, penny auctions or online auctions, advertisements and affiliate advertising e.g., but not limited to, any promotion, products, goods or services. Such users and members and/or subscribers (e.g., "Social Shoppers") can find great promotions, online coupons, mobile services, Products, Goods & Services, entertainment shopping, penny auctions or online auctions, advertisements and affiliate advertising from leading travel & hospitality industry, restaurant, toy and/or entertainment companies and/or top retailers around the world.

A delivery system or providing combined social behavior tracking, online surveillance and web bot software technologies via a mobile device or computer for tracking online consumer behavior and data, cookies, embedded advertisements and affiliate advertising, predicting online consumer behavior and, buying patterns, monitoring online activity, location, online communications, search inquires, transaction history, consumer address books and contact lists, search inquiries for social networking activities, social plugins, promotions, social applications, entertainment shopping, penny auctions or online auctions, bidding, bidding behavior, bidding results, advertisements and affiliate advertising, blogs, chat rooms, friends, acquaintances and strangers, instant messaging, text chat, internet forum, service providers, travel and hospitality services, real estate, educational services, ancillary services (as defined herein) and delivery system for behavior targeting and filtering of promotions, online coupons, mobile services, Products, Goods & Services, entertainment shopping, penny auctions or online auctions, advertisements and affiliate advertising and service providers, business centers and affiliates for related company information on a three dimensional geospatial platform using multi-dimensional and scalable geospatial mapping associated with entities providing and/or members of the service and/or social networking on a host geospatial website (accessible via a mobile device or computer) can provide for a multidimensional representation of information and/or scalable version of web content for the delivery of promotions, online coupons, mobile services, Products, Goods & Services, entertainment shopping, penny auctions or online auctions, advertisements and affiliate advertising on a three dimensional geospatial platform using geospatial mapping technology. A host geospatial website can include realistic virtual landscape using satellite and/or aerial photography that can include many content layers of web based information, e-commerce links, social networking, social networking communities and/or advertisements and affiliate advertising for a richer user experience. A host website shall store images, web-based content, social data, social plugins, social applications and/or share live social feeds from Facebook™, Twitter™ and other popular social networks and/or other communications in real-time. Connecting promotions, online coupons, mobile services, Products, Goods & Services, entertainment shopping, penny auctions or online auctions, advertisements and affiliate advertising with users and members known as "Social Shoppers" based upon desired location in real-time on a geographical area across multiple social layers that are displayed as graphic animated color overlays on a three dimensional geospatial platform using geospatial mapping technology." The invention can also provide payment method and/or system for effectuating an online payment through a computer or mobile device to complete an e-commerce transaction on a three dimensional geospatial platform using geospatial mapping technology. The present invention can also provide user-friendly desktop interfaces and mobile apps for smart phones and other communication devices that will allow Social Shoppers to enjoy a unique experience utilizing a multitude of promotions, online coupons, mobile services, Products, Goods & Services, entertainment shopping, penny auctions or online auctions, advertisements and affiliate advertising as they virtually tour around the globe using the present invention.

Users and members of the present invention can do one or more of the following: Use the present invention after installing Google Earth™ or similar plug-ins; View Social Earth promotions, online coupons, mobile services, Products, Goods & Services, entertainment shopping, penny auctions or online auctions, advertisements and affiliate advertising, online retail stores, virtual communities and virtual goods and information about microloans or microcredit, humanitarian aid and support other worldly causes through charitable donations or sustainable gifts for those in need around the world by geo-target location on the present inventions unique "live view" of the planet; optionally Receive Social Earth promotions, online coupons, mobile services, Products, Goods & Services, entertainment shopping, penny auctions or online auctions, advertisements and advertising affiliates from merchants and sellers from around the world via the computer or mobile device based upon a desired location; View "live social feeds" from social networking sites such as Facebook™ and Twitter™; Zoom to birds-eye and human scale view and navigate around stunning 3D satellite images of the virtual Earth; Type in an address and fly directly to the location on the platform by using the zoom technology; and/or Watch videos from RSS links. The present invention provides a unique interactive user experience, view live links to places and events knowing that a portion of the dollars spent on the present invention are going to help those in impoverished conditions around the world.

The invention can further provide in one aspect geospatial website provides combined social behavior tracking, online surveillance & web bot software technologies via a mobile device or computer for tracking online consumer behavior and data, cookies, embedded advertisements and affiliate advertising, predicting online consumer behavior, buying patterns, monitoring online activity, location, online communications, search inquiries, transaction history, consumer address books and contact lists, search inquiries for social networking activities, promotions, social plugins, social applications, entertainment shopping, penny auctions or online auctions, bidding, bidding behavior, bidding results, advertisements and affiliate advertising, purchasing, behavior, buying patterns and other criteria and blogs, chat rooms, friends, acquaintances and strangers, instant messaging, text chat, internet forum, service providers, business centers and affiliate advertising for related company information, travel and hospitality, real estate, educational services, ancillary services (as defined herein) and delivery system for behavior targeting and filtering of promotions, online coupons, mobile services, Products, Goods & Services, entertainment shopping, penny auctions or online auctions, advertisements and affiliate advertising and service providers, business centers and affiliate advertising for related company information on a three dimensional geospatial platform using multi-dimensional and scalable geospatial mapping associated with entities providing and/or members of the service and/or social networking and aggregates of promotions, online coupons, mobile services, Products, Goods & Services, entertainment shopping, penny auctions or online auctions, advertisements and affiliate advertising from merchants and sellers from around the world and/or showcasing them in their actual, physical location on the websites unique live view of Earth.

As users and members and/or subscribers shop the world for Products. Goods and Services, as well as bargains, they can view promotions, online coupons, Products, Goods & Services, entertainment shopping, penny auctions or online auctions, advertisements and affiliate advertising for various types of real estate (e.g. vacant land, residential, commercial, recreational, retail, shopping malls, hotels, motels, golf courses, resorts, marinas, industrial, vacation, time shares, condominiums, multifamily, and other types of real estate, etc.), travel and hospitality services, educational services, ancillary services (e.g. brokers, agents, relocation services, internet marketing, concierge, transportation, hospitality, entertainment, concierge, transportation, entertainment, lenders, appraisers, education, developers, contractors, inspectors, home improvements/remodeling, basement designs, landscaping, home warranties, insurance, indoor and outdoor furniture, fixtures, windows, siding, roofing, heating/cooling, solar, plumbing, electrical, mechanical, and similar etc.), loans and quotes, auto loans, mortgages, banking services, and/or any other Products, Goods & Services, e.g., family fun, sports, restaurants, events and/or hundreds of top consumer products, goods or services, e.g., but not limited to, groceries, apparel, beverages, books and magazines, foods, health care, household, office, personal care, pet care, photography, banking services, autos, business, classic car parts, restoration and maintenance services, collectibles and art, custom car parts, restoration and maintenance services, deals and gifts education, electronics, fashion, financial, healthcare, home, outdoor and décor, travel and hospitality services, insurance, online services, other legal, marketing, medical facilities, medical insurance, medical retailers, motors, pets, physicians, dentists, other practioners, public services, psychics, intuitives, metaphysical, mediums and spiritual advisors, real estate, ancillary services, sports, travel, tourism, wedding, parties and entertainment, hotels, motels, golf courses, resorts, marinas, colleges and universities, private and public schools, libraries, post offices, government agencies, transportation, AAA, equestrian, parks and recreation, tennis, airports, airlines, online dating and/or any other products, goods or services. Social Shoppers can to find great promotions, online coupons, mobile services, Products, Goods & Services, entertainment shopping, penny auctions or online auctions, advertisements and affiliate advertising from leading travel & hospitality industry, restaurants, toy and/or entertainment companies and/or top retailers around the world. Social Shoppers can to use online access payment method and/or system for effectuating an online payment through a computer or mobile device equipped carrier and/or a mobile device equipped bank using a mobile users device in connection with e-commerce transactions on the host geospatial website via a website or mobile device (e.g., mobile, telephone, PDA, laptop computer, etc.); wherein users and members create and/or maintain a rich-media application via a geospatial mapping platform via the Internet comprising: mobile banking and/or electronic payments.

The delivery system for a host geospatial website (accessible via a mobile device or computer) can provide for a multidimensional representation of information and/or sealable version of web content for an infrastructure and global platform that provides users and members and businesses of all types and sizes with access to broad markets for the delivery system and method for providing combined social behavior tracking, online surveillance and web bot software technologies via a mobile device or computer for tracking online consumer behavior and data, cookies, embedded advertisements and affiliate advertising, social plugins, social applications, predicting online consumer behavior, buying patterns, monitoring online activity, location, online communications, search inquiries, social networking, social plugins, promotions, social applications, entertainment shopping, penny auctions or online auctions, bidding, bidding behavior, bidding results, advertisements and affiliate advertising, purchasing, behavior and buying patterns, consumer address books & contact lists, blogs, chat rooms, friends, acquaintances and strangers, instant messaging, text chat, internet forum, service providers, travel and hospitality services, real estate, educational services, ancillary services (as defined herein) and delivery system for behavior targeting and filtering of promotions, online coupons, mobile services, Products, Goods & Services, entertainment shopping, penny auctions or online auctions, advertisements and affiliate advertising and service providers, business centers and affiliates for related company information on a three dimensional geospatial platform using multi-dimensional and scalable geospatial mapping associated with entities providing and/or members of the service and/or social networking and aggregating of promotions, online coupons, mobile services, Products, Goods & Services entertainment shopping, penny auctions or online auctions, advertisements and affiliate advertising on a three dimensional geospatial platform using geospatial mapping technology. A host geospatial website can include realistic virtual landscape using satellite and/or aerial photography that can include many content layers of web based information, e-commerce and mobile banking links, social networking, social networking communities and/or advertisements and affiliate advertising for a richer user experience. A host geospatial website shall store images, web-based content, social data and/or share live social feeds from social networking giants Facebook™ and Twitter™, social networking, social networking communities, social plugins, social applications, promotions, online coupons, mobile services, Products, Goods & Services, entertainment shopping, penny auctions or online auctions, advertisements and affiliate advertising and/or other communications in real-time. The use of geospatial mapping for associating information to specific places can include, but is not limited to, one or more of: Live links to places and events; Data on the landscape; Zoom to birds-eye and human scale views; 3D custom audio/visual content; Interactive 360 panoramas; Fly-through tours with content, narration, music; Stunning imagery and videos; 3D buildings and landscaping e-commerce and mobile banking tools and hooks; Advertising on the landscape; Advanced search for private and public information; Social networking, social plugins, social applications, social integration and social networking communities; Self-posting for uploading user generated content; Custom tools, social and mobile apps and widgets; tracking social behavior and the like.

Connecting promotions, online coupons, mobile services, Products, Goods & Services, entertainment shopping, penny auctions or online auctions, advertisements and affiliate advertising with users and members known as "Social Shoppers" in real-time on a geographical area across multiple social layers that are displayed as graphic animated color overlays on a three dimensional geospatial platform using geospatial mapping technology. More specifically, it relates to a method for users and members known as "Social Shoppers" to effectuate banking and/or electronic payments via a mobile device or computer; accessing a user account, engaging in mobile social activities and/or viewing available options via a three dimensional geospatial mapping platform using geospatial mapping technology. The present invention provides one or more of the following advantages over online products, goods or services, email, daily deal, coupons and social networking sites by one or more of: Combining the community of social networking and connecting users, buyers and sellers with promotions, online coupons, mobile services, Products, Goods & Services, entertainment shopping, penny auctions or online auctions, advertisements and affiliate advertising on a fun collective buying site along with the fastest growing business model on the Web; A portion of each "Social Earth Coupon" that is sold on its website of the present invention to provide information about microloans or microcredit, humanitarian aid or support other worldly cause through charitable donations or sustainable gifts to help those in need; Gathering promotions, online coupons, mobile services, Products, Goods & Services, entertainment shopping, penny auctions or online auctions, advertisements and affiliate advertising, as well as bargains from all over the world into one fun online shopping experience; Shoppers can search for promotions, online coupons, mobile services, Products, Goods & Services, entertainment shopping, penny auctions or online auctions, advertisements and affiliate advertising from merchants and sellers from around the world based upon a desired geo-target locations in each market: Easy-to-scale usability and social networking component, SOCIAL EARTH will spread virally and expand rapidly into different regions because of social networking integration; Allowing Social Shoppers to engage in social networking activities and share the latest promotions, online coupons, mobile services, Product, Goods & Services, entertainment shopping, penny auctions or online auctions, advertisements and affiliate advertising and bargains with their friends will create "stickiness" and bring them back to the site again and again; Giving Social Shoppers a fun, hip interactive experience on a live view of Earth with satellite imagery, aerial photography and graphic animated color overlays; and/or Having a unique interactive user experience, view live links to places and events and giving back to our planet.

Accordingly, it is an object of the present invention to provide a new mechanism for tracking social behavior and profiling a user during the marketing of digital content, by any means known in the art, e.g., as disclosed in U.S. application Ser. No. 09/797,647, filed Mar. 1, 2001, which is entirely incorporated herein by reference.

Another object of the invention is to provide such a mechanism which is substantially ambivalent to the underlying nature of the digital content.

Another object of the invention is to provide such a mechanism which works when the user is off-line and accessing a local inventory of the digital content.

And, another object of the invention is to provide such a mechanism which operates continuously, whenever consumers want and without need for the actual physical availability of vendor and financial intermediary parties.

Briefly, preferred embodiment of the present invention is a method for collecting user data, and optionally creating a user profile. An inventory of digital content is supplied, wherein at least part of the inventory is pre-stored on a client computer. The inventory includes at least one asset, collateral for an asset, or advertisement. Information about the inventory is displayed to a user of the client computer and user data is collected about the user based on their actions with regard to the information about the inventory. Optionally, a user profile is then constructed based on the user data.

An advantage of the present invention is that it provides behavior tracking and user profiling at the speed of digital electronics, yet operates in the context of the conventional, time proven, widely understood, and trusted transactional interrelation of consumer, financial intermediary, and vendor.

Another advantage of the invention is that it may be entirely automated and may employ communications with outside services which may also be entirely automated.

And, another advantage of the invention is that it is efficient and economical for all involved. The initial user being tracked and profiled are not burdened and the end users of the information provided can automatically and cheaply obtain the data being generated.

These and other objects and advantages of the present invention will become clear to those skilled in the art in view of the description of the best presently known mode of carrying out the invention and the industrial applicability of the preferred embodiment as described herein and as illustrated in the several figures of the drawings.

Social Networking Integration: The present invention can also provide in certain embodiments integrated social plugins with "live social feeds" from social networking giants Facebook™ and Twitter™, e.g., but not limited to Facebook™ and Twitter™, into its website(s), which allows Social Shoppers to interact and share the latest promotions, online coupons, mobile services, Products, Goods & Services, entertainment shopping, penny auctions or online auctions, advertisements and affiliate advertising with their friends, acquaintances, strangers, family, business associates, and others. Tapping into the power of social networking users through social networking integration will help users of the present invention connect with thousands or millions of users around the world in real time. Twitter™ the latest social networking phenomenon, enables its users to send and read other users messages called "tweets." The present invention provides opportunities to use open source technology to rapidly grow its Social Shoppers around the world by utilizing social networking integration and developing social applications with feeds" from social networking sites Facebook™ and Twitter™ into its website and encouraging Social Shoppers to share the latest products or services or deals with their friends in these popular social networks.

BRIEF DESCRIPTION OF THE DRAWINGS

FIG. 1 is a diagrammatic and block diagram view of an electronic Product, Good or Service with/Geospatial Mapping/Company-Local Information/Social Networking/Communities ("PGS-GM-CL/I-SN") information and/or product/good/service distribution system, according to an exemplary embodiment;

FIG. 2 is a simplified block diagram showing, in greater detail, a database server portion of the main server system shown in FIG. 1;

FIGS. 3A-3B illustrate a screen display defining an interface associated with a client system portion, according to an exemplary embodiment;

FIG. 4 is a simplified flowchart diagram view illustrating interactions between the client system, and the main server system, according to an exemplary embodiment;

FIGS. 22-23 are simplified flowchart diagram views showing alternate actions taken by the client system in response to selection by the user of a logo pane and an advertising pane, respectively, according to exemplary embodiments;

FIG. 24 is a simplified flowchart diagram view showing the steps executed by the client system when a user selects an item from PGS-GM-CL/I-SN information and/or data subcategory list, according to an exemplary embodiment;

FIG. 25 is a simplified flowchart diagram view showing the steps executed by the client system when the user selects a particular PGS-GM-CL/I-SN product and/or service, according to an exemplary embodiment;

FIGS. 27A and 27B are flow diagrams of processes for controlling the number of clicks to a clickable advertisement, according to exemplary embodiments;

FIG. 36 presents a flow chart showing a typical transaction for the purchase online coupons, mobile services, Products, Goods & Services and more that provides a portion of each sale shall be attributed to microloans or microcredit, humanitarian aid and support other worldly causes through charitable donations or sustainable gifts. In addition, users will also be able to donate money to a worthy cause through the Shopping Cart or purchasing a online coupons, mobile services, Products, Good and Services, entertainment shopping, penny auctions or online auctions, advertisements and affiliate advertising on the "Giving Back" Layer; "View Social Earth promotions, online coupons, mobile services, Products, Goods & Services, entertainment shopping, penny auctions or online auctions, advertisements and affiliate advertising, retail stores, virtual communities and virtual goods, information about microloans or microcredit, humanitarian aid and support other worldly causes through charitable donations or sustainable gifts that will help those in need around the world by geo-target location or anywhere in the world on the present inventions unique "live view" of the planet."

DETAILED DESCRIPTION

Figure 5:
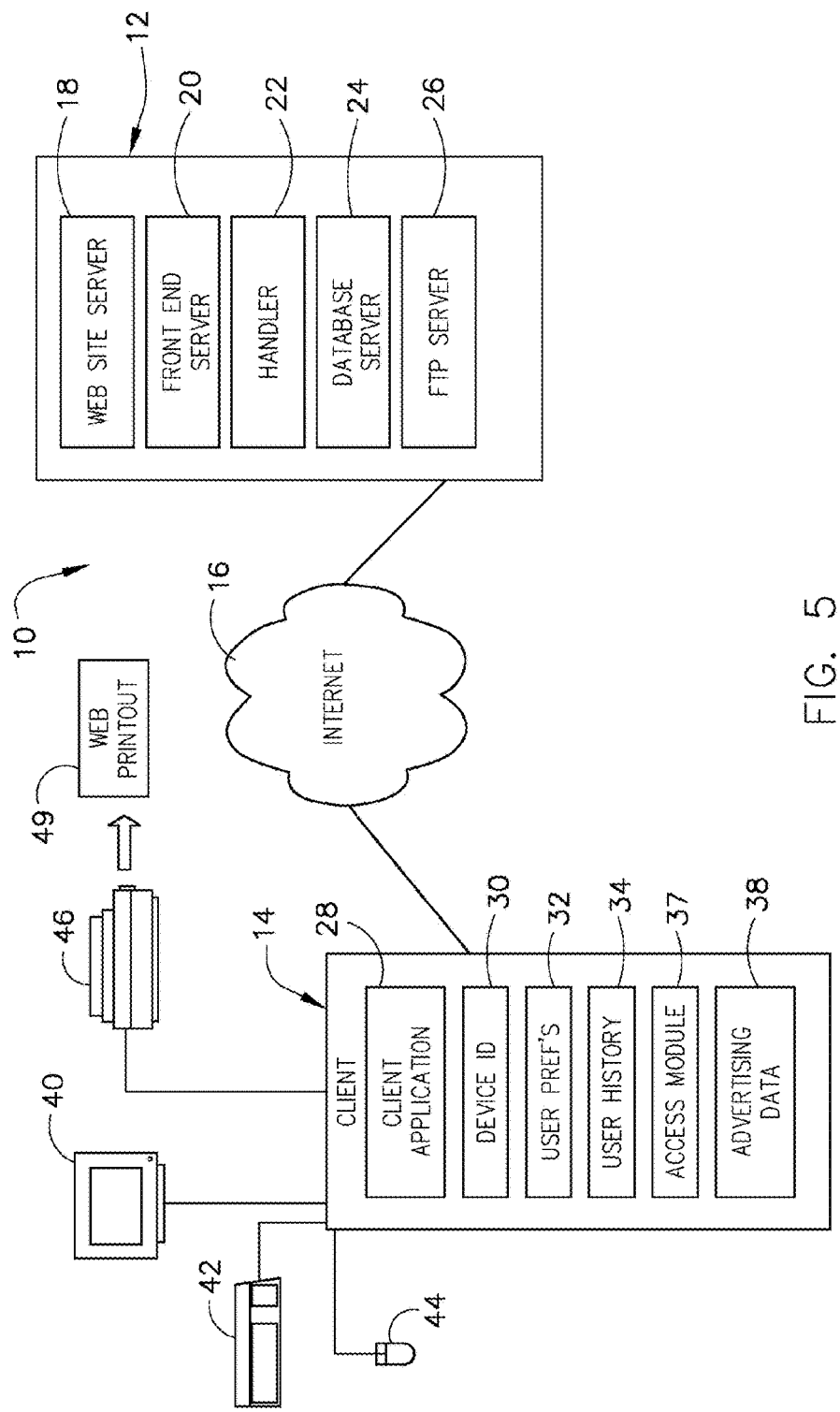
FIG. 5 is a diagrammatic and block diagram view of a system for controlling the number of clicks to a clickable advertisement, according to an exemplary embodiment.

The present invention provides in one aspect a system and method for providing combined technologies for social networking interactions using tracking, predicting, and implementing online consumer communications, browsing behavior, buying patterns, and advertisements and affiliate advertising, for promotions, online coupons, mobile services, Products, Goods & Services, entertainment shopping, penny auctions or online auctions, advertisements and affiliate advertising and service providers, for targeting and filtering of promotions, online coupons, mobile services, Products, Goods & Services, entertainment shopping, penny auctions or online auctions, advertisements and affiliate advertising and service providers, business centers and affiliates for related company and local information on a three dimensional geospatial platform using geospatial mapping technology, company-local information, social networking, and social networking communities ("PGS-GM-CL/I-SN"). The present invention provides in one aspect a system and method for providing social networking and social networking interactions using combined social behavior tracking, online surveillance and web bot software technologies via a mobile device or computer for tracking online consumer behavior and data, cookies, embedded advertisements, predicting online consumer behavior, buying patterns, monitoring online activity, location, online communications, search inquires, social networking, social plugins, promotions, social applications, entertainment shopping, penny auctions or online auctions, bidding, bidding behavior, bidding results, advertisements, purchasing, behavior and buying patterns, consumer address books & contact lists, blogs, chat rooms, friends, acquaintances and strangers, instant messaging, text chat, internet forum, service providers, travel and hospitality services, real estate, educational services, ancillary services (as defined herein or as known in the art) and delivery system for behavior targeting and filtering of promotions, online coupons, mobile services, Products, Goods & Services, entertainment shopping, penny auctions or online auctions, advertisements and affiliate advertising, service providers, business centers and affiliates for related company information on a three dimensional geospatial platform using multi-dimensional and scalable geospatial mapping associated with entities providing and/or members of the service and/or social networking for a geospatial website (accessible via a mobile device or computer) for a multidimensional representation of information and/or scalable versions of web and mobile device content for the delivery of Products, Goods & Services with/Geospatial Mapping/Company-Local Information/Social Networking/Communities ("PGS-GM-CL/I-SN") on a three dimensional geospatial platform using geospatial mapping technology.

One example of an aspect of the invention is a geospatial website that aggregates, inter alia, promotions, online coupons, mobile services, Products, Goods & Services, entertainment shopping, penny auctions or online auctions, advertisements and affiliate advertising, service providers, business centers and affiliates for related company information on a three dimensional geospatial platform using multi-dimensional representation of information and/or scalable versions of web and mobile device for the delivery of promotions, online coupons, mobile services, Products, Goods & Services, entertainment shopping, penny auctions or online auctions, advertisements and affiliate advertising for such items, including without limitation, e-commerce, media and entertainment, sports, personal and financial network, travel and hospitality services, real estate, educational services, ancillary services (e.g. brokers, agents, relocation services, internet marketing, concierge, travel and hospitality services, transportation, entertainment, lenders, appraisers, education, developers, contractors, inspectors, home improvements/remodeling, basement designs, landscaping, home warranties, insurance, indoor and outdoor furniture, fixtures, windows, siding, roofing, heating/cooling, solar, plumbing, electrical, mechanical, and similar etc.), service providers, social networking, online dating, gaming, retail stores, virtual communities and virtual goods, information about microloans or microcredit, humanitarian aid and support other worldly causes through charitable donations or sustainable gifts for those in need (collectively, "Products, Goods & Services" as any product or service or subgroup thereof) from around the world and/or showcases them, e.g., in their actual, physical location on the websites live view of Earth in combination with social networking and/or socially conscious information and/or activities.

Social Earth will provide information and links to some of the top real estate websites and integrate real estate information into its website from third party websites such as, but not limited to, Yahoo Real Estate, Zillow, Realtor.com, Trulia, MSN Real Estate, Homes.com, AOL Real Estate, Rent.com, ZipRealty, MyNewPlace, LoopNet, Apartment Guide, Re/Max Real Estate, Apartments.com, Welchet.com, Redfin, HomeFinder, Listingbook Services, Rentals.com, ForRent.com and other real estate related websites.

The present invention addresses problems and/or shortcomings of current online products or services, retail stores, virtual communities and virtual goods, and will provide information about microloans or microcredit, humanitarian aid and support other worldly causes through charitable donations or sustainable gifts to help those in need, which should also provide socially conscious information about the companies that supply promotions, online coupons, mobile services, Products, Goods & Services, entertainment shopping, penny auctions or online auctions, advertisements and affiliate advertising so that consumers can see where the companies and/or stores are located and can find out information about the companies, communities they are located in, what interaction and help they provide to communities and/or other economic and/or socially responsible activities, and to associate the geographical and other geospatially available information connecting also by the use of integrated social media, which combination is not current provided and/or available. As users and members and/or subscribers of the website, (e.g., "Social Shoppers") shop the world for promotions, online coupons, mobile services, Products, Goods & Services, entertainment shopping, penny auctions or online auctions, advertisements and affiliate advertising, e.g., but not limited to, promotions, online coupons, mobile services, Products, Goods & Services, entertainment shopping, penny auctions or online auctions, advertisements and affiliate advertising, residential and commercial various types of real estate, travel & hospitality services, educational services and ancillary services, auto loans, mortgages, banking services, and/or any other products, goods or services, e.g., but not limited to, family fun, spoils, restaurants, events and/or hundreds of top consumer packaged goods brands for, e.g., but not limited to, groceries, apparel, beverages, books and magazines, foods, health care, household, office, personal care, pet care, photography, service providers, e-commerce, media and entertainment, sports, personal and financial network, travel and hospitality services, real estate, educational services, ancillary services, service providers, social networking, social networking communities, social plugins, social applications, online dating, gaming, retail stores, virtual communities and virtual goods for residential and commercial various types of real estate (e.g. vacant land, residential, commercial, recreational, retail, shopping malls, hotels, motels, golf courses, resorts, marinas, industrial, vacation, time shares, condominiums, multifamily, and other types of real estate, etc.), and providing information about loans and quotes, auto loans, mortgages, banking services, and/or any other product or service, e.g., family fun, sports, restaurants, events and/or hundreds of top consumer products or services, e.g., but not limited to, groceries, apparel, beverages, books and magazines, foods, health care, household, office, personal care, pet care, photography, residential and commercial various types of real estate (e.g. vacant land, residential, commercial, recreational, retail, shopping malls, hotels, golf courses, marinas, industrial, vacation, time shares, condominiums, multifamily, and other types of real estate, etc.), educational services, ancillary services, loans and quotes, auto loans, mortgages, banking services, autos, business, classic car parts, restoration and maintenance services collectibles and art custom car parts, restoration and maintenance services deals and gifts education, electronics, fashion, financial, healthcare, home, outdoor and décor, travel and hospitality services, insurance, online services, other legal marketing, medical facilities, medical insurance, medical retailers, motors, pets, physicians, dentists, other practioners, public services, psychics, intuitive, metaphysical, mediums and spiritual advisors, real estate, ancillary services, sports, tourism, wedding, parties and entertainment, social networking, social networking communities, online dating and/or any other product or service. Such users and members and/or subscribers (e.g., "Social Shoppers") can find great promotions, online coupons, Products, Goods & Services, entertainment shopping, penny auctions or online auctions, advertisements and affiliate advertising from the leading travel & hospitality industry, restaurants, toy and/or entertainment companies and/or top retailers around the world.

The delivery system for a host geospatial website (accessible via a mobile device or computer) can provide for a multidimensional representation of information and/or scalable version of web content for an infrastructure and global platform that provides users and members and businesses of all types and sizes with access to broad markets for the delivery of promotions, online coupons, mobile services, Products, Goods & Services, entertainment shopping, penny auctions or online auctions, online advertisements (including but not limited to embedded advertisements) service providers, business centers and affiliates for related company information for such items, including without limitation, e-commerce, media and entertainment, sports, personal & financial network, travel & hospitality services, real estate, educational services, ancillary services, advertisers, service providers, social networking, social networking communities, online dating, gaming, retail stores, virtual communities and virtual goods and information about microloans or microcredit, humanitarian aid and support other worldly causes through charitable donations or sustainable gifts on a three dimensional geospatial platform using geospatial mapping technology. A host geospatial website can include realistic virtual landscape using satellite and/or aerial photography that can include many content layers of web based information, promotions, online coupons, mobile services, Products, Goods & Services, entertainment shopping, penny auctions or online auctions, advertisements and affiliate advertising and mobile banking links and social networking integration for a richer user experience. A host website shall store images, web-based content, social data, social plugins, social networking, social networking communities, social applications and/or share "live social feeds" from social networks and/or other communications in real-time.

The use of geospatial mapping for associating information to specific places can included, but it not limited to, one or more of: Live links to places and events; Data on the landscape; Zoom to birds-eye and human scale views; 3D custom audio/visual content; Interactive 360 panoramas; Fly-through tours with content, narration, music; Stunning imagery and videos; 3D buildings and landscaping, e-commerce and mobile banking tools and hooks; Advertising on the landscape; Advanced search for private and public information; Social networking integration; Self-posting for uploading user generated content; Custom tools, mobile apps and widgets; and the like. Connecting buyers and sellers with Products, Goods & Services with users and members known as "Social Shoppers" in real-time on a geographical area across multiple social layers that are displayed as graphic animated color overlays on a three dimensional geospatial platform using geospatial mapping technology." The invention can also provide mobile payment method and/or system for effectuating an online payment through a computer or a mobile device to complete an e-commerce and mobile banking transaction on a three-dimensional geospatial platform using geospatial-mapping technology.

The invention can further provide in one aspect geospatial website aggregates buyers and sellers with promotions, online coupons, mobile services, Products, Goods & Services, entertainment shopping, penny auctions or online auctions, advertisements and affiliate advertising from merchants and sellers around the world and/or showcases them in their actual, physical location on the websites unique live view of Earth. As users and members and/or subscribers shop the world for promotions, online coupons, mobile services, Products, Goods & Services, entertainment shopping, penny auctions or online auctions, advertisements and affiliate advertising, as well as the latest bargains. Users can also view media and entertainment, sports, personal & financial network, travel & hospitality services, real estate, educational services, ancillary services, penny auctions or online auctions, advertisements and affiliate advertising, service providers, business centers and affiliates for related company information, social networking, social networking communities, online dating, gaming, retail stores, virtual communities and virtual goods and information about microloans or microcredit, humanitarian aid and support other worldly causes through charitable donations or sustainable gifts and more for family fun, sports, restaurants, events and/or hundreds of top consumer packaged goods brand/brandors for groceries, apparel, beverages, books & magazines, foods, health care, household, office, personal care, pet care, photography, autos, business, classic car parts, restoration and maintenance services, collectibles & art, custom car parts, restoration and maintenance services, deals & gifts, education, electronics, fashion, financial, healthcare, home, outdoor & décor, travel & hospitality services, insurance, online services, other legal marketing, medical facilities, medical insurance, medical retailers, motors, pets, physicians, dentists, other practioners, public services, psychics, mediums & spiritual advisors, travel & hospitality services, sports, travel, tourism, wedding, parties & entertainment, social networking, social networking communities, online dating and/or the like. Social Shoppers can to find great promotions, online coupons, mobile services, Products, Goods & Services, entertainment shopping, penny auctions or online auctions, advertisements and affiliate advertising from merchants, sellers and the leading travel & hospitality industry, restaurants, toy and/or entertainment companies and/or top retailers around the world. Social Shoppers can to use "a mobile device payment method and/or system" for effectuating an online payment through a mobile device equipped carrier and/or a mobile device equipped bank using a mobile users device or computer in connection with an e-commerce and mobile banking transactions on the host geospatial website or mobile device (e.g., mobile telephone, PDA, laptop computer, etc.); wherein users and members create and/or maintain a rich-media application via a geospatial mapping platform via the Internet comprising: mobile banking and/or electronic payments.

Social Earth Mobile allowing Social Shoppers to receive promotions, online coupons, mobile services, Products, Goods & Services, entertainment shopping, penny auctions or online auctions, advertisements and affiliate advertising based upon their precise location. Mobile apps for smart phones (e.g., but not limited to, Android™ and tablets, e.g., iPhone™, iPod Touch™ and iPad™) are provided that will allow Social Shoppers to receive promotions, online coupons, mobile services, Products, Goods & Services, entertainment shopping, penny auctions or online auctions, advertisements and affiliate advertising based upon their online activities, precise location, GPS, online communications, search inquiries, social networking, social networking communities, social plugins, promotions, social applications, entertainment shopping, penny auctions or online auctions, bidding, bidding behavior, bidding results, advertisements and affiliate advertising, purchasing, behavior, buying patterns and other criteria, such as shopping or interest preferences. With Social Earth Mobile, Social Shoppers can explore the same 3D imagery and terrain as on the desktop version. Users will be able to fly to their current location or anywhere in the world by typing in the address in the search bar. With a touch of a button, users will be able to Pan, zoom, and tilt their view as they virtually travel around the globe. Users will be able to Search for people, cities, places and businesses around the world and View many layers of geographic information and other information on a three-dimensional geospatial platform using geospatial-mapping technology. The invention provides opportunities to connect buyers and sellers and reach people at the point of shopping through GPS—a benefit both to shoppers and merchants. The delivery system for a host geospatial website can provide for a multidimensional representation of information and/or sealable version of web content for an infrastructure and global platform that provides users and members and businesses of all types and sizes with access to broad markets for the delivery of promotions, online coupons, mobile services, Products, Goods & Services, entertainment shopping, penny auctions or online auctions, advertisements and affiliate advertising and service providers, business centers and affiliates for related company information on a three dimensional geospatial platform using geospatial mapping technology. A host geospatial website can include realistic virtual landscape using satellite and/or aerial photography that can include any content and many layers of web based information, promotions, online coupons, mobile services, Products, Goods & Services, entertainment shopping, penny auctions or online auctions, advertisements and affiliate advertising and mobile banking links, social networking, social networking communities and/or advertisements (including but not limited to embedded advertisements) for a richer user experience. A host geospatial website shall store images, web-based content, social data and/or share "live social feeds" from social networking giants Facebook™ and Twitter™ and/or other communications in real-time. Connecting an infrastructure and global platform that provides users and members and businesses of all types with access to broad market for the delivery of promotions, online coupons, mobile services, Products, Goods & Services, entertainment shopping, penny auctions or online auctions, advertisements and affiliate advertising to users and members known as "Social Shoppers" based upon their location in real-time on a geographical area across multiple social layers that are displayed as graphic animated color overlays on a three dimensional geospatial platform using geospatial mapping technology.

The invention provides in one aspect a method for providing social networking interactions using internet and mobile websites and related computer systems that provide end user customized interactive displays of three dimensional geospatial maps comprising end user customized promotions, online coupons, mobile services, Products, Goods & Services, entertainment shopping, penny auctions or online auctions, advertisements and affiliate advertising, social networking, social networking communities, service providers, business centers and affiliates, and related company and local information, the method resulting in collection and analysis of end user data relating to end user's online activity, location, online communications, search inquiries, social networking, social networking community, user profiles, messaging, viewing public & private user profiles, social plugins, promotions, social applications, entertainment shopping, penny auctions or online auctions, bidding, bidding behavior, bidding results, advertisements and affiliate advertising, purchasing, behavior, preferences and buying patterns, the collection and analysis used to (A) firstly provide first consumer data sets used to generate first end user geospatial interactive displays comprising first promotional data collections of promotions, online coupons, mobile services, Products, Goods & Services, entertainment shopping, penny auctions or online auctions, bidding behavior, bidding results, advertisements and affiliate advertising, social networking, social networking communities, service providers, business centers and affiliates for related company and local information, using multi-dimensional and scalable geospatial mapping and integrated social networking, social networking community; and to (B) secondly provide second consumer data sets related to one or more of (i) the end users, (ii) additional end users, and (iii) target end user groups, the second consumer data comprising end user related consumer profiles, trends and target markets, the first and second consumer data sets used to generate second end user geospatial interactive displays comprising customized second promotional data collections of promotions, online coupons, mobile services, Products, Goods & Services, entertainment shopping, penny auctions or online auctions, bidding, bidding behavior, bidding results, advertisements and affiliate advertising, social networking, social networking communities, service providers, business centers and affiliates, and related company and local information, the first and second end user displays generated using a three dimensional geospatial platform using multi-dimensional and scalable geospatial mapping, the method comprising:

(a) electronically assigning on a computer system an identifier to a client mobile device or computer receiving a request from the end user via a client application operating on the client mobile device or computer system for Internet access to websites or links;

(b) electronically providing on a mobile device or computer system access to the websites or links that provide three dimensional geospatial interactive displays, the mobile device or computer system comprising a combination of:
  (i) first consumer data sets used to generate first end user geospatial interactive displays using multi-dimensional and scalable geospatial mapping and integrated social networking, user profiles, online communications, messaging, the first end user geospatial interactive displays comprising
    a. first promotional data collections for separate locations shown on the displays, the first promotional data collections comprising
      1. promotions,
      2. online coupons,
      3. mobile services,
      4. products,
      5. goods,
      6. services, 7. entertainment shopping,
8. penny and online auctions,
9. bidding,
10. bidding behavior,
11. bidding results,
12. advertisements and affiliate advertising,
13. social networking,
14. social networking communities,
15. service providers,
16. business centers and affiliates,
17. related company information; and
18. local information; and
  b. interactive links to social networks, social networking, social networking communities, online communications, user profiles, messaging, viewing public & private user profiles, social plugins, promotions, social applications, entertainment shopping, penny and online auctions, bidding, bidding behavior, bidding results, advertisements and affiliate advertising; and
  c. interactive links to websites displaying the promotions, online coupons, mobile services, Products, Goods & Services, entertainment shopping, penny and online auctions, bidding, bidding behavior, bidding results, advertisements and affiliate advertising, social networking, social networking communities, service providers, business centers and affiliates, and related company information and related local information;
(c) electronically displaying on the client computer the first end user geospatial interactive display provided in step (b);
(d) electronically monitoring, collecting and analyzing, using a mobile device or computer system data analysis system, the end user data relating to end user's
  (i) online activity,
  (ii) location,
  (iii) online communications,
  (iv) social networking plugins,
  (v) search inquiries,
  (vi) social networking,
  (vii) social networking communities,
  (viii) user profiles,
  (ix) messaging,
  (x) viewing public & private user profiles,
  (xi) social plugins,
  (xii) promotions,
  (xiii) social applications,
  (xiv) entertainment shopping,
  (xv) penny and online auctions,
  (xvi) bidding,
  (xvii) bidding behavior,
  (xviii) bidding results,
  (xix) advertisements and affiliate advertising,
  (xx) purchasing,
  (xxi) behavior;
  (xxii) preferences
  (xxiii) IM, text and email messaging; and
  (xiv) buying patterns on the websites or links, to provide end user output data;
(e) electronically processing the end user output data from step (d) to electronically generate second consumer data sets related to one or more of
  a. the end users,
  b. additional end users, and
  c. target end user groups, the second consumer data sets comprising end user related consumer profiles, trends and target markets, based on the analyzing in step (c);
(f) electronically processing the first and second consumer data sets to generate second end user geospatial interactive displays using multi-dimensional and scalable geospatial mapping and integrated social networking, social networking community, user profiles, online communications, messaging, the second end user geospatial interactive displays comprising
  (i) customized second promotional data collections for separate locations shown on the displays, the customized second promotional data collections comprising
    (a) promotions,
    (b) online coupons,
    (c) mobile services,
    (d) products,
    (e) goods,
    (f) services,
    (g) entertainment shopping,
    (h) penny and online auctions,
    (i) bidding,
    (j) bidding behavior,
    (k) bidding results,
    (l) advertisements and affiliate advertising,
    (m) social networking,
    (n) social networking communities,
    (o) service providers and related company information; and
    (p) local information; and
    (q) interactive links to social networks, social networking, social networking communities, online communications, user profiles, messaging, viewing public & private user profiles, social plugins, promotions, social applications, entertainment shopping, penny auctions, online auctions, bidding, bidding behavior, bidding results, advertisements and affiliate advertising; and
    (o) interactive links to websites displaying the promotions, online coupons, mobile services, Products, Goods & Services, entertainment shopping, penny auctions, online auctions, bidding, bidding behavior, bidding results, advertisements and affiliate advertising, social networking, social networking communities, service providers and related company information and related local information; and
(g) electronically displaying on the client mobile device or computer system the second end user geospatial interactive display provided in step (f).
The method can further provide wherein the social networking is selected from one or more of access to trusted user-generated content using social networks, accessing information from multiple networks, social graphs, and content sites, accumulating social relation information for social network services, adaptive packaging of network resources, adaptive social network management, advertising products to groups within social networks, aggregation of social network data, aggregation, standardization and extension of social networking contacts to enhance a television consumer experience, application of social networking data, assigning access privileges in a social network, associative memory operators, methods and computer program products for using a social network for predictive marketing analysis, automatically locating web-based social network members, automatically manage social connections, auto-shared photo album, biometric social networking, blocking objectionable communications in a social network, broadcast notifications using social networking systems, clarifying search results using social-networking information, collective socializing using a mobile social network, collectively giving gifts in a social network environment, commercializing ideas or inventions, communicating between users, community detection, community translation on a social network, confirming an association in a web-based social network, consumption management systems and methods integrated with social networks, content sharing across enterprise social networks, contingent rights exchange associated with a social network, controlling access of user information using social-networking information, coordinated location aware brokering of social networks, correlation of psycho-demographic data and social network data to initiate an action, creating a social network map of non-voice communications, creating a social-networking online community, cross-network social networking application architecture, defined searching and web crawling, defining user relationships in a social networking environment, determining a group preference in a social network, device, system, and method of generating location-based social networks, discerning human intent based on user-generated metadata, discovering, creating, using, and managing social network circuits, displaying demographic information of members discussing topics in a forum, dynamically generating a privacy summary, dynamically generating segmented community flyers, dynamically managing a social network group, dynamically providing a news feed about a user of a social network, elements of an enterprise event feed, email confirmation page for social network notifications, enabling location-dependent value exchange and object of interest identification, enabling messaging between users of different social networks and between users of social networks and users of other communication systems, enterprise social graph and contextual information presentation, establishing a social network system based on motif, social status and social attitude, facilitate real time communications between members of a social network, feature propagation, federation and interoperability between social networks, feeding updates to landing pages of users of an online social network from external sources, file sharing based on social network, friends toolbar for a virtual social venue, generating a feed of stories personalized for members of a social network, generating segmented community flyers in a social networking system, giving gifts and displaying assets in a social network environment, graphical representation of social network vitality, highlighting email recipients, hosting a social network that enables granular management of the privacy of posted information, hot video prediction system based on user interests social network, incentivize transactions to enhance social goodness, incorporation of variables into textual content, information handling system low power network communications, information security for recovery based social networking, integrating a social network and data repository to enable map creation, integrating social contact identifiers into wagering games, integrating social networking with financial services, integrating social networks and wagering games, integrating updates into a social-networking service, interacting with social networking in an internet protocol television system, leveraging a social graph from a social network for social context in other systems, leveraging information in a social network for inferential targeting of advertisements, managing information about relationships in a social network via a social timeline, managing information flow between members of an online social network, managing organizational resources, marketing system having multiple fulfillment channels and a method for directing a personalized invitation to members of a social network, markup language for incorporating social networking system information by an external website, measuring social capital index in an online social network, mobile device and method of operating same to interface content provider website, mobile network operator controlled content to mobile subscribers using social networking messages, mobile social networking enabled by bar codes, mobile social networking system and method, modeling social networks using analytic measurements of online social media content, modification of social networks via design codes, monetizing a social network platform, monitoring activity of a specified user on internet-based social networks, multi-governance social networking groups, name conflict resolution, name resolution, networking across web based and telecommunication based portals, observing responses to invitations by users in a web-based social network, offering discounts, online promotions through a social network-based platform, online promotions through social media networks, organization of a contact list based on social network context, page caching for rendering dynamic web pages, page rendering for dynamic web pages, personalized platform for accessing internet applications, platform for providing a social context to software applications, predictive resource identification and phased delivery of structured documents, presenting social networking events via a television receiver, processing social relation oriented service, profile rating and verification system, promoting shopping information on a network based social platform, providing an answer to a question from a social network site using a separate messaging site, providing social networking content, publish/subscribe mashups for social networks, random voice communications through a social network, ranking search results using social-networking information, ranking search results based on the frequency of access on the search results by users of a social-networking system, ranking search results based on the frequency of clicks on the search results by members of a social network who are within a predetermined degree of separation, ranking social network objects, real time media-based social network notifications, recommending new individuals to be invited into a confirmed social network based on mined social data, recording usage of an online social network, relationship characterization and utilization from a user's social networks, remote work sessions, reputation evaluation of online users in a social networking scheme, resource management of social network applications, scoring individual network competitiveness and network effect in an online social network, searching data in a social network to provide an answer to an information request, selecting advertisements for output by a television receiver based on social network profile data, self funding emergency and other notification system, setting cookies in conjunction with phased delivery of structured documents, sharing digital content on a social network, sharing social network information, sharing social networking content in a conference user interface, single login procedure for accessing social network information across multiple external systems, situation-aware ad-hoc social interaction, social behavior analysis and inferring social networks for a recommendation system, social capital, social context for inter-media objects, social graph search system, social graph that includes web pages outside of a social networking system, social home page, social marketing, social mobilized content sharing, social network analysis with prior knowledge and non-negative tensor factorization, social network construction based on data association, social network marketing plan monitoring method and system, social network message categorization systems and methods, social network notifications for external updates, social network qualification systems, social network virtual private network, social network-driven cooperative characterization with non-social network sites, social networking architecture in which profile data hosting is provided by the profile owner, social networking via communications over interactive devices, social notification for a set-top box, storing data related to social publishers and associating the data with electronic brand data, suggesting contacts for social networks, tagging digital media, targeting messages to users in a social network, targeting online ads using social neighborhoods of a social network, targeting third party content to users based on social networks, tie strength prediction and social media filtration, tracking significant topics of discourse in forums, travel related commercial interactions, use with and integration into a video game, user pivot navigation of shared social media, using social information for authenticating a user session, using social networks while respecting access control lists, vehicle based social networking, visual tags for search results generated from social network information, visualization application for mining of social networks, visualizing communications within a social setting, web-based social networking database, weighting social network relationships based on communications history, and youth based social networking.

The method can include wherein said affiliate advertising comprises one or more of (a) advertising content management system and method; (b) advertising method and product; (c) affiliate distribution of advertisements with compensation for attention; (d) affiliate system and affiliate device; (e) affiliate system on social networking; (f) affiliated advertising widget; (g) apparatus and method for internet advertising and affiliate compensation; (h) apparatus, method and article to evaluate affiliate performance; (i) arranging delivery of advertisements over a network such as the internet; (j) assured comprehension advertising system; (k) bond issue information management and distribution system; (l) buying and selling spots for advertisements in mass-market media; (m) centralized affiliated marketplaces systems and methods; (n) computerized networking device with embedded advanced content and web traffic monetization functionality, (o) context-based transactions using broadcast advertising; (p) customer loyalty and advertising; (q) customizing an advertisement; (r) delivery, targeting, and measuring advertising over networks; (s) electronic publication advertising system; (t) email-based advertising system; (u) evaluating content based advertising; (v) internet business co-op with rotating banners; (w) internet-based and tangible referral system; (x) network interaction correlation; (y) non-authentication access management system for affiliated websites linked with advertisement; (z) offering advertising services; (a) online platform for web advertisement partnerships or affiliate advertising; (b) providing purchasing incentives and advertisements; (c) providing targeted advertisements based on current activity; (d) quality-based online advertisement trading system; (e) revenue generation and sharing for content sharing services; (f) selecting a website affiliate based on maximum potential revenue generation; (g) selecting personalized non-competitive electronic advertising for electronic display; (h) self-funded commission management system; and (ii) service system and mobile communication terminal for free using of data communication.

The method can further comprise providing remote computing or mobile device or computer system access and wherein the interactive links are selected from internet sites, feeds, pictures, videos, audio clips, social network, social networking, social networking community, online communications, messaging, user profiles, viewing public & private user profiles, social plugins, promotions, social applications, entertainment shopping, penny and online auctions, bidding, bidding behavior, bidding results, advertisements and affiliate advertising, local promotional data based on end user's online activity, location, profile, online communication, social plugins, social networking, social networking communities, user profiles, messaging, viewing public & private user profiles, social plugins, promotions, social applications, entertainment shopping, penny and online auctions, bidding, bidding behavior, bidding results, advertisements and affiliate advertising, purchasing, behavior, preferences and buying patterns, online behavior.

The method can further provide wherein the second consumer data sets further comprise one selected from contacts information, social network contact information, location, online communications, search inquiries, social networking, social networking communities, user profiles, messaging, viewing public & private user profiles, social plugins, promotions, social applications, embedded advertisements and affiliate advertising, entertainment shopping, penny and online auctions, bidding, bidding behavior, bidding results, advertisements and affiliate advertising, purchasing, behavior, preferences and buying pattern information.

The method can further provide wherein the method further comprises providing the second consumer data sets to a third party.

The method can further provide wherein the third party is selected from a government agency, a credit reporting agency, a company, or a regulatory agency according to applicable laws and regulations.

The method can further provide wherein the company is selected from a financial services company, a product company, a services company, a retailer, a real estate company, a travel & hospitality company, an entertainment company, a penny or online auction, or other type of service company.

The method can further provide wherein the second promotional data collections is based in part on prior purchase history of one or more end users.

The method can further provide wherein The method of claim 2, wherein the second consumer data sets further comprise one selected from statistics regarding donations, humanitarian aid and sustainable gifts made by the end users or other end users.

The method can further provide wherein the method further comprises providing the statistics to the end user or other end users.

The method can further provide wherein the method further comprises the end user designating a portion of a purchase, or providing links or websites to the end user, to provide charitable contributions.

The method can further provide wherein the product or service is a travel, hospitality, real estate, educational services, entertainment shopping services, penny and online auction services, an advertisement or affiliate advertising, service provider services, business center services, affiliate services, or related products or services.

The method can further provide wherein the search inquiry is for real estate related online coupons, mobile services, Products, Goods & Services, entertainment shopping, penny and online auctions, advertisements and affiliate advertising, and wherein a. the real estate product or good is selected from social networking, social networking communities, user profiles, messaging, viewing public & private user profiles, social plugs, promotion, social applications, entertainment shopping, penny and online auctions, advertisements and affiliate advertising, sale or lease of vacant land, residential real estate, commercial real estate, recreational real estate, retail, shopping, hotels, motels, golf courses, resorts, marinas, industrial real estate, vacation, time shares, condominiums, multifamily, dwellings;

b. the real estate service is selected from social networking, social networking communities, user profiles, online communications, messaging, viewing public & private user profiles, social plugins, promotion, social applications, entertainment shopping, penny and online auctions, advertisements and affiliate advertising, travel agents, brokers, agents, relocation services, internet marketing, concierge, transportation, travel and hospitality services, lenders, appraisers, education, developers, contractors, inspectors, home improvements/remodeling, basement designs, landscaping, home warranties, insurance, indoor and outdoor furniture, fixtures, windows, siding, roofing, heating/cooling, solar, plumbing, electrical, mechanical, HVAC, or repair, renovation or addition services.

The method can further provide wherein the Internet access in step (a) is subject to identity verification.

The method can further provide wherein the social networking links are provided as one selected from locate, online communications, search inquiries, social networking, social networking communities, user profiles, entertainment shopping, penny and online auctions, bidding, bidding behavior, bidding results, messaging, viewing public & private user profiles, social plugins, promotions, social applications, user profiles, advertisements and affiliate advertising, SSLs, cookies, and embedded advertisements and affiliate advertising.

The method can further provide wherein promotion or service comprises job or employment search inquiries.

The method can further provide wherein promotion or service comprises travel and hospitality related search inquiries.

The method can further provide wherein promotion or service comprises a penny auction or online auction relates search inquiries.

The method can further provide wherein promotion or service comprises of social networking, social networking communities, a social networking activity, online communications, messaging, viewing public & private user profiles, social plugins, promotion, social applications, user profiles, advertisements and affiliate advertising and other social networks.

The method can further provide wherein promotion or services comprises a real estate or ancillary services related search inquiries.

The method can further provide wherein promotion or service comprises search inquiries related to one selected from a promotion, education services, entertainment services, penny and online auction services, advertisement or affiliate advertising, business center services or affiliated services.

The method can further provide wherein the method further comprises behavior tracking communications with social networking, social networking community, online communications, messaging, user profiles, viewing public & private user profiles and other social networks.

The method can further provide wherein the promotions, online coupons, mobile services, Products, Goods & Services, entertainment shopping, penny auctions or online auctions, advertisements or affiliate advertising are selected from promotions, online coupons, mobile services, Products, Goods & Services, entertainment shopping, penny and online auctions, bidding, bidding behavior, bidding results, advertisements and affiliate advertising, location, online communications, search inquiries, social networking, social networking communities, user profiles, messaging, viewing public & private user profiles, social plugins, promotions, social applications, coupons, entertainment shopping, penny auctions, online auctions, bidding, bidding behavior, bidding results, advertisements and affiliate advertising, embedded advertisements and affiliate advertising by geo-target location, including without limitation, daily deal coupons, free or discounted printable coupons, business directories, advertisements and affiliate advertising, text, SMS marketing, search, multimedia, operating systems, devices, banking, payment, wallet or electronic payments, express checkout, money transfer, social media, keywords, coupons, instant messaging marketing, voting, e-cards, short codes, commerce, shopping, push content, geo-information, geo-social information, daily deal coupons, art, penny auctions, online auctions, e-commerce, m-commerce, media and entertainment, sports, personal networks, financial networks, travel and hospitality services, real estate, educational services, ancillary services, penny auctions or online auctions, advertisements and affiliate advertising, service providers and business owners, business center services, healthcare services, financial services, consumer products, specialty retail, media, entertainment, lenders, mortgage companies, online dating, gaming, retail stores, virtual communities, and virtual goods.

The invention can further provide a computer system for providing social networking interactions using internet and mobile websites and related computer systems that provide end user customized interactive displays of three dimensional geospatial maps comprising end user customized promotions, online coupons, mobile services, Products, Goods & Services, entertainment shopping, penny auctions, online auctions, advertisements and affiliate advertising, social networking, social networking community, online communications, user profiles, messaging, service providers, business centers and affiliates, and related company and local information, the system comprising system components that conduct computer operations that result in the collection and analysis of end user data relating to end user's online activity, location, online communications, search inquiries, social networking, social networking communities, user profiles, messaging, viewing public & private user profiles, social plugins, promotions, social applications, entertainment shopping, penny auctions, online auctions, bidding, bidding behavior, bidding results, advertisements and affiliate advertising, purchasing, behavior, preferences and buying patterns, the collection and analysis used to (A) firstly provide first consumer data sets used to generate first end user geospatial interactive displays comprising first promotional data collections of promotions, online coupons, mobile services, Products, Goods & Services, entertainment shopping, penny auctions, online auctions, bidding, bidding behavior, bidding results, advertisements and affiliate advertising, social networking, social networking communities, service providers, business centers, and affiliated services, and related company and local information, using multi-dimensional and scalable geospatial mapping and integrated social networking; and to (B) secondly provide second consumer data sets related to one or more of (i) the end users, (ii) additional end users, and (iii) target end user groups, the second consumer data comprising end user related consumer profiles, trends and target markets, the first and second consumer data sets used to generate second end user geospatial interactive displays comprising customized second promotional data collections of promotions, online coupons, mobile services, Products, Goods & Services, entertainment shopping, penny auctions, online auctions, bidding, bidding behavior, bidding results, advertisements and affiliate advertising, social networking, social networking communities, service providers, business centers and affiliate advertising or services for related company and local information, the first and second end user displays generated using a three dimensional geospatial platform using multi-dimensional and scalable geospatial mapping, the system comprising:

(a) a system component for electronically assigning on a mobile device or computer system an identifier to a client mobile device or computer receiving a request from the end user via a client application operating on the client mobile device or computer for internet access to websites or links;

(b) a system component for electronically providing on a mobile device or computer system access to the websites or links that provide three dimensional geospatial interactive displays, the computer system comprising a combination of:
  (i) first consumer data sets used to generate first end user geospatial interactive displays using multi-dimensional and scalable geospatial mapping and integrated social networking, the first end user geospatial interactive displays comprising
  (ii) first promotional data collections for separate locations shown on the displays, the first promotional data collections comprising
    (a) promotions,
    (b) online coupons,
    (c) mobile services,
    (d) products,
    (e) goods,
    (f) services,
    (g) entertainment shopping,
    (h) penny and online auctions,
    (i) bidding,
    (j) bidding behavior,
    (k) bidding results,
    (l) advertisements and affiliate advertising,
    (m) social networking,
    (n) social networking communities,
    (o) user profiles,
    (p) messaging,
    (q) online communications,
    (r) viewing public & private user profiles,
    (s) service providers,
    (t) business centers and affiliated advertising or services,
    (u) related company information,
    (v) local information; and
    (w) interactive links to social networks, social networking, social networking communities, online communications, messaging, user profiles, viewing public & private user profiles, social plugins, promotions, social applications, entertainment shopping, penny and online auctions, bidding, bidding behavior, bidding results, advertisements and affiliate advertising; and
    (q) interactive links to websites displaying the promotions, online coupons, mobile services, Products, Goods & Services, entertainment services, penny and online auctions, bidding, bidding behavior, bidding results, advertisements and affiliate advertising, social networking, social networking communities, service providers, business centers and affiliated advertising, and related company information and related local information;

(c) a system component for electronically displaying on the client mobile device or computer system the first end user geospatial interactive display provided in step (b);

(d) a system component for electronically monitoring, collecting and analyzing, using a mobile device or computer data analysis system, the end user data relating to end user's online activity, location, online communications, search inquiries, social networking, social networking communities, user profiles, viewing public & private user profiles, messaging, social plugins, promotions, social applications, entertainment shopping, penny and online auctions, bidding, bidding behavior, bidding results, advertisements and affiliate advertising or services, purchasing, behavior, preferences and buying patterns on the websites or links, to provide end user output data;

(e) a system component for electronically processing the end user output data from step (d) to electronically generate second consumer data sets related to one or more of
  i. the end users,
  ii. additional end users, and
  iii. target end user groups,
the second consumer data comprising end user related consumer profiles, trends and target markets, based on the analyzing in step (c);

(f) electronically processing the first and second consumer data sets to generate second end user geospatial interactive displays using multi-dimensional and scalable geospatial mapping and integrated social networking, the second end user geospatial interactive displays comprising
  (i) customized second promotional data collections for separate locations shown on the displays, the customized second promotional data collections comprising
    (a) promotions,
    (b) online coupons,
    (c) mobile services,
    (d) products,
    (e) goods,
    (f) services,
    (g) entertainment shopping,
    (h) penny and online auctions,
    (i) bidding,
    (j) bidding behavior,
    (k) bidding results,
    (l) advertisements and affiliate advertising or services,
    (m) social networking,
    (n) social networking communities,
    (o) user profiles.
    (p) messaging,
    (q) online communications,
    (r) viewing public & private profiles,
    (s) service providers;
    (t) business centers and affiliated advertising or services,
    (u) related company information; and
    (v) local information;

(w) interactive links to social networks, online communications, social networking, user profiles, messaging, viewing public & private user profiles, social plugins, promotions, social applications, entertainment shopping, penny and online auctions, bidding, bidding behavior, bidding results, advertisements and affiliate advertising; and (n) interactive links to websites displaying the promotions, online coupons, mobile services, Products, Goods & Services, entertainment shopping, penny and online auctions, bidding, bidding behavior, bidding results, advertisements and affiliate advertising or services, social networking, social networking community, service providers, business centers, and affiliated services, and related company information and related local information;

(g) electronically displaying on the client mobile device or computer system the second end user geospatial interactive display provided in step (f).

More specifically, it relates to a method for users and members known as "Social Shoppers" to effectuate banking and/or electronic payments via a computer or mobile device; accessing a user account, engaging in mobile social activities and/or viewing available options via a three dimensional geospatial mapping platform using geospatial mapping technology.

The present invention thus provides alternative social networking interactions, as functions or content, access, systems, and the like, as known in the art, or as described herein, which can include, but are not limited to, access to trusted user-generated content using social networks, accessing information from multiple networks, social graphs, and content sites, accumulating social relation information for social network services, adaptive packaging of network resources, adaptive social network management, advertising products to groups within social networks, aggregation of social network data, aggregation, standardization and extension of social networking contacts to enhance a television consumer experience, application of social networking data, assigning access privileges in a social network, associative memory operators, methods and computer program products for using a social network for predictive marketing analysis, automatically locating web-based social network members, automatically manage social connections, auto-shared photo album, biometric social networking, blocking objectionable communications in a social network, broadcast notifications using social networking systems, clarifying search results using social-networking information, collective socializing using a mobile social network, collectively giving gifts in a social network environment, commercializing ideas or inventions, communicating between users, community detection, community translation on a social network, confirming an association in a web-based social network, consumption management systems and methods integrated with social networks, content sharing across enterprise social networks, contingent rights exchange associated with a social network, controlling access of user information using social-networking information, coordinated location aware brokering of social networks, correlation of psycho-demographic data and social network data to initiate an action, creating a social network map of non-voice communications, creating a social-networking online community, cross-network social networking application architecture, defined searching and web crawling, defining user relationships in a social networking environment, determining a group preference in a social network, device, system, and method of generating location-based social networks, discerning human intent based on user-generated metadata, discovering, creating, using, and managing social network circuits, displaying demographic information of members discussing topics in a forum, dynamically generating a privacy summary, dynamically generating segmented community flyers, dynamically managing a social network group, dynamically providing a news feed about a user of a social network, elements of an enterprise event feed, email confirmation page for social network notifications, enabling location-dependent value exchange and object of interest identification, enabling messaging between users of different social networks and between users of social networks and users of other communication systems, enterprise social graph and contextual information presentation, establishing a social network system based on motif, social status and social attitude, facilitate real time communications between members of a social network, feature propagation, federation and interoperability between social networks, feeding updates to landing pages of users of an online social network from external sources, file sharing based on social network, friends toolbar for a virtual social venue, generating a feed of stories personalized for members of a social network, generating segmented community flyers in a social networking system, giving gifts and displaying assets in a social network environment, graphical representation of social network vitality, highlighting email recipients, hosting a social network that enables granular management of the privacy of posted information, hot video prediction system based on user interests social network, incentivize transactions to enhance social goodness, incorporation of variables into textual content, information handling system low power network communications, information security for recovery based social networking, integrating a social network and data repository to enable map creation, integrating social contact identifiers into wagering games, integrating social networking with financial services, integrating social networks and wagering games, integrating updates into a social-networking service, interacting with social networking in an internet protocol television system, leveraging a social graph from a social network for social context in other systems, leveraging information in a social network for inferential targeting of advertisements, managing information about relationships in a social network via a social timeline, managing information flow between members of an online social network, managing organizational resources, marketing system having multiple fulfillment channels and a method for directing a personalized invitation to members of a social network, markup language for incorporating social networking system information by an external website, measuring social capital index in an online social network, mobile device and method of operating same to interface content provider website, mobile network operator controlled content to mobile subscribers using social networking messages, mobile social networking enabled by bar codes, mobile social networking system and method, modeling social networks using analytic measurements of online social media content, modification of social networks via design codes, monetizing a social network platform, monitoring activity of a specified user on internet-based social networks, multi-governance social networking groups, name conflict resolution, name resolution, networking across web based and telecommunication based portals, observing responses to invitations by users in a web-based social network, offering discounts, online promotions through a social network-based platform, online promotions through social media networks, organization of a contact list based on social network context, page caching for rendering dynamic web pages, page rendering for dynamic web pages, personalized platform for accessing internet applications, platform for providing a social context to software applications, predictive resource identification and phased delivery of structured documents, presenting social networking events via a television receiver, processing social relation oriented service, profile rating and verification system, promoting shopping information on a network based social platform, providing an answer to a question from a social network site using a separate messaging site, providing social networking content, publish/subscribe mashups for social networks, random voice communications through a social network, ranking search results using social-networking information, ranking search results based on the frequency of access on the search results by users of a social-networking system, ranking search results based on the frequency of clicks on the search results by members of a social network who are within a predetermined degree of separation, ranking social network objects, real time media-based social network notifications, recommending new individuals to be invited into a confirmed social network based on mined social data, recording usage of an online social network, relationship characterization and utilization from a user's social networks, remote work sessions, reputation evaluation of online users in a social networking scheme, resource management of social network applications, scoring individual network competitiveness and network effect in an online social network, searching data in a social network to provide an answer to an information request, selecting advertisements for output by a television receiver based on social network profile data, self funding emergency and other notification system, setting cookies in conjunction with phased delivery of structured documents, sharing digital content on a social network, sharing social network information, sharing social networking content in a conference user interface, single login procedure for accessing social network information across multiple external systems, situation-aware ad-hoc social interaction, social behavior analysis and inferring social networks for a recommendation system, social capital, social context for inter-media objects, social graph search system, social graph that includes web pages outside of a social networking system, social home page, social marketing, social mobilized content sharing, social network analysis with prior knowledge and non-negative tensor factorization, social network construction based on data association, social network marketing plan monitoring method and system, social network message categorization systems and methods, social network notifications for external updates, social network qualification systems, social network virtual private network, social network-driven cooperative characterization with non-social network sites, social networking architecture in which profile data hosting is provided by the profile owner, social networking via communications over interactive devices, social notification for a set-top box, storing data related to social publishers and associating the data with electronic brand data, suggesting contacts for social networks, tagging digital media, targeting messages to users in a social network, targeting online ads using social neighborhoods of a social network, targeting third party content to users based on social networks, tie strength prediction and social media filtration, tracking significant topics of discourse in forums, travel related commercial interactions, use with and integration into a video game, user pivot navigation of shared social media, using social information for authenticating a user session, using social networks while respecting access control lists, vehicle based social networking, visual tags for search results generated from social network information, visualization application for mining of social networks, visualizing communications within a social setting, web-based social networking database, weighting social network relationships based on communications history, youth based social networking. Non-limiting examples, include, e.g., those disclosed in one or more of e.g., but not limited to, such social networking functions and/or features as presented in the following US patents and patent applications: US20100082693, US20100017431, US20110276631, US20100268655, US20100293247, US20080040428, US20090106822, US20110282944, US20110137722, US20090327432, US20100057859, 7958193, US20100268830, US20090271247, US20110022602, US20090292814, US20080033776, US20090049525, US20090271244, US20110047229, US20100114788, US20090144075, US20100153175, US20090215469, US20110131095, US20080281710, US20090292549, US20110314017, US20110225518, US20080306822, US20100132049, US20100082695, US20100203963, US20110167071, US20100088364, US20110196922, US20090319288, US20110258429, US20090150380, US20120023085, US20100036936, US20090210480, US20100042511, US20100241468, US20100121849, US20110320250, US20110258556, 7987110, US20090030927, 7801971, US20110023101, US20110153553, US20110179161, US20110265011, US20110022657, US20090187624, US20100229223, US20110173051, US20110055333, US20100287256, US20100005518, US20090265604, US20090249451, US20080255989, US20110060793, US20100058417, US20110145052, US20090327437, US20110107382, US20110106884, US20120028623, US20080320139, US20080104225, US20090157439, US20090182664, US20090300502, US20090171691, US20110106597, US20100318925, US20090222348, US20100319034, US20100217721, 8010460, US20080208971, US20110046980, US20080189188, US20090222322, US20100293170, US20110251970, 8073794, 7970657, US20060042483, US20070288464, US20110197224, US20110258203, US20090164400, US20120030210, US20100174747, US20100228617, US20110246560, US20080294678, US20090125230, US20080243933, US20100318619, US20110238752, US20080109296, US20100185935, US20110213762, US20110078252, US20080140786, US20090282144, US20090259970, US20110271328, US20110167117, US20090171904, US20110209192, US20100185578, US20110196923, US20050216300, US20110082747, 7941535, US20090043844, US20110225514, US20110015981, US20110153740, US20090222448, US20110022669, US20090132652, US20110270923, US20090055263, US20110126121, US20110185285, US20080275849, US20080133445, US20100077045, US20110125846, US20090307057, US20100319031, US20110113096, US20110264737, US20100216553, US20100217757, US20110167115, US20090031301, US20120028718, US20100070335, US20080133658, US20090307073, US20110004660, US20110179125, U.S. Pat. No. 8,010,460, U.S. Pat. No. 8,027,943, U.S. Pat. No. 8,010,458, U.S. Pat. No. 7,827,208, U.S. Pat. No. 7,890,501, U.S. Pat. No. 7,809,805, U.S. Pat. No. 8,099,433, U.S. Pat. No. 7,933,810, U.S. Pat. No. 7,970,657, U.S. Pat. No. 7,669,123, U.S. Pat. No. 7,797,256, U.S. Pat. No. 7,788,260, U.S. Pat. No. 7,725,492, U.S. Pat. No. 8,081,817, U.S. Pat. No. 8,037,093, U.S. Pat. No. 7,945,653, U.S. Pat. No. 7,827,265, U.S. Pat. No. 8,108,377, US20110093498, US20080033739, US20100049852, US20080046976, US20110044354, US20110093346, US20110145321, US20110229223, US20110087658, US20100257023, US20100169327, US20100198581, US20090144392, US20110055314, US20110145287, US20110093506, US20110055683, US20090198487, US20100164957, US20100132049, and US20110093460, which are each entirely incorporated herein by reference.

The present invention thus provides alternative affiliated advertising functions, components, and systems, including, but not limited to: one or more of (a) advertising content management system and method; (b) advertising method and product; (c) affiliate distribution of advertisements with compensation for attention; (d) affiliate system and affiliate device; (e) affiliate system on social networking or social networking communities; (f) affiliated advertising widget; (g) apparatus and method for internet advertising compensation; (h) apparatus, method and article to evaluate affiliate performance; (i) arranging delivery of advertisements over a network such as the internet; (j) assured comprehension advertising system; (k) bond issue information management and distribution system; (l) buying and selling spots for advertisements in mass-market media; (m) centralized affiliated marketplaces systems and methods; (n) computerized networking device with embedded advanced content and web traffic monetization functionality; (o) context-based transactions using broadcast advertising; (p) customer loyalty and advertising; (q) customizing an advertisement; (r) delivery, targeting, and measuring advertising over networks; (s) electronic publication advertising system; (t) email-based advertising system; (u) evaluating content based advertising and affiliate advertising; (v) internet business co-op with rotating banners; (w) internet-based and tangible referral system; (x) network interaction correlation; (y) non-authentication access management system for affiliated websites linked with advertisement; (z) offering advertising services; (a) online platform for web advertisement partnerships or affiliate program; (b) providing purchasing incentives and advertisements; (c) providing targeted advertisements based on current activity; (d) quality-based online advertisement trading system; (e) revenue generation and sharing for content sharing services; (f) selecting a website affiliate based on maximum potential revenue generation; (g) selecting personalized non-competitive electronic advertising for electronic display; (h) self-funded commission management system; and (ii) service system and mobile communication terminal for free using of data communication, e.g., but not limited to those disclosed in the following US patents and patent applications: US20080208682, US20100324965, US20070244756, US20080120156, US20080021783, US20030220837, U.S. Pat. No. 6,763, 334, U.S. Pat. No. 7,599,853, US20100069157, US20050065847, U.S. Pat. No. 7,788,130, US20080147499, US20110066479, US20100268582, US20020066688, US20070192369, US20090319372, US20040111319, US20100198670, US20080126515, US20090106098, US20060167820, US20050234775, US20050171838, US20070218876, US20080172329, US20050038702, US20020072965, US20110191176, US20040172331, US20100023392, US20040172332, U.S. Pat. No. 7,930,207, U.S. Pat. No. 7,827,062, U.S. Pat. No. 7,844,488, US20040172324, US20030028433, U.S. Pat. No. 5,948,061, US20070214227, US20020087631, US20110270686, US20090307081, US20090240582, US20040153366, US20080306823, US20090198551, U.S. Pat. No. 5,774,534, US20020042914, US20110246391, US20080059575, each of which patents or patent application is entirely incorporated herein by reference.

Exemplary Definitions

A social networking service is an online service, platform, or site that focuses on building and reflecting of social networks or social relations among people, who, for example, share interests and/or activities. A social network service essentially consists of a representation of each user (often a profile), his/her social links, and a variety of additional services. Most social network services are web based and provide means for users to interact over the Internet, such as e-mail, blogs, chat rooms and instant messaging. Online community services are sometimes considered as a social network service, though in a broader sense, social network service usually means an individual-centered service, whereas online community services are group-centered. Social networking sites allow users to share ideas, activities, events, and interests within their individual networks. The main types of social networking services are those, which contain category places (such as former school year or classmates), means to connect with friends (usually with self-description pages) and a recommendation system linked to trust. Other non-limiting examples can include one or more of the following, e.g., w Facebook™ and Twitter™ widely used worldwide, Nexopia (mostly in Canada); Bebo, VKontakte, Hi5, Hyves (mostly in The Netherlands), Draugiem.lv (mostly in Latvia), StudiVZ (mostly in Germany), iWiW (mostly in Hungary), Tuenti (mostly in Spain), Nasza-Klasa (mostly in Poland), Decayenne, Tagged, XING, Badoo and Skyrock in parts of Europe; Orkut and Hi5 in South America and Central America; and Mixi, Multiply, Orkut, Wretch, renren and Cyworld in Asia and the Pacific Islands and LinkedIn and Orkut are very popular in India.

A social network is a social structure made up of individuals (or organizations) called "nodes", which are tied (connected) by one or more specific types of interdependency, such as friendship, kinship, common interest, financial exchange, dislike, sexual relationships, or relationships of beliefs, knowledge or prestige.

Geospatial analysis is an approach to applying statistical analysis and other informational techniques to geographically based data. Such analysis employs spatial software and analytical methods with terrestrial or geographic datasets, including geographic information systems and geomatics. Google Earth™ is a non-limiting example of the application of geospatial analysis, where it provides a virtual globe, map and geographical information program. Google Earth™ is a virtual globe, map and geographic information program that layered with geographic information. Google Earth™ is available for Android, Windows 2000, XP, Vista, 7, Mac OS X, Blackberry Storm, iOS and Linux. Google Earth™ provides a wealth of topographical information about our planet Earth on a variety of subjects. Google Earth™ lets you fly anywhere to view satellite imagery, maps, terrain, 3D buildings, galaxies in outer space, and the depths of the ocean. With Google Earth™ 6, users can explore the streets in 3D like never before. Fly from outer space down to the streets with the new Street View and easily navigate your way around. Google Earth™ has also been able to assist in promoting awareness of global problems such as Hurricane Katrina, the war in Iraq and photos of the post Japan earthquake panoramas in Google Earth™. Google Earth™ has many "layers" of data, including videos, photos, Wikipedia, real-time weather, real-time traffic, 3D buildings, GPS tracks and more. The release of free Web mapping applications opened up printable mapping to mainstream Internet users. Google™ also released free APIs for their Google Earth™ platform, allowing users to geo-locate and map their own data. Google is apparently working on a faster, easier Google Earth™ plug-in download as well as an improved Google Earth™ mobile app. The Google Earth™ API is a free service, available for any web site that is free to consumers. The Plug-in and its JavaScript API allows users to place a version of Google Earth™ into web pages. The API does not have all the features of the full Google Earth™ Application but enables sophisticated 3D map applications to be built, including use for GM of the present invention. The Google Earth™ Plug-in and its JavaScript API let you embed Google Earth™, a true 3D digital globe, into your web pages. Using the API you can draw markers and lines, drape images over the terrain, add 3D models, or load KML files, allowing you to build sophisticated 3D map applications.

In marketing, a coupon is a ticket or document that can be exchanged for a financial discount or rebate when purchasing a product. Customarily, coupons are issued by manufacturers of consumer-packaged goods or by retailers, to be used in retail stores as a part of sales promotions. They are often widely distributed through mail, magazines, newspapers, the Internet, directly from the retailer, and mobile devices such as cell phones. Since only price conscious consumers are likely to spend the time to claim the savings, coupons function as a form of price discrimination, enabling retailers to offer a lower price only to those consumers who would otherwise go elsewhere. In addition, coupons can also be targeted selectively to regional markets in which price competition is great. Internet Coupons: Online retailers often refer to coupons as "coupon codes," "promotional codes," "promotion codes," "discount codes," "key codes," "promo codes," "surplus codes," "portable codes," "shopping codes," "voucher codes," "reward codes" "discount vouchers" or "source codes." Internet coupons typically provide for reduced cost or free shipping, a specific dollar or percentage discount, or some other offer to encourage consumers to purchase specific products or to purchase from specific retailers. Because paper coupons would be difficult to redeem, typically secret words or codes are distributed for consumers to type in at checkout. Marketers can use different codes for different channels our groups in order to distinguish response rates.

The present invention can in one embodiment gather basic demographic profile information including the user's current location and behavior data as they purchase and/or view promotions, online coupons, mobile services, Products, Goods or Services, entertainment shopping, penny auctions or online auctions, advertisements and affiliate advertising or services on Social Earth, which can be sent to advertisers or otherwise capitalized by the users of the invention. By gathering this valuable demographic information, the present invention provides the ability to target market to Social Shoppers based upon specific location, demographic profile and selected social layer. This data can also include GPS for mobile user, which can be sent to advertisers servers for target mobile marketing based upon the users' location and buying preferences. The present invention can also provide fast access by, when visiting a website of a user of the present invention, Social Shoppers can access as easily as entering their email address and select a city to access the site. The present invention can use email addresses and selected city for future email marketing. For example, In just 2, 3, 4, 5, 6, 7 or other number of clicks, Social Shoppers are ready to use the inventions website after they download a Google Earth™ or similar plug-in, or visit the Apple™, Android™, or similar marketplace for their smart phone, Social Networking Integration: The present invention can also provide in certain embodiments social networking links, tracking, collection and/or analysis, including integrated social plugins with "live social feeds" from social networking sites, e.g., but not limited to Facebook™ and Twitter™, into its website(s), which allows Social Shoppers to interact and share the latest product or services deals with their friends, family, business associates, and others. Tapping into social networking users through social networking integration will help users and members of the present invention connect with thousands or millions of users and members. Twitter™ the latest social networking phenomenon, enables its users and members to send and read other users and members' messages called "tweets." The present invention provides opportunities to use open source technology to rapidly grow its Social Shoppers around the world by utilizing social networking integration with "live social feeds" from social networking sites into its website and encouraging Social Shoppers to share the latest promotions, online coupons, mobile services, Products, Goods & Services, entertainment shopping, penny auctions or online auctions, advertisements and affiliate advertising with their friends on Social Earth or in these popular social networks.

Social Software Applications. Social software applications include communication tools and interactive tools. Communication tools typically handle the capturing, storing and presentation of communications, usually written but increasingly including audio and video as well, which can also include tracking and predicting of online communications via a mobile device or computer with respect to third party applications and outside social networks such as e.g. Facebook™, Twitter™, Skype™ and other social networks around the world. Interactive tools handle mediated interactions between a pair or group of users. They focus on establishing and maintaining a connection amount users, facilitating the mechanics of conversation and talk.

Instant Messaging: An instant messaging application or client allows one to communicate with another person over a network in real time, in relative privacy. One can add friends to a contact or buddy list by entering the person's email address or messenger ID.

Text Chat: Internet Relay Chat (IRC) and other online chat technologies allow users to join and communicate with many people at once, publically.

Groupware: Groupware software allows subjects to share data such as files, photos, text, etc.

Internet Forums: Internet forums allow users to post a "topic" for others to review. Other users can view the topic and post their own comments in a linear fashion, one after the other.

Wikis: A wiki is a web page whose content can be edited by its visitors.

Blogs: Blogs, short for web logs, are online journals for a particular person. The owner will post a message periodically, allowing others to comment. Topics often include the owner's daily life, views on politics or a particular subject important to them.

Prediction Markets: Many predictions market tools have become available that make it easy to predict and bet on future events. This is a more formal version of social interaction, although it qualifies as a robust type of social software.

Social Networking Services: Social networking services allow people to come together online around shared interests, hobbies or causes.

Social Engine: Social engine refers to a web based framework and platform for developing custom social apps as well as hosting them. A social engine acts as a web operating system for developing all kinds of social networking services and projects.

Social Guides: A social guide recommending places to visit or contains information about places in the real world such as coffee shops, restaurants and wife hotspots, etc.

Social Bookmarking: Some web sites allow users to post their list of bookmarks or favorite website for others to search and view them.

Social Cataloging: Social cataloging is a software aimed towards academics. It allows the user to post a citation for an article found on the Internet or a website, online database like Academic Search Premier or LexisNexis.

Social Online Storage: Social online storage applications allow their users to collaboratively create file archives containing files of any type. Files can either be edited online or from a local computer which has access to the storage system.

Social Plugins: A button placed on a website and blogs that members can click to share their interests in a site with their friends. A Like Box can also be added to a web page that provides a scrolling window into the organization's Facebook™ page. The Like Button and Like Box are called "social plugins."

Virtual Worlds: Virtual worlds are services where it is possible to meet and interact with other people in a virtual environment reminiscent of the real world. Thus the term virtual reality. Typically, the user manipulates an avatar through the world, interacting with others using chat or voice chat.

Massively Multiplayer Online Games (MMOGs): MMOG's are virtual worlds that add various sorts of point systems, levels, competition and winners and losers to virtual world simulation.

Computer Surveillance: Computer surveillance is the act of perform surveillance of computer or mobile activity and of data stored on a hard drive or being transferred over the Internet.

Network Surveillance: The vast majority of computer surveillance involves the monitoring of data and traffic on the Internet. In the United States for example, under the Commissions Assistance For Law Enforcement Act, all phone calls and broadband internet traffic (emails, web traffic, instant messaging, etc.) are required to be available for unimpeded real-time monitoring by Federal law enforcement agencies.

Penny Auctions or Online Auctions: Is an auction where bidders pay-per-bid for an item and the time increases with each bid.

Web Bot: Web bot is a software program that is claimed to be able to predict future events by tracking keywords entered on the Internet. Internet bots monitor articles, blogs, forums and other forms of Internet chatter. Words in the lexicon are assigned numeric values for emotional quantifiers such as duration, impact, immediacy, intensity and others.

Non Limiting Examples of Alternative
Implementations of the Present Invention

The present invention provides in one aspect combining social behavior tracking, online surveillance and web bot software technologies via a mobile device or computer for tracking consumer behavior and data, cookies, embedded advertisements and affiliate advertising, predicting online consumer behavior by monitoring online activity, online communications, search inquiries, social networking, social plugins, promotions, social applications, entertainment shopping, penny auctions or online auctions, bidding, bidding behavior, bidding results, advertisements and affiliate advertising, purchasing behavior, buying patters and other criteria, consumer address books & contact lists, blogs, chat rooms, friends, acquaintances and strangers, instant messaging, text chat, internet forum, service providers, travel & hospitality, real estate, educational services, ancillary services (as defined herein) and delivery system for behavior targeting and filtering of promotions, online coupons, mobile services, Products, Goods & Services, penny auctions or online auctions, advertisements and affiliate advertising or services and service providers, business centers and affiliates for related company information on a three dimensional geospatial platform using multi-dimensional and scalable geospatial mapping associated with entities providing and/or members of the service and/or social networking communities.

Unlike other shopping sites, when site subscribers using the present invention, called Social Shoppers (or "SE SHOPPERS"), visit a website of the invention, they are invited to travel virtually just about any where in the world in search of the best promotions, online coupons, mobile services, Products, Goods & Services, entertainment shopping, penny auctions or online auctions, advertisements and affiliate advertising or services as they shop for the best bargains on the planet. This one-of-a-kind website aggregates "daily deal coupons" and "free" printable coupons from major brands from around the world (collectively referred to as "Social Earth Coupons") and showcase them in their actual, physical location on the websites unique "live view" of Earth. As Social Shoppers shop the world for promotions, online coupons, mobile services, Products, Goods & Services, entertainment shopping, penny auctions or online auctions, advertisements and affiliate advertising or services as well as view bargains, online coupons and offers from major brands for family fun, sports, restaurants, events and hundreds of top consumer packaged goods brands for groceries, apparel, beverages, books & magazines, foods, health care, household, office, personal care, pet care, photography and the like. Social Shoppers will find great promotions, online coupons, mobile services, Products, Goods & Services, entertainment shopping, penny auctions or online auctions, advertisements and affiliate advertising or services from merchants and sellers from the leading travel & hospitality industry, restaurants, toy and entertainment companies and top retailers around the world.

Social Shoppers can select target locations anywhere in the U.S. such as Atlanta, Austin, Dallas, Denver, San Diego, and San Francisco or in any other cities around the world. Social Shoppers, e.g., can find products, goods or services or advertisements and affiliate advertising around the world in place such as London, Paris or Rome or they can tour the planet at will, jumping from Hong Kong to Amsterdam to Buenos Aires to check out the local promotions, online coupons, mobile services, Products, Goods & Services, as well as entertainment shopping, penny auctions or online auctions, advertisements and affiliate advertising or servicing from merchants and sellers from around the world. Because the Earth view comes live from satellite and webcam images, shoppers can zoom in for a closer look or zoom out to gain perspective on the location. Such an aspect of the present invention displays, organizes and delivers information across many social layers and social media sites featuring top-notch content, stunning satellite imagery, aerial photography and graphic animated color overlays on top of Google Earth™.

The present invention delivers a delightful mash-up of content, Coupons and live social feeds" from Facebook™ and Twitter™ or other popular social networks around the world. The present invention utilizes social networking platforms such as, but not limited to, Facebook™ and Twitter™, to allow Social Shoppers to share the latest promotions, online coupons, mobile services, Products, Goods & Services, entertainment services, penny auctions or online auctions, advertisements and affiliate advertising or services with their friends on Social Earth or in these popular social networking giants. Unlike other sites, the present invention aggregates promotions, online coupons, mobile services, Products, Goods & Services, entertainment shopping, penny auctions or online auctions, advertisements and affiliate advertising or services on its site daily, but they won't last just one day. The present invention can further provide products, goods or services or advertisements and affiliate advertising can last for days, weeks or even months. Social Shoppers are encouraged to share these promotions, online coupons, mobile services, Products, Goods & Services, entertainment shopping, penny auctions or online auctions, advertisements and affiliate advertising or services with their friends on Social Earth or in Facebook™ and Twitter™ or other social networking avenues. The global sharing capabilities are built into the present inventions technology using sophisticated technology integrating geospatial mapping, layering location-relevant data and GPS technologies. Social Shoppers are able to find great promotions, online coupons, mobile services, Products, Goods & Services, entertainment shopping, penny auctions or online auctions, advertisements and affiliate advertisings or services in their local areas or just about anywhere else in the world with the click of a mouse or mobile device. Capitalizing on the popularity of social networking giants Facebook™ and Twitter™ with more than 750 million or more users worldwide, the present invention provides an online community that taps into the power of social networking by integrating "live social feeds" from these social networking giants directly into its website. By creating a highly engaged social networking community on Social Earth, Facebook™ and Twitter™ and encouraging users and members to share the latest promotion, online coupons, mobile services, Products, Goods & Services, entertainment shopping, penny auction or online auctions, advertisement and affiliate advertising or services with their friends on Social Earth, Facebook™ or Twitter™, the present invention creates "stickiness," keeping the Social Shoppers on the site for long periods of time, as well as bringing them back again and again.

The present invention provides long-time customer loyalty, not just a one-off deal. The present invention also provides that a portion of each "Social Earth Coupon" that is sold on the platform will be allocated to microloans or microcredit, humanitarian aid or other worldly cause or sustainable gifts. In addition, users will be able to make charitable donations through the Shopping Cart and purchase online coupons, Products, Goods & Services, entertainment shopping, penny auction or online auction, advertisements and affiliated advertising or services that support humanitarian aid or sustainable gifts to help those in need around the world. The community aspect of the present invention is the driver behind building awareness of the website and its featured promotions, online coupons, mobile services, Products, Goods & Services, entertainment shopping, penny auctions or online auctions, advertisements and affiliate advertising or services. Existing and potential customers provide advertising by spreading the word to their friends about the great promotions, online coupons, mobile services, Products, Goods & Services, entertainment shopping, penny auctions or online auctions, advertisements and affiliate advertising or services they've found on a shopping site of the present invention. Add to that the power of collective buying with the power of social networking and it's easy to see how the community provided by the present invention can leverage group size in exchange for larger discounts. The present invention delivers Social Earth promotions, online coupons, mobile services, Products, Goods & Services, entertainment shopping, penny auctions or online auctions, advertisements and affiliate advertising or services from merchants and sellers from around the world to its Social Shoppers via its unique live view of the Earth on a geospatial platform that includes links to places and events, data on the landscape, interactive 360 panoramas, and fly-through shopping tours with stunning 3D imagery. The use of geospatial mapping for associating information to specific places can included, but it not limited to, one or more of: Live links to places and events; Data on the landscape; Zoom to birds-eye and human scale views; 3D custom audio/visual content; Interactive 360 panoramas; Fly-through tours with content, narration, music; Stunning imagery and videos; 3D buildings and landscaping, e-commerce and mobile banking tools and hooks; Advertising on the landscape; Advanced search for private and public information; Social networking integration, social plugins, social applications; Self-posting for uploading user generated content; Custom tools, social & mobile apps and widgets; and the like. The present invention further provides mobile device access from any device to provide Social Earth promotions, online coupons, mobile services, Products, Goods & Services, entertainment shopping, penny auctions or online auctions, advertisements and affiliate advertising or services from merchants and sellers from around the world to Social Shoppers based upon their precise location and GPS technology. This provides the ability to create an infrastructure and global platform that provides users and members and businesses of all types and sizes with access to broad markets and connect buyers and sellers and to reach people at the point of shopping—a benefit both to shoppers and merchants.

Social Layers. Social Shoppers using or part of the present invention virtually travel just about any where in the world in search of shopping products or services, as well as bargains. The present inventions technology drives content, promotions, online coupons, mobile services, Products, Goods & Services, entertainment shopping, penny auctions or online auctions, advertisements and affiliate advertising or services into a "virtual Earth" based upon its precise location and GPS technology. Users will be able to enjoy the shopping scene on the planet Earth and view Social Earth promotions, online coupons, mobile services, Products, Goods & Services, entertainment shopping penny auctions or online auctions, advertisements and affiliate advertising or services from merchants and sellers from around the world by geo-target location using GPS technologies. This website of the invention aggregates Social Earth promotions, online coupons, mobile services, Products, Goods & Services, entertainment shopping, penny auctions or online auctions, advertisements and affiliate advertising or services from merchants and sellers from around the world (in different languages) and showcase them in their actual, physical location on the virtual Earth. Because the virtual Earth is "interactive," one can zoom in for a more detailed view or zoom out to gain perspective on where they are in the world. Social Earth promotions, online coupons, mobile services, Products, Goods & Services, entertainment shopping, penny auctions or online auctions, advertisements and affiliate advertising or services can last for days, weeks or even months. What makes the present inventions website different from other group buying websites is that websites of the present invention allow Social Shoppers to search for promotions, online coupons, mobile services, Products, Goods & Services, entertainment shopping, penny auctions or online auctions, as well as advertisements and affiliate advertising or services from merchants and sellers from around the world on a virtual Earth. Users will be able to customize their buying preferences, engage in social networking activities, support worthwhile causes and much more. Websites of the present invention can allow Social Shoppers to select from a menu of coupons based upon their online activities, location, online communications, search inquiries, social networking, social plugins, promotions, social applications, entertainment shopping, penny auctions or online auctions, advertisements and affiliate advertising or services, purchasing, behavior, buying patterns and other criteria, which is integrated into the virtual Earth along with other layer location-relevant data as Social Shoppers shop online and interact with their friends in other popular social networks. Advertisers and merchants will be able to target Social Shoppers based on geo-target location.

The present invention provides layer applications, which are known as "social layers." These social layers allow Social Shoppers to customize their personal experience on SOCIAL EARTH as they search for Social Earth promotions, online coupons, mobile services, Products, Goods & Services, entertainment shopping, penny auctions or online auctions, advertisements and affiliate advertising or services from merchants and sellers in their local area or just about anywhere else in the world based upon their precise location, GPS, buying preferences, interests or travels take them. Social Shoppers select from a menu of "Purchase" coupon categories such as. (Arts & Entertainment, Travel, Giving Back, Eat & Drink, Deal of the Day) and "Free" coupon categories such as: (Health & Beauty, Sports, Shopping, Groceries). The present invention provides methods and systems that drive traffic to its website by targeting Social Earth Products, Goods & Services and connecting buyers and sellers from around the world on a global platform, based upon a user's preference, which are displayed on a unique "live view" of planet Earth. Once a Social Shopper selects one or more coupon categories, advertisements for Social Earth promotions, online coupons, mobile services, Products, Goods & Services, entertainment shopping, penny auctions or online auctions, advertisements and affiliate advertising or services from merchants and sellers from around the world will populate the virtual Earth. Social Shoppers are able to double click on Social Earth promotions, online coupons, mobile services, Products, Goods & Services, entertainment shopping, penny auctions or online auctions, advertisements and affiliate advertising or services and virtually fly directly to its location on Earth. Social Shoppers can also click on one of the featured cities and take a tour of London, San Francisco or Denver and zoom down to street level to take a closer look. Social Shoppers enjoy the experience of virtually traveling around the world, zooming in and out to street level in search for great promotions, online coupons, mobile services, Products, Goods & Services, entertainment shopping, penny auctions or online auctions, advertisements and affiliate advertising or services and sharing them with their friends on Social Earth or in these popular social networks.

In connection with a one-of-a-kind geospatial website aggregates Social Earth promotions, online coupons, mobile services, Products, Goods & Services, entertainment shopping, penny auctions or online auctions, advertisements and affiliate advertising or services from merchants and sellers from around the world and showcases them in their actual, physical location on the websites unique live view of Earth. As Social Shoppers shop the world for bargains, they can view Social Earth promotions, online coupons, mobile services, Products, Goods & Services, entertainment shopping, penny auctions or online auctions, advertisements and affiliate advertising or services from merchants and sellers of major brands for such items as family fun, sports, restaurants, events and hundreds of top consumer packaged goods brands for groceries, apparel, beverages, books & magazines, foods, health care, household, office, personal care, pet care, photography and other embodiments.

Social Shoppers can find great promotions, online coupons, mobile services, Products, Goods & Services, entertainment shopping, penny auctions or online auctions, advertisements and affiliate advertising or services from merchants and sellers from the leading travel & hospitality industry, restaurants, toy and entertainment companies and top retailers around the world. Social Shoppers can use "a mobile device payment method and system for effectuating an online payment through a computer or a mobile device equipped carrier or a mobile device equipped bank using a mobile users device in connection with an e-commerce and mobile banking transactions on the host geospatial website or mobile device (e.g., mobile telephone, PDA, laptop computer, etc.); wherein users and members create and maintain a rich-media application via a geospatial mapping platform via the Internet comprising: mobile banking and electronic payments. The delivery system for a host geospatial website (access via a mobile device or computer) will provide for a multidimensional representation of information and scalable version of web content for the delivery of Social Earth promotions, online coupons, mobile services, Products, Goods & Services, entertainment shopping, penny auctions or online auctions, advertisements and affiliate advertising or services from merchants and sellers from around the world on a three dimensional geospatial platform using geospatial mapping technology.

A host geospatial website will include realistic virtual landscape using satellite and aerial photography that will include many content layers of web based information, e-commerce and mobile banking links, social networking, social networking communities, social networking activities, social plugins, promotions, social applications, online dating, entertainment shopping, penny auctions or online auctions and advertisements and affiliate advertising or services from merchants and sellers from around the world for a richer user experience. A host geospatial website shall store images, web-based content, social data and share "live social feeds" from social networking giants Facebook™ and Twitter™ and other communications in real-time, which can also include tracking and predicting of online communications via a mobile device or computer with respect to third party applications and outside social networks such as e.g. Facebook™, Twitter™, Skype™ and other social networks around the world. Connecting Social Earth products, goods or services from merchants around the world with users and members known as "Social Shoppers" in real-time on a geographical area across multiple social layers that are displayed as graphic animated color overlays on a three dimensional geospatial platform using geospatial mapping technology. More specifically, it relates to a method for users and members known as "Social Shoppers" to effectuate banking and electronic payments; accessing a user account, engaging in mobile social activities and viewing available options via a three dimensional geospatial mapping platform using geospatial mapping technology."

Giving Back: Social Shoppers will be able to help those who have been impacted by a natural disaster, live in impoverished conditions or are less fortunate in the world. Social Earth plans to provide microloans or microcredit, humanitarian aid and support other worldly causes in developing countries and charities in their communities and local and global causes around our planet and other relief efforts for natural and man made disasters including devastating earthquakes and/or tsunamis. For example, fly to Japan and view a video on the Japan relief effort. By tapping into the power of social networking and bringing together a collective consciousness with millions of Social Shoppers, Social Earth plans to raise awareness for global issues and millions of dollars for microloans or microcredit, humanitarian aid and support other worldly causes.

Products, Goods & Services: Non-limiting examples of Products, Goods & Services provided by the present invention, can include, but are not limited to: A powerful search engine; Online promotions, online coupons, mobile services, Products, Goods & Services, entertainment shopping, penny auctions or online auctions, advertisements and affiliate advertising or services, including without limitation, for such items as e-commerce, media and entertainment, sports, personal & financial network, travel & hospitality services, real estate, educational services, ancillary services, service providers, social networking, social networking communities, online dating, gaming, retail stores, virtual communities and virtual goods and information about microloans or microcredit, humanitarian aid and support other worldly causes through charitable donations or sustainable gifts (collectively "Products, Goods & Services" as any product or service or subgroup thereof) with geospatial mapping. Free real estate information on market trends, free mortgage quotes auto loans, insurance and home equity loans; Low mortgage rates to refinance your home. Compare lender quotes from competing providers; Providing a database with thousands of real estate properties from around the world; Providing a database with thousands of advertisers, service providers and business owners from around the world; Comparing auto quotes from competing providers and refinance your car loan; Providing advertising opportunities for service providers who want to reach millions of users online; Providing social networking, social networking communities, social networking activities, social plugins, promotions, social applications, online communications, social plugins and user profiles, messaging, viewing public & private user profiles; Providing RSS links with news feeds (e.g., from CNN or MSN) for breaking news, real-time weather, sports and media and entertainment news and financial markets from around the world; and/or providing the ability to purchase Products, Goods & Services from thousands of advertisers, merchants, service providers and online businesses from around the world.

Virtual Advertisements: Non-limiting examples of virtual advertisements services provided by the present invention, can include, but are not limited to the following: Providing virtual online advertisements, digital billboards and other products, goods or services that connects millions of users and members from around the world on a three dimensional geospatial platform using geospatial mapping technology.

Virtual Penny Auction or Online Auction Market: Non-limiting examples of virtual auctions services provided by the present invention, can include, but are not limited to the following. Providing an infrastructure and global platform that provides users and businesses of all types and sizes with access to broad markets of penny auctions or online auctions promoting the sale of products, goods & services with millions of users and members from around the world on a three dimensional geospatial platform using geospatial mapping technology.

Virtual E-commerce Market: Non-limiting examples of e-commerce services provided by the present invention, can include, but are not limited to the following. Providing an infrastructure and global platform that provides users and members and businesses of all types and sizes with access to broad markets of e-commerce and other products, goods or services that connects millions of users and members from around the world on a three dimensional geospatial platform using geospatial mapping technology.

Virtual Media and Entertainment Market: Non-limiting examples of virtual media and entertainment services provided by the present invention, can include, but are not limited to the following. Providing an immersive, interactive virtual reality to media and entertainment and other products, goods or services that connects millions of users and members via the Internet with thousands of videos, games, virtual reality television and other amusement applications that connects millions of users and members from around the world on a three dimensional geospatial platform using geospatial mapping technology.

Virtual Sports Market: Non-limiting examples of virtual sports services provided by the present invention, can include, but are not limited to the following. Providing an immersive, interactive virtual reality to sports, media and entertainment, sporting events, players, scores and updates, sports around the world, RSS links, videos and other products or services that connects millions of users and members via the Internet with thousands of videos, games, virtual sports and other amusement applications that connects millions of users and members from around the world on a three dimensional geospatial platform using geospatial mapping technology.

Virtual Personal & Financial Network Market: Non-limiting examples of virtual personal & financial network services provided by the present invention, can include, but are not limited to the following: Providing an infrastructure and global platform that provides users and members and businesses of all types and sizes with access to broad markets of virtual personal & financial network of service providers, products or services that connects millions of users and members from around the world on a three dimensional geospatial platform using geospatial mapping technology.

Virtual Travel & Hospitality Market: Non-limiting examples of virtual travel & hospitality services provided by the present invention, can include, but are not limited to the following: Providing travel & hospitality services and other products, goods or services with a powerful network of thousand of travel & hospitality service providers e.g. travel agents, hotels, motels, resorts, airlines, entertainment, transportation, and other related products, goods & services, etc. and other professionals that connects millions of users and members from around the world on a three dimensional geospatial platform using geospatial mapping technology.

Virtual Real Estate Market: Non-limiting examples of virtual real estate services provided by the present invention, can include, but are not limited to the following: Providing information about various types of real estate, ancillary services and other products, goods or services with a powerful network of thousands of real estate professionals, ancillary services and other affiliates that connects millions of users and members from around the world on a three dimensional geospatial platform using geospatial mapping technology.

Virtual Service Providers: Non-limiting examples of service providers provided by the present invention, can include, but are not limited to: allowing service providers and business owners' to reach users and members and consumers online, offering advertising opportunities for service providers, business owners and affiliates for business services, healthcare services, specialty financial services, consumer products, specialty retail and media and entertainment, lenders, mortgage companies and the like; providing advertisements that can appear on consumers' property search results and connecting thousands of service providers and business owners for business services, healthcare services, specialty financial services, consumer products, specialty retail and media and entertainment, lenders, mortgage companies lenders and mortgage companies to provide financing quotes to millions of users and members and consumers online; providing real estate market information and mortgage quotes for, e.g., purchase of a new home, refinance, consolidating debt, auto loans, insurance quotes or home equity loans and other products, goods & services, advertisers, service providers and business owners from around the world on a three dimensional geospatial platform using geospatial mapping technology.

Virtual Social Networking Market: Non-limiting examples of virtual social networking services provided by the present invention, can include, but are not limited to the following: Providing a social networking platform with social networking and social networking communities and a means for users and members to interact i.e. user profile, social links, share interests and/or activities, social plugins, promotions, social applications, messaging, online communications, viewing public & private user profiles, blogs, chat rooms, other entertainment, events and interests, emailing and instant messaging, games, groups, etc. for members and other products, goods or services that connects millions of users and members from around the world on a three dimensional geospatial platform using geospatial mapping technology.

Virtual Online Dating Market: Non-limiting examples of virtual online dating provided by the present invention, can include, but are not limited to the following: Providing an online community for dating, gathering and other types of services for users and members to interact i.e. user profiles, viewing public & private user profiles, online communications, messaging, social links, social plugins, social applications, blogs, chat rooms, sharing interests and/or activities, entertainment, events and interests, emailing and instant messaging, games, groups, etc. and other products, goods or services that connects millions of users and members from around the world on a three dimensional geospatial platform using geospatial mapping technology.

Virtual Social Gaming Market: Non-limiting examples of social gaming services provided by the present invention, can include, but are not limited to, gaming and social sites, add-ons for online games, digital gifts and other items, online virtual communities and similar or related forms of entertainment, virtual real estate, social networks, searching online for different types of real estate and other products, goods & services, educational services, ancillary services that connects millions of users and members from around the world on a three dimensional geospatial platform using geospatial mapping technology.

Virtual Retail Stores Market: Non-limiting examples of virtual retail stores services provided by the present invention, can include, but are not limited to, virtual retail stores. Proving users and members and business owners with an online retail store and ability to create a central shopping location where buyers can learn about you and all the products that you sell. Providing online retail stores for members and business owners and other products, goods & services, advertisers, service providers and business owners that connects millions of users and members from around the world on a three dimensional geospatial platform using geospatial mapping technology.

Virtual Communities Market: Non-limiting examples of virtual communities services by the present invention, can include, but are not limited to, virtual worlds. Virtual worlds are online communities in which individuals are able to interact with each other in real time, and can include v-businesses, which is virtual commerce of goods and services for use in these virtual worlds. Virtual communities have thousands and millions of members, namely people who join the virtual communities to exchange information, gain social support, or to seek entertainment and friendship. Providing users and members and business owners with an online virtual community and other products, goods & services, advertisers, service providers and business owners that connects millions of users and members and members from around the world on a three dimensional geospatial platform using geospatial mapping technology.

Virtual Goods Market: Non-limiting examples of products, goods & services provided by the present invention, can include, but are not limited to, virtual goods, which can relate to virtual worlds and multiplayer online role playing games (MMO or MMORPG), e.g., like Entropia and Second Life, for members and other products, services, service providers and businesses that connects millions of users and members via the Internet with thousands and millions of members from around the world on a three dimensional geospatial platform using geospatial mapping technology.

Microloans or Microcredit Market: Non-limiting examples of microloan or microcredit services provided by the present invention, can include, but are not limited to, information about microloans or microcredit, which is an extension of very small loans to those in poverty designed to spur entrepreneurship. Providing information about microloans or microcredit to men and women that lack collateral, steady employment and verifiable credit history and in impoverished conditions around the world and other products, goods & services, advertisers, service providers and business owners that connects millions of users and members with organizations that support disadvantaged men and women from around the world on a three dimensional geospatial platform using geospatial mapping technology.

Humanitarian Aid Market: Non-limiting examples of humanitarian aid services provided by the present invention, can include, but are not limited to, humanitarian aid for poverty, natural disasters and man-made disasters. The primary objective of humanitarian aid is to save lives, provide food, clean water and shelter to alleviate suffering and maintain human dignity. Providing humanitarian aid to those in impoverished conditions and suffering from around the world from natural disasters and man made disasters and including animals, animal rights and protecting endangered species and wildlife from extinction and that connects millions of users and members and members with organizations that support underprivileged men, women and children and including animals, animal rights and protecting endangered species and wildlife from extinction from around the world from poverty, natural disasters and man made disasters on a three dimensional geospatial platform using geospatial mapping technology.

Charitable Donations or Sustainable Gifts Market: Non-limiting examples of charitable donations or sustainable gifts services provided by the present invention, can include, but are not limited to, charitable donations or sustainable gifts to benefit those in need from around the world for such categories as: hunger & poverty, education & play, immunization, water, nutrition, health & emergency. In addition, Social Earth supports saving the rain forest, lives and finding cures for infectious diseases, etc. A donation or sustainable gift may take various forms, including cash or a Social Earth Coupon, can include, but are not limited to, a goat, sheep, chicken, water buffalo, cow, stove, carpentry tools, class supplies, health clinic, food, clothing, water, medical or other supplies, services, new or used goods including clothing, toys, food and vehicles. It may also consist of emergency, relief or humanitarian aid items, development aid support and medical care needs as i.e. blood or organs for transplant. Providing charitable donations or sustainable gifts to those in need in impoverished conditions for such items as food, clothing, education, health or benefit a cause around the world and other products, services, service providers and business owners that connects millions of users and members and members with thousands of local communities, charitable organizations and foundations from around the world on a three dimensional geospatial platform using geospatial mapping technology.

The present invention further provides the use of various marketing and customer generation methods, including, but not limited to, social media platforms to generate traffic to the websites and access points for the present invention, e.g., but not limited to, a SOCIAL EARTH website, in order to provide a large subscriber base of Social Shoppers; which can include, but is not limited to, one or more of the following: Virtual Penny Auctions or Online Auctions—Social Shoppers can view, bid and purchase items from penny auctions or online auction from around the world on Social Earth. Virtual Coupons—Social Shoppers can view Social Earth promotions, online coupons, mobile services, Products, Goods & Services, entertainment shopping, penny auctions or online auctions, advertisements and affiliate advertising or services by geo-target location; Video Coupons—Social Earth "video" promotions, online coupons, Products, Goods & Services, entertainment shopping, penny auctions or online auctions, advertisements and affiliate advertising or services from merchants and sellers from around the world that are displayed on one or more pages, links, on the website; Email Marketing—featured Social Earth promotions, online coupons, mobile services, Products, Goods & Services, entertainment shopping, penny auctions or online auctions, advertisements and affiliate advertising or services will be emailed to users and contain a brief headline deal(s) with a full description of upcoming events; Website—Visitors are prompted to register as a Social Shopper when they first visit website and thereafter use the website as a portal for featured Social Earth promotions, online coupons, mobile services, Products, Goods & Services, entertainment services, penny auctions, or online auctions, advertisements and affiliate advertising or services from merchants and sellers from their local area or just about any where in the world; Mobile Applications—Consumers can access Social Earth promotions, online coupons, mobile services, Products, Goods & Services, entertainment shopping, penny auction or online auctions, advertisements and affiliate advertising or services via a smartphone or similar device, which is compatible with Google Earth™ and similar geospatial mapping technologies, and smart phones; Google Ad Words™—Google Ad Words™ or similar advertising is provided to maximize search results for Social Earth Coupons; Pay Per Ad—the invention can provide a PPC Ad link on other "high traffic" websites to drive traffic to websites of the invention; In-stream Advertising—In-stream advertising is also provides to use social media platforms such as "live social feeds" from Facebook™ and Twitter™ to spread the word about Social Earth Coupons; User Generated Traffic the invention can provide rewards to Social Shoppers for sharing and spreading the word about products, goods & services that are offered. e.g., if a certain number of people sign up for Social Earth Coupon, then the deal becomes available to all included; Share Coupons with Friends—the present invention provides this way to make it easy for users and members to share "Social Earth Coupons with friends on social networking and similar sites, e.g., but not limited to, Twitter™, Facebook™, StumbleUpon™, Delicious™, Friendfeed™, or Digg™; Refer A Friend—the invention can provide a Referral Widget and encourage Social Shoppers to refer their friends and receive $10 worth of loyalty credits; Loyalty Card Program—the invention can provide Loyalty Card Programs that reward Social Shoppers each time they purchase a Social Earth Coupon; Social Network Feeds—the invention provides where Social Shoppers can suggest a business to others in the Social Shopper community, track their friends and share "live social feeds" from Facebook™ and Twitter™;

SOCIAL EARTH For Your Business—the present invention can provides for help for businesses to reach new customers with the inventions "live view" Earth business platform, where are provided businesses featured in a sponsor ads, such as, but not limited to, Premium Sponsor Ads; Gift Cards—Social Shoppers and businesses can purchase Gift Cards for friends, family and customers; Foursquare™—the invention can provide promotions via Foursquare so consumers can act and immediately share the information with their friends; Open Source Technologies—the invention provides that Social Shoppers can connect with millions of Social Shoppers in popular social networks such as Facebook™ and Twitter™ using open source technologies; Data Mining—the invention provides for gathering social data for online, mobile advertisers and social brands that are interested in a target market of a particular segment based upon their precise location or other criteria; Image Sharing Sites—the invention provides for Social Shoppers to upload images on image sharing sites such as Flickr™ and Picasaweb™; Social Bookmarking: the invention provides for the use of social bookmarking with sites like Digg™, Delicious™, StumbleUpon™, etc.; Search Engine Optimization—Key words can be used in the present invention to optimize visibility to top search engines such as: Google™, Yahoo™, Bing™, Ask™ and AOL Search™. Other search engines such as: Collecta™, Topsy™, 48ers™, Leapfish™, Scoopler™ and Sency™ are powerful tools that will show live streams of microblog updates from Twitter™, Jaiku™ and Identica™, photos from Flickr™, TwitPic™ and yFrog™ and videos from YouTube™ and Ustream™; YouTube™: the present invention can provide periodic YouTube videos outlining how to use and maximize user purchasing power using the present invention, e.g., SOCIAL EARTH, as well as soliciting and providing video testimonials from Social Shoppers on an ongoing basis, e.g., incentivizing "four star" videos with a special "Best Expert User" badge to be featured on their profile page; Video Viral Marketing can also be used in the present invention; as well as Blogging, and using article servers (such as ezinearticles.com, goarticles.com, selfgrowth.com, isnare.com); Twitter™ Marketing, including, e.g., but not limited to, discounts or other special promotions, online coupons, mobile services, Products, Goods & Services, entertainment shopping, penny auctions or online auctions, advertisements and affiliate advertising or services with their friends on Social Earth and Twitter™; Affiliates—the invention can further provide API widgets or geo-targeted social links that can be downloaded by affiliates. Social Shoppers can get paid X percent (X %) of sales of Social Earth Coupons on their websites; Independent Coupon Distributors—the invention can provide network(s) of independent coupon distributors that own Valupak™ or other franchises (and other direct mail coupon companies) to include "Social Earth Coupons" that can be distributed to local businesses.

Referring now to the drawings wherein like reference numerals are used to identify identical components in the various views, FIG. 1 shows an example of a combined Products, Goods or Services with/Geospatial Mapping/Company-Local Information/Social Networking/Communities ("PGS-GM-CL/I-SN") system 10 in accordance with an exemplary embodiment combined online Product or Service in combination with geospatial mapping/company/Local Information/and/or social networking distribution system 10 includes a main server system 12 and a client system 14 that is remote from main server system 12, connected together by a distributed computer network, such as the Internet 16 (network, or mobile device access system). A user desiring to obtain one and/or more of online Products, Goods or Services in combination with geospatial mapping/company/Local Information/and/or social networking uses client system 14 to interact with main server system 12 to obtain online Products, Goods or Services. An electronic coupon can be but is not limited to any advertisement that is electronic (e.g., electronic advertisement on website, electronic advertisement sent to client device, a hyper link based on a search result from a search engine and/or any other push/pull techniques).

Main server system 12 is configured to be connected to, and/or otherwise receive, promotions, online coupons, social activity, location, Product, Good and/or services information from the issuer of such coupons (i.e., the coupons sponsor) and/or as provided by the website and/or other electronically provided information, e.g., by PDA, cell phone, portable electronic tablet, etc., including mobile banking or e-commerce system. Although not shown, this function can be performed by a direct electronic connection with a sponsor system, and/or can involve loading data from a physically transportable data storage medium (e.g., diskette, tape, CD-ROM, USB drive, etc.). The coupon sponsor may, and in most cases will, issue in connection with the coupon an associated set of instructions that define how the coupon is to be distributed. For example, such instructions can include restrictions as to the number of coupons that any one user can print out for redemption, the state and/or zip code associated with a user for such user to have access to the coupon, the expiration date, the item and discount amount, etc. Main server system 12 is further configured to be connected to, and/or otherwise receive, advertising information from an advertising sponsor, or purchasing system, e.g., Amazon, or company purchase website or mobile application, or through mobile banking system. Although not shown, this function can be performed by direct electronic connection with the ad sponsors system, and/or can involve loading data from a physically transportable data storage medium (i.e., diskette, tape, CD-ROM, etc.). The advertising impressions are displayed on client system 14, as described in greater detail below.

Main server system 12 can include a website server 18, a front-end server 20, a handler 22, a database server 24, and an FTP server 26. Website server 18 is configured to provide "web pages", mobile app, e-commerce or electronic or mobile banking, to consumers (including possible users and members of electronic coupon distribution system 10) with Internet access. Internet 16, more particularly, the World Wide Web portion thereof, "WWW", is an interconnected computer network that is generally distributed throughout the world on discrete interconnected computer nodes having software interfaces generally referred to as "web pages," which further includes geospatial mapping, social networking, company and local information, and/or any other useful data. Access to Internet 16 can be made by various methods; typically, however, a non-institutional user obtains access from one of a plurality of Internet Service Providers (ISPs), which in turn obtain authorized access to Internet 16. Navigation on the WWW portion of Internet 16 involves knowledge of a directory structure of various nodes of the Internet (i.e., an "address" to each given resource on Internet 16). Such an address is generally referred to as a Uniform Resource Locator (URL), which typically starts with a protocol name followed by a domain name, for example: http://www.valuepass.com. Website server 18 is configured to provide, among other things, an interface for effecting a download of client software that a consumer can download and execute to establish a client system 14 on his and/or her computer system. In this way the consumer can become an authorized user ("user") of electronic coupon distribution system 10. In particular, website server 18 can refer an Internet consumer to FTP server 26 for the client installation file.

Front-end server 20 provides multiple interface and allocation/direction features for electronic coupon distribution system 10. Front-end server 20 is the entity that is initially contacted by client system 14 at the start of each new session of combined Products, Goods or Services with /Geospatial Mapping/Company-Local Information/Social Networking/Communities ("PGS-GM-CL/I-SN") distribution system 10, and/or when automatic coupon updates occur. Handler 22 is configured to interface with database server 24. After a new session is established by a user, all subsequent requests by client system 14 can be directed to and are "handled" by handler 22. As a result, handler 22 can thereafter issue a request and/or a command to database server 24, and/or directly respond to client system (if configured to do so). Database server 24 can comprise a plurality of physical, individual general purpose digital computers configured as database servers, which can be further configured in a cluster arrangement. Database server 24, in one embodiment, can be configured to operate using SQL server software, such as, but not limited to, Microsoft SQL Server Version 7, commercially available from, for example, Microsoft Corporation, Redmond, Wash., U.S.A.

FTP server 26 can be configured to operate in cooperation with website server 18 to provide, for example, installation and/or setup programs. The installation program(s) are downloaded to a general-purpose computer (e.g., PC and/or a MAC) for installation of the client software in accordance with the present disclosure.

Client system 14 includes client application software 28, DeviceID data 30 (ID) data 30, user preference data 32, user history data 34, PGS-GM-CL/I-SN information data 36, and advertising data 38. In addition, client system 14 can comprise a general purpose computing apparatus configured to operate in accordance with an operating system having a graphical user interface, such as, for example, Windows 95/98/NT 4.0/2000/Vista/7, and Apple Computer, Inc. MAC OS Operating System for Macintosh platforms. Client system 14 can further include standard peripherals such as a display device 40, a keyboard 42, a pointing device, such as a mouse 44, and an output device, such as a printer 46, for producing a "hard copy" of PGS-GM-CL/I-SN 48. DeviceID data 30 can be stored on main server system 12, according to an exemplary embodiment. In exemplary embodiments, one, a few, a plurality and/or all DeviceID data 30 can be stored on main server system 12.

Client application software 28 comprises software compatible with and executing on client system 14 configured to implement the present disclosure as described herein. Client application software 28 performs various functions including, but not limited to, collecting user information, including preferences, communicating with main server system 12 via Internet 16, and providing an interface for the user for browsing through, and selecting, PGS-GM-CL/I-SN information for printout. DeviceID data 30 can comprise a multi-digit number that is assigned by main server system 12, more particularly, database server 24, when a user registers with PGS-GM-CL/I-SN information distribution system 10. DeviceID data 30 can have a format, such as XXXXXXXX, where X is a digit between 0-9. DeviceID data 30, however, does not specifically identify the user personally, but rather, more accurately associates a physical machine defining client system 14 with user profile information obtained during registration. DeviceID data 30 is stored on client system 14, main server system 12, and/or both as a part of a User Info object. If the DeviceID data 30 is stored on client system 14, then DeviceID data 30 is provided to main server system 12 when making requests, for example, for new PGS-GM-CL/I-SN information data. If a client system 14 operates multiple independent operating systems (e.g., a Mac operating system (a product of Apple Computer, Inc.) and a Windows operating system (a product of Microsoft Corp.)), then there can be a separate DeviceID data 30 for each operating system assigned to that client system 14. Main server system 12 can correlate the provided DeviceID data 30 with user information stored in a profile database. The user information can then be used in identifying PGS-GM-CL/I-SN information suitable for the user. In this embodiment, however, the user is not personally identified nor is it even possible (e.g., through the "hacking" of main server system 12) to identify the user personally, as such information is not even collected from the user. Accordingly, the approach described herein maintains privacy of the user of PGS-GM-CL/I-SN information distribution system 10.

The User Info object further includes user information collected from the user of client system 14 indicative of one and/or more demographic characteristics of the user. In this embodiment, the user information is insufficient to specifically identify the user. In a constructed embodiment, such information comprises a postal zip code associated with the user, and a state in which the user resides. Client application software 28 allows the user to update this information after initial registration. In addition, the User Info object includes the mode in which the Internet is accessed, for example, through use of a modem (e.g., dial-up), through use of a Local Area Network (LAN), and/or use of a proxy server. The User Info object can further include the version number of the client application software 28. User preference data 32 comprises two main groups. The first group of information contained in user preference data 32 includes information defining how often the main server system 12 is checked for new PGS-GM-CL/I-SN information. In a constructed embodiment, the options include one hour, two hours, four hours (the default), twice a day, and once a day. The first group of information contained in user preference data 32 can also include a miscellaneous item of information indicating whether the user prefers that certain PGS-GM-CL/I-SN information be automatically printed (this can be selected and/or deselected by the user). The second main group of information included in user preference data 32 includes a comprehensive listing of main categories of PGS-GM-CL/I-SN information selected by the user that the user wishes to receive. While the particular main PGS-GM-CL/I-SN information category descriptions can be changed on main server system 12 and downloaded to client system 14 at any time, exemplary categories include "Apparel", "Athletics", "Automotive", and "Internet Electronics", among others. A user can deselect a category, in which case PGS-GM-CL/I-SN information pertaining to that category will not be sent from main server system 12 to client system 14.

User history data 34 comprises data corresponding to events occurring at the remote client system 14, as well as other items pertaining to the operation of client system 14. All these items are stored in a user history file. For example, when a user is browsing through available PGS-GM-CL/I-SN information each PGS-GM-CL/I-SN information that is selected for viewing is noted in the user history file. Likewise, when PGS-GM-CL/I-SN information is selected for printing, that action is also recorded in the user history file. Other examples include when PGS-GM-CL/I-SN information is actually printed, and when an advertising impression (described in further detail below) is displayed on display device 40. The information contained in the user history data 34 is encrypted by client application software 28 in accordance with a client system encryption strategy to protect the integrity of the data contained therein. The contents of the user history data 34 are described and illustrated in greater detail in connection with FIG. 17.

PGS-GM-CL/I-SN information data 36 includes information corresponding to the PGS-GM-CL/I-SN information available (e.g., for browsing) on client system 14. Each PGS-GM-CL/I-SN information, such as PGS-GM-CL/I-SN information 48, includes a plurality of items of information associated therewith.

Therefore, an exemplary, non-limiting, structure is defined for each PGS-GM-CL/I-SN information having the items of information set forth in Table 1 below.

TABLE 1

PGS-GM-CL/I-SN information Data Structure

1. PGS-GM-CL/I-SN information Sponsor Name
2. Product and/or Service Description
3. Savings and/or Discount Amount
4. The Number of PGS-GM-CL/I-SN information Available for Printout
5. The Number of PGS-GM-CL/I-SN information Printed Out Thus Far TABLE 1-continued PGS-GM-CL/I-SN information Data Structure 6. Expiration Date
7. Optional Text/Image(s)
8. PGS-GM-CL/I-SN information Identification Number In addition, when PGS-GM-CL/I-SN information 48 is actually printed out, additional information can be printed out on the "hard copy" of the PGS-GM-CL/I-SN information. These additional items can include the DeviceID data 30, portions of the demographic data such as the postal zip code, one and/or more items of the user information contained in user preference data 32, the date and time, and optionally various Internet URLs. Coupon sponsors have found some of the information appearing on printed PGS-GM-CL/I-SN information 48 desirable. That is, when the user redeems PGS-GM-CL/I-SN information 48, for example, at a retail store, information appearing on PGS-GM-CL/I-SN information 48 (which is eventually returned by the retailer to the PGS-GM-CL/I-SN information issuer and/or sponsor) is available to the PGS-GM-CL/I-SN information sponsor. This information can thereafter be used in analyzing and assessing the efficacy of various advertising/promotional strategies. PGS-GM-CL/I-SN information data 36 can be stored on a hard drive and/or the like associated with client system 14, and is preferably stored in an encrypted form. In particular, and in accordance with the present disclosure, PGS-GM-CL/I-SN information data 36 corresponding to PGS-GM-CL/I-SN information is encrypted by main server system 12 in accordance with a server system encryption strategy.

The encrypted PGS-GM-CL/I-SN information data is then transmitted to client system 14. Client system 14 further encrypts the once-encrypted PGS-GM-CL/I-SN information data in accordance with a client system encryption strategy to thereby generate doubly encrypted PGS-GM-CL/I-SN information data. The doubly encrypted PGS-GM-CL/I-SN information data 36 can then be stored on the client system 14. The foregoing encryption steps substantially minimize the occurrence of fraud in the distribution of PGS-GM-CL/I-SN information compared to known systems. A user, for example, can therefore not easily defeat the PGS-GM-CL/I-SN information counting scheme that limits the number of printouts by, for example, exploring the client systems hard drive, identifying PGS-GM-CL/I-SN information data, and thereafter producing printed copies of the PGS-GM-CL/I-SN information. Use of the environment established by client application software 28 is therefore practically the only means for the user to obtain usable PGS-GM-CL/I-SN information 48. Advertising data 38 comprises a plurality of advertising impressions wherein each impression can include a predetermined combination of text and images. Advertising data 38 is also stored on client system 14 in an encrypted form. Display device 40, keyboard 42, mouse 44, and printer 46 can comprise an apparatus known to those of ordinary skill in the art.

FIG. 2 shows, in greater detail, database server 24 of main server system 12. As described above, database server 24 can comprise a plurality of physical database servers arranged in a cluster. Further physical machines can be added to provide for load balancing (i.e., scalability, and the ability to quickly add additional hardware as load and responsiveness criteria require). Database server 24 can include PGS-GM-CL/I-SN information database 50, an advertising database 52, a master category list master category list database 54, a plugin database 56, a brand logo database 58, and a user transaction history database 60.

PGS-GM-CL/I-SN information database 50 includes PGS-GM-CL/I-SN information data similar to that described in connection with PGS-GM-CL/I-SN information data 36, but is more in the nature of a master PGS-GM-CL/I-SN information database including the entire universe and/or a larger set of PGS-GM-CL/I-SN information available on PGS-GM-CL/I-SN information distribution system 10. Advertising database 52 includes a plurality of ad impressions, which can be a combination of text and/or images. Again, advertising database 52 is in the nature of a master advertising database including all of the advertising impressions included in main server system 12.

Master category list database 54 includes the main PGS-GM-CL/I-SN information category names presently established on PGS-GM-CL/I-SN information distribution system 10. In addition, display characteristics, such as the color of a main PGS-GM-CL/I-SN information category button (to be described in connection with FIG. 3A) can also be stored in database 54.

Plugin database 56 includes information as to available plugins for use in connection with client application software 28 of client system 14. Plugin database 56 includes a plurality of plugins. The particular plugins that are selected for use in connection with client application software 28 depends on what added functionality has been configured in client system 14. For example, plugins can be configured to provide Zodiac information, recipe information, and stock quote information to the user. Additionally, a plugin can be configured to provide a new PGS-GM-CL/I-SN information style for the user. In this way, client system 14 can be updated remotely with new functionality.

Brand logo database 58 includes information as to how the user interface of client system 14 is "branded." The default "branding" of the user interface involves the display of a company logo of the assignee of the present disclosure. Also, a corresponding Internet URL for "click through" purposes is associated with the brand image. However, in alternate embodiments, other companies can arrange (e.g., through a referral of potential new users and members of PGS-GM-CL/I-SN information distribution system 10) to have the user interface of client application software 28 "branded" with the referring company's logo (and Internet URL for "click through").

User transaction history database 60 includes information contained in user history data 34 uploaded from client system 14. User transaction history database 60 therefore contains information corresponding to actions and/or events taken by and/or involving the user of client system 14. User transaction history database 60 therefore includes a record for each PGS-GM-CL/I-SN information that has been downloaded and/or otherwise provided to client system 14. As each PGS-GM-CL/I-SN information is displayed, and/or printed by the user, for example, the corresponding record in user transaction history database 60 is updated.

Referring now to FIGS. 3A and 3B, FIG. 3A shows a Graphical User Interface (GUI) 62 displayed on display device 40 in connection with the execution of client application software 28. User interface 62 includes a plurality of main PGS-GM-CL/I-SN information category "buttons" 64 each having a respective status indicator 66 associated therewith. User interface 62 also includes PGS-GM-CL/I-SN information subcategory list 68, PGS-GM-CL/I-SN information list 70, an advertising pane 72, a logo pane 74, a main PGS-GM-CL/I-SN information display area 76, an "Add-To-Print-Cart" button 78, a "Print Now" button 80, a "More Info" button 82, a "Delete" button 84, a "Preferences" button 86, a "Promotions" button 88, a "Refresh" button 90, a printout status display area 92, and a general message display area 94.

Main PGS-GM-CL/I-SN information category buttons 64 allow the user of client system 14 to select the general category of PGS-GM-CL/I-SN information that the user is interested in viewing. For example, the user who is interested in browsing through media and entertainment PGS-GM-CL/I-SN information, would select the main category button 64 designated "Media and Entertainment" using a pointing device such as mouse 44 (e.g., via "clicking" on the button). Status indicator 66 associated with each main PGS-GM-CL/I-SN information category button 64 indicates whether there are PGS-GM-CL/I-SN information under that main category that have not yet been displayed in PGS-GM-CL/I-SN information display area 76. As shown in FIG. 3A, when a status indicator 66 is "checked" (i.e., active), as indicated generally at 66.sub.A for the main PGS-GM-CL/I-SN information category button labeled "Added Extras", such indication informs the user that PGS-GM-CL/I-SN information are available under that main PGS-GM-CL/I-SN information category that have not yet been displayed.

Alternatively, when there are no undisplayed PGS-GM-CL/I-SN information under a main category, the "checked" status indicator 66 becomes inactive and is removed, as shown by a dashed line box designated 66.sub.I where a status indicator would otherwise be displayed had it been "active."

When one of the plurality of main PGS-GM-CL/I-SN information category buttons 64 is selected, a corresponding subcategory list is displayed in PGS-GM-CL/I-SN information subcategory list 68. A user can then browse through the items contained in PGS-GM-CL/I-SN information subcategory list 68 and make a selection. When one of the items contained in PGS-GM-CL/I-SN information subcategory list 68 is selected by the user (e.g., via "clicking"), the corresponding individual PGS-GM-CL/I-SN information and/or informational messages are displayed in PGS-GM-CL/I-SN information list 70. The user can then select an item from PGS-GM-CL/I-SN information list 70, which will then be displayed in PGS-GM-CL/I-SN information display area 76. Through the foregoing interface, users and members of PGS-GM-CL/I-SN information distribution system 10 can quickly and easily navigate from broad main PGS-GM-CL/I-SN information categories, to individual PGS-GM-CL/I-SN information, for printout and later redemption. If the user desires to print out a particular PGS-GM-CL/I-SN information, the user can select the print cart button 78 to add the selected PGS-GM-CL/I-SN information to a print cart and/or queue for subsequent printout on printer 46. Alternatively, the user can print the selected PGS-GM-CL/I-SN information immediately by selecting the "Print Now" button 80.

Advertising pane 72 is configured to display an advertising impression. In one embodiment, the advertising impression is selected from a plurality of advertising impressions as a function of a selected PGS-GM-CL/I-SN information subcategory. For example, a vendor of electronic equipment can arrange to have an ad impression for that vendors company displayed in advertising pane 72 when the user selects a particular PGS-GM-CL/I-SN information subcategory from list 68 when the "Internet Electronics" category button 64 is selected. As a further feature, the advertiser can provide an Internet URL (e.g., to its home page) and have it associated with the ad impression. Client application software 28 is configured such that when a user selects (e.g., "clicks") advertising pane 72, an Internet browser program associated with client system 14 is launched and is directed to the URL as specified by the advertiser. This is a so-called "click through" occurrence, which is recorded in the user history file.

Logo pane 74 provides a display area through which the user interface 62 of PGS-GM-CL/I-SN information distribution system 10 can be "branded." As with advertising pane 72, an Internet URL can be associated with the brand logo displayed in logo pane 74. Client application software 28 is configured such that when the user selects (e.g. "clicks") logo pane 74, an Internet browser program associated with client system 14 is launched and is directed to the specified URL.

The "Print Now" button 80 is configured under client application software 28 such that when selected, the PGS-GM-CL/I-SN information currently being viewed is printed out on printer 46. If there are one and/or more other PGS-GM-CL/I-SN information currently in the print queue, as a result of prior selection of the print cart button 78 for previously displayed PGS-GM-CL/I-SN information, then selection of the "Print Now" button 80 by the user will operate to print all such selected PGS-GM-CL/I-SN information 48 on printer 46. The "More Info" button 82 is configured under client application software 28 to launch an Internet browser program associated with client system 14 when selected, and, further, to direct the browser to a specified URL. In accordance with a secure e-couponing embodiment of the present disclosure, predetermined ones of the PGS-GM-CL/I-SN information displayed in PGS-GM-CL/I-SN information display area 76 can be redeemed by the user electronically (as opposed to printing out the displayed PGS-GM-CL/I-SN information and physically tendering the same to the retailer). Generally, a portion of the PGS-GM-CL/I-SN information being displayed in PGS-GM-CL/I-SN information display area 76 will tell the user to click on the "More Info" button 82 to instantly redeem the PGS-GM-CL/I-SN information.

Client application software 28 is configured to invoke, in response to the "click", the specified but completely hidden and inaccessible URL (including the appended promotional code) using an Internet browser program. Client application software 28 disables access to the invoked URL/code. For example, moving the mouse arrow over the PGS-GM-CL/I-SN information/ad does not cause the URL to be displayed, nor is "right-button clicking" operative to allow capture of the URL. Accordingly, the specified URL (and code) is neither displayed nor available, and cannot be discovered by, for example, "right-clicking" on PGS-GM-CL/I-SN information display area 76, like a web-based e-PGS-GM-CL/I-SN information distribution systems. The browser takes the user to the website corresponding the specified URL, where the appended promotional code is processed, and the user provided an opportunity to redeem the same. The present disclosure therefore provides secure PGS-GM-CL/I-SN information distribution. In another embodiment, the specified URL that is invoked when the "More Info" button 82 is "clicked" comprises the URL associated with an advertiser's website (i.e., the advertiser associated with an ad impression displayed in advertising pane 72). The "Delete" button 84 is configured under client application software 28 to delete the currently viewed PGS-GM-CL/I-SN information when selected by the user.

The "Preferences" button 86 is configured under client application software 28 to allow the user to set and/or modify the information contained in the user preference data 32, when selected by the user. For example, the refresh interval referred to above can be updated by the user to extend and/or foreshorten the PGS-GM-CL/I-SN information update interval. The "Promotions" button 88 is configured under client application software 28 to prompt the user to enter a promotion code to obtain a special promotion PGS-GM-CL/I-SN information, when selected by the user. For example, a third-party website, and/or the like, can advise the user of a promotional code, with instruction to establish client system 14 (if they are not already a registered user), and then to enter the promotion code as described above, to obtain the promotional PGS-GM-CL/I-SN information.

The "Refresh" button 90 is configured under client application software 28 to transmit an update request from client system 14 to main server system 12, when selected by the user. This action, in-effect, requests that any new PGS-GM-CL/I-SN information waiting for the user on main server system 12 at that point in time be downloaded to client system 14. Additionally, any data in the user history file is uploaded. Printout status display area 92 is provided for displaying messages pertaining to the status of the print cart (e.g., "Items to Print: 2"). Message display area 94 is provided for displaying various messages to the user of client system 14.

Referring now to FIG. 3B, the graphical user interface associated with the operating system of client system 14 can include a taskbar 100. In accordance with the present disclosure, taskbar icon 102 is provided. Client application software 28 is configured to display taskbar icon 102 to the user in a first display state when no new PGS-GM-CL/I-SN information and/or messages are available to the user. Taskbar icon 102 in the first display state can assume a static display. In constructed embodiment, taskbar icon 102 includes a generally black-colored "%" symbol on a yellow-colored background, all enclosed by a dashed-line box.

Client application software 28 is further configured to display taskbar icon 102 in a second display state different from the first display state when new PGS-GM-CL/I-SN information and/or messages are available for the user. In a constructed embodiment, the second display state associated with taskbar icon 102 comprises a quasi-flashing display state wherein (i) the color of the "%" symbol is indexed and/or rotated through a plurality of different colors, and (ii) the dashed-line enclosure box is manipulated to give the sense of movement, particularly rotation, around the perimeter of taskbar icon 102.

Referring now to FIG. 4, a brief description of the operation of PGS-GM-CL/I-SN information distribution system 10, particularly the main interactions between client system 14 and main server system 12, will now be set forth. Each time a new session is commenced, the basic steps set forth in FIG. 4 are performed.

In step 104, client system 14, by way of execution of client application software 28, is initialized. In step 106, client application software 28 determines whether there is an identified user device for client system 14, and/or whether the present user is a "new" user device. Client application software 28 can make this determination based on the existence and/or absence of particular files on client system 14 (e.g., a file containing a DeviceID data 30) indicative of whether and/or not this is a "new" user device. If "NO", then the method branches to step 112. Otherwise, if the answer to step 106 is "YES", then the method branches to step 107.

In step 107, client application software 28 obtains user information from the user. In particular, client application software 28 is configured to collect user information from a user of client system 14 indicative of one and/or more demographic characteristics of the user without obtaining information sufficient to specifically identify the user. In a constructed embodiment, the information obtained comprises a postal zip code associated with the user, and a State where the user resides. Personal information such as the users and members name, e-mail address, residence address, social security number, telephone number, and the like is not obtained in step 107. In accordance with the present disclosure, the foregoing step provides useful information to main server system 12 in the selection of PGS-GM-CL/I-SN information appropriate for the user (e.g., geographic area). PGS-GM-CL/I-SN information from merchants located geographically proximate the users and members residence can be more easily redeemed by the user, thus increasing the efficacy of the PGS-GM-CL/I-SN information offer. Other information, such as the type of Internet connection (e.g., modem), can also be obtained from the user in step 107.

In step 108, main server system 12 registers the "new" user device. Main server system 12 determines whether the user of remote client system 14 is a "new" user device based on the presence and/or absence of DeviceID data 30 in a message from client system 14 to main server system 12. The "new" user device is then registered on main server system 12. Main server system 12 is configured to register the new user by performing, among other things, the steps of allocating a new DeviceID data 30, and associating the new DeviceID data 30 with the user information obtained in step 107. Through the foregoing, remote client system 14 can always be identified by its DeviceID data 30.

In step 109, client system 14 and main server system 12 communicate so as to update the master category list, plugins, brand logo information, advertising data and PGS-GM-CL/I-SN information data at the remote client system 14. This is done, for the first time client application software 28 is executed, by searching the main server system 12 for new information that has come into being between the time the installation and/or setup program that the user used to install client system 14 was populated with such data (the "sync" date), and the present time (the server date). The identified information is downloaded to thereby update client system 14. This step ensures that the user of client system 14 has the most up-to-date information in these categories. The method then proceeds to step 110 wherein main client application software 28 is executed.

When the answer to step 106 is "NO", then the method branches to step 112. In step 112, client application determines whether client system 14 is "online." Client system 14 is "online" when the user is connected to the Internet such that client system 14 can communicate with main server system 12. While this basic step are described in greater detail below (FIG. 9), it bears emphasizing that client system 14, in an exemplary embodiment, will not force a connection to Internet 16. Rather, if there is no "online" connection, the user of client system 14 will have access to PGS-GM-CL/I-SN information in an "offline" mode of operation. Thus, if the answer to step 112 is "NO", then the method branches to step 110. Otherwise, when the answer step 112 is "YES", then the method branches to step 114. In step 114, main server system 12 identifies the remote client system 14 based on a DeviceID data 30 provided by client system 14. In this way, main server system 12 can utilize the information "on file", such as state and zip code, for a variety of purposes. In a constructed embodiment, the state and zip code data are included in a request by front-end server 20 to database server 24 to select a server that will service this user for this session (described in detail in connection with FIG. 10). The response to the request is a virtual IP address to a particular handler 22, and a selected database "name" of a selected database server 24.

In step 116, main server system 12, particularly the assigned handler 22 and database server 24, is updated with any information contained in user history data 34 that has not yet been uploaded and processed. The user history file contains information indicative of actions taken by, or, events occurring in response to actions taken by, the user of remote client system 14. As described above, user history data 34 contains information such as the identity of PGS-GM-CL/I-SN information selected, PGS-GM-CL/I-SN information printed, advertising impressions displayed in advertising pane 72, etc. The assigned handler 22 in conjunction with database server 24 uses the user history file in at least two ways: (i) to produce data from which a user script can be built by the remote client system 14 and, (ii) to update the user transaction history database 60, which can then be queried to prepare reports that are provided as feedback to the various advertising sponsors, PGS-GM-CL/I-SN information issuers, and PGS-GM-CL/I-SN information referral agents.

Step 118 involves obtaining a client script for execution by client system 14. Step 118 includes the substep of identifying PGS-GM-CL/I-SN information at main server system 12 suitable for the user. What is suitable for any particular user can be based on DeviceID data 30, the user information associated with DeviceID data 30, the main PGS-GM-CL/I-SN information categories selected by the user, the OS platform (e.g., MAC OS vs. Windows), the version of client application software 28, the cobrand ID, and the promotional code, if any. Use of these criteria can be either inclusive and/or exclusive. Client system 14 can be sent lists of undownloaded PGS-GM-CL/I-SN information, undownloaded ads, etc. The lists can only identify, for example, the PGS-GM-CL/I-SN information to be downloaded (not the PGS-GM-CL/I-SN information itself). Steps 120, 122, and 124 involve obtaining the actual PGS-GM-CL/I-SN information data, ad data, etc.

In step 120, the master category list, plugins, and brand logo information is updated, based on execution of the client script by client system 14. Particularly, client system 14 works through the list of needed items.

In step 122, advertising data comprising advertising impressions from advertising database 52 are updated at the remote client system 14. This step ensures that the user has the most up-to-date advertising available. Again, client system 14 works through a list of needed ads, sequentially making requests from database server 24.

In step 124, PGS-GM-CL/I-SN information data from PGS-GM-CL/I-SN information database 50 is updated at remote client system 14. Updating of the PGS-GM-CL/I-SN information data includes retrieving PGS-GM-CL/I-SN information data corresponding to the identified PGS-GM-CL/I-SN information (i.e., the list provided as part of the client script).

In FIG. 5, a diagrammatic and block diagram view of a system for controlling the number of clicks to a clickable advertisement is shown, according to an exemplary embodiment. The system for controlling the number of clicks to a clickable advertisement includes additional features, such as an access module 37 and a web printout 49, according to an exemplary embodiment. Client application software 28, DeviceID data 30, user preferences 32, user history data 34, advertising data 38 and the other features listed in FIG. 1 operate in a similar manner as detailed in the description of FIG. 1.

Figure 6:
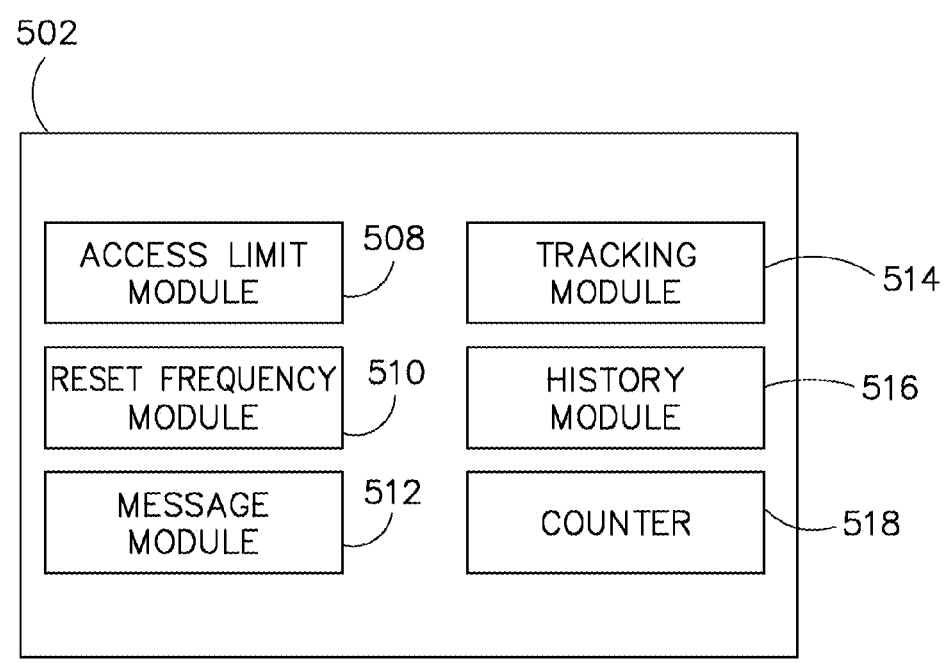
FIG. 6 is a block diagram showing, in greater detail, the system for controlling the number of clicks to a clickable advertisement shown in FIG. 5, according to an exemplary embodiment.

In FIG. 6, a block diagram of the system for controlling the number of clicks to a clickable advertisement shown in FIG. 5 is shown, according to an exemplary embodiment. The system for controlling the number of clicks to a clickable advertisement can include a processing circuit 502. Processing circuit 502 can include an access limit module 508, a reset frequency module 510, a message module 512, a tracking module 514, a history module 516 and a counter module 518, according to exemplary embodiments. Access limit module 508 can be configured to limit the amount of times an advertisement, website, and/or PGS-GM-CL/I-SN information can be accessed. The amount of times an advertisement, website, and/or PGS-GM-CL/I-SN information can be accessed can be determined manually and/or automatically. The manual process can include data entry by a user, system administrator, clerk, etc. The automatic process can include simple and/or complex algorithms, which can for example dynamically change the access limit based on inputs, such as time of day, time passed since last access attempt, advertising campaign strategy and timing, etc. It should be noted that any $^{algorithm}$ that is known to a person of ordinary skill in the art is hereby incorporated into this disclosure. One and/or more components of processing circuit 502 can be operable on client system 14, website server 16, and/or both. The term processing circuit and processor can be used interchangeably. In an exemplary embodiment, counter module 518 monitors the number of times the advertisement, website, and/or PGS-GM-CL/I-SN information has been accessed. Processing circuit 502 compares the number of times the advertisement, website, and/or PGS-GM-CL/I-SN information has been accessed to the number of times the user is allowed to access the information based on the data stored in access limit module 508 to determine whether access should be granted.

In an exemplary embodiment, reset frequency module 510 is configured to reset the number of times the advertisement, website and/or PGS-GM-CL/I-SN information has been access based on predetermined timeframe. For example, access limit module 508 can be set to limit the access to the advertisement, website, and/or PGS-GM-CL/I-SN information to three times. However, reset frequency module 510 is configured to reset the number of times the advertisement, website, and/or PGS-GM-CL/I-SN information has been accessed to zero every twenty-four hours. Therefore, the advertisement, website, and/or PGS-GM-CL/I-SN information can be accessed up to three times every twenty-four hours. It should be noted that any reset time interval can be utilized and that reset frequency module 510 can be configured to increment access limit module 508. For example, access limit module 508 can be set to allow access three times. After a predetermined timeframe (e.g., twenty-four hours) has past, reset frequency module 510 can be configured to increment access limit module 508 to allow access six times.

In an exemplary embodiment, message module 512 is configured to transmit various messages. These messages can include access denial messages, access allowed messages, system status messages, promotional messages, informational messages, and/or system reporting messages. In an exemplary embodiment, history module 516 is configured to store a history of all advertisement, website, and/or PGS-GM-CL/I-SN information accessed by the computing device. In an exemplary embodiment, tracking module 514 is configured to analyze the data stored in history module 516 to determine any patterns in the advertisements, websites, and/or PGS-GM-CL/I-SN information accessed by the computing device that indicate misuse, fraud and/or other behavior warranting further evaluation.

Processing circuit 502 can be implemented with digital and/or analog components, such as one and/or more processors and/or logic devices, such as a complex instruction set computer (CISC) microprocessor, a reduced instruction set computing (RISC) microprocessor, a very long instruction word (VLIW) microprocessor, a processor implementing a combination of instruction sets, and/or other processor device. In one embodiment, for example, processing circuit 502 can be implemented as a general purpose processor, such as a processor made by Intel™ Corporation, Santa Clara, Calif. Processing circuit 502 can also be implemented as a dedicated processor, such as a controller, microcontroller, embedded processor, a digital signal processor (DSP), a network processor, a media processor, an input/output (I/O) processor, a media access control (MAC) processor, a field programmable gate array (FPGA), a programmable logic device (PLD), and so forth.

Figure 7:
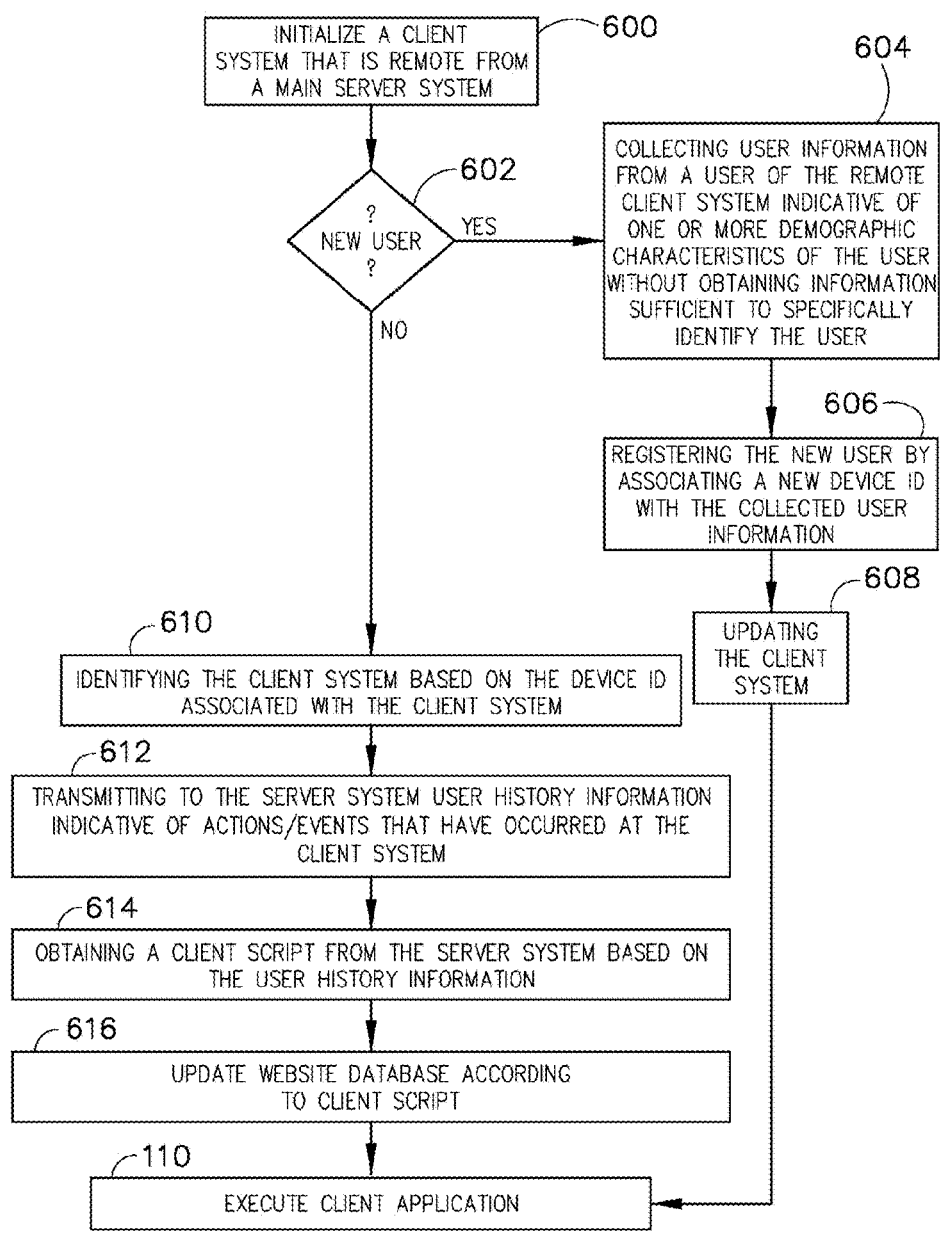
FIG. 7 is a simplified flowchart diagram view illustrating interactions between the client system, and the main server system, according to an exemplary embodiment.

In FIG. 7, a flowchart diagram view illustrating interactions between client system 14, and main server system 12 is shown, according to an exemplary embodiment. The process is started by initializing client system 14 that is remote from main server system 12 (step 600). The system determines whether the user is a new user (step 602). If the user is a new user device, then the system collects user information from a user of remote client system 14 indicative of one and/or more demographic characteristics of the user without obtaining information sufficient to specifically identify the user (step 604). The system registers the new user device by associating a new DeviceID data 30 with the collected user information (step 606). The system updates client system 14 (step 608). If the user is not a new user, then the system identifies client system 14 based on DeviceID data 30 associated with client system 14 (step 610). The system transmits to main server system 12 user history information indicative of actions/events that have occurred at client system 14 (step 612). The system obtains a client script from the server system based on the user history information (step 614). The system updates the website database according to client script (step 616). The system executes client application software 28 (step 616).

Figure 8:
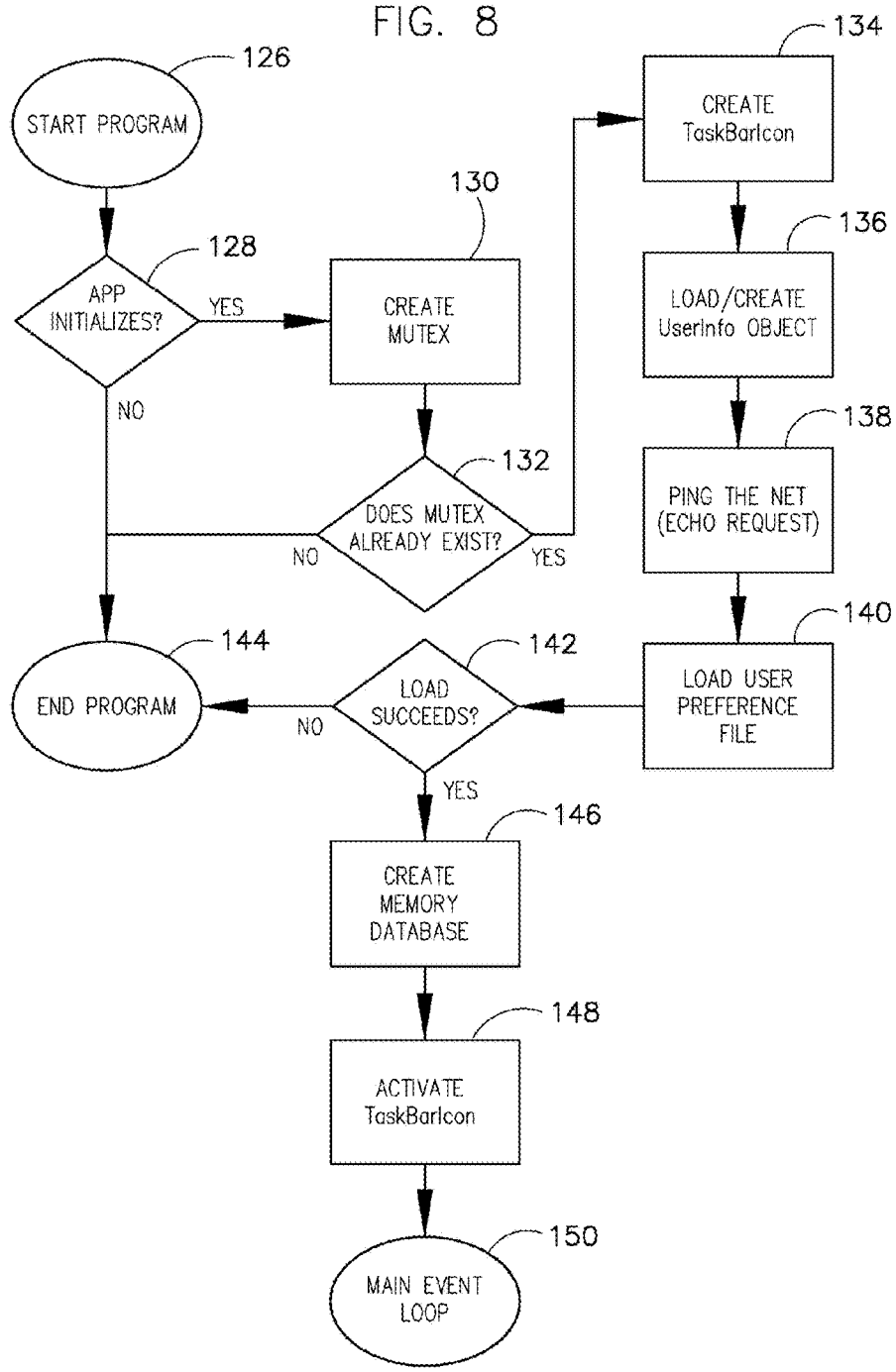
FIG. 8 is a simplified flowchart diagram view showing, in greater detail, the initial steps illustrated in FIG. 4 for system initialization, according to an exemplary embodiment.

FIG. 8 shows steps 104, 106, 107 and 112 of FIG. 4 in greater detail. The method begins in step 126 with initiation of client application software 28. In step 128, if client application software 28 properly initializes, then the method branches to step 130. Otherwise, the method branches to step 144 where execution of client application software 28 ends. In step 130, a "mutex" is created by client application software 28. "Mutex" stands for "mutually exclusive." Programs and/or code segments that establish a mutex prevent other programs and/or code segments from running if they try to establish a mutex with the same ID. Client application software 28 employs mutex functionality in the Microsoft Operating system to ensure that only one instance of client application software 28 is running on any given client system 14. A second instance would be denied use of the mutex, and that instance would then exit.

In step 132, a test is performed to determine whether the mutex already exists. If the answer is "NO", the method branches to step 144 where client application software 28 ends. However, if the response to the inquiry in step 132 is "YES", then the method branches to step 134.

In step 134, taskbar icon 102 is created by client application software 28. The taskbar icon 102 is graphically illustrated in FIG. 3B. As described above, a quasi-flashing taskbar icon 102, in an exemplary embodiment, is a visual alert to the user of client system 14 that new PGS-GM-CL/I-SN information and/or offers are available for browsing. The method then proceeds to step 136. In step 136, a User Info object is loaded (if it already exists) and/or created (if it does not already exist). If this is the first time the client application software 28 has been executed, the User Info object must be created. As described above, the User Info object includes DeviceID data 30, demographic data, proxy server information, if any and software version number. This information can be stored, for example, on a hard drive portion of client system 14. The method then proceeds to step 138.

In step 138, client system 14 transmits an echo request to main server system 12, which is received by front-end server 20. Inasmuch as client system 14 can be connected to the Internet in a variety of logically and physically different configurations (e.g., dial-up connection, proxy server, hidden proxy server such as in the case of AOL, etc.), step 138 is provided to ensure a virtual channel for messaging between client system 14 and main server system 12. The method then proceeds to step 140. In step 140, a user preference file containing user preference data 32 is loaded into the memory of client system 14 for use by client application software 28. Initially, a default set of information is used, in which all PGS-GM-CL/I-SN information categories are selected and the refresh interval is set to 4 hours. The method then proceeds to step 142.

In step 142, a test is made by client application software 28 to determine whether the user preference file has loaded successfully. If the answer to this inquiry is "NO", then the method branches to step 144 ("end program"). This can occur when the user preference file has been deleted, for example. On the other hand, if the answer to step 142 is "YES", then the method branches to step 146. In step 146, a memory database is created for maintaining user history events. This database is configured to contain the user actions taken by the user, ad impression displayed, etc., and to store the same for later transmittal to main server system 12 as user history data 34.

In step 148, taskbar icon 102 (FIG. 3B) is activated. This provides a visual cue to the user that client application software 28 is available, and, that PGS-GM-CL/I-SN information lists can be browsed, PGS-GM-CL/I-SN information selected and printed out, and/or any other function available on client application software 28. Under certain circumstances, taskbar icon 102 alerts the user to new PGS-GM-CL/I-SN information and/or offers.

In step 150, client application software 28 begins main event loop processing. In main event loop processing, certain action, such as, for example, selecting a main PGS-GM-CL/I-SN information category, selecting PGS-GM-CL/I-SN information subcategory, selecting a particular PGS-GM-CL/I-SN information, displaying PGS-GM-CL/I-SN information, printing PGS-GM-CL/I-SN information, refreshing the local PGS-GM-CL/I-SN information database, etc., can be initiated by the user and detected and executed by client application software 28. While the program in accordance with an exemplary embodiment can be invoked manually by user of client system 14, many operating systems, notably Windows 95/98, allow the user to specify that the execution of client application software 28 should occur on startup of the computer on which client system 14 resides. Accordingly, without any further intervention by the user, upon each startup of client system 14, client application software 28 will initialize.

Figure 9:
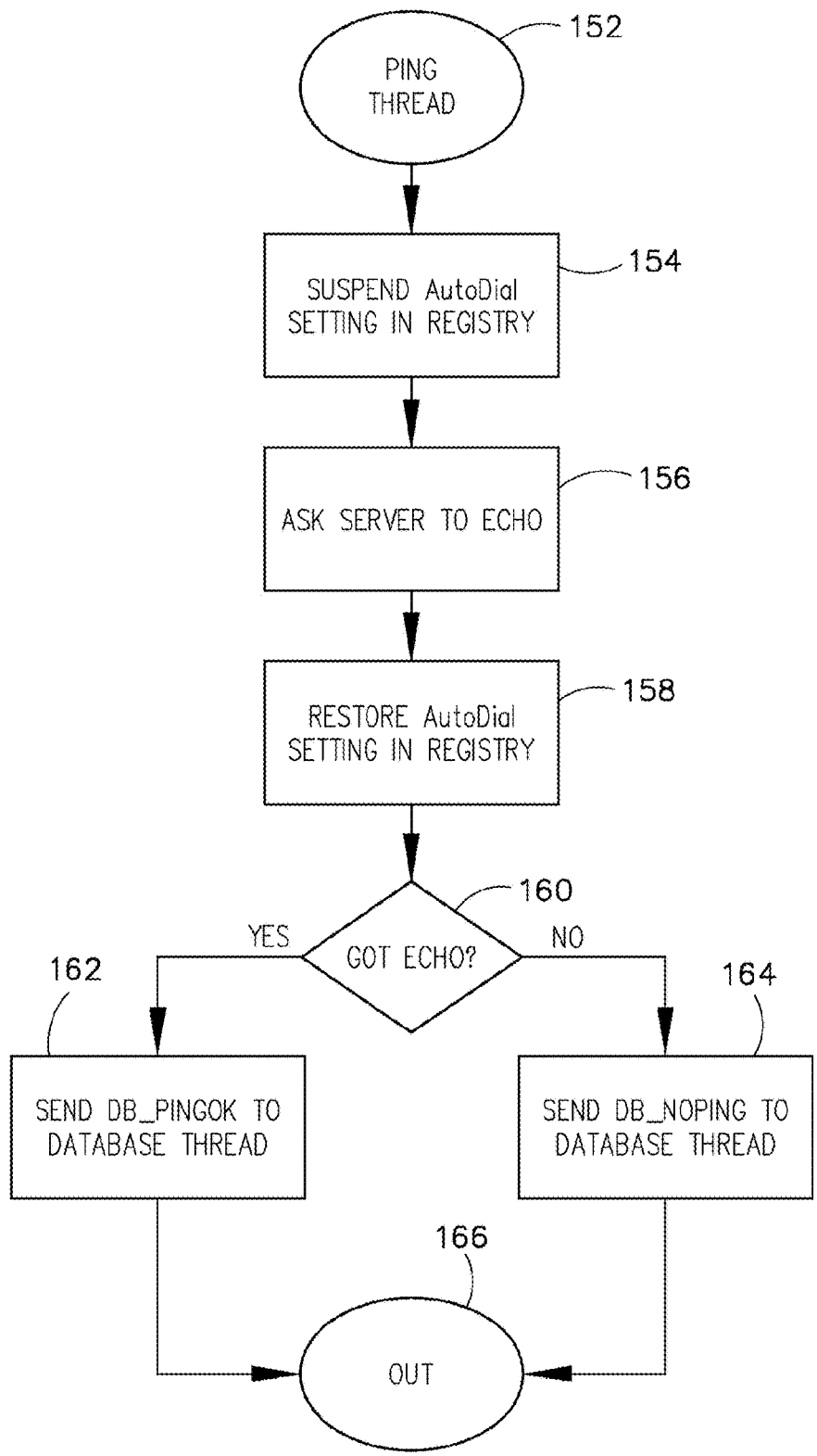
FIG. 9 is a simplified flowchart diagram view showing, in greater detail, an echo request step shown in block diagram form in FIG. 8, according to an exemplary embodiment.

FIG. 9 shows step 138 of FIG. 8 (the "echo request" and/or "ping the net" step) in greater detail. Execution of the method begins in step 152 wherein the "ping thread" portion of client application software 28 commences execution. If client system 14 is not "online", client application software 28 will not force an Internet connection. Thus, in step 154, client application software 28 suspends the "AutoDial" setting in the Windows registry. This ensures that the echo request to front-end server 20 does not automatically cause a dialog window to be presented to the user asking for ISP Identification and Password information. In step 156, client system 14 through execution of client application software 28, transmits a request to front-end server 20 to echo. The nature of the requested "echo" can simply be a return transmittal of an acknowledgement from front-end server 20. In step 158, the "AutoDial" setting is restored in the Windows registry.

In step 160, the ping thread performs a test to determine whether the requested "echo" was received by way of a return transmission from front-end server 20. If the answer to this inquiry is "YES", then the method branches to step 162, wherein a positive indication that an echo response to the echo request was returned to the client system ("DB_PINGOK") is generated. The positive indication is provided to client application software 28 (particularly, a database thread portion thereof). Otherwise, if no echo was received from front-end server 20, then a negative indication ("DB_NOPING") is sent to the database thread in step 164. In either case, control from steps 162 and 164 both proceed to step 166, which is an exit step from the ping thread portion of client application software 28.

Figure 10:
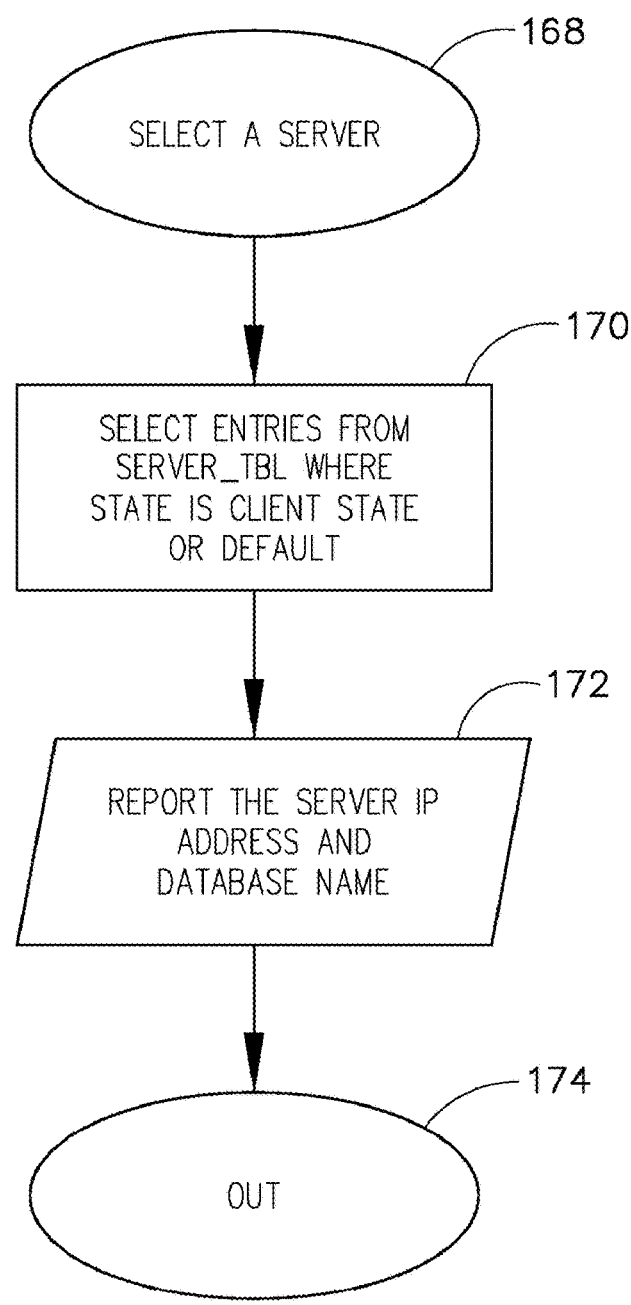
FIG. 10 is a simplified flowchart diagram view showing a server selection routine performed at the main server system, according to an exemplary embodiment.

FIG. 10 shows in detail the steps performed by main server system 12, particularly front-end server 20, in requesting that an appropriate handler 22 and database server 24 be selected for servicing client system 14. This "server select" operation occurs immediately after a successful "echo request" operation (FIG. 9). A plurality of database servers 24 can be deployed, the particular number of which is selected to match the quantity of incoming requests ("load") from the multiplicity of client systems 14 installed remotely. Step 168 marks the beginning of the method. At this point, main server system 12 has in its possession at least the demographic information previously collected (e.g., state and zip code) even if it is a "new user" with no assigned DeviceID data 30 yet. The database server receives the request. The method then proceeds to step 170.

In step 170, a database server 24 routine selects entries from a server table where the state in the table matches the state of residence provided by client system 14. The table entry information defines the logical entities that will service this client system 14.

In step 172, an Internet Protocol (IP) address and a database name are reported over Internet 16 to client system 14. Subsequent requests during this session from client system 14 regarding requests for updated data and the like are sent in a message addressed to the selected server IP address (which points to a handler 22), and will include in that message the selected database name, which logically maps to entries selected in step 170 (e.g., these can be various advertisement databases 52, PGS-GM-CL/I-SN information databases 50, etc.). The selected IP address, in-effect, is a virtual IP address since there are a plurality of database servers 24, perhaps arranged in a cluster, that are physically provided in order to provide the desired load carrying capacity. The routing function is performed on main server system 12, by handler 22 in a manner known to those of ordinary skill in the art. The method ends in step 174.

Figure 11:
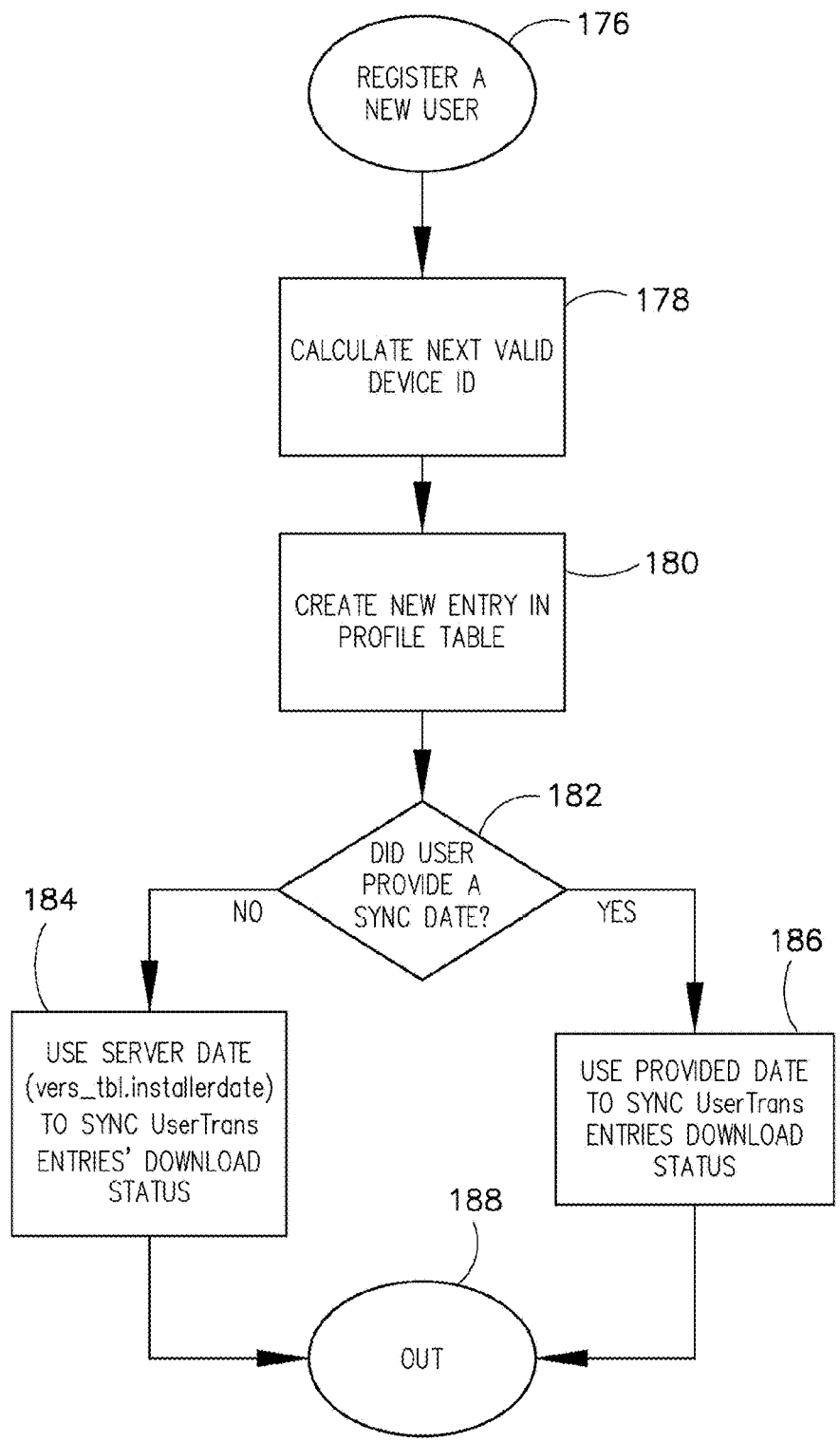
FIG. 11 is a simplified flowchart diagram view showing the steps for registration of a new user on the main server system, according to an exemplary embodiment.

FIG. 11 shows the steps performed on main server system 12 to register a new user device. The process begins in step 176 with commencement of the registration routine. In step 178, a new DeviceID data 30 is calculated by database server 24. In step 180, a new entry and/or record is created in a user profile table. The profile entry will associate DeviceID data 30 with the user information collected from the user. The method then proceeds to step 182. In step 182, database server 24 determines whether a "sync date" was provided from client system 14. This is a date that describes how "up-to-date" client system 14 is, particularly the PGS-GM-CL/I-SN information and advertising information portions thereof. The use of the sync date has been described above in connection with FIG. 4. This "sync date" is automatically provided from client system 14 to database server 24 via the assigned handler 22. If a "sync date" was not provided by client system 14, then the method branches to step 184 where a nominal sync date based on the version of the software installed on the client system is used for downloading and updating purposes. Alternatively, if the answer to step 182 is "YES", then the method branches to step 186.

In step 186, the date provided by client system 14 is used as the "sync date" to synchronize the data on client system 14 relative to the master data on main server system 12. It should be emphasized that the "sync date" is not a date that client application software 28 solicits from the user, but rather, is simply a date available within client application software 28 relating to how "current" the data is (i.e., PGS-GM-CL/I-SN information/advertising data, etc.). In either case, the method proceeds to and ends at step 188.

Figure 12:
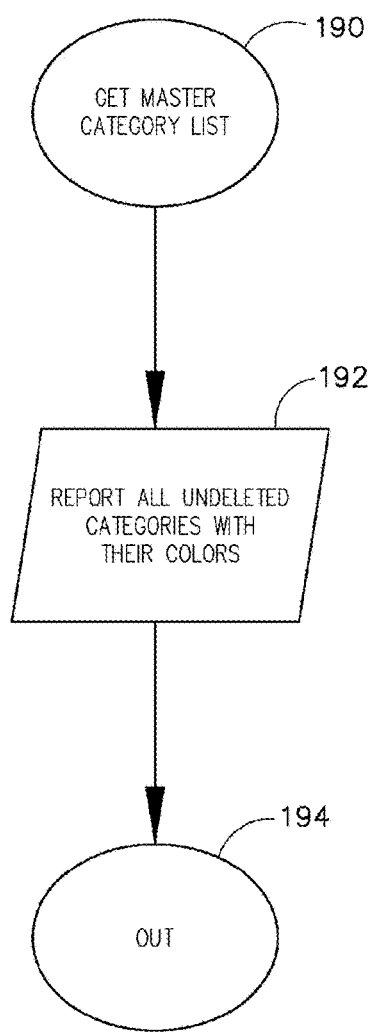
FIGS. 12-14 are simplified flowchart diagram views showing, in greater detail, the steps of updating the master category list, plugins, and brand logo information, respectively, that are shown in block diagram form in FIG. 4, according to an exemplary embodiment.

FIGS. 9, 10 and 11 show step 120 (FIG. 4) in greater detail. Referring to FIG. 12, step 190 represents a request to obtain a master category list (i.e., the up-to-date list). This request is made from client system 14 to the selected database server 24 via handler 22. Such a request is directed to the selected "virtual" IP address as described above. The master PGS-GM-CL/I-SN information category list (e.g., "Athletics", "Automotive", "Internet Electronics", etc.) can be updated on main server system 12, particularly database server 24. That is, categories can be added, and/or categories can be deleted. In either case, such a change are reflected in user interface 62 of the respective client systems 14 when the next session is invoked by a user.

In step 192, all undeleted master PGS-GM-CL/I-SN information categories, along with their display color (as displayed on display device 40 of client system 14) are reported out to client system 14 for use by client application software 28. Step 194 ends the master PGS-GM-CL/I-SN information category list updating process.

Figure 13:
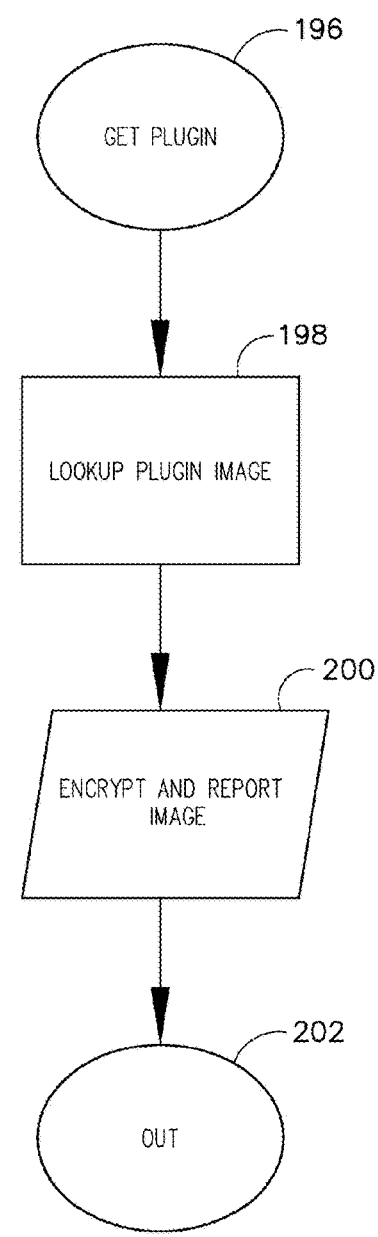

Referring now to FIG. 13, step 196 represents a request from client system 14 to database server 24 via handler 22 to obtain a new and/or an up-to-date plugin(s). It should be understood that for an existing user, client system 14 can be executing a client script that includes a list containing needed plugins. The process outlined in FIG. 13 would be executed for each plugin on the list.

In step 198, database server 24 performs a look-up of the needed plugin to locate the corresponding plugin file (or image).

In step 200, an "image" and/or copy of the file of the sought-after plugin is encrypted in accordance with a server system encryption strategy, and is reported and/or transmitted via Internet 16 to client system 14. In step 202, the plugin update process is completed.

Figure 14:
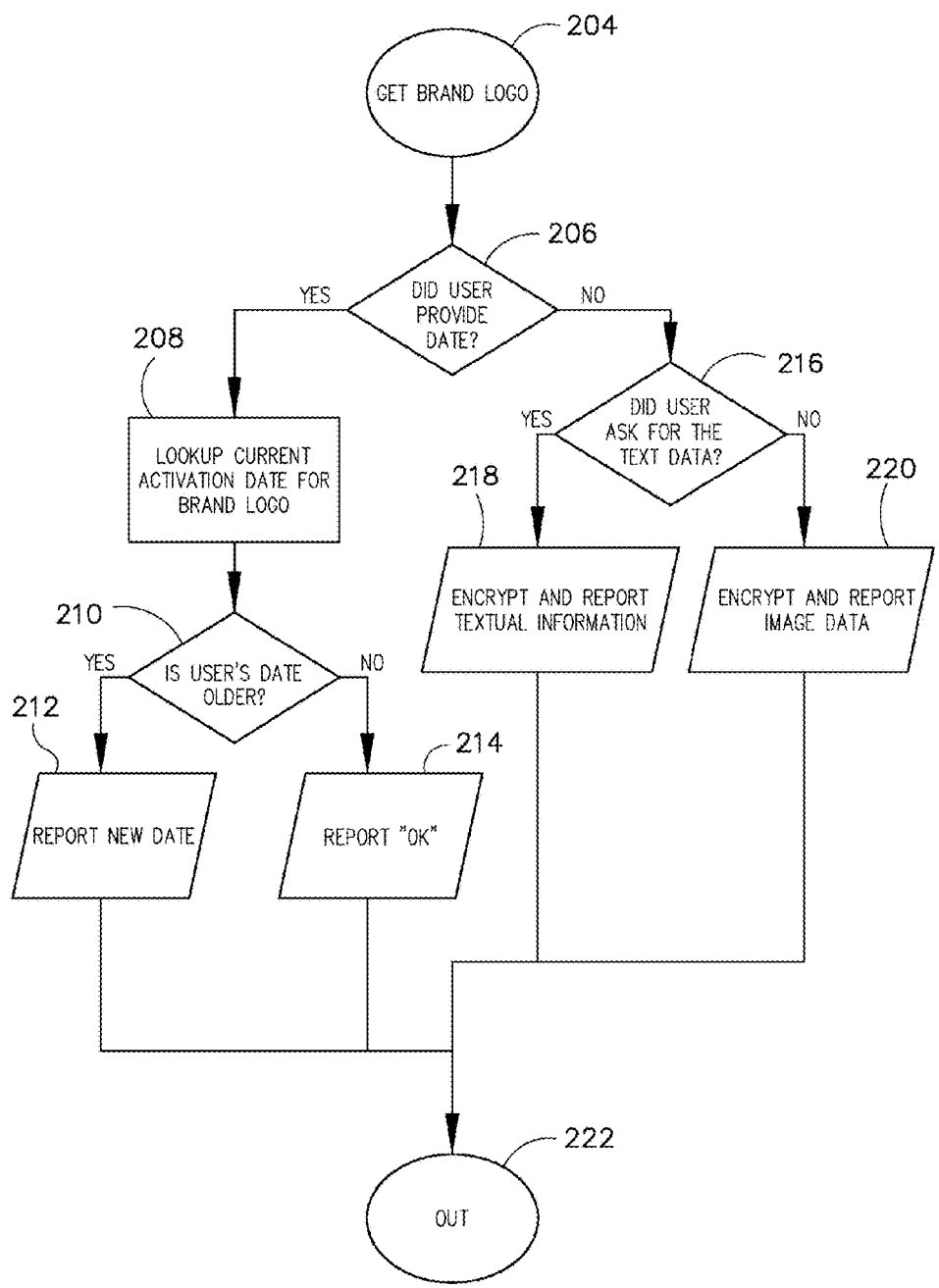

Referring now to FIG. 14, steps 204-222 illustrate the steps involved in determining whether to maintain a default brand logo in logo pane 74 (FIG. 3A), or, in the alternative, whether to download a different brand logo. While a default brand and/or company logo is associated with client system 14 initially, the default can be changed. For example, a user of Internet 16 can be informed of the existence of PGS-GM-CL/I-SN information distribution system 10 by a third-party vendor who also maintains a website, and refers that Internet user to website server 18 of main server system 12. The referral mechanism, a hyperlink and/or the like to website server 18, appends the identification of the referring vendor to the HTTP reference (the ID herein referred to as the "cobrand ID"). Website server 18 is configured to recognize and respond to such appended data (the cobrand ID) by putting a "cookie" (i.e., a file used by Internet browser programs) on such Internet users and members' computer system that contains the cobrand ID. Then, if such potential user of PGS-GM-CL/I-SN information distribution system 10 decides to download and install the client software, the client installation software will search for the "cookie." If it finds the "cookie", and certain other qualifying criteria are satisfied, then the cobrand ID are passed to main server system 12 upon installation with a request to download the text and/or image data of the other (non-default) brand logo.

Some client systems 14 are deployed with both a default brand logo, and an alternate brand logo (including text/images), in alternative embodiments. The following steps apply when client application software 28 determines that it should display an alternate brand logo. In step 204, client system 14 requests a brand logo (non-default). The process proceeds to step 206. In step 206, database server 24 determines whether client system 14 provided a date along with the request for the alternate brand logo. If so, then client system 14 already has the text/images corresponding to the brand logo and just needs to determine whether to turn the requested brand logo "on" at client system 14.

Thus, if the answer to step 206 is "YES", then the method branches to step 208. In step 208, database server 24 conducts a look-up to determine an activation date for the subject brand logo. The method then proceeds to step 210. In step 210, database server 24 determines whether the client-provided date is "older" than the current activation date. If "YES", then the method branches to step 212, where the new activation date is reported out to client system 14. Client system 14 will therefore defer activation of the alternate, non-default brand logo until such new date. Otherwise, the method branches to step 214, where database server 24 reports an "ok" to client system 14. Client system 14 will then implement (i.e., display) the brand logo corresponding to the cobrand ID.

When the method branches to step 216, (a "NO" to step 206), database server 24 performs another test to determine whether client system 14 asked for text corresponding to the cobrand ID. If "YES", then the method branches to step 218, where the textual information is encrypted according to a server system encryption strategy, and reported out to client system 14. Otherwise, step 220 is performed, where image data corresponding to the cobrand ID is encrypted (according to a server system encryption strategy), and reported to client system 14. The method ends in step 222.

Figure 15:
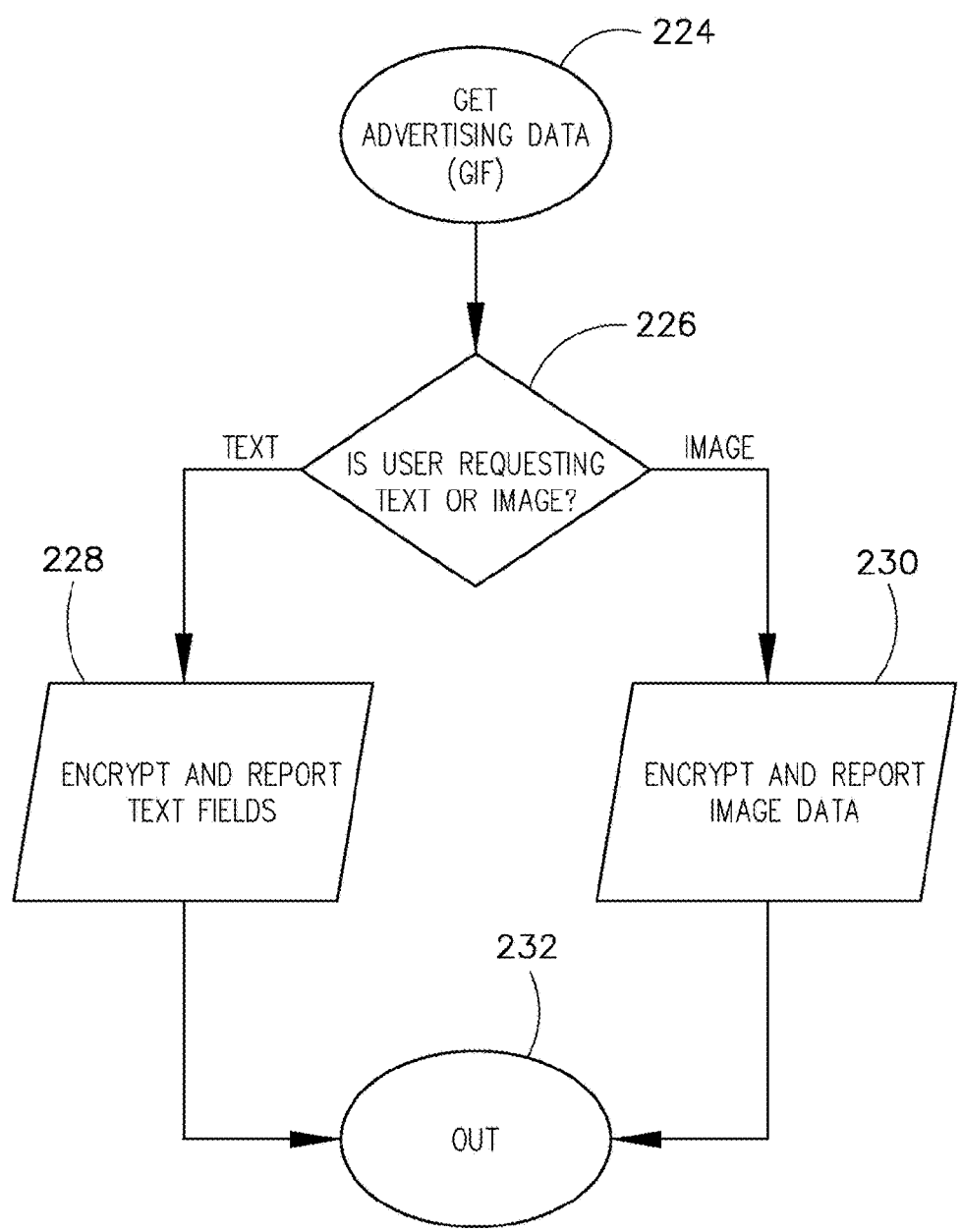
FIG. 15 is a simplified flowchart diagram view showing, in greater detail, the step of updating advertising data that is shown in block diagram form in FIG. 4, according to an exemplary embodiment.

FIG. 15 shows step 122 ("updating advertising data") of FIG. 4 in greater detail. In particular, steps 224-232 illustrate, in accordance with the present disclosure, that advertising text, and images are encrypted to thereby provide secure transmission to client system 14. It should be understood that for an existing user device, client system 14 can be executing a client script that includes a list containing needed advertising impressions. The process outlined in FIG. 15 would be executed for each advertising impression on the list. Step 224 marks the beginning of the advertising update method.

In step 226, main server system 12 determines whether the user, more particularly client system 14, is requesting "text" and/or "image" advertising data. If the answer is "text", then the method proceeds to step 228. In step 228, main server system 12, particularly database server 24, encrypts the text of the advertising data, and reports out the resulting encrypted advertising data. It should be understood this encryption occurs in accordance with a server system encryption strategy.

Otherwise, the method proceeds to step 230 when the advertising data requested is "image" data. In step 230, the advertising data ("image" data) is encrypted by main server system 12 according to a main server system encryption strategy, resulting in encrypted advertising image data. The encrypted ad image data is then reported out to client system 14. Step 232 defines the end of the advertising update process.

Figure 16:
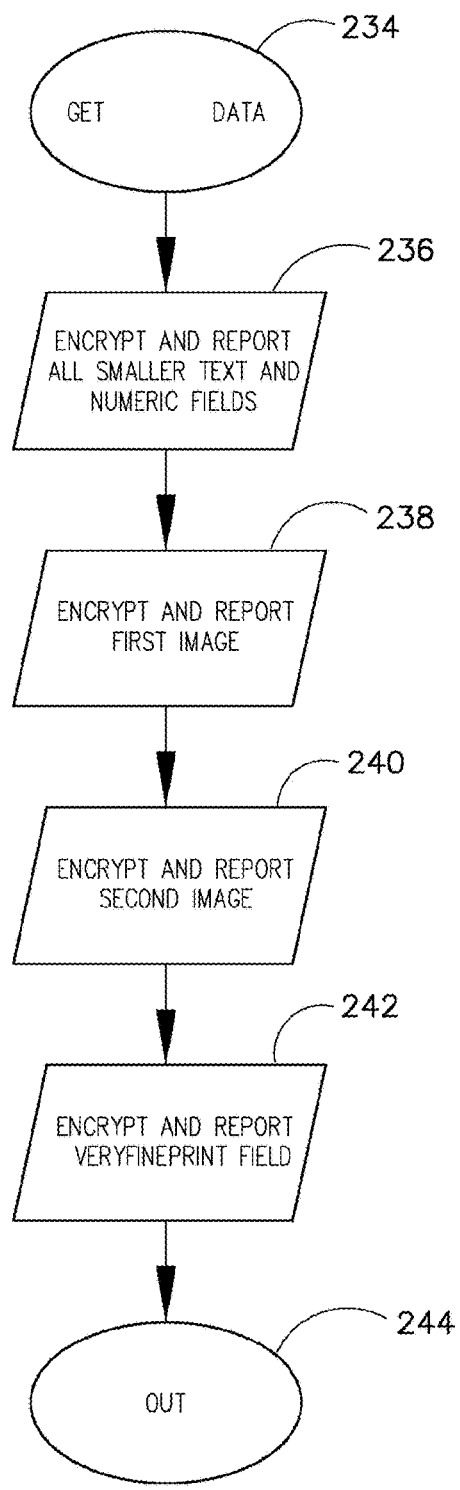
FIG. 16 is a simplified flowchart diagram view showing, in greater detail, the step of updating PGS-GM-CL/I-SN information data that is illustrated in block diagram form in FIG. 4, according to an exemplary embodiment.

FIG. 16 illustrates, in greater detail, step 124 in FIG. 4 ("updating PGS-GM-CL/I-SN information data"). It should be understood that for an existing user device, client system 14 can be executing a client script that includes a list containing needed PGS-GM-CL/I-SN information data. The process outlined in FIG. 16 would be executed for each PGS-GM-CL/I-SN information on the list.

Steps 234-244 illustrate that PGS-GM-CL/I-SN information text and image data are encrypted in accordance with a server system encryption strategy prior to transmission to client system 14, resulting in encrypted PGS-GM-CL/I-SN information data. It bears emphasizing that the steps 234-244 in FIG. 16, occur at main server system 12. Since the PGS-GM-CL/I-SN information data is encrypted, even if intercepted, the actual PGS-GM-CL/I-SN information cannot be easily recovered and reprinted. This reduces the occurrence of fraud.

In step 234, client system 14 issues a request to get a particular PGS-GM-CL/I-SN information. In step 236, database server 24 encrypts and reports (to client system 14) all smaller text and numeric fields. In steps 238 and 240, database server 24 encrypts and reports, respectively, first and second images associated with the requested PGS-GM-CL/I-SN information. In step 242, the very fine print portions of the requested e-PGS-GM-CL/I-SN information and/or e-coupon in encrypted and reported out to client system 14. Step 244 is an exit step.

Figure 17:
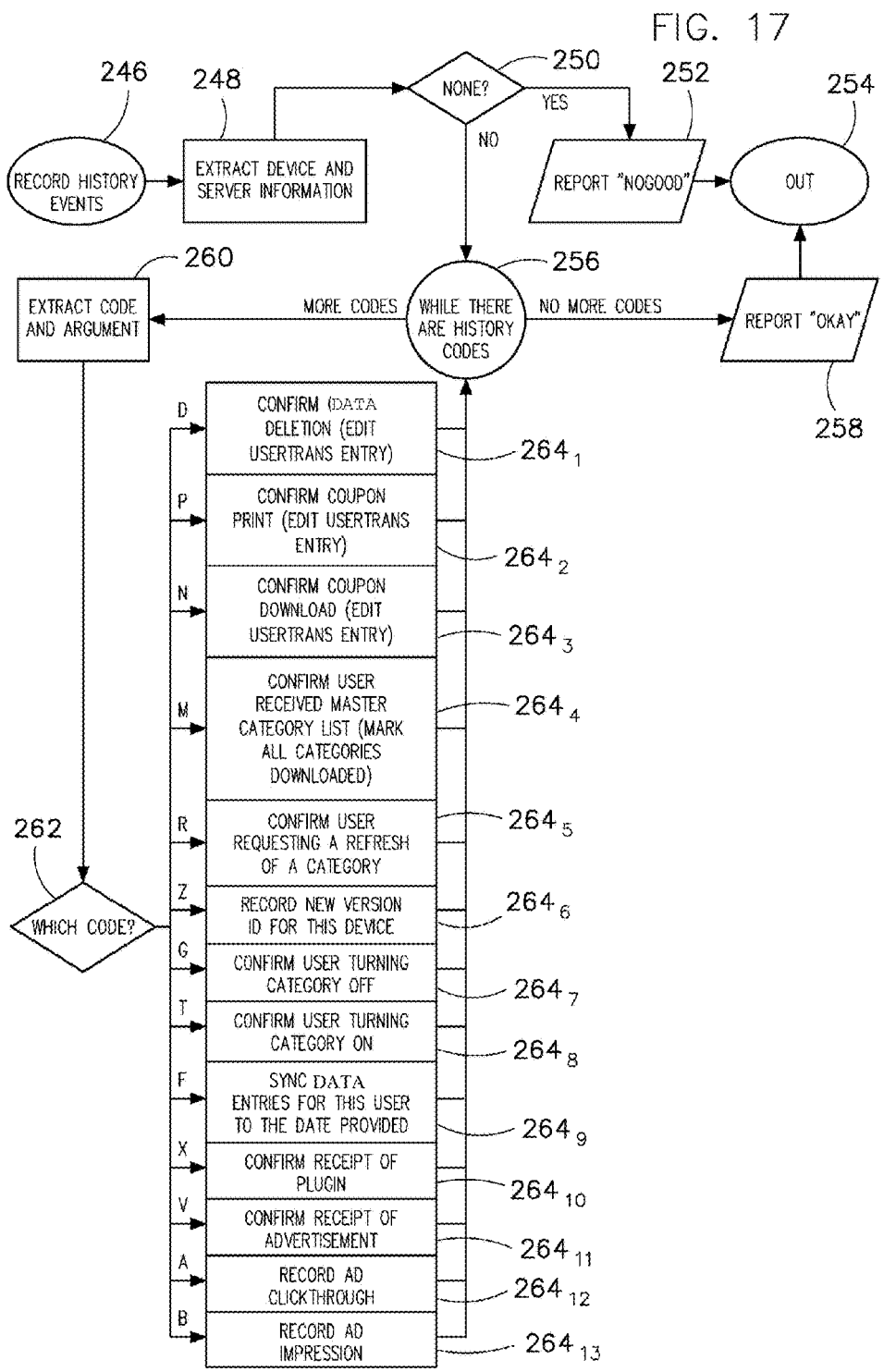
FIG. 17 is a simplified flowchart diagram view showing, in greater detail, the step of updating the main server system with a user history file that is shown in block diagram form in FIG. 4, according to an exemplary embodiment.

FIG. 17 shows, in greater detail, step 116 of FIG. 4 ("transmitting to the server system user history information"). Steps 246-264 occur principally on main server system 12, more particularly, between handler 22 and database server(s) 24. Prior to step 246, client system 14 sends a message to database server 24 containing the user history data 34. Step 246 marks the beginning of the process used by main server system 12 in recording the events contained in the user history data 34.

In step 248, the user and server information is extracted from the user history data 34. This information is used in updating the user transaction records associated with the identified user of PGS-GM-CL/I-SN information distribution system 10. The information developed in this process is also used to generate a client script that are described in further detail. In step 250, a test is made to determine whether there is any user and server information in the user history file. If the answer to this inquiry is "NONE", then flow of the process proceeds to step 252 where an indicator "NO GOOD" is reported out. Flow of the process then continues to step 254 where the process exits. On the other hand, if user and server information is successfully extracted from the user history file, flow of the process continues at step 256. In step 256, a "WHILE DO" process structure is established. Method steps 256, 260, 262, and 264 are continuously repeated while there are new history codes remaining to be read-out and extracted from the user history data 34.

In step 260, the next history code is extracted along with any arguments pertaining thereto. Flow of the process then proceeds to step 262, and 264 where the extracted user history codes are decoded. For example, a user history code designated "F" indicates that PGS-GM-CL/I-SN information entries should be synchronized, for this user to the date so provided as the argument (i.e., to the so-called "sync date"). This is shown in block 2649. As another example, a user history code "B", specifies that an advertising impression described in the argument should be recorded in a user transaction record. This is shown in block 26413. The ad impression, when recorded, can be used thereafter to prepare reports for the sponsor of the advertising impression. Other user history codes involve modification of a user transaction entry. For example, the code "N" indicates a positive confirmation by client system 14 that certain PGS-GM-CL/I-SN information were downloaded successfully. Accordingly, the user transaction entry should be edited to so indicate. In this way, positive feedback is provided as to what PGS-GM-CL/I-SN information have been safely received at the remote client system 14. FIG. 17 specifically identifies thirteen codes, and corresponding responses, respectively designated 264.sub.1-264.sub.13.

Figure 18:
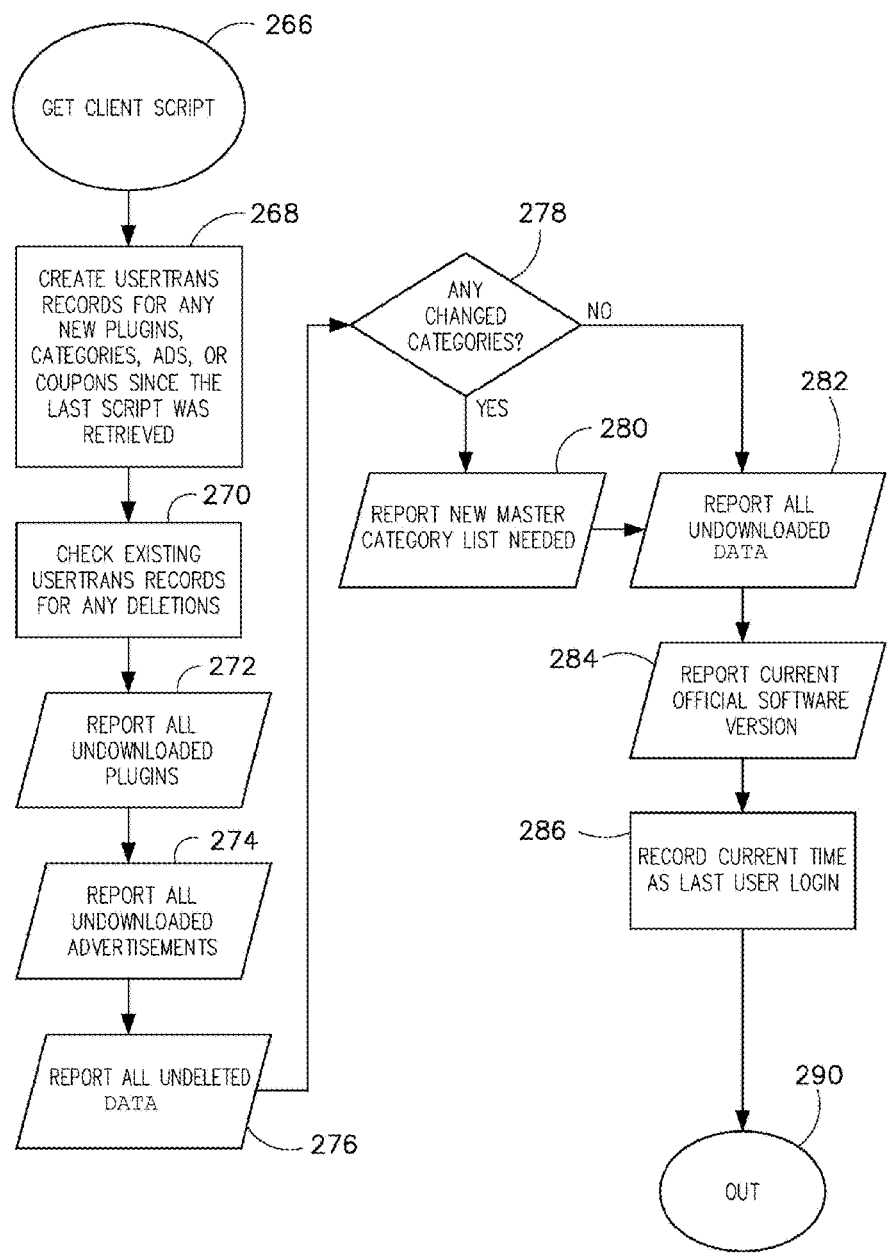
FIG. 18 is a simplified flowchart diagram view showing the steps involved in obtaining a client script, according to an exemplary embodiment.

When the last remaining history code has been extracted and decoded, the "WHILE DO" loop at step 256 fails, and flow of the process proceeds to step 258. In step 258, database server 24 reports an "Okay" message to handler 22. Flow of the process then proceeds to an exit step, designated step 254. Referring now to FIG. 18, after the user history codes from user history data 34 have been extracted and decoded, a "client script" is built by client system 14 based on information (e.g., lists) from handler 22 in cooperation with database server 24. The client script provides instructions for main server system 12 to execute. In step 266, client system 14 issues a request to handler 22 to obtain the "user" and/or "client" script. The client script is then returned to client system 14. Step 268 show the execution of the client script by client system 14, which issues the commands shown in the steps 268-290. In step 268, client system 14 issues commands via handler 22 to database server 24 to create user transaction records for any new plugins, main PGS-GM-CL/I-SN information categories, advertising data, and/or PGS-GM-CL/I-SN information data received by client system 14 since the last client script was retrieved. In step 270, client system 14 issues commands via handler 22 to database server 24 to check existing user transaction records for any deletions. Any deletions are processed whereby the affected user transaction record are modified to indicate that the client PGS-GM-CL/I-SN information has been deleted. In step 272, client system 14, in execution of the client script, issues a command via handler 22 to database server 24 to report all undownloaded plugins. Database server 24, through handler 22, returns a message containing a listing of all undownloaded plugins. This list is processed by client system 14 after the client script has been completed. In step 274, client system 14, in execution of the client script, issues a command via handler 22 to database server 24 to report all undownloaded advertising impressions. Database server 24 returns a list of all undownloaded ad impressions. In step 276, client system 14, in execution of the client script, issues a command via handler 22 to database server 24 to report all undeleted PGS-GM-CL/I-SN information. In step 278, client system 14, in execution of the client script, issues a command via handler 22 to database server 24 to determine whether any of the main PGS-GM-CL/I-SN information categories have been changed. If the answer to this inquiry is "YES", then flow of the process continues at step 280, wherein the database server 24 reports to client system 14 that a new master category list is needed. Flow then proceeds to step 282.

If the answer to the inquiry in step 278 is "NO", then flow of the process proceeds to step 282. In step 282, client system 14, in execution of the client script, issues a command via handler 22 to database server 24 to report all undownloaded PGS-GM-CL/I-SN information. Database server 24 returns a listing of all undownloaded PGS-GM-CL/I-SN information. In step 284, client system 14, in execution of the client script, issues a command via handler 22 to database server 24 to report the current official software version. Database server 24 returns the latest version number. In step 286, database server 24 is requested to record the current time as the last user login. Flow of the process then continues to step 290, which marks the end of the client script execution.

Figure 19:
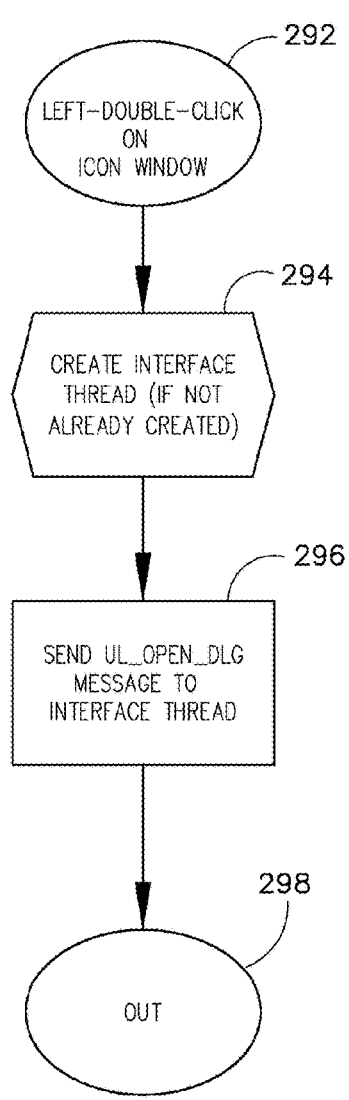
FIGS. 19-20 are simplified flowchart diagram views showing alternate responses taken by client system 14 in response to double-clicking taskbar icon 102, according to an exemplary embodiment.

Referring now to FIGS. 16 and 17, upon initial execution of client application software 28, taskbar icon 102 is created, as illustrated in FIG. 3B. Referring particularly now to FIG. 19, steps 292-298 illustrate the steps that client application software 28 performs when the taskbar icon 102 is left double clicked. Step 292 marks the beginning of the process that initiates the display of user interface 62. Step 292 is performed when it is detected that the user has left-double-clicked on taskbar icon 102. In step 294, client application software 28 creates an interface thread, unless user interface 62 has already been created by a preexisting interface thread. In step 296, a user interface open dialog message is sent to interface thread by client application software 28. The result of the execution of steps 294, and 296 results in the display shown in FIG. 3A. In step 298, the process that creates user interface 62 via an interface thread exits.

Figure 20:
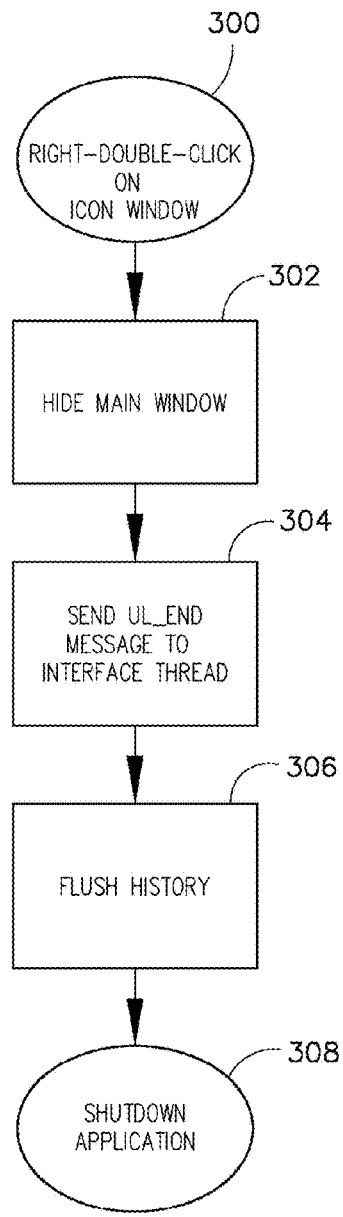

Referring now particularly to FIG. 20, in step 300, main client application software 28 determines (via the OS, for example) when taskbar icon 102 has been right double clicked and enters the process of steps 300-308.

In step 302, the "window" in which main user interface 62 would generally be displayed is hidden from the user (i.e., disappears from the display as viewed on display device 40 of client system 14). In step 304, client application software 28 sends a user interface-end message to the interface thread portion of client application software 28. In step 306, client application software 28 flushes the history (i.e., any unsaved user history actions and/or events are encrypted and written to the user history file). In step 308, client application software 28 shuts down. This removes client application software 28 from client system 14.

Figure 21:
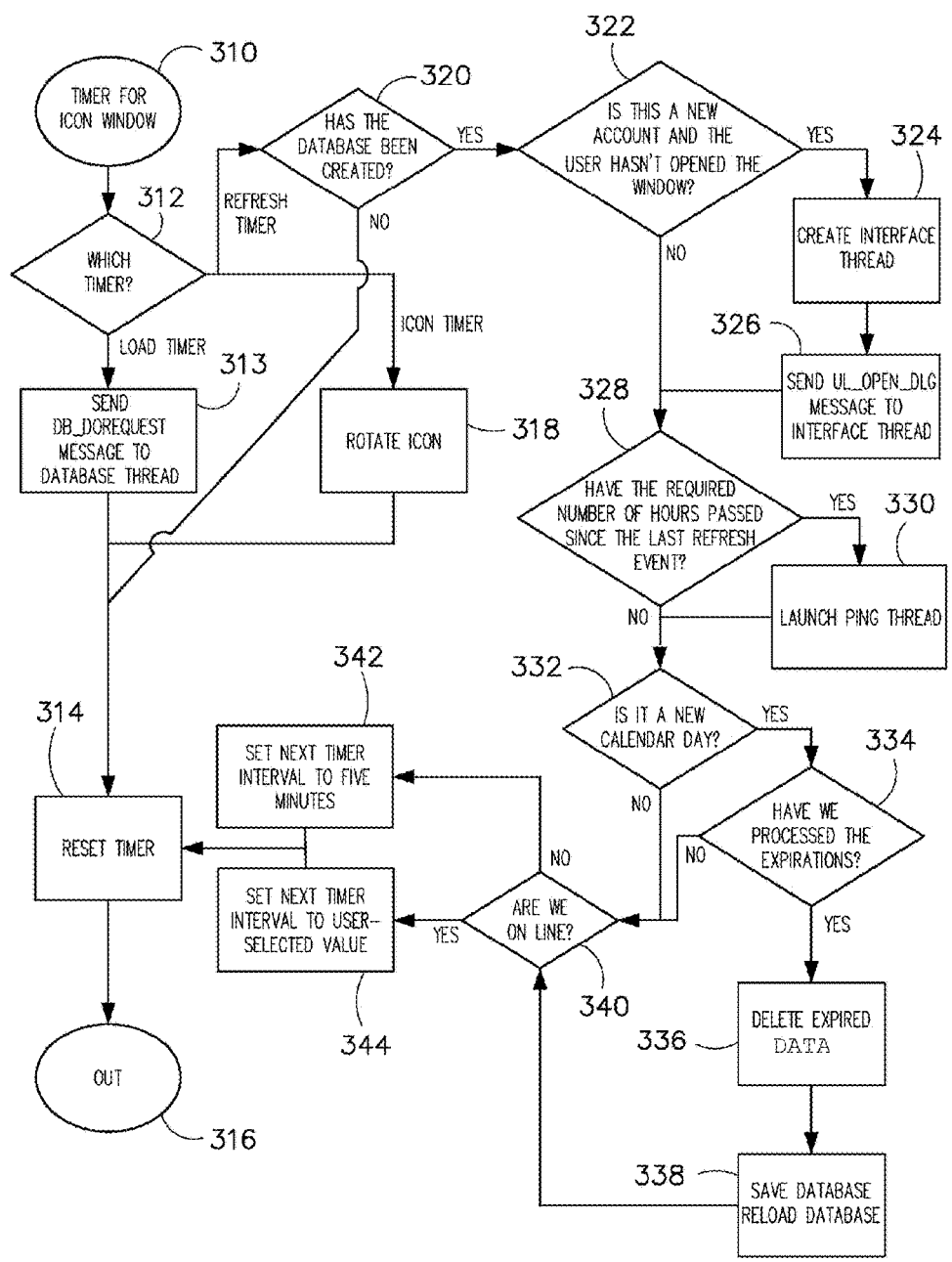
FIG. 21 is a simplified flowchart diagram view showing timing mechanisms for automatically updating PGS-GM-CL/I-SN information and/or data without user intervention, according to an exemplary embodiment.

FIG. 21 illustrates a portion of the timing loops executing on main client application software 28. The flow chart illustrates the operation of three timers: the "load" timer, the "icon" timer, and the "refresh" timer. The steps in FIG. 21 can hereafter be referred to as the timing loop thread. Step 310 marks the beginning of the processing for evaluating the various timing loops illustrated in FIG. 21. In step 312, a decision is made by client application software 28 as to which timer is being evaluated. If the "load" timer is being evaluated in the timing loop thread illustrated in FIG. 21, then flow of the process continues at step 313. In step 313, the timing loop thread sends a message to the database thread. In particular, the DB_DOREQUEST is the event the database thread uses to perform the delayed downloading. Client system 14 feeds a DB_DOREQUEST event to the database thread while there are any PGS-GM-CL/I-SN information, plugins, and/or ad impressions remaining to download. In response to this event, the database thread pops the top download request off the download queue and retrieves that item. Flow of the process then proceeds to step 314, wherein the "load" timer is reset. Flow of the process then proceeds to step 316, where the timing loop thread exits. On the other hand, if the timer being evaluated is the "icon" timer, as determined in step 312, then flow of the process proceeds to step 318. In step 318, client application software 28 rotates taskbar icon 102. This is done only when there are new PGS-GM-CL/I-SN information and/or offers available to the user on PGS-GM-CL/I-SN information distribution system 10. That is, this is the loop that causes the taskbar icon 102 to change display states so as to present a "flashing" effect to alert the user to the availability of new PGS-GM-CL/I-SN information and/or offers. The flow of the process then proceeds through steps 314-316, wherein the "icon" timer is reset and the timing loop thread is exited.

Finally, if the timer being evaluated in the timing loop thread is the "refresh" timer, as determined in step 312, then flow of the process proceeds to step 320. In step 320, the timing loop determines whether the PGS-GM-CL/I-SN information database has been created. If the answer is "NO" then the process proceeds through steps 314-316, where the refresh timer is reset, and the timing loop is exited. On the other hand, if the answer to the inquiry in step 320 is "YES", then flow of the process proceeds to step 322. In step 322, if a user has not opened the user interface window containing user interface 62 (FIG. 3A), and, the account is a new account, then flow of the process proceeds to step 324, wherein the "create interface" thread is invoked to create user interface 62 (best shown in FIG. 3A). The process then proceeds to step 326, wherein a user interface open dialog message is sent to the interface thread, which displays user interface 62 in a window. Flow then proceeds to step 328. If the answer to the inquiry in step 322 is "NO", then flow of the process also proceeds to step 328.

In step 328, the timing loop determines whether the predetermined, number of hours has passed since the last refresh event. In accordance with the disclosure, the user can select, as described above, from a number of different refresh intervals (e.g., one-hour, two-hours, etc.). The value of this parameter is what is being tested in step 328. If the answer to this inquiry is "YES", then the process branches to step 330, where the echo-request/ping-the-net thread is invoked (FIG. 9). If the answer to step 328 is "NO", then the process branches to step 332. In step 332, the timing loop thread determines whether the present day is a new calendar day. This parameter needs to be tested because some PGS-GM-CL/I-SN information can now be "expired" that were not "expired" on the prior calendar day. If the answer to this inquiry is "YES", then the process branches to step 334. In step 334, the timing loop thread determines whether client application software 28 has processed the PGS-GM-CL/I-SN information expirations arising because of the new calendar day. If the answer to this inquiry is "YES", then the process branches to steps 336, and 338, where expired PGS-GM-CL/I-SN information are deleted from the database (memory), the database is saved (file), and the database is thereafter reloaded into the memory of the client application software 28. The method proceeds to step 340.

If the answer to the inquiry in step 332 and/or step 334 is "NO" then the method branches to step 340. In step 340, the timing loop thread determines whether client system 14 is "online." It can make this determination based on the response from the "ping" thread, invoked in step 330. If the answer to this inquiry is "NO", then the process branches to step 342. In step 342, the next timer interval is set to five minutes (i.e., try again in five minutes to see if the user is "online"). According to an exemplary embodiment, client application software 28 will not force the user device to connect to Internet 16 to refresh client system 14, but will simply wait a preselected time (e.g., five minutes) and check again to see if the user is connected.

Otherwise, if the answer to step 340 is "YES", then the process branches to step 344, in which the next timer interval is set to the user-selected value (i.e., the one hour, two hour, etc. that the user chooses as the selected refresh interval). Flow then proceeds from both steps 342 and 344 to step 314 where the "refresh" timer is reset. The process exits in step 316.

In FIG. 22, steps 346-350 illustrate the response of client application software 28 when a user "clicks" and/or otherwise selects logo pane 74 of user interface 62 (best shown in FIG. 3A). Step 346 marks the beginning of the routine. Step 346 is entered when client application software 28 (via the OS) detects that the user has "clicked" on and/or otherwise selected a portion of logo pane 74.

In step 348, client application software 28 invokes an Internet browser registered with the operating system of client system 14 as the default browser and passes thereto a URL. The Internet browser then connects to a website server resource corresponding to the specified URL. This "click" action, therefore, takes the user to the website of the company displayed in logo pane 74. Step 350 marks the end of this routine.

FIG. 23 shows the response of client application software 28 when a user "clicks" on and/or otherwise selects a portion of advertising pane 72 (best shown in FIG. 3A). Step 352 marks the beginning of the routine. In step 354, client application software 28 creates a click-through history record indicative of the fact that the user has "clicked" and/or otherwise selected the advertiser displayed in advertising pane 72. This are included in user history data 34, which will thereafter be encrypted and transmitted to main server system 12 for processing.

In step 356, the client application software 28 launches an Internet browser registered with the operating system of client system 14, and passes thereto a URL corresponding to the advertiser displayed in advertising pane 72. When the Internet browser executes, it connects to a website server resource defined by the URL. In-effect, the foregoing actions take the user to the advertisers website specified in the URL. Step 358 marks the end of this routine.

FIG. 24 illustrates a response taken by client application software 28 when a user "clicks" on and/or otherwise selects an item appearing in PGS-GM-CL/I-SN information subcategory list 68 (best shown in FIG. 3A). Step 360 marks the beginning of the process. Step 360 is entered when client application software 28 (via the OS) determines that an item in PGS-GM-CL/I-SN information subcategory list 68 has been "clicked" on. In step 362, client application software 28 determines whether the selection was a "click" and/or a "double-click." Depending on which of these events occurred, client application software 28 will take alternative courses of action. If the action is a single-click, then the method branches to step 364.

In step 364, the local PGS-GM-CL/I-SN information database is locked by client application software 28. The process proceeds to step 366. In step 366, the selected subcategory item is retrieved from the local database on client system 14. In step 368, the contents of PGS-GM-CL/I-SN information list 70 is reset by client application software 28 according to the contents of the new subcategory. For example, if the new subcategory pertains to PGS-GM-CL/I-SN information, then the new PGS-GM-CL/I-SN information associated with the new selected subcategory are displayed in PGS-GM-CL/I-SN information list 70 (best shown in FIG. 3A). In step 370, client application software 28 determines and/or otherwise selects an advertising impression to be displayed in advertising pane 72 in accordance with a predetermined advertising impression selection strategy. In the illustrated embodiment, the selection criteria includes the identity of the selected PGS-GM-CL/I-SN information subcategory. In step 372, a test is performed by client application software 28 to determine whether the newly selected advertising impression is different from the advertising impression currently being displayed. If the answer is "YES", then the process branches to step 374, where the new advertising impression is displayed in advertising pane 72, and an advertising impression history record is created for inclusion in the user history data 34. The method proceeds to step 376, which exits the thread shown in FIG. 24.

If the answer to step 372 is "NO", however, then the process branches to step 376, which is an exit step. If the action evaluated in step 362 is determined to be a "double click", then the process branches to step 378. "Double clicking" PGS-GM-CL/I-SN information subcategory is a user request to refresh the contents of that subcategory. In step 378, client application software 28 creates a refresh history event for that subcategory. In step 380, client application software 28 sends to the database thread a request to flush the current history. The contents of that subcategory are then downloaded (available on display device 40) as if they were new. In step 382, a message is sent to the database thread to do idle processing.

FIG. 25 illustrates the response by client application software 28 when a user "clicks" on an item from PGS-GM-CL/I-SN information list 70. The process begins in step 384. Step 384 is entered when client application software 28 detects that an item in the PGS-GM-CL/I-SN information list 70 (VIA the OS) has been "clicked" on.

In step 386, client application software 28 locks the local PGS-GM-CL/I-SN information database for the interface thread. In step 388, client application software 28 obtains from the local PGS-GM-CL/I-SN information database the item corresponding to that selected in PGS-GM-CL/I-SN information list 70. In step 390, client application software 28 determines whether the item in PGS-GM-CL/I-SN information list 70 that was clicked on was actually "selected." If the answer to this inquiry is "NO", then the method branches to step 392, which is an exit.

If the answer to step 390 is "YES", then the process branches to step 394. In step 394, client application software 28 sets the shown PGS-GM-CL/I-SN information to correspond to the item selected in PGS-GM-CL/I-SN information list 70. The process then proceeds to step 396. In step 396, client application software 28, by way of the interface thread, displays the PGS-GM-CL/I-SN information in PGS-GM-CL/I-SN information display area 76. The method then proceeds to step 392, which is an exit step.

Figure 26:
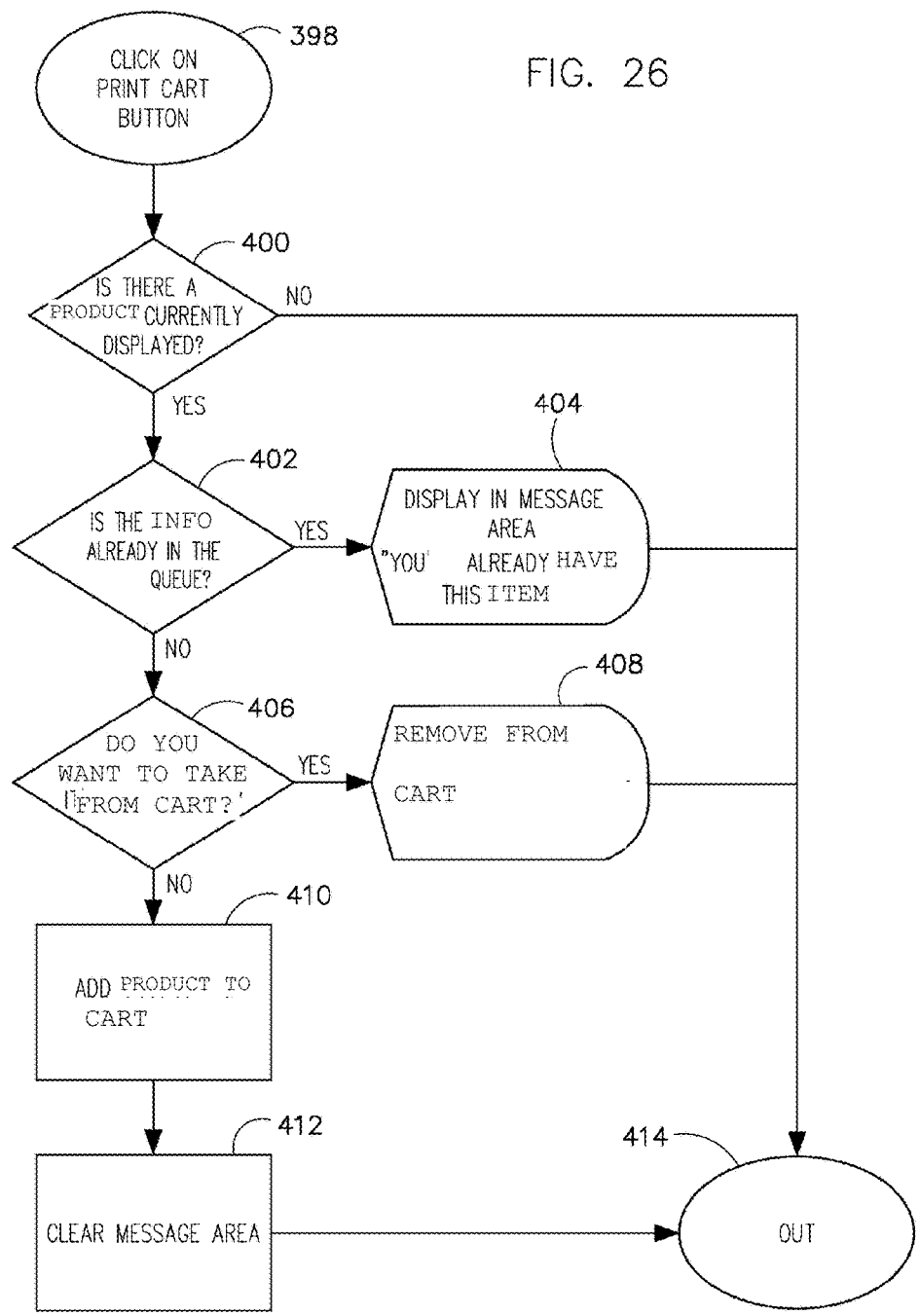
FIG. 26 is a simplified flowchart diagram view showing the steps executed by the client system when PGS-GM-CL/I-SN product, good and/or service is selected and added to a cart, according to an exemplary embodiment.

FIG. 26 illustrates the process carried out by client application software 28 when the "Add to Cart" button 78 is "clicked" on and/or otherwise selected by the user. Step 398 is invoked when client application software 28 (VIA the OS) determines that the Add to Cart button has been "clicked" on. The process then proceeds to step 400. In step 400, client application software 28 performs a test to determine whether there is PGS-GM-CL/I-SN product or service information currently displayed in PGS-GM-CL/I-SN information display area 76. If the answer to step 400 is "NO", then the method branches to step 414, which is an exit step. If the answer to step 400 is "YES", then the method branches to step 402. In step 402, client application software 28 determines whether the PGS-GM-CL/I-SN product or service information currently being displayed in PGS-GM-CL/I-SN product or service information display area 76 is already in the cart. If the answer to this inquiry is "YES", then the method branches to step 404. In step 404, client application software 28 causes a predetermined message to be displayed in message display area 94 advising, for example, the user that the PGS-GM-CL/I-SN product or service information is already in queue of the cart. This insures that PGS-GM-CL/I-SN product or service information is not added to the shopping cart more times than the user desires. If the user in-fact wishes to make multiple entries of a product or service into the shopping cart, the user can alternatively click on the "add to cart" button to add more than one product or service to the shopping cart. The process then proceeds to step 414, which is an exit step.

If the answer to step 402 is "NO", then the method branches to step 406. In step 406, client application software 28 determines whether the proposed adding to the cart of the product or service corresponding to the PGS-GM-CL/I-SN information displayed is confirmed as an error by the user. If the answer to this step is "YES", then the method branches to step 408. In step 408, an appropriate message is displayed to the user in message display area 94, advising that the selected product or service has been removed from the cart. The method then proceeds to step 414, which is an exit step.

If the answer to step 406 is "NO", then the method branches to step 410. In step 410, the PGS-GM-CL/I-SN information currently being displayed in PGS-GM-CL/I-SN information display area 76 is used to add a selected product or service to the cart. The method proceeds to step 412, wherein message display area 94 is cleared, thereby clearing any pre-existing message displayed therein. The process then proceeds to step 414, which is an exit step. For some PGS-GM-CL/I-SN information displayed, it is of value to limit the number of times a specific user can access the PGS-GM-CL/I-SN information. For example, a particular vendor can wish to limit the number of PGS-GM-CL/I-SN information available to a user to a specific amount. Similarly, for clickable links from advertisers (i.e., clickable advertisements), it is also of value to limit the number of times a specific user can click on the advertisement. In response to a click on a clickable advertisement, a user is typically transferred to another website that relates to the information present in the clickable advertisement. By being able to limit the number of times a specific user can click on the advertisement, the advertiser can be more certain that the click on the advertisement was a true access and/or intended click by a particular user.

Limiting the clicking of clickable advertisements is particularly useful to avoid click fraud. Click fraud can occur, for example, in pay per click online advertising when a person, automated script, and/or computer program imitates a legitimate user of a web browser clicking on an ad for the purpose of generating a charge per click without having actual interest in the target of the ads link. Pay per click advertising is an arrangement in which webmasters (operators of web sites), acting as publishers, display clickable advertisements from advertisers, in exchange for a charge per click. By limiting the number of times a particular client system 14 can click on a clickable advertisement to a set amount, e.g., three, the ability to commit click fraud is significantly reduced. Moreover, if an advertiser can control the number of clicks to a clickable advertisement from a particular client system 14, the advertiser is more likely to increase the amount it will pay for each unique click of the clickable advertisement. To promote control over the clicking on of clickable advertisements, each clickable advertisement can include an access limit, which defines the number of times any client system can click on the clickable advertisement. For example, if the access limit for a clickable advertisement is three, then client application software 28 of a particular client system 14 would only be able to click on that clickable advertisement three times. In an exemplary embodiment, client application software 28 can be configured to allow access to the advertisement but not increment the count for revenue generation purposes (e.g., search engine revenue, etc.).

The system for displaying an advertisement from an advertisement database on a client computer on a network can include processing circuit 502 configured to receive a display request for an advertisement and to provide access to display the advertisement. Processing circuit 502 can be further configured to determine a revenue counting display limit and a number of times the advertisement has been displayed. Processing circuit 502 can also be configured to increment a revenue account and/or revenue counter based on a comparison of the number of times the advertisement has been displayed to the revenue counting display limit.

The system for displaying an advertisement from an advertisement database on a client computer on a network can also not increment the revenue account if the number of times the advertisement has been displayed exceeds the revenue counting display limit. The system for displaying an advertisement from an advertisement database on a client computer on a network can also increment the revenue account if the number of times the advertisement has been displayed does not exceed the revenue counting display limit.

The system for displaying an advertisement from an advertisement database on a client computer on a network can also include processing circuit 502 and/or components thereof being configured to be partially operated on main server system 12. Processing circuit 502 and/or components thereof can also be configured to be partially operated on client system 14 and/or client computing device. The system for displaying an advertisement from an advertisement database on a client computer on a network can also include the revenue counting display limit being stored on main server system 12.

The access limit for each clickable advertisement could be stored, for example, in database server 24, and/or in a secure area of client system 14. In addition, for each clickable advertisement, a counter can be maintained in the database server 24 for each DeviceID data 30. The counter counts the number of times a particular DeviceID data 30 has clicked on the associated clickable advertisement.

The method for controlling access to PGS-GM-CL/I-SN information can include assigning an identifier (e.g., DeviceID data 30) to a client computer and receiving a request from client application software 28 operating on the client computer to view PGS-GM-CL/I-SN information image data for the PGS-GM-CL/I-SN information. The method can also include displaying the PGS-GM-CL/I-SN information image data on the client computer and receiving a request to access the PGS-GM-CL/I-SN information from client application software 28. The request can include the identifier assigned to the client computer. The method can also include determining an access limit for the PGS-GM-CL/I-SN information. The access limit being a number of times that the client computer is permitted to access the PGS-GM-CL/I-SN information. The method can also include determining the number of times the PGS-GM-CL/I-SN information has been accessed based on the identifier and controlling access to the PGS-GM-CL/I-SN information based on the number of times the PGS-GM-CL/I-SN information has been accessed and the access limit.

The method can further include transmitting the PGS-GM-CL/I-SN information to the client computer based on the controlling step. The method can also include transferring the user to a website corresponding to the PGS-GM-CL/I-SN information in response to a request for more information from the client computer. The method can also include incrementing a counter associated with the PGS-GM-CL/I-SN information in response to the request wherein the counter corresponding to the number of times the PGS-GM-CL/I-SN information has been accessed. The method can also include transmitting the PGS-GM-CL/I-SN information access report to a remote device. The method can further include that the PGS-GM-CL/I-SN information image data comprises a thumbnail image and an overlay information.

It should be noted that access can include transmitting data to a print queue, transmitting data based on clicking on and/or any other method of activating a hyper link, initiating a search (e.g., an internet search engine, an intranet search engine, a local computing device search, and/or any other search known to a person skilled in the art), displaying data, receiving data, transmitting data and/or any combination thereof. Access as used herein can refer to any of a number of ways that client system 14 can be configured to provide access to the user, in various alternative embodiments. It should also be noted that access limit can include number of times client system 14 can print an advertisement, number of times client system 14 can send an advertisement to a print queue, number of times client system 14 can be allowed to display an advertisement, the number of times client system 14 can be allowed to click thorough a clickable link to display an advertisement, the number of times client system 14 can be allowed to download an advertisement from the advertisement server, the number of times a user can click on a link which is a result of a search performed on an internet search engine, and/or any other way client system 14 can be allowed to access an advertisement. The access limit can be limits on other user accesses to advertisement. Accordingly, providing access, limiting access, and/or requesting access as used herein can refer to steps relating to any of the above mentioned types of access.

FIGS. 27A and 27B are flow diagrams of processes for controlling the number of clicks to a clickable advertisement. As shown in FIG. 27A, in step 420, a request is received from client application software 28 of a particular client system 14 to view clickable advertisements. The request preferably includes DeviceID data 30, which is a unique identifier assigned to the client system 14 that uniquely identifies client system 14 making the request. The request can be made in response to linking and/or accessing a particular website and/or by submitting the request through user interface 62.

In step 422, an access limit is identified for each of the clickable advertisements that are responsive to the received request. Based on the received request, main server system 12 can identify an appropriate handler 22 and database server 24 for servicing the request. Handler 22 accesses database server 24, which can includes a list of available clickable advertisements, to identify the clickable advertisements (including PGS-GM-CL/I-SN information) responsive to the request and to identify the access limits associated with those clickable advertisements.

In step 424, for each of the clickable advertisements responsive to the request, it is determined how many times each clickable advertisement has been clicked on by client application software 28 and/or client system 14 based on the associated DeviceID data 30. This information can be determined by checking the values of the counters held in database server 24 for each clickable advertisement corresponding to DeviceID data 30 provided in the request.

In step 426, clickable advertisements are made available to the requesting client system 14 that have been accessed (i.e., clicked on) by client system 14 fewer times than the access limit. To determine if a clickable advertisement should be made available, main server system 12 compares the identified access limit to the determined number of accesses set in the corresponding counter. If the access limit is greater than the determined number of accesses set in the corresponding counter, then the clickable advertisement is made available to the requesting client system 14. On the other hand, if the access limit is equal to (or less than) the determined number of accesses set in the corresponding counter, then the clickable advertisement is not made available to the requesting client system 14. The clickable advertisements made available to the client system 14 can be viewed, for example, in advertising pane 72 and/or logo pane 74. Each of the clickable advertisements made available to client system 14 can be accessed, i.e., clicked on, by the user at client system 14.

In step 428, in addition to making the clickable advertisement available to be clicked on by the user at client system 14, if the clickable advertisement is PGS-GM-CL/I-SN information, then the user is permitted to print PGS-GM-CL/I-SN information as well. To print PGS-GM-CL/I-SN information, the user can select the "Print Now" button 80, which prints the PGS-GM-CL/I-SN information currently being viewed on printer 46. In step 430, in response to the click of the clickable advertisement, the counter associated with that clickable advertisement and corresponding to DeviceID data 30 of client application software 28 and/or client system 14 is incremented. More specifically, client application software 28 can generate a signal to main server system 12 indicating that the clickable advertisement has been clicked on, and based on that signal the server increments the applicable counter in database server 24. The signal can include information identifying the clickable advertisement, as well as DeviceID data 30 of client system 14. Accordingly, each time a clickable advertisement is clicked on, the counter associated with the clickable advertisement is incremented, and once the count in the counter reaches the access limit, the user at that client system 14 is no longer permitted to click on that clickable advertisement. It should be noted that client system 14 can be a client computer.

The method for controlling access to advertisement in a network can include assigning an identifier to a client computer and receiving a request from client application software 28 operating on the client computer to access the advertisement. The request can include the identifier assigned to the client computer. The advertisement can have an access limit. The method can also include determining the number of times that the advertisement has been accessed by the client computer based on the identifier. The method can further include comparing the number of times the advertisement has been accessed to the access limit and providing the client computer with access to the advertisement based on the comparison. The method can also include sending to the client computer the advertisement if the access limit has not been exceeded. The method can further include transferring the user to a website corresponding to the advertisement if the access limit has not been exceeded. The method can further include refusing access for the client computer to the advertisement if the access limit has been met and/or exceeded. The method can also include sending to the client computer a message indicating that access has been refused. The method can also include incrementing the access counter based on receiving the request from the client application operating on the client computer to access the advertisement. The method can further include transmitting an advertisement access report to a remote server. The method can further include the identifier being assigned to the client computer by the client application. The method can also include that the identifier being assigned to the client computer is not one of a DeviceID data 30 and/or an internet protocol address. The method can also include encrypting the advertisement at a server to generate a first encrypted advertisement and further encrypting the first encrypted advertisement at the client computer to generate a second encrypted advertisement.

The system for monitoring access to an advertisement can include processing circuit configured to determine an advertisement access limit and the number of times the advertisement has been accessed, according to an exemplary embodiment. The system can further include processing circuit being configured to be partially operated on a server, according to an exemplary embodiment. The system can also include processing circuit being configured to be partially operated on a client computing device, according to an exemplary embodiment. The system can further include processing circuit being configured to receive a request to access an advertisement, according to an exemplary embodiment. The request can include an identifier assigned to the computing device, according to an exemplary embodiment. Processing circuit can determine the number of times that the advertisement has been accessed by the computing device based on the identifier, according to an exemplary embodiment. Processing circuit can generate a comparison based on an access counter module/circuit data and an access limit module/circuit data, according to an exemplary embodiment. Processing circuit can transmits an access control signal based on the comparison, according to an exemplary embodiment. The system can also include processing circuit determining that the access limit has not been exceeded based on the comparison and transmits the advertisement to the computing device, according to an exemplary embodiment. The system can further include the user being transferred to a website corresponding to the advertisement based on a request for more information, according to an exemplary embodiment. The system can also include processing circuit determining that the access limit has been exceeded and the advertisement is not sent to the computing device, according to an exemplary embodiment.

FIG. 27B illustrates a process similar to the one in FIG. 27A. Like the process of FIG. 27A, in step 432 of FIG. 27B, a request is received from the client application software 28 to view clickable advertisements, the request including DeviceID data 30 that uniquely identifies client system 14 making the request. However, instead of checking the access limit of responsive clickable advertisements, all clickable advertisements that are responsive to the request are made available to the requesting client system 14 in step 434. To determine which clickable advertisements are responsive, main server system 12 can identify an appropriate handler 22 and database server 24 for servicing the request. Handler 22 can access database server 24 to identify the clickable advertisements responsive to the request. The user at client system 14 can try to click on any of the clickable advertisement made available to client system 14. In step 436, in response to clicking on a selected clickable advertisement, a request is received by main server system 12 for access to that clickable advertisement. The request can include information identifying the selected clickable advertisement, as well as DeviceID data 30 of the requesting client system 14. In step 438, in response to the received request, an access limit is identified for the selected clickable advertisement. More particularly, main server system 12 can identify an appropriate handler 22 to access database server 24 and identify the access limits associated with the selected clickable advertisement. In step 440, it is determined how many times the selected clickable advertisement has been clicked on by client application software 28 and/or client system 14 based on the associated DeviceID data 30. This information can be determined by checking the values of the counter held in database server 24 for the selected clickable advertisement corresponding to DeviceID data 30 provided in the request.

In step 442, the user is permitted to click on and access the selected clickable advertisement if it is determined that the clickable advertisement has been accessed by client system 14 fewer times than the access limit. To determine if a clickable advertisement should be made available, main server system 12 compares the identified access limit to the determined number of accesses (i.e., clicks) set in the corresponding counter. If the access limit is greater than the determined number of accesses set in the corresponding counter, then the user is permitted to click on and access the clickable advertisement at the requesting client system 14. On the other hand, if the access limit is equal to (or less than) the determined number of accesses set in the corresponding counter, then the user is not permitted to click on and access the clickable advertisement at client system 14. If permitted to click on and access the clickable advertisement, and the clickable advertisement is PGS-GM-CL/I-SN information, then the user can print or add to a cart the PGS-GM-CL/I-SN information, for example, by selecting the "Print Now" button 80, which prints the PGS-GM-CL/I-SN information currently being viewed on printer 46.

In step 444, in response to the click of a clickable advertisement, the counter associated with that clickable advertisement and corresponding to DeviceID data 30 of client application software 28 and/or client system 14 is incremented. More specifically, client application software 28 can generate a signal to main server system 12 indicating that the accessed clickable advertisement has been clicked on, and based on that signal main server system 12 increments the applicable counter in database server 24. The signal can include information identifying the clickable advertisement, as well as DeviceID data 30 of client system 14. Accordingly, each time a clickable advertisement is clicked on and accessed, the counter associated with the clickable advertisement is incremented, and once the count in the counter reaches the access limit, no user at that client system 14 is permitted to click on and access that clickable advertisement.

The method for controlling access to a clickable advertisement in a network includes assigning a computer identifier to a client computer and receiving a request from client application software 28 operating on the client computer to access the clickable advertisement. The request includes the computer identifier assigned to the client computer. The clickable advertisement having an access limit. The access limit being the number of times that the client computer is permitted to access the clickable advertisement. The method can include determining the number of times that the clickable advertisement has been accessed by the client computer based on the computer identifier. The method also can include comparing the number of times the clickable advertisement has been accessed to the access limit. The method can include providing the client computer with access to the clickable advertisement based on the comparison and storing the comparison. The method can further include sending to the client computer the clickable advertisement based on the comparison because the comparison determined that the access limit has not been exceeded.

The method can further include transferring the user to a website corresponding to the clickable advertisement based on the comparison because the comparison determined that the access limit has not been exceeded. The method can further include refusing access for the client computer to the clickable advertisement based on the comparison because the comparison determined that the access limit has been exceeded. The method can also include sending a message to the client computer indicating that access has been refused. The method can further include incrementing an access counter based on receiving the request from client application software 28 operating on the client computer to access the clickable advertisement. The method can further include transmitting a clickable advertisement access report.

Figure 28:
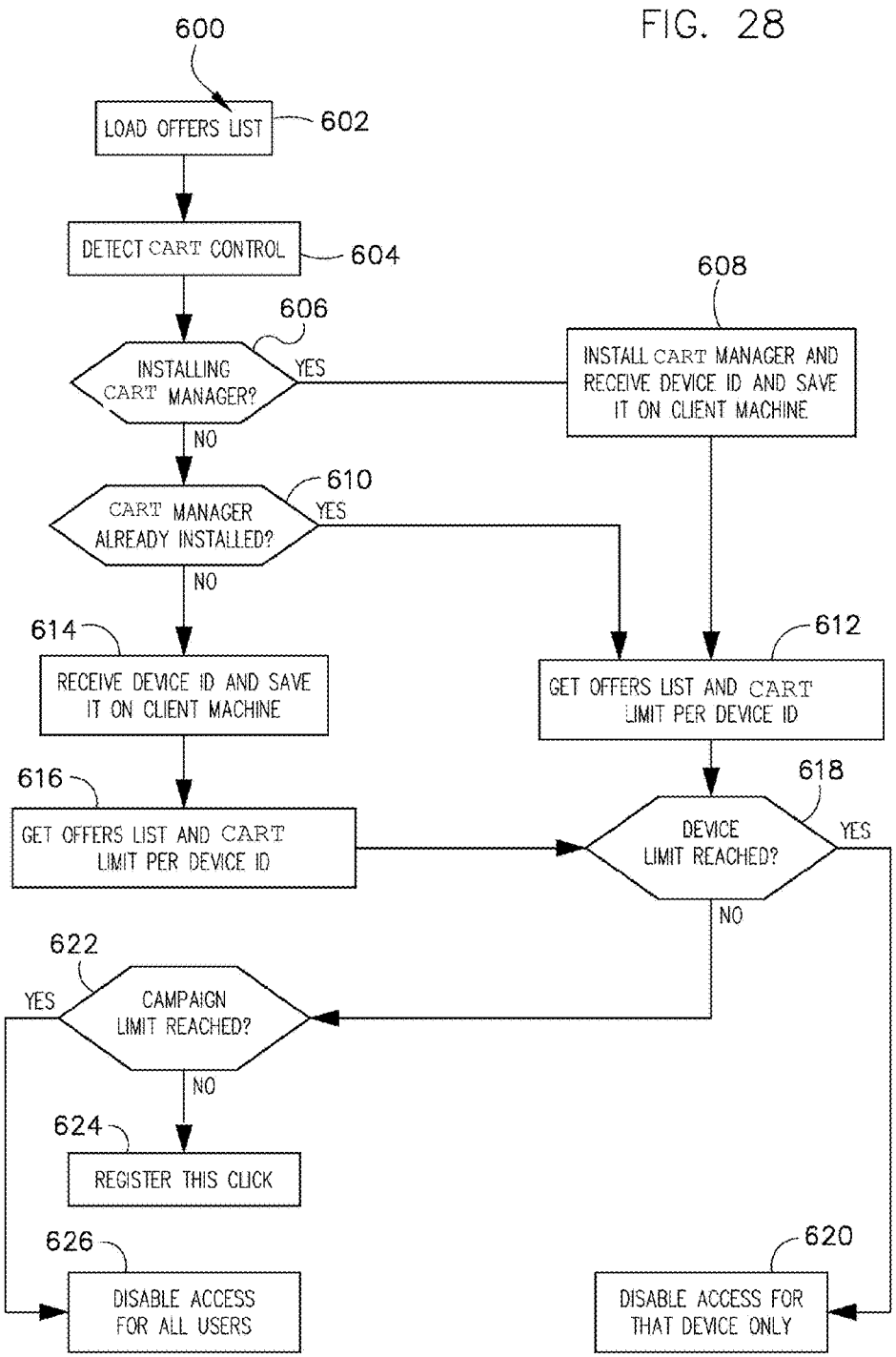
FIG. 28 is another flow diagram of the process for controlling the number of clicks to a clickable advertisement, according to an exemplary embodiment.

Referring to FIG. 28, a flow diagram 600 of the process for controlling clicks to a clickable advertisement is shown, according to an exemplary embodiment. In step 602, the system loads an offers list onto the client device, a server, and/or another computing device. An offers list is a set of advertisements, PGS-GM-CL/I-SN information, websites, and/or any other offers. In step 604, the system detects the cart control of the client device, server, and/or another computing device. In step 606, the system determines whether the cart manager are installed. If the cart manager are installed, then the process moves to step 608. In step 608, the system installs the cart manager and receives DeviceID data 30 and save it on client device, server, and/or another computing device. After installing cart manager and receiving DeviceID data 30 (step 608), the process moves to step 612. If the print manager will not be installed, then the process moves to step 610. In step 610, the system determines whether the cart manager is already installed. If the cart manager is not already installed, the process moves to step 614. In step 614, the system receives DeviceID data 30 and saves it on client device, server, and/or another computing device. In step 616, the system receives the offering lists, limits per DeviceID data 30 and click limits per DeviceID data 30. If the cart manager is already installed, the process moves to step 612. In step 612, the system receives the offering lists per DeviceID data 30 and click limits per DeviceID data 30. In step 618, the system determines whether the device limit has been reached. If the device limit has been reached, then in step 620 the system disables access to the data requested by that device. If the device limit has not been reached, then the process moves to step 622. In step 622, the system determines whether the campaign limit has been reached. A campaign limit can be a promotional limit, a budget limit, a sales limit and/or any other limit placed on the advertisement. If the campaign limit has been reached, then the system in step 626 disables access to the data for all devices. If the system determines that the campaign limit has not been reached, then the system in step 624 registers the access to the data.

Figure 29:
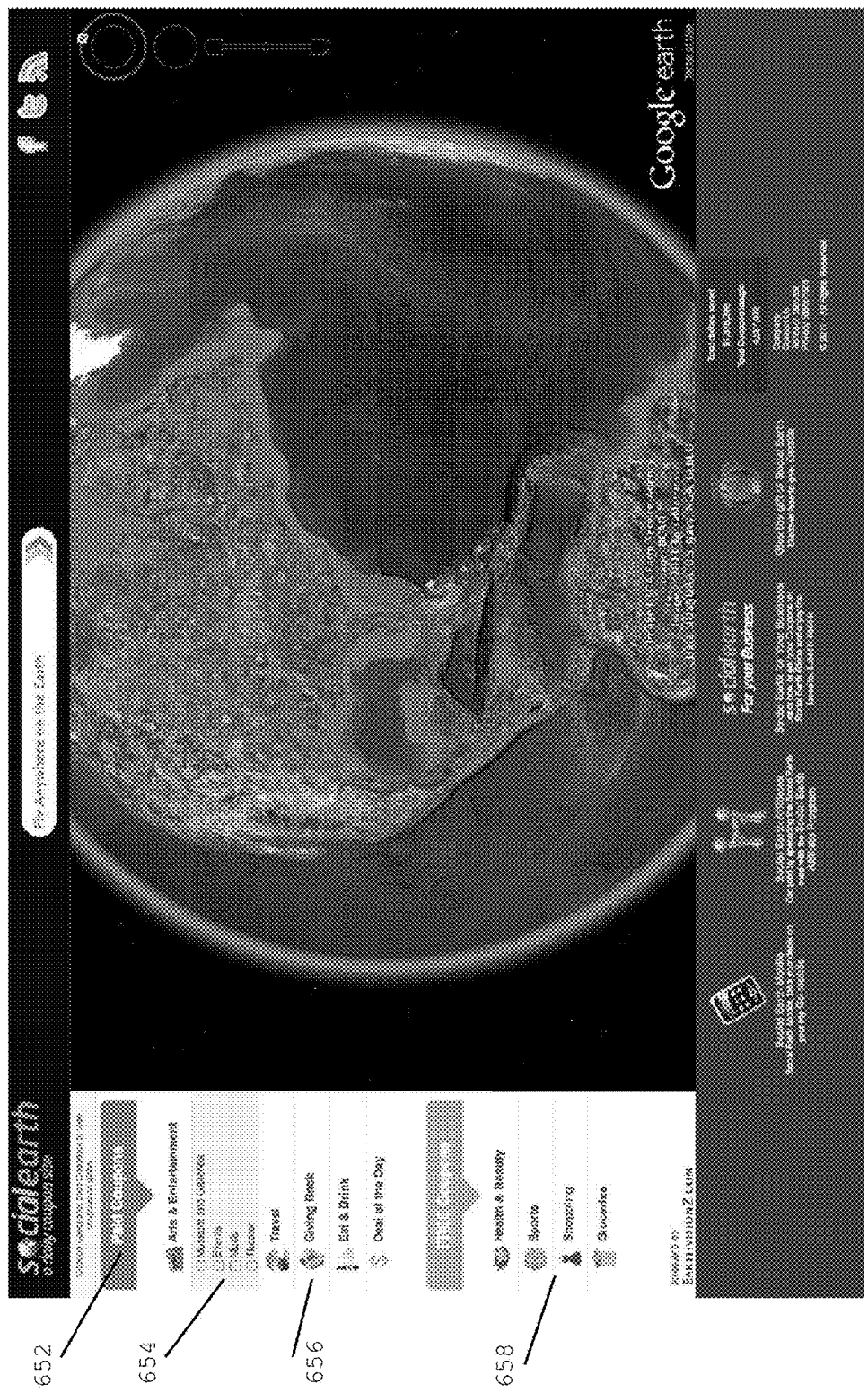
FIG. 29 illustrates a screen display defining an interface associated with a client system portion, according to an exemplary embodiment.

Referring to FIG. 29, illustrations of a screen display defining an interface associated with a client system portion are shown, according to exemplary embodiments, e.g., as Social Earth. FIG. 29 is similar to FIGS. 3A and 3B with the added feature of being able to utilize a pull down menus 652, 654, 656, and 658 to retrieve PGS-GM-CL/I-SN information data. It is to be understood that the above description is merely exemplary rather than limiting in nature, the disclosure being limited only by the appended claims. Various modifications and changes can be made thereto by one of ordinary skill in the art, which embody the principles of the disclosure and fall within the spirit and scope thereof. For example, one and/or more steps described herein as being performed by client system 14 and/or main server system 12 can be performed by the other of client system 14 and/or main server system 12, and/or by both.

For example, a thin client can be operable on client system 14 to interface with main server system 12. A thin client is a client computer and/or client software in client-server architecture networks, which depends primarily on the central server for processing activities, and mainly focuses on conveying input and output between the user and the remote server. In contrast, a thick and/or fat client does as much processing as possible and passes only data for communications and storage to the server. Many thin client devices run only web browsers and/or remote desktop software, meaning that all significant processing occurs on the server.

The present invention provides in one aspect a delivery system for a geospatial website for a multidimensional representation of information and/or scalable versions of web content for the delivery of Products, Goods & Services combined with /Geospatial Mapping/Company-Local Information/Social Networking/Communities ("PGS-GM-CL/I-SN") on a three dimensional geospatial platform using geospatial mapping technology. One example of an aspect of the invention is a geospatial website that aggregates, inter alia, promotions, online coupons, mobile services, Products, Goods & Services, entertainment shopping, penny auctions or online auctions, advertisements and affiliate advertising or services, including without limitation, such items as service providers, business centers and affiliates for related company information, media and entertainment, sports, personal & financial network, travel & hospitality services, real estate, educational services, ancillary services, penny auctions or online auctions, advertisements, service providers, social networking, social networking communities, social plugins, promotions, social applications, entertainment shopping, penny auctions or online auctions, advertisements and affiliate advertising or services, social networking, social networking communities, online communications, messaging, user profiles, viewing public & private user profiles, online dating, gaming, retail stores, virtual communities and virtual goods and information about microloans or microcredit, humanitarian aid and support other worldly causes through charitable donations or sustainable gifts to those in need (collectively "Products, Goods & Services") from around the world and/or showcases them in their actual, physical location on the websites live view of Earth in combination with social networking and/or socially conscious information and/or activities. The present invention addresses problems and/or shortcomings of online products, goods or services, which should also provide socially conscious information about the companies that supply the coupons so that consumers can see where the companies and/or stores are located and can find out information about the companies, communities they are located in, what interaction and help they provide to communities and/or other economic and/or socially responsible activities, and to associate the geographical and other geospatially available information connecting also by the use of integrated social media, which combination is not current provided and/or available.

As users and members and/or subscribers of the website, (e.g., "Social Shoppers") shop the world for bargains, they can view promotions, online coupons, mobile services, Products, Goods & Services, entertainment shopping, penny auctions or online auctions, advertisements and affiliate advertising or services for such items as e.g., but not limited to, family fun, spoils, restaurants, events and/or hundreds of top consumer packaged goods brand/brandors for, e.g., but not limited to, groceries, apparel, beverages, books & magazines, foods, health care, household, office, personal care, pet care, photography and/or the like. Such users and members and/or subscribers (e.g., "Social Shoppers") can find great promotions, online coupons, mobile services, Products, Goods & Services, entertainment shopping, penny auctions or online auctions, advertisements and affiliate advertising or services from merchants and sellers from around the world in the leading travel & hospitality industry, restaurants, toy and/or entertainment companies and/or top retailers around the world. The delivery system for a host geospatial website can provide for a multidimensional representation of information and/or scalable version of web content for an infrastructure and global platform that provides users and members and businesses of all types and sizes with access to broad markets and connect buyers and sellers and to reach people at the point of shopping through GPS technology—a benefit both to shoppers and merchants and delivery of promotions, online coupons, mobile services, Products, Goods & Services, entertainment shopping, penny auctions or online auctions, advertisements and affiliate advertising or services from merchants and sellers from around the world on a three dimensional geospatial platform using geospatial mapping technology. A host geospatial website can include realistic virtual landscape using satellite and/or aerial photography that can include many content layers of web based information, e-commerce and mobile banking links, social networking, social networking communities, social plugins, promotions, social applications and/or advertisements for a richer user experience. A host website shall store images, web-based content, social data and/or share live social feeds from social networks and/or other communications in real-time. Connecting promotions, online coupons, mobile services Products, Goods & Services, entertainment shopping, penny auctions or online auctions, advertisements and affiliate advertising or services from merchants and sellers from around the world with a highly-engaged social networking community of savvy Social Shoppers based upon a desired location in real-time on a geographical area across multiple social layers that are displayed as graphic animated color overlays on a three dimensional geospatial platform using geospatial mapping technology." The invention can also provide mobile payment method and/or system for effectuating an online payment through a mobile device to complete an e-commerce and mobile banking transaction on a three dimensional geospatial platform using geospatial mapping technology.

The invention can further provide in one aspect geospatial website aggregates promotions, online coupons, mobile services, Products, Goods & Services, entertainment shopping, penny auctions or online auctions, advertisements and affiliate advertising or services from merchants and sellers from around the world and/or showcases them in their actual, physical location on the websites unique live view of Earth. As users and members and/or subscribers shop the world for bargains, they can view online promotions, online coupons, mobile services, Products, Goods & Services, entertainment shopping, penny auctions or online auctions, advertisements and affiliate advertising or services for such items as family fun, sports, restaurants, events and/or hundreds of top consumer packaged goods brand/brandors for groceries, apparel, beverages, books & magazines, foods, health care, household, office, personal care, pet care, photography and/or more! Social Shoppers can to find great product, goods or services deals from leading travel & hospitality, restaurant, toy and/or entertainment companies and/or top retailers around the world. Social Shoppers can to use "a mobile device payment method and/or system for effectuating an online payment through a computer or mobile device equipped carrier and/or a mobile device equipped bank using a mobile users and members device in connection with e-commerce and mobile banking transactions on the host geospatial website via a computer or mobile device (e.g., mobile telephone, PDA, laptop computer, etc.); wherein users and members create and/or maintain a rich-media application via a geospatial mapping platform via the Internet comprising: mobile banking and/or electronic payments. The delivery system for a host geospatial website can provide for a multidimensional representation of information and/or sealable version of web content for the delivery of promotions, online coupons, mobile services, Products, Goods & Services, entertainment shopping, penny auctions or online auctions, advertisements and affiliate advertising or services from merchants and sellers from around the world on a three dimensional geospatial platform using geospatial mapping technology. A host geospatial website can include realistic virtual landscape using satellite and/or aerial photography that can include many content layers of web based information, e-commerce and mobile banking links, social networking and/or virtual advertisements for a richer user experience.

A host geospatial website shall store images, web-based content, social data, social networking, social networking communities, promotions, social applications, user profiles, messaging, viewing public & private user profiles and live social feeds from social networks such as Facebook™ and Twitter™, social plugins, social applications, advertisements and/or other communications based upon a desired location in real-time. Connecting promotions, online coupons, mobile services, Products, Goods & Services, entertainment shopping, penny auctions or online auctions, advertisements and affiliate advertising or services with merchants and sellers from around the world with Social Shoppers based upon a desired location in real-time on a geographical area across multiple social layers that are displayed as graphic animated color overlays on a three dimensional geospatial platform using geospatial mapping technology. More specifically, it relates to a method for users and members known as "Social Shoppers" to effectuate banking and/or electronic payments; accessing a user account, engaging in mobile social networking, social networking communities, social networking activities and/or viewing user profiles, sending messages, online communications, viewing public & private user profiles and other available options via a three dimensional geospatial mapping platform using geospatial mapping technology.

The foregoing description of exemplary embodiments of the disclosure has been presented for purposes of illustration and description. It is not intended to be exhaustive and/or to limit the disclosure to the precise form disclosed, and modifications and variations are possible in light of the above teachings and/or can be acquired from practice of the disclosure. The embodiments (which can be practiced separately and/or in combination) were chosen and described in order to explain the principles of the disclosure and as a practical application to enable one skilled in the art to make and use the disclosure in various embodiments and with various modifications suited to the particular uses contemplated. It is intended that the scope of the disclosure is not limited to the disclosure herein, but covers any embodiment expressed to one of ordinary skill in the relevant arts in combination with what is known in the art, and their equivalents.

A geographic information system (GIS) (also called geographic mapping and/or "GM") is a computer technology that provides an analytical framework for managing and integrating data, solving problems, and/or understanding past, present, and/or future situations. A GIS can link information and/or attributes to location data (hereinafter referred to as a "feature"), for example, people to addresses, buildings to parcels, and/or streets within a network. GIS and/or GM can further layer such information to present a better and/or clearer understanding of how many different variables interrelate and/or work together. Layers can be in the form of colored and/or textured overlays, graphics, icons, graphs, and/or other visual indicators of data in context with a geographic location associated with the data.

A GIS and/or GM is most often associated with maps formed within a framework of a common coordinate system, such as the World Geodetic System 1984 (WGS84). Reference locations within the framework can be specified by and/or translated to and/or from locations defined within a common coordinate system, so as to allow integration of disparate data and functionality with a geospatial browser. A map, however, is only one way a user can work with geographic data in a GIS and/or GM and is only one type of output generated by a GIS and/or GM. Furthermore, a GIS and/or GM can provide many more problem-solving capabilities than using a simple mapping program and/or adding data to an online mapping tool (e.g., in a "mash-up").

Generally, a GIS and/or GM can be viewed in at least three ways, (1) as a database; (2) as a map; and/or (3) as a model. As a database, a GIS provides a unique kind of database relating to the Earth and/or other mapped region, such as a geographic database and/or geo-database. Fundamentally, a GM is based on a structured database that describes the mapped region in geographic terms. GM maps can be either two and/or three dimensional in presentation. GM maps are generally constructed of "tiles" that are unit areas of a geographic region. Tiles can be identified in the database by coordinate boundaries and/or individual reference identifications allocated to each tile. The number of tiles covering a particular geographic region will vary depending upon the resolution of the map requested; a high resolution map (e.g., 1 m) of a geographic area will have substantially more tiles than a lower resolution map of the same area. Maps combining the underlying geographic information with overlays of associated data can be constructed and used as "windows into the database" to support queries, analysis, and editing of the information in a process called "geo-visualization." As a model, a GM is a set of information transformation and/or "geo-processing" tools that derive new geographic datasets from existing datasets. This geo-processing functionality can take information from existing datasets, apply analytic functions, and write results into new derived datasets that show features and feature relationships with the mapped region and present the results to a user.

A GM allows mapping of locations and things and identification of places with requested features. GIS mapping can provide information about individual feature and/or present a distribution of features on a map to identify patterns. GM and/or GIS mapping can be based upon and/or filtered by quantities, for example, locations of most and least of a feature. GM and/or GIS mapping can also find and establish relationships between places, features, conditions, and/or events and determine where certain criteria are met and/or not met. GM and/or GIS mapping can also present densities to view concentrations. A density map allows measurement of a number of features using a uniform area unit, such as acres and/or square miles, to clearly present the distribution. This functionality provides an additional level of information beyond simply mapping the locations of features.

GM and/or GIS can also be used to depict events occurring within and/or nearby an area. For example, a district attorney might monitor drug-related arrests to find out if an arrest is within 1,000 feet of a school; if so, stiffer penalties can apply. GM and/or GIS can be used to determine items within a set distance of a feature by mapping an area within a range of the feature. GM and/or GIS can also be used to map the change in an area to anticipate future conditions, decide on a course of action, and/or to evaluate the results of an action and/or policy. By mapping where and how things move over a period of time, insight into trends and/or behaviors can be gained.

GM and/or GIS can be used to map changes to anticipate future needs. For example, a police chief might study how crime patterns change from month to month to help decide where officers should be assigned. GM and/or GIS can also be used to map conditions before and after an action and/or event to see the impact. For example, a retail analyst might map the change in store sales before and after a regional ad campaign to see where the ads were most effective.

Figure 30:
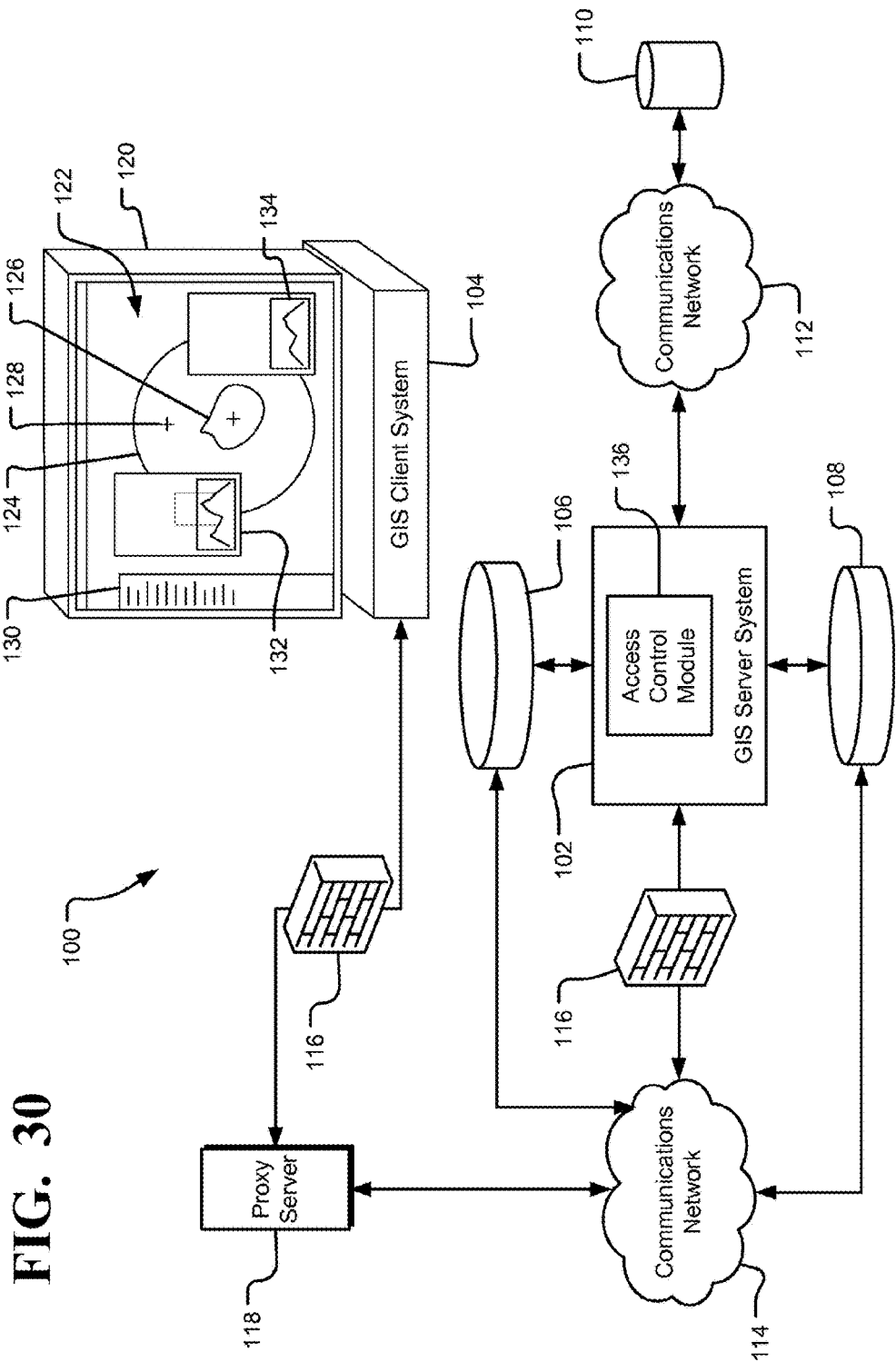
FIG. 30 is a schematic diagram of an exemplary implementation of a geospatial decision management system for implementing a geographic information system over a network.

A GM and/or GIS can be implemented in a geospatial decision management system (GDMS) 100, shown in FIG. 30 to provide the geo-processing power and infrastructure to process the data and render geo-visualizations of the data in a user interface. The GDMS 100 of FIG. 30 can be implemented in a combination of a server computer system 102, one and/or more client computer systems 104, and various data sources 106, 108, and 110. GDMS data can be saved in the GDMS server system 102 and/or in a datastore 106, 108, and 110 at a local and/or remote location. The data sources 106 and 108 are depicted as local to the server system 102, whereas the data source 110 is depicted as coupled remotely to the server system 102 via a communications network 112. GDMS data can also be cached in a proxy server.

The client system 104 can be coupled remotely to the server system 102 via a communication network 114 (or alternatively, the same communications network 112), although a local connection between the client system 104 and the server system 102 can be employed. It should be understood that multiple client systems can be coupled with the server system 102 concurrently. It should also be understood that the client system 104 and server system 102 can be implemented in an integrated system. The network connection 114, such as an Internet connection, can be used by GDMS client systems 104 to access the data (e.g., data defining layers and/or providing financial information, chemical concentrations, test results, project state reports, etc.) at the remote data sources 106, 108, 110, directly and/or through an intermediate computing system (e.g., a proxy server and/or GDMS server).

The client computer 104 can be coupled to an intermediate server, such as a proxy server 118. The proxy server 118 can be positioned between the client computer 104 and the server system 102. The proxy server 118 intercepts all requests to the server system 102 to see if it can fulfill the requests itself with cached data from prior requests. If not, the proxy server 118 forwards the request to the server system 102 to be fulfilled. The proxy server 204 can also be coupled to the communications network 114 and accessed by the client computer 104 and the server system 102 via the network 114. Firewalls 116 can also be implemented between the server system 102 and the client computer 104 and the network 114 for an added layer of security.

The connection can be established as a secure connection between the client system 104 and the server 102 and/or the remote data sources 106, 108 and 110. The secure connection can be accomplished by a variety of different methods including, but not limited to, authentication codes and passwords, secure user management tools, firewalls, user authentication, secure user management tools, user pathway mapping and/or encryption, etc. In another example, the server system 102 can include an administrative website that can allow authorized users and members to manipulate and assign user rights (e.g., an administrative tier). The server system 102 can also include a security feature, for example, an access control module 136 to establish, control, and monitor access by client computers 104 to certain data stored within and/or accessible within the GDMS 100. Access control can be governed by an administrator and/or it can be an automated function of the access control module 136 based upon attributes of the data requested and permissions held by the user as further described below.

The server system 102 can represent one and/or more hardware and software servers providing multiple server functions. In addition, one and/or more of the server system 102, the client system 104, and the databases 106, 108 and 110 can form an N-tier system. The server system 102 can also include a web server application subsystem, whereby World Wide Web-enabled applications can provide various aspects of functionality of the GDMS 100. For example, the server system 102 can provide a website where content creators and/or generators can upload geospatially-related data that can be transformed into features referenced to locations within a map of the GDMS 100 for access through the client system 104 connected to the GDMS 100 for geo-visualization of the information. In an alternative implementation, the client system 104 can be implemented as a "thick" client and execute client-installed software for some and/or all of the functionality of the GDMS 100.

A monitor 120, coupled to the client system 104, presents a GDMS interface 122 constructed from data and functionality received through the server system 102. When a user is working within a GDMS 100, s/he is said to be in a GDMS session. The GDMS interface 122 can be generated by a GDMS application executing on the client system 104 and/or alternatively through a server-executed GDMS application that provides the interface components over the network to a dumb terminal and/or a browser application running on the client system 104. The GDMS interface 122 can be a geospatial browser window including a map 124 (e.g., a globe in this illustration), a geo-visualization of data as a layer 126 and individual features 128 on the map 124, a layer manager 130 for selecting data and other features from the databases 106, 108, 110. The GDMS view can also include tool palettes 132 and 134, which can be distinct features of the browser interface, browser plug-ins, and/or separate utilities and/or applications.

In one implementation, the GDMS interface 122 can be in the form of a geospatial browser window and one and/or more geospatially-referenced tools. Access to the data and/or functionality is provided by geospatially-referenced tools (e.g., tool palettes 132 and 134) that are associated with and triggered in relation to a specific location in a common coordinate system (e.g., WGS84 and/or some other shared coordinate system) shared by the tools and the geospatial browser. For example, a tool can provide chemical analysis results pertaining to soil samples taken from the location over time. In another example, a tool can retrieve and analyze financial data pertaining to a construction project on a specified region on the map (e.g., a location). The data available to such tools is provided from a variety of data sources and associated with each location within the common coordinate system of the GDMS system 100, such as through specified coordinates (e.g., longitude and latitude), other geographic constraints, and/or organizational constraints (e.g., a project identifier of a project having a specific geographic location and/or constraint, a feature identifier of a feature having a specific geographic location and/or constraint, etc.). In this manner, the user can view a location through the geospatial browser and access data and/or functionality associated with a location that is accessible through the tools in the browser. These locations can be the same location and/or distinct locations.

Figure 31:
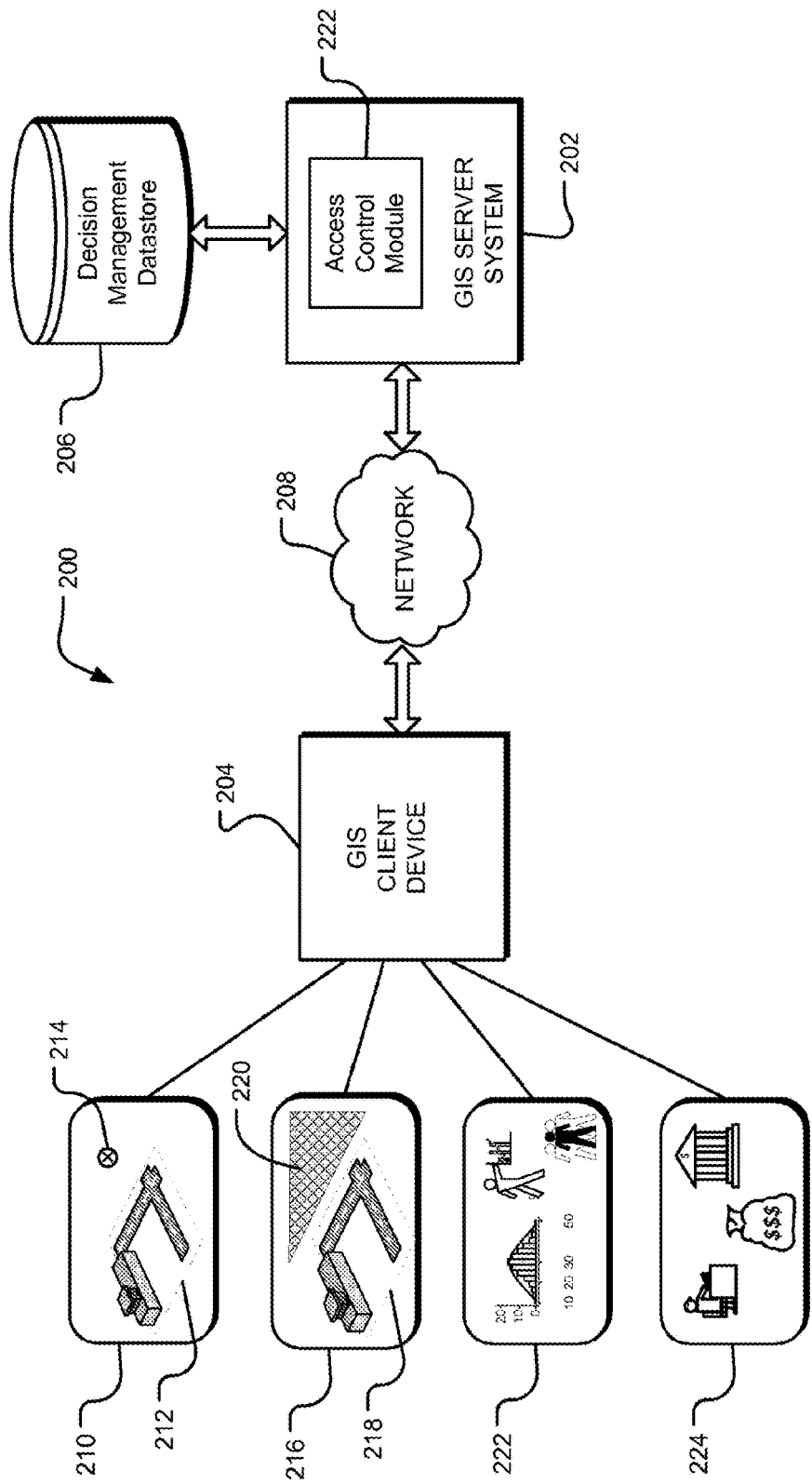
FIG. 31 is a schematic diagram of a geospatial decision management system depicting exemplary implementations of technical and management interface tools available to a client user.

FIG. 31 further illustrates an example of a GDMS 200 for accessing specific data and/or information within a database based on the association of the information with geospatial coordinates. Again, the GDMS 200 can be implemented by a GM and/or GIS server system 202 in communication with a GM and/or GIS client computer 204 over a communication network 208, e.g., the Internet. The GM and/or GIS client computer 204 can be used to access information in a decision management datastore (DMD) 206 connected with the GM and/or GIS server system 202. The communication network 208 ideally provides the GM and/or GIS client computer 204 with high-speed access to indexed data on the DMD 206.

The GM and/or GIS server system 202 can also include a security feature, for example, an access control module 222 to establish, control, and monitor access by GM and/or GIS client computers 204 to certain data stored within and/or accessible via the DMD 206. Access control can be governed by an administrator and/or it can be an automated function based upon attributes of the data requested and permissions held by the user as further described below The data retrieved from the DMD 206 can be presented in a user interface 210, 216, 222, 224 (of which four exemplary configurations are presented in FIG. 31 at the GM and/or GIS client computer 204. A feature presented in the user interface 210 (e.g., a geospatial coordinate and/or geographic location) on the client computer 204 can be used to access information indexed by features using the DMD 206.

The GM and/or GIS client computer 204 can access the indexed data in the DMD 206 by using applications and/or plug-ins, such as technical interfaces 210, 216 and management interfaces 222, 224. The technical interfaces 210, 216 can be used to access technical data associated with particular features. In exemplary implementations such technical data might be biochemical, geochemical, hydro-geological, and/or other physical data on analytes. The management interfaces 118, 120 can be used to access business management data. In exemplary implementations such management data might be business and organizational documents and data associated with particular features. Several examples of the use of such tools to interface with the DMD 206 and extract the data are presented below.

As shown in the first technical interface 210 in FIG. 31, if the GM and/or GIS client computer 204 requests information about a particular feature, such as a ground water well located near an airport 212, the GM and/or GIS client computer 204 can select the feature 214, i.e., the ground water well, to receive information related to that feature 214. The first technical interface 210 can include a concentric area data tool that can provide technical data related to the ground water well feature 214, for example, latitude and longitude, physical inspection data, water level information, and water contamination information, in a the form of information windows and visual geographic information overlays on a base location map. In an alternate implementation shown in the second technical interface 216, technical data concerning an area of land 220 around, adjacent, and/or near the airport 218 at the location of the feature 214, for example, landscaping, slope, soil composition, and/or grading information can be presented.

In a further implementation shown in a first management interface 222, a contract management concentric data tool can provide management data based upon the selected feature 214, for example, information on construction and/or work in progress, zoning and/or easement information, and/or information on any contracts applicable to the feature 214. In a further implementation shown in a second management interface 224, a finance management concentric data tool 120 can also provide management data relating to financial information applying to the feature 214 selected, for example, costs of past repairs and/or current maintenance fees. In some implementations the management interfaces 222, 224 can further comprise a real-time link to a video camera providing a view of the selected feature 214 and any construction and/or activity occurring at the selected feature 214.

Figure 32:
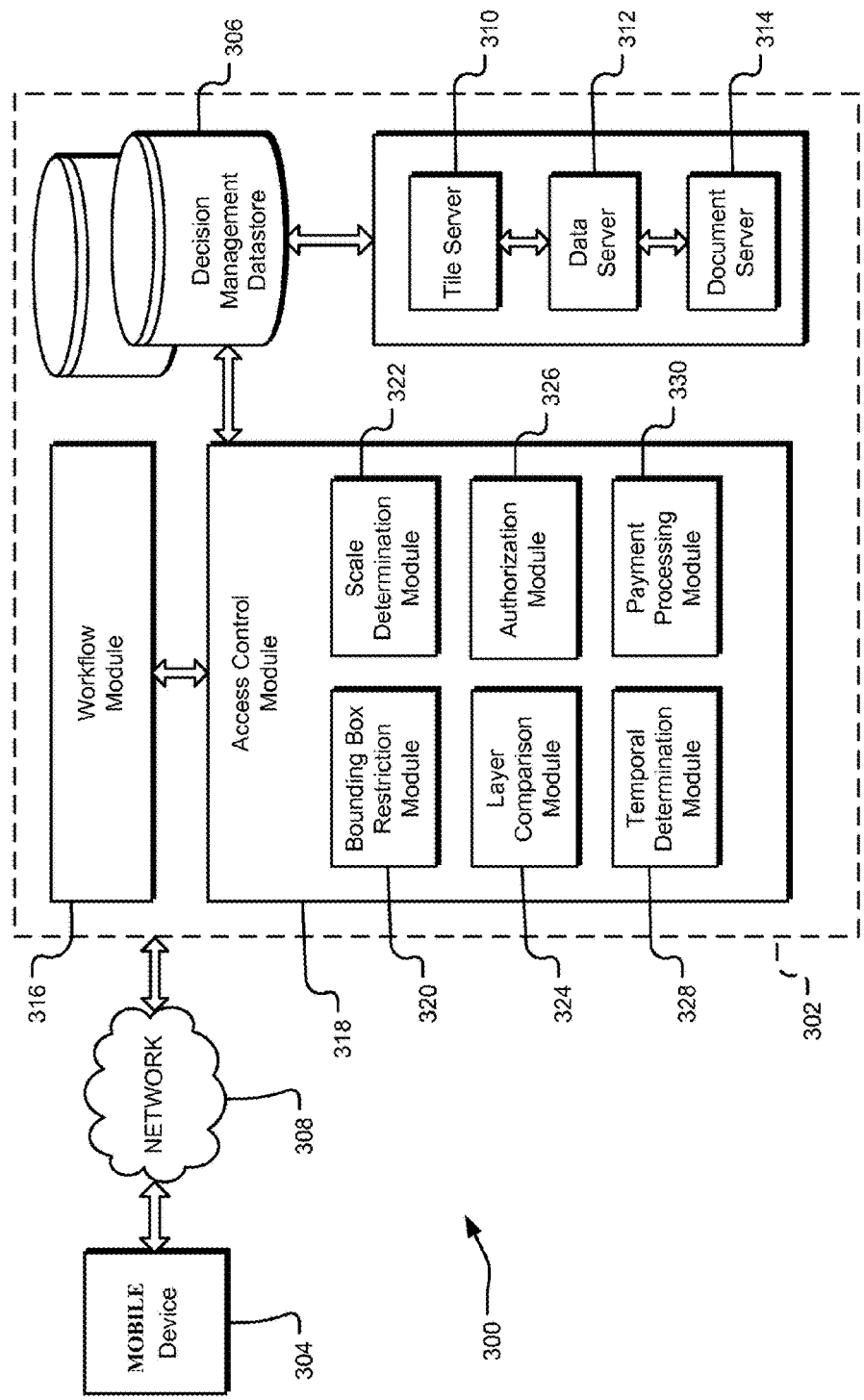
FIG. 32 is a schematic diagram of additional components of a geospatial decision management system for implementing access control to presentation of geospatial attributes within a network.
Figure 33:
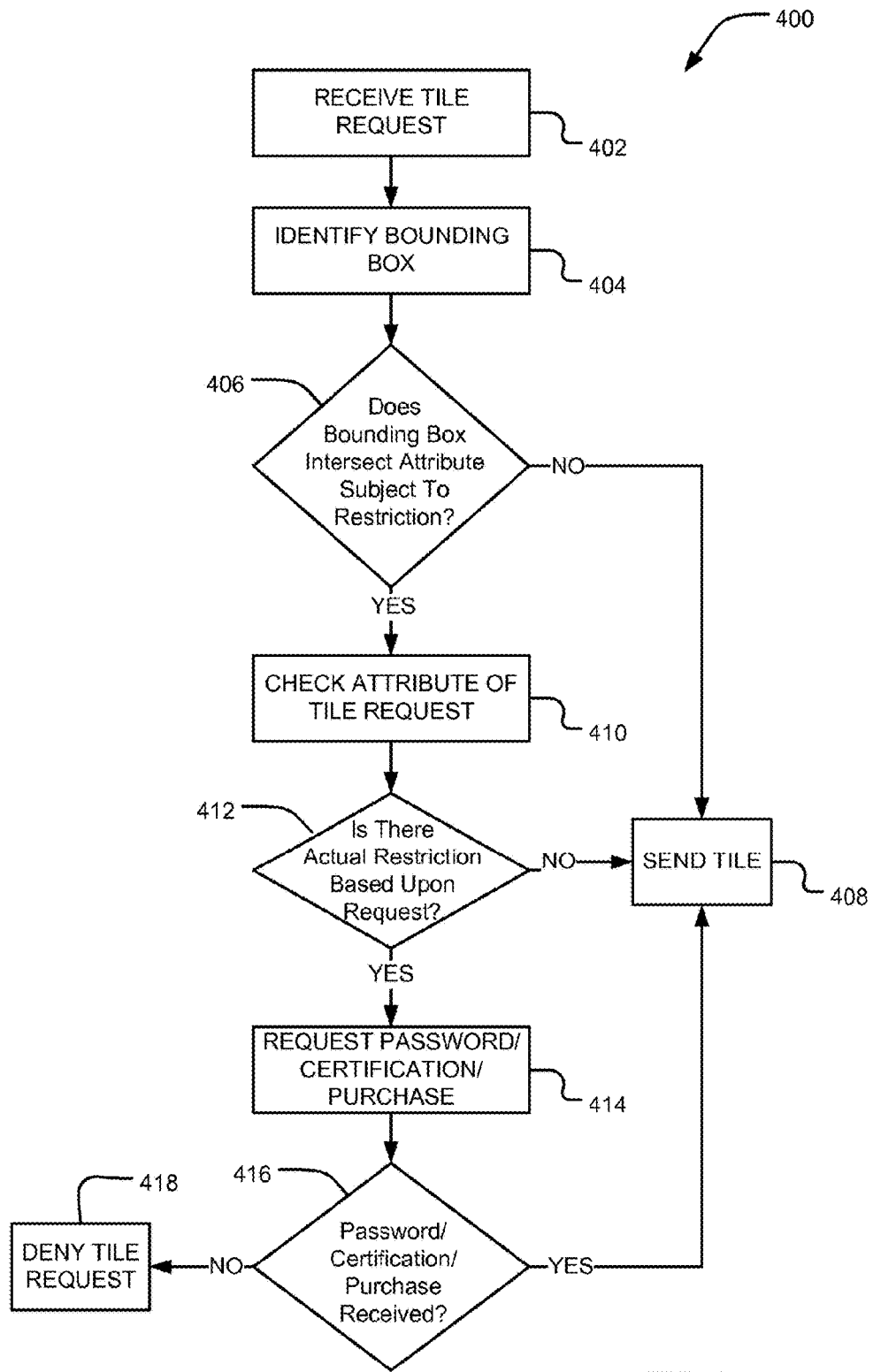
FIG. 33 is a flow diagram of exemplary operations for implementing access control to presentation of geospatial attributes within a geospatial decision management system.

The GDMS shown in FIGS. 32 and 33 is an innovative, GM and/or GIS-based management decision support tool that optimizes the geo-processing and geo-visualization of available GM and/or GIS data, for example, natural resources, building resources, time-management resources, personnel resources, financial resources, and information resources, and others. The GDMS can enable a GM and/or GIS client to easily visualize and interpret large, multifaceted, and complex information sets in order to make comparative analyses of alternatives, identify potential liabilities and opportunities, and optimize program strategies.

The GDMS provides full convergence, and/or integration, of multiple (essentially limitless) disparate data sets within a single virtual three-dimensional (geospatial) model. The disparate data sets, and even sub-data sets within them, can be organized by association with relevant features on the model. For example, groundwater analytical data can be associated with a given groundwater well; building data can be associated with a given building; installation information can be associated with the installation; and command information can be associated with the command. The GDMS full data convergence allows data to be accessed relative to position, scale, resolution, time, and other geospatial attributes and serves as an extremely intuitive and efficient way to organize and access essentially limitless quantities of information.

The GDMS allows queries, filters, and comparisons of data to be completed at the GM and/or GIS server system and then visually represented in three dimensions in near real time at the GM and/or GIS client device. The three-dimensional representation of data helps users and members gain a better understanding of the meaning contained within the data more rapidly than using traditional tabular and/or two-dimensional representations of data. The GDMS thus allows the meaning represented in the three-dimensional data to be rapidly communicated to users and members.

The GDMS improves on traditional closed and/or organization-specific GM and/or GIS by affording live connections to multiple databases. As the databases are updated, the representations afforded by GDMS can thus be current. This allows a fourth dimension, time, to be factored into resource management decisions. Time is an important additional data factor because previous "views" of the data can be compared to current "views" of the data, in order to gain an understanding of the rates of change (or dynamics) of the real system. In other words, the GDMS allows for differences between time states to be understood and factored into a decision process.

In FIG. 30 a GDMS 100 can be used to provide access to specific sections within documents, which are associated with a particular geographic coordinate, e.g., Products, Goods & Services-Geographic Mapping-Company/Local Information-Social Networking (PSR-GM-C/L-SN) information. More specifically, a GDMS 100 user (or GM and/or GIS client) can select a specific location and/or 'feature' on a map and be directed to Products, Goods & Services-Geographic Mapping-Company/Local Information-Social Networking (PSR-GM-C/L&SC-SN) information, e.g., information and/or documents, as well as entire sets of information and/or documents themselves associated with a promotion, online coupons, mobile services, Products, Goods or Services, entertainment shopping, penny auctions or online auctions, advertisements and affiliate advertising or services, service providers, business centers and affiliates for related company and/or local information, including socially conscious information, which contain data and/or information relevant to that specific 'feature' and/or location selected. Said another way, specific relevant data can be provided to a user based upon the 'feature' selected, not just based upon a traditional search query. Thus, GDMS 100 links and/or ties a 'feature,' and/or specific geographic location, to an indexed database of data. Examples of documents that can have a geospatial associated, but are not amenable to layered geo-visualization can include one and/or more components of Products, Goods & Services-Geographic Mapping-Company/Local Information-Social Networking (PSR-GM-C/L&SC-SN) information, e.g., but not limited to, promotions, online coupons, mobile services, Products, Goods & Services, entertainment shopping, penny auctions or online auctions, advertisements and affiliate advertising or services, product information, socially conscious information about companies, their products, goods & services, local cities and/or communities, and/or the like, e.g., real estate contracts concerning a particular property, title records, covenants, plats, zoning regulations, construction plans, and others. The specific relevant data provided to a user can comprise only portions and/or sections of documents, maps, and/or images related to that specific 'feature' selected. This can greatly increase efficiency of GM and/or GIS by taking a user directly to a relevant section of a document, which can be hundreds and/or thousands of pages in length.

The GDMS speeds the process of bringing discordant stakeholder groups to consensus by providing real-time and highly comprehensible (due to the visual output) answers to questions offered in meetings and/or any networking and/or social networking methods, systems and/or resources. Moreover, the technology introduced in the GDMS yields truly optimal solutions to highly complex and nonlinear physical problems using reasonable computational times and resources, including associating company, local and product and/or service information, comprising social conscious information, data, and other resources. The modular design of GDMS permits coupling to virtually any simulation code. The GDMS can also be linked to and implemented within user-friendly and widely-accepted graphical user interfaces (GUIs) including web browser applications.

As should be apparent from the above discussion, the GDMS is a powerful tool that can be used to access enormous quantities of data stored at remote locations. When using the GDMS, control access to data stored at remote locations, for example, an access control module 222 as depicted in FIG. 31 can be implemented. An administrator of the data stored at the remote location to have server-side control over varying levels of access to data. Thus, in some implementations, access control can be exercised on the server-side; however, in other implementations this level of access control can be exercised on the client side. Further, access control can also be exercised at/by a given database. It can also be desirable to have different levels of authorization to control data access for employees having different roles within an organization. For example, a higher level officer, such as a supervisor and/or general, can have unlimited access to classified data, while entry-level employees can only have access to non-classified data. These levels of authorization can be created and adjusted by an administrator to permit varying levels of access to the data. The GDMS can specifically establish different levels of access to the data can be controlled for each individual and/or can be controlled in groups (e.g., hierarchically) by the administrator and can be created and maintained using operations implemented within the access control module 222.

The varying levels of accessibility to data can be controlled using a number of different methods including, but not limited to, authentication codes and passwords, secure user management tools, firewalls, user authentication, user pathway mapping, and/or encryption. The levels of access control to the data can also be controlled by the creation of an individual profile for each user identifying the user's role in the organization and specifying their level of access to the data. Then, when a user logs onto a system, their level of access to data can be known by the system and the user can then only be able to view and/or access data that was commensurate with their level of authorization.

The layers of data can also be saved so that other authorized users and members can access the saved layers to view and make additional changes to (or comments on) the layers and then save those additional changes. This allows a given user to open the selected state, make changes, alterations, and comments, and save this new altered state for review and potential further modification by others. Certain GDMS view state data and/or functionality can and/or can not be accessible to and/or be editable by a user based upon access permissions that have been granted to and/or withheld from the user.

In one implementation, access to the different map tiles and/or layers of data can be based upon the scale and/or resolution of the map and/or layer, i.e., access is 'scale-driven.' The contextual and/or 'smart' layers of data can be turned on and/or off by an administrator based upon the authorization to access each layer of data. A user's ability to change and/or alter the layers of data can also be dependent upon their level of authorization.

With reference now to FIG. 32, an exemplary GDMS 300 is implemented in a server system 302 with a DMD 306 as described above. The server system 302 can further include additional data servers, for example, a map tile server 310 indexed by coordinates, reference number, and/or feature; one and/or more layer servers 312 that provide feature and layer information also indexed by reference to geospatial coordinates, tile reference number, and/or feature; and a document server 314 that can provide Product/Service/Retail-Geographic Mapping-Company/Local Information-Social Networking (PSR-GM-C/L&SC-SN) information, and/or other documents and information associated with a geospatial location (again indexed by coordinate, reference number, and/or feature) in a format not amenable to geo-visualization. As shown in FIG. 32, the data servers 310, 312, 314 can be connected to the DMD 306 and/or to one another to maximize operating efficiency of the datastore 306. In some implementations, the data servers 310, 312, 314 and the datastore 306 can be located within the same server system 302, while in other implementations, the data servers 310, 312, 314 and the datastore 306 can be distributed across a network.

The server system 302 can further comprise a workflow module 316 and an access control module 318 through one and/or a number of different types of software programs (i.e., programming logic and/or computer executable instructions) utilizing a variety of different types of measures to control access to the DMD 306. The workflow module 316 and the access control module 318 can be positioned between the client computer 304 and the DMD 306, as shown in FIG. 32, to provide a layer of access control between the client device 304 and the DMD 306 and/or the data servers 310, 312, 314. In other implementations, the access control module 318 and workflow module 316 can be partially and/or substantially implemented in other locations, for example, on the client device 304, and/or within the communications network 308.

In one implementation of the GDMS 300, as shown in FIG. 32, the access control module 318 and workflow module 316 can be separate from the DMD 306 and the servers 310, 312, 314. In other implementations, the access control module 318 and 310, 312, 314. The access control module 318 and workflow module 316, DMD 306, and data servers 310, 312, 314 are shown as separate components in FIG. 32 for simplicity of illustration, but can all be combined into one server system 302, system datastore, and/or network.

The access control module 318 and workflow module 316 can be operatively associated and can control access to different layers of data via the DMD 306 to facilitate control over what users and members can access through the DMD 306. The access control module 318 and workflow module 316 can work in concert to provide a security control function that grants and/or denies a user access to map tiles, information, documents, features, applications, resolution, elevation views, aerial extent views, and/or system access based on the users and members identification. This also allows the DMD 306 to provide only the information, documents, features, and applications that are authorized and relevant to a given user, which can provide workflow efficiencies.

By streamlining user workflow, the availability of information and applications can be assigned by appropriate and relevant scale and/or resolution intervals. In this construct, application icons and information layers can appear and disappear based on the scale and/or resolution presented to the user within the system at any given point in time. This streamlines tasks by eliminating those information and application choices that are not relevant at a certain scale (and hence represent clutter) and by allowing more efficient navigation to the information and application choices that remain, i.e., those that are relevant at a given scale.

The workflow module 316 is a tool, which can also lead users and members though data sets by progressively 'walking' a user through design steps using interactive design tools, which can traverse more than one layer of data. The workflow module 316 can be particularly helpful for novice users and members as they attempt to navigate through the vast amounts of data accessible via the DMD 306. In one exemplary implementation, the features and functionality of the workflow module 316 can be turned on and off based upon the scale and/or resolution that a user attempts to access. In this embodiment, the workflow module 316 can operate by correlating the resolution and/or magnification of the geo-visualization data to conform to a user's level of authorization, thus controlling which users and members are able to view the most detailed and/or secure data.

The workflow module 316 can allow a system administrator to create within the DMD 306 different levels and/or groups of levels of access to the data for each individual within an organization. In this implementation, each individual within an organization can be given an individual profile. The individual profile can include information such as their role and/or security clearance within an organization. The individual profiles can be stored on a database coupled to, and/or integral with, the DMD 306. The profiles and/or lists of users and members can contain information on the level of information, and/or data, that each user is permitted to view. This individual profile can be accessed by the workflow module 316 and/or access control module 318 when individuals attempt to access data through the DMD 306 to permit the individual to have only a pre-determined level of access to data. When individuals attempt to access the DMD 306, their individual identities can be linked to their profile such that their access to the DMD 306 can be referenced and/or validated before they are permitted to access the DMD 306.

The workflow module 316 and access control module 318 can also allow system administrator of the DMD 306 to create and edit different levels of access to data for individuals and/or groups within an organization. For example, in the military, all individuals having equivalent rank and/or security clearance can have the same amount of access to the data within the datastore 306. Thus, the limited access is applied uniformly to the entire group of individuals, such that all of the individuals in the group have the same level of access to the data. This can be referred to as 'hierarchical access control' because groups and/or individuals can be grouped together for purposes of determining server-side access control levels.

Alternately, in an implementation of the GDMS 300 in an open and/or public platform, rather than a system internal to and/or controlled by a particular organization, access to data can be controlled based merely upon geospatial attributes, for example, the geospatial location (coordinates) of a tile request, scale of a tile request, resolution of a tile request, payment for access, the combination of layers requested, and/or freshness and/or staleness of data requested. Another example of a geospatial attribute can be the ability to download a geospatial dataset as opposed to merely having the ability to view a geo-visualization of such data, e.g., as a layer and/or set of features, e.g., Product, Goods & Services Geographic Mapping-Company/Local Information-Social Networking (PSR-GM-C/L&SC-SN) information. A further example of a geospatial attribute can be the ability to save and/or bookmarks geo-visualization states defines by various combinations of underlying mar tiles and overlying layers and features for easily returning to such states as opposed to having to recreate the same filter query to return to a prior state. In such a public platform, contributors of GM and/or GIS data accessible for geo-visualization can place limits and/or restrictions on the availability of and/or accessibility of the GM and/or GIS data. A public implementation of the workflow module 316 can be used as an interface for data sources to either upload data to the DMD 306 and/or otherwise register data with the DMD 306 so that the DMD 306 can locate and access the data from a remote server and/or data store managed by the data source.

In order to place access restrictions on data, the data source can use the workflow module 316 to tag and/or otherwise encode an entire dataset and/or portions of the dataset with restriction instructions associated with one and/or more geospatial attributes. In one implementation, the workflow module 316 can provide tools to tag datasets, for example, using extensible mark-up language (XML) to indicate the presence and nature of a restriction tied to a particular map tile, data layer, and/or feature. In an alternate embodiment, a data source can encode a dataset itself as long as the tags are in a language and format that the DMD 306 understands.

As depicted in FIG. 32, the access control module 318 can be understood as composed of a number of functional sub-modules for implementing a public platform with controlled access to GM and/or GIS data. Such sub-modules can include, for example, a bounding box restriction module 320, a scale determination module 322, a layer comparison module 324, an authorization module 326, a temporal determination module 328, and a payment processing module 330. Each of these modules can provide separate functionality, but often can operate in conjunction with each other to make an access control determination as further described below. It can be desirable to control access to data for a variety of reasons, for example, to generate revenue for a particular data source.

The bounding box restriction module 320 within the access control module 318 can be used to provide a gross initial screening to determine whether a tile request by a user falls within the range of a bounding box that is entirely off-limits for presentation without a password and/or certificate due to proprietary and/or security concerns. The bounding box restriction module 320 monitors all tile requests for GM and/or GIS data to determine whether any of the requested tiles falls within a restricted bounding box. The bounding box can be also understood as defining a collection of records in a GM and/or GIS database that have geospatial coordinate fields associated with the data with values falling within the range of the bounding box. An additional field in the data records can indicate whether there is a restriction placed on the data record and the nature of the restriction.

If a requested tile is restricted, then the bounding box restriction module 320 can interface with the DMD 306 and instruct that the requested GM and/or GIS data and/or the tiles thereof that fall within the bounding box be withheld from delivery by the DMD 306 to the client 304. However, this access restriction can be overridden if the requestor can provide a valid password and/or certificate as further discussed below. The functions provided by the bounding box restriction module 320 can be used by the other modules within the access control module 318 in order to identify the geographic boundaries of a map tile request and/or data layer.

The scale determination module 322 can be used to control access to data based upon the scale and resolution of the GM and/or GIS data requested. The term "scale" is used herein in the cartographic sense, e.g., 1 cm: 1 km (1 cm of the image presented on the screen corresponds to 1 km in real terms), whereas "resolution" refers to the sharpness of the image file available for presentation on the screen (e.g., the number of pixels and/or dots per inch in a raster image). A large scale, e.g., 1:1 generally will correspond to an image of high resolution whereas a small scale, e.g., 1:100,000 will generally correspond to an image of low resolution as there is a limited ability of a presentation screen to present a very high resolution at a small scale—there is physically no room. In the context of access control, it can be perfectly acceptable to provide map tiles of a particular coordinate area at a scale of 1 cm: 100 m at a relatively coarse resolution (e.g., 60 dpi), but it can be unacceptable to provide a larger scale (e.g., 1 cm: 1 m) at a high resolution (e.g., 300 dpi), and/or at any resolution at all, e.g., because that combination of scale and resolution has a premium value and is coded as inaccessible without payment of a fee.

The scale determination module 322 monitors requests for GM and/or GIS data having a scale and/or resolution attribute. If there is a scale and/or resolution change requested, the scale determination module 322 can interface with the DMD 306 and request that the GM and/or GIS data be held for screening by the scale determination module 322 to determine whether the requested GM and/or GIS data has a scale and/or resolution restriction, and/or a combination thereof, and the nature of the restriction.

The layer comparison module 324 can be used to control access to data based upon the types and combinations of data layers of the GM and/or GIS data requested for overlay on a map. For example, it can be perfectly acceptable to provide a geo-visualization of a data layer showing locations of Products, Goods & Services-Geographic Mapping-Company/Local Information-Social Networking (PSR-GM-C/L&SC-SN) information. In a further implementation, the layer comparison module 324 can be configured to save identifying information of a user making a layer combination request associated with interaction relating to one and/or more Products, Goods & Services-Geographic Mapping-Company/Local Information-Social Networking (PSR-GM-C/L&SC-SN) information.

In each of the examples of geospatial attribute-driven access control presented above, it is noted that request denials of map tiles and/or data layers can be overridden by the provision of a valid certificate and/or password. The authorization module 326 provides an opportunity for requestors to enter a password, certificate, and/or other identification sufficient to overcome a denial of presentation of a requested map region, data layer, and/or feature. In such a case, if a requester enters the appropriate password and/or presents an appropriate certificate, the authorization module 326 can direct the DMD 306 to access and present the requested GM and/or GIS data.

Another exemplary function of the access control module 318 can be embodied in the temporal determination module 328 that allows and/or denies access to map tiles and/or layers based upon the age of the information comprising the particular dataset, e.g. Products, Goods & Services-Geographic Mapping-Company/Local Information-Social Networking (PSR-GM-C/L&SC-SN) information. In an example, data that is significantly older can develop additional value again for use in temporal studies to identify trends. In such a case, the data can again only be accessible upon payment of a fee for the service. The temporal determination module 328 manages the temporal worth of GM and/or GIS data, for example, by examining time stamps associated with particular GM and/or GIS datasets and comparing the timestamps to any tags that can be encoded with the data indicating that the GM and/or GIS dataset is subject to a fee for service within particular ranges of age.

A further exemplary function of the access control module 318 can be the acceptance of payment for access to GM and/or GIS datasets through the payment processing module 330. Upon receipt of a request for a GM and/or GIS dataset, the payment processing module 330 can query the relevant datastore to determine whether the dataset is subject to a fee for service, for example membership, registration, and/or subscription for website access for providing coupons and/or discounts and associated company, local information, including socially conscious information, such as Product, Goods & Services-Geographic Mapping-Company/Local Information-Social Networking (PSR-GM-C/L&SC-SN) information. If so, the payment processing module 330 can instruct the DMD 306 to withhold delivery of a dataset to a requestor until payment is made. In an alternate implementation, the payment processing module 330 can maintain a schedule of fees charged by each contributor for particular datasets and compare incoming dataset requests with the schedule to determine whether a fee is required to access the data and instruct the DMD 306 accordingly. In another implementation, upon payment of a fee for access to a restricted dataset, the payment processing module 330 can issue a password and/or certification to the requester who would then present the password/certificate to the authorization module 326 to seek access to the dataset through that component. The payment processing module 330 can actually accept and process access payments from requesters, and/or it can interface with a third party payment processing service (e.g., PayPal™) to actually process fund transfers.

FIG. 33 depicts an exemplary set of access control operations 400 that can be performed according to one implementation of an access control module within a GDMS. Initially the access control module receives a tile request in a receiving operation 402 associated with one and/or more Products, Goods & Services-Geographic Mapping-Company/Local Information-Social Networking (PSR-GM-C/L&SC-SN) information. It should be understood that any request from a client device for GM and/or GIS data, e.g., Products, Goods & Services-Geographic Mapping-Company/Local Information-Social Networking (PSR-GM-C/L&SC-SN) information be it a particular map and/or a dataset for a layer and/or a feature and/or even a document, will necessarily be associated with one and/or more map tiles. In order to present a geo-visualization interface, all of the data can have a reference to particular geospatial coordinates, which can optionally broken down in units of map tiles.

Once a tile request is received, the access control module can next identify a bounding box containing all the tiles in the tile request in identification operation 404. Creation of a bounding box allows the access control module to easily determine whether access is restricted to presentation of any of the map tiles requested. In a comparison operation 406, the access control module can simply compare whether any of the entire region of the bounding box intersects with a geospatial attribute that can be subject to a presentation restriction. Recall that there can be any number of geospatial attributes that can be designated as having restriction requirements, for example, the geospatial location (coordinates) of a tile request itself, the scale of the tile request, resolution of a tile request, an angle of view (e.g., plan, aerial, street level, etc.), payment for access, the combination of layers requested, and/or the freshness and/or staleness of data requested. If there are no geospatial attribute restrictions associated with any of the tiles in the bounding box, the process 400 can approve all of the tiles and instruct the DMD to send the particular map tiles, layer dataset, features, and/or other information in sending operation 408.

If the access control module recognizes that there is a restriction associated with one and/or more of the tiles in the bounding box, the access control module can next determine what kind of geospatial attribute is implicated in the bounding box restriction in checking operation 410. The access control module can then invoke one and/or more of the sub-modules described above for further processing assistance. The appropriate sub-module(s) can first determine whether an actual restriction must be imposed on the data request pursuant to the geospatial attribute in determination operation 412. This operation determines whether the requested a value of the geospatial dataset and/or feature actually conflicts with the restriction set by the data contributor. For example, the tile request at a resolution value restricted by the data contributor without additional authorization and/or payment and the tile would be considered actually restricted. Alternatively, if the tile request is at a resolution value within the allowable bounds set by the contributor, then the attribute of the request would not be considered restricted and the tiles and/or associated data would be approved for presentation in sending operation 408.

If the geospatial attribute associated with the tile request is found to be "set high," then the access control module will request that some form of authentication be presented by the requester before the data are released for presentation in requesting operation 414. Responses to the requesting operation are then examined in determination operation 416 to determine what information should be provided relating to Products, Goods & Services-Geographic Mapping-Company/Local Information-Social Networking (PSR-GM-C/L&SC-SN) information. Similarly, if the GM and/or GIS dataset is a premium service requiring additional payment, upon payment by the requester the access control module can approve the request and the tile are sent in sending operation 408. If a requester cannot provide the appropriate password and/or certification, and/or chooses not to pay for a premium service, then the access controller will deny the tile request in denying operation 418. The GDMS can either inform the requester that the request has been denied and/or alternatively return a GM and/or GIS data set as responsive as possible to the request, but without providing the restricted information.

Some implementations described herein can be implemented as logical steps in one and/or more computer systems. The logical operations of the described systems, apparatus, and methods are implemented (1) as a sequence of processor-implemented steps executing in one and/or more computer systems and (2) as interconnected machine modules within one and/or more computer systems. The implementation is a matter of choice, dependent on the performance requirements of the computer system implementing the described system, apparatus, and method. Accordingly, the logical operations making up the implementations of the systems, apparatus, and methods described herein are referred to variously as operations, steps, objects, and/or modules.

In some implementations, articles of manufacture are provided as computer program products that cause the instantiation of operations on a computer system to implement the invention. One implementation of a computer program product provides a computer program storage medium readable by a computer system and encoding a computer program. Another implementation of a computer program product can be provided in a computer data signal embodied in a carrier wave by a computing system and encoding the computer program.

Figure 34:
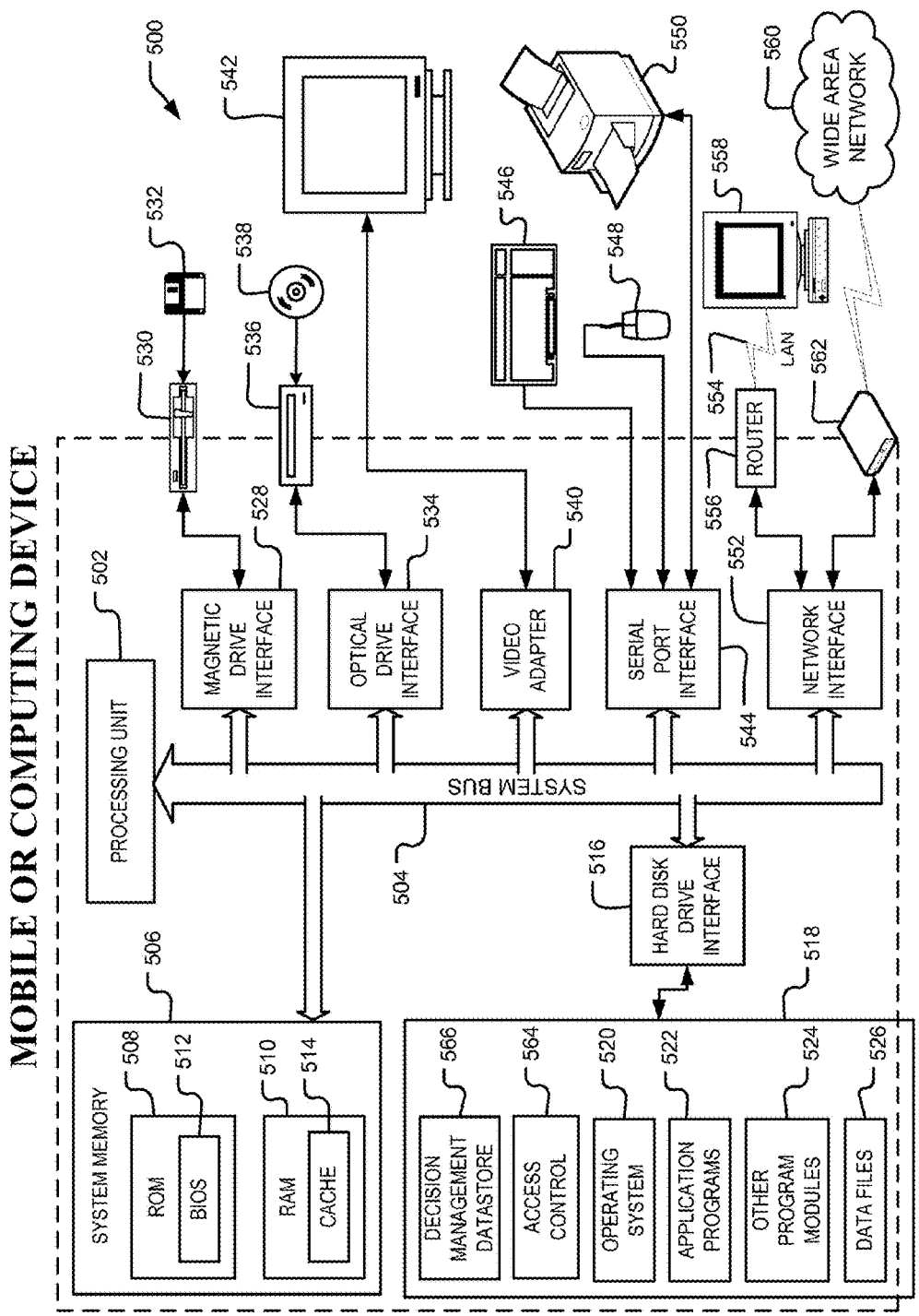
FIG. 34 is a schematic diagram of an exemplary implementation of a general purpose computer system that that can be used to implement various aspects of a geospatial decision management system, including access control.

An exemplary computer system 500 for implementing the file origin determination processes above is depicted in FIG. 34. The computer system 500 can be a computer server with internal processing and memory components as well as interface components for connection with external input, output, storage, network, and other types of peripheral devices. Internal components of the computer system in FIG. 34 are shown within the dashed line and external components are shown outside of the dashed line. Components that can be internal and/or external are shown straddling the dashed line. Alternatively to a server, the computer system 500 can be in the form of any of a personal computer (PC), a notebook and/or portable computer, a tablet PC, a handheld media player (e.g., an MP3 player), a smart phone device, a video gaming device, a set top box, a workstation, a mainframe computer, a distributed computer, an Internet appliance, and/or other computer devices, and/or combinations thereof.

The computer system 500 includes a processor 502 and a system memory 506 connected by a system bus 504 that also operatively couples various system components. There can be one and/or more processors 502, e.g., a single central processing unit (CPU), and/or a plurality of processing units, commonly referred to as a parallel processing environment. The system bus 504 can be any of several types of bus structures including a memory bus and/or memory controller, a peripheral bus, a switched-fabric, point-to-point connection, and a local bus using any of a variety of bus architectures. The system memory 506 includes read only memory (ROM) 508 and random access memory (RAM) 510. A basic input/output system (BIOS) 512, containing the basic routines that help to transfer information between elements within the computer system 500, such as during start-up, is stored in ROM 508. A cache 514 can be set aside in RAM 510 to provide a high speed memory store for frequently accessed data.

A hard disk drive interface 516 can be connected with the system bus 504 to provide read and write access to a data storage device, e.g., a hard disk drive 518, for nonvolatile storage of applications, files, and data. A number of program modules and other data can be stored on the hard disk 518, including an operating system 520, one and/or more application programs 522, other program modules 524, and data files 526. In an exemplary implementation, the hard disk drive 518 can further store access control module 564 for restricting access to map and data files and the decision management datastore 566 for housing and managing GM and/or GIS databases according to the exemplary processes described herein above. Note that the hard disk drive 518 can be either an internal component and/or an external component of the computer system 500 as indicated by the hard disk drive 518 straddling the dashed line in FIG. 37. In some configurations, there can be both an internal and an external hard disk drive 518.

The computer system 500 can further include a magnetic disk drive 530 for reading from and/or writing to a removable magnetic disk 532, tape, and/or other magnetic media. The magnetic disk drive 530 can be connected with the system bus 504 via a magnetic drive interface 528 to provide read and write access to the magnetic disk drive 530 initiated by other components and/or applications within the computer system 500. The magnetic disk drive 530 and the associated computer-readable media can be used to provide nonvolatile storage of computer-readable instructions, data structures, program modules, and other data for the computer system 500.

The computer system 500 can additionally include an optical disk drive 536 for reading from and/or writing to a removable optical disk 538 such as a CD ROM and/or other optical media. The optical disk drive 536 can be connected with the system bus 504 via an optical drive interface 534 to provide read and write access to the optical disk drive 536 initiated by other components and/or applications within the computer system 500. The optical disk drive 530 and the associated computer-readable optical media can be used to provide nonvolatile storage of computer-readable instructions, data structures, program modules, and other data for the computer system 500.

A display device 542, e.g., a monitor, a television, and/or a projector, and/or other type of presentation device can also be connected to the system bus 504 via an interface, such as a video adapter 540 and/or video card. Similarly, audio devices, for example, external speakers and/or a microphone (not shown), can be connected to the system bus 504 through an audio card and/or other audio interface (not shown).

In addition to the monitor 542, the computer system 500 can include other peripheral input and output devices, which are often connected to the processor 502 and memory 506 through the serial port interface 544 that is coupled to the system bus 506. Input and output devices can also and/or alternately be connected with the system bus 504 by other interfaces, for example, a universal serial bus (USB), a parallel port, and/or a game port. A user can enter commands and information into the computer system 500 through various input devices including, for example, a keyboard 546 and pointing device 548, for example, a mouse. Other input devices (not shown) can include, for example, a microphone, a joystick, a game pad, a tablet, a touch screen device, a satellite dish, a scanner, a facsimile machine, and a digital camera, and a digital video camera. Other output devices can include, for example, a printer 550, a plotter, a photocopier, a photo printer, a facsimile machine, and a press (the latter not shown). In some implementations, several of these input and output devices can be combined into a single device, for example, a printer/scanner/fax/photocopier. It should also be appreciated that other types of computer-readable media and associated drives for storing data, for example, magnetic cassettes and/or flash memory drives, can be accessed by the computer system 500 via the serial port interface 544 (e.g., USB) and/or similar port interface.

The computer system 500 can operate in a networked environment using logical connections through a network interface 552 coupled with the system bus 504 to communicate with one and/or more remote devices. The logical connections depicted in FIG. 34 include a local-area network (LAN) 554 and a wide-area network (WAN) 560. Such networking environments are commonplace in home networks, office networks, enterprise-wide computer networks, and intranets. These logical connections can be achieved by a communication device coupled to and/or integral with the computer system 500. As depicted in FIG. 34, the LAN 554 can use a router 556 and/or hub, either wired and/or wireless, internal and/or external, to connect with remote devices, e.g., a remote computer 558, similarly connected on the LAN 554. The remote computer 558 can be a PC client, a server, a peer device, and/or other common network node, and typically includes many and/or all of the elements described above relative to the computer system 500.

To connect with a WAN 560, the computer system 500 typically includes a modem 562 for establishing communications over the WAN 560. Typically the WAN 560 can be the Internet. However, in some instances the WAN 560 can be a large private network spread among multiple locations. The modem 562 can be a telephone modem, a high speed modem (e.g., a digital subscriber line (DSL) modem), a cable modem, and/or similar type of communications device. The modem 562, which can be internal and/or external, is connected to the system bus 518 via the network interface 552. In alternate embodiments the modem 562 can be connected via the serial port interface 544. It should be appreciated that the network connections shown are exemplary and other means of and communications devices for establishing a communications link between the computer system and other devices and/or networks can be used. Connection of the computer system 500 with a WAN 560 allows the decision management datastore 566 the ability to access remote GM and/or GIS datastores to provide for a distributed GM and/or GIS platform.

All directional references (e.g., proximal, distal, upper, lower, upward, downward, left, right, lateral, front, back, top, bottom, above, below, vertical, horizontal, clockwise, and counterclockwise) are only used for identification purposes to aid the readers understanding of the present invention, and do not create limitations, particularly as to the position, orientation, and/or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Figure 35:
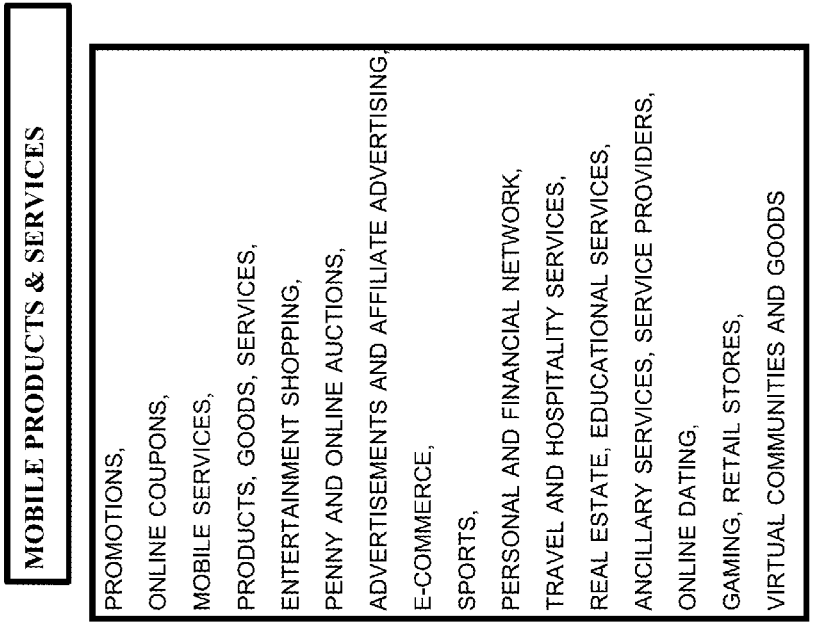
FIG. 35 is flow chart and a list of representative products and services that can be provided in combination with geospatial mapping, socially responsible information, local, global and company information, social networking, and charity/aid, according to the present invention. As presented in FIG. 35, the present invention provides in one aspect a delivery system for a geospatial website for a multidimensional representation of information and/or scalable versions of web and mobile device content for an infrastructure and global platform that provides users and members and businesses of all types and sizes with access to broad markets for the delivery of promotions, online coupons, mobile services, Products, Goods & Services, entertainment shopping, penny auctions or online auctions, advertisements and affiliate advertising, e-commerce, media and entertainment, sports, personal and financial network, travel and hospitality services, real estate, educational services, ancillary services, advertisements and affiliate advertising, service providers, social networking, social networking communities, online dating, gaming, retail stores, virtual communities and virtual goods, microloans or microcredit, humanitarian aid and support other worldly causes through charitable donations (collectively referred to as "Products, Goods & Services" as any product or service or subgroup thereof) through combined Products, Goods and Service with Geospatial Mapping/Company-Local Information/Social Networking/Communities ("PGS-GM-CL/I-SN") on a three dimensional geospatial platform using geospatial mapping technology.

As presented in FIG. 35, The present invention provides in one aspect a delivery system for a geospatial website for a multidimensional representation of information and/or scalable versions of web and mobile device content for an infrastructure and global platform that provides users and members and businesses of all types and sizes with access to broad markets for the delivery of promotions, online coupons, mobile services, Products, Goods & Services, entertainment shopping, penny auctions or online auctions, advertisements and affiliate advertising or services from merchants and sellers from around the world for such items as: e-commerce, media and entertainment, sports, personal & financial network, travel & hospitality services, real estate, educational services, ancillary services, advertisers, service providers, social networking, online dating, gaming, retail stores, virtual communities and virtual goods end user's online activity, location, online communications, search inquiries, social networking, social networking communities, social plugins, promotions, social applications, entertainment shopping, bidding, bidding behavior, bidding results, advertisements, purchasing, behavior, buying patterns and other criteria for collection and analysis used to provide customized promotional website displays of promotions, online coupons, mobile services, Products, Goods & Services, entertainment shopping, penny auctions or online auctions, advertisements and affiliate advertising or services from merchants and sellers from around the world, service providers and related company and local information using three-dimensional and scalable geospatial mapping. (collectively referred to as "Products, Goods & Services" as any product or service or subgroup thereof) through combined Products, Goods and Service with Geospatial Mapping/Company-Local Information/Social Networking/Communities ("PGS-GM-CL/I-SN") on a three dimensional geospatial platform using geospatial mapping technology.

FIG. 36 presents a flow chart showing a typical transaction for the purchase a Social Earth online coupons, mobile services, Products, Goods and Service, entertainment shopping, penny auctions or online auctions, advertisements and affiliate advertising or services from merchants and sellers from around the world that provides a portion of the sale proceeds will be allocated to microloans or microcredit, humanitarian aid and support other worldly causes through charitable donations. "View Social Earth promotions, online coupons, mobile services, Products, Goods & Services, entertainment shopping, penny auctions or online auctions, advertisements and affiliate advertising or services from merchants and sellers from around the world, retail stores, virtual communities and virtual goods and information about microloans or microcredit, humanitarian aid and support other worldly causes through charitable donations from around the world by geo-target location or anywhere in the world on the present inventions unique "live view" of the planet."

POTENTIAL ASPECTS OR ELEMENTS OF THE CLAIMED INVENTION THAT CAN BE OPTIONALLY EXCLUDED OR NEGATIVELY CLAIMED. The present invention can also in particular claimed embodiments exclude or negatively claim one or more aspect of the following list, e.g., to more particularly recite or exclude embodiments or elements that might occur in cited or other published art. Accordingly, the present invention can optionally exclude, not include, or not provide, one of more, or any combination of, promotion, online coupons, mobile services, entertainment shopping, penny auctions or online auctions, advertisements and affiliate advertising or services for such items as e-commerce, media and entertainment, sports, personal & financial network, real estate, educational services, ancillary services, advertisements, service providers, social networking, social networking communities, social networking activities, social plugins, promotions, social applications, entertainment shopping, penny auctions or online auctions, advertisements and affiliate advertising or services, social networking, social networking communities, messaging, online communications, user profiles, viewing public & private user profiles, online dating, gaming, and/retail stores, virtual communities and virtual goods and information about microloans or microcredit, humanitarian aid and support other worldly causes through charitable donations or sustainable gifts, e.g., but not limited to, various types of real estate (e.g. vacant land, residential, commercial, recreational, retail, shopping malls, hotels, motels, golf courses, resorts, marinas, industrial, vacation, time shares, condominiums, multifamily, and other types of real estate etc.), travel & hospitality services, educational services, ancillary services, (e.g. brokers, agents, relocation services, internet marketing, concierge, transportation, entertainment, lenders, appraisers, education, developers, contractors, inspectors, home improvements/remodeling, basement designs, landscaping, home warranties, insurance, indoor & outdoor furniture, fixtures, windows, siding, roofing, heating/cooling, solar, plumbing, electrical, mechanical, and additional services etc.) and providing other services such as loans and quotes, auto loans, mortgages, banking services, family fun, sports, restaurants, events, consumer packaged goods, groceries, apparel, beverages, books & magazines, foods, health care, household, office, personal care, pet care, photography, autos, business, classic car parts, restoration and maintenance services, collectibles & art, custom car parts, restoration and maintenance services, deals & gifts education, electronics, fashion, financial, healthcare, home, outdoor & décor, travel & hospitality services, insurance, online services, other legal, marketing, medical facilities, medical insurance, medical retailers, motors, pets, physicians, dentists, other practioners, public services, psychics, mediums & spiritual advisors, travel & hospitality, real estate, ancillary services, sports, travel, tourism, wedding, parties & media and entertainment, online dating, and the like. The present invention can also exclude one or more of the following: (1) finding social awareness of companies found in patent searches; (2) showing entities such as companies on maps; (3) finding local travel & hospitality, real estate, educational services & ancillary service providers and other types of service providers on map searches; (4) ranking entities found using geospatial mapping; (5) representing objects (e.g., brand or logo or product) of entities on a geospatial map; (6) providing local comparative shopping information to members on a website; and/or (7) modeling user views to include objects (brand, logo, or product) of entities in local environment.

Although various embodiments of this invention have been described above with a certain degree of particularity, and/or with reference to one and/or more individual embodiments, those skilled in the art could make numerous alterations to the disclosed embodiments without departing from the spirit and/or scope of this invention. And while the subject matter has been described in language specific to structural features and/or methodological arts, it is to be understood that the subject matter defined in the appended claims is not necessarily limited to the specific features and/or acts descried above. Rather, the specific features and acts described above are disclosed as example forms of implementing the claimed subject matter. It is intended that all matter contained in the above description and/or shown in the accompanying drawings shall be interpreted as illustrative only and not limiting. Changes in detail and/or structure can be made without departing from the basic elements of the invention as defined in the following claims.

EXAMPLES

Exemplary Implementation of Non-Limiting Embodiments of the Present Invention

The following example is shown by way of example and is not intended to limit the scope of the present invention in any way.

Example 1

Social Earth, Inc.: Description of Present Invention Example

The present invention in a non-limiting embodiment called SOCIAL EARTH™ provides, in one aspect, for an infrastructure and global platform that provides users and members and businesses of all types with access to broad markets for the delivery of Social Earth promotions, online coupons, mobile services, Products, Goods & Services, entertainment shopping, penny auctions or online auctions, advertisements and affiliate advertising or services from merchants and sellers from around the world to its highly-engaged Social Shoppers via its unique live view of the planet. The site includes links to places and events, data on the landscape, interactive 360 panoramas, fly-through shopping tours with stunning 3D imagery and videos, advertising on the landscape, advanced search for private and public information, social networking integration, self-posting for uploading user generated content, custom tools, apps, widgets and other embodiments. SOCIAL EARTH™ will include Social Earth Mobile allowing Social Shoppers to receive Social Earth Mobile Coupons for Products, Goods & Services, entertainment shopping, penny auctions or online auctions, advertisements and affiliate advertising or services based upon their precise location. Mobile apps for smart phones (Android and tablets, iPhone, iPod Touch and iPad) are provided that will allow Social Shoppers to receive Social Earth Mobile products, services, or retail based upon their precise location or other criteria, such as shopping or interest preferences. With Social Earth Mobile, Social Shoppers can explore the same 3D imagery and terrain as the desktop version. Fly to your current location or just about anywhere in the world with the touch of a button. Pan, zoom, and tilt your view as you travel around the globe. Search for cities, places and businesses around the world. View layers of geographic information and more. The invention provides opportunities to reach people at the point of shopping—a benefit both to shoppers and merchants. What do you get when you combine a global marketplace with buyers and sellers and promotions, online coupons, Products, Goods & Services, entertainment shopping, penny auctions or online auctions, advertisements and affiliate advertising or services from merchants and sellers from around the world, including without limitation, for such items as products, services, e-commerce, media and entertainment, sports, personal & financial network, real estate, educational services, ancillary services, advertisements, service providers, social networking, online dating, gaming, retail stores, virtual communities and virtual goods and information about microloans or microcredit, humanitarian aid and support other worldly causes through charitable donations or sustainable gifts, the social media revolution and the power of geo-mapping technology? You get a cutting-edge online experience that blends the best of online shopping and social networking and takes it to a stratospheric new height called SOCIAL EARTH™.

Unlike any other shopping site, when Social Earth site subscribers called Social Shoppers (OR SE SHOPPERS), visit the Social Earth website, e.g., at www.socialearth.co, they are invited to travel virtually around the globe in search of promotions, online coupons, mobile services, Products, Goods & Services, entertainment shopping, penny auctions or online auctions, advertisements and affiliate advertising or services from merchants and sellers from around the world. This one-of-a-kind website aggregates promotions, online coupons, mobile services, Products, Goods & Services, entertainment shopping, penny auctions or online auctions, advertisements and affiliate advertising or services from merchants and sellers from around the world (collectively referred to as "Social Earth Shopping") and showcases them in their actual, physical location on the websites through GPS technology and unique "live view" of Earth. As Social Shoppers shop the world for coupons, products, goods & services, they can view Social Earth Shopping from major brands for promotions, online coupons, mobile services Products, Goods & Services, entertainment shopping, penny auctions or online auctions, advertisements and affiliate advertising or services from merchants and sellers from around the world for such items as: products, goods & services, service providers, media and entertainment, sports, personal & financial network, travel & hospitality services, real estate, educational services, ancillary services, advertisements, service providers, social networking, online dating, gaming, retail stores, virtual communities and virtual goods and information about microloans or microcredit, humanitarian aid and support other worldly causes through charitable donations or sustainable gifts, e.g., but not limited to, online auctions, various types of real estate (e.g. vacant land, residential, commercial, recreational, retail, shopping malls, hotels, motels, golf courses, resorts, marinas, industrial, vacation, time shares, condominiums, multifamily, and other types of real estate etc.), educational services, ancillary services, loans and quotes, auto loans, mortgages, banking services, and/or any other product or service, e.g., but not limited to, family fun, sports, restaurants, events and hundreds of top consumer packaged goods brands for groceries, apparel, beverages, books & magazines, foods, health care, household, office, personal care, pet care, photography and other embodiments.

Social Shoppers will find great promotions, online coupons, mobile services, Products, Goods & Services, entertainment shopping, penny auctions, or online auctions, advertisements and affiliate advertising or services from merchants and sellers from the leading travel & hospitality industry, restaurants, toy and entertainment companies and top retailers around the world. Social Shoppers can select a target location in the U.S., e.g., but not limited to, Atlanta, Austin, Dallas, Denver, San Diego, San Francisco or in other cities around the world. Social Shoppers can find product or services deals in London or they can tour the planet at will, jumping from Hong Kong to Amsterdam to Buenos Aires to check out the bargains. Because the Earth view comes live from satellite and webcam images, shoppers can zoom in for a closer look or zoom out to gain perspective on the location.

SOCIAL EARTH™ will offer advertising opportunities for service providers, business centers, affiliates and business owners e.g. for business services, healthcare services, specialty financial services, consumer products, specialty retail and media and entertainment, lenders, mortgage companies, auto finance companies and other business owners' who want to reach millions of users and members online on Social Earth. Advertisements will appear at the top of consumers' property and service provider search results ahead of other properties meeting their search criteria. Realtors, mortgage lending, auto finance, financial services, healthcare, travel & hospitality services, cars, insurance, online education, government services, media and entertainment and sports industry, travel industry, top internet advertisers, social brands and thousands of service providers, business owners and affiliates will have the ability to purchase advertising space, which will appear at the top of consumers' property and service provider search results ahead of other properties meeting their search criteria. Consumers can learn about neighborhoods, property values, schools, shopping centers, and cost of living features and join with thousands of service providers and business owners from around the world. Our goal is to help consumers conveniently connect with thousands of service providers and business owners to find what they're looking for in our Social Earth Personal Network.

SOCIAL EARTH™ will also provide links and free real estate information and mortgage quotes from national lenders and mortgage companies for the purchase of a new home, refinance, consolidating debt, auto loans, insurance quotes or home equity loans. The SOCIAL EARTH™ database will include links to millions of residential listings, commercial properties and thousands of service providers and business owners. Millions of users and members will search online and align with thousands of service providers and business owners in search of everything from "A" to "Z" whether its buying a home or a new or used car, finding an apartment or a medical professional or healthcare provider, booking travel, weather updates, breaking news, reading about your favorite celebrity or entertainer or sports' team, SOCIAL EARTH™ has it all.

The Company's website will populate the virtual landscape with various types of real estate (e.g. vacant land, residential, commercial, recreational, retail, shopping malls, hotels, motels, golf courses, resorts, marinas, industrial, vacation, time shares, condominiums, multifamily, and other types of real estate, etc.), travel & hospitality services, educational services, ancillary services (e.g. brokers, agents, relocation services, internet marketing, concierge, transportation, hospitality, lenders, appraisers, education, developers, contractors, inspectors, home improvements/remodeling, basement designs, landscaping, home warranties, insurance, indoor & outdoor furniture, fixtures, windows, siding, roofing, heating/cooling, solar, plumbing, electrical, mechanical, and additional etc.), advertisements from service providers and various links from the desired search request. Consumers can zoom in and out of the Social Earth Personal Network, click on advertisements and links and see the exact location of a business, retailer, restaurant or shopping mall on the landscape. Advertisements will appear at the top of the consumers' property and service provider search results. Home buyers and renters can learn about neighborhoods, property values, apartments, schools, shopping centers, cost of living and connect with thousands of real estate professionals, educational services, ancillary services and other service providers and business owners from around the world. The SOCIAL EARTH™ Personal Network will allow consumers too easily and conveniently search for all of their personal and financial services from the comfort of their home. The future of searching for all of your personal and financial needs via the Internet is here with the development of a SOCIAL EARTH™ Personal Network.

SOCIAL EARTH™ displays, organizes and delivers information across many social layers and social media sites featuring top-notch content, stunning satellite imagery, aerial photography and graphic animated color overlays on top of Google Earth™. SOCIAL EARTH™ delivers a delightful mash-up of content, Social Earth Shopping and live social networking feeds from, e.g., Twitter™. Social Earth™ utilizes the top social networking platforms such as Facebook™ and Twitter™ to allow Social Shoppers to share the latest product or services deals with their friends. Unlike Groupon™, Livingsocial™ or Google Offers™, SOCIAL EARTH™ aggregates Social Earth Shopping on its site. Social Shoppers are encouraged to share these product or services deals with their friends in Facebook™ and Twitter™. The global sharing capabilities are built into SOCIAL EARTH™ technology using sophisticated technology integrating geospatial mapping, layering location-relevant data, and GPS technologies.

Social Shoppers are able to find great products or services in their local areas or just about anywhere else in the world with the click of a mouse or input on their mobile device. Capitalizing on the popularity of social networking giants such as Facebook™ and Twitter™ with more than 750 million users worldwide, SOCIAL EARTH™ creates an online community that taps into the power of social networking by integrating live social feeds from these social networking giants directly into its website. By creating a highly engaged social networking community, Social Earth creates "stickiness," keeping the Social Shoppers on the site for long periods of time, as well as bringing them back again and again. In other words, SOCIAL EARTH™ provides long-time customer loyalty, not just a one-off deal.

Social Earth™ also provides microloans or microcredit and donates a portion of each "Social Earth online coupon, mobile services, Products, Goods or Services" that are sold on Social Earth will be allocated to microloans or microcredit, humanitarian aid or other worldly cause or sustainable gift to help those in need. The community aspect of SOCIAL EARTH™ is the driver behind building awareness of the website and its featured promotions, online coupons, mobile services, Products, Goods & Services, entertainment shopping, penny auctions or online auctions, advertisements and affiliate advertising or services from merchants and sellers from around the world. Existing and potential customers provide advertising by spreading the word to their friends about the great product or services deals they have found on a shopping site such as SOCIAL EARTH™. Add to that the power of collective buying and its easy to see how the SOCIAL EARTH™ community can leverage group size in exchange for larger discounts. Social Earth delivers promotions, online coupons, mobile services, Products, Goods & Services, entertainment shopping, penny auctions or online auctions, advertisements and affiliate advertising or services from merchants and sellers from around the world to its Social Shoppers via its unique live view of the Earth that includes links to places and events, data on the landscape, interactive 360 panoramas, fly-through shopping tours with stunning 3D imagery. The use of geospatial mapping for associating information to specific places can included, but it not limited to, one or more of: Live links to places and events; Data on the landscape; Zoom to birds-eye and human scale views; 3D custom audio/visual content; Interactive 360 panoramas; Fly-through tours with content, narration, music; Stunning imagery and videos; 3D buildings and landscaping e-commerce and mobile banking tools and hooks; Advertising on the landscape; Advanced search for private and public information; Social networking integration; Self-posting for uploading user generated content; Custom tools, apps and widgets; and the like. SOCIAL EARTH™ Mobile sends mobile coupons to Social Shoppers based upon their precise location. This provides opportunities to reach people at the point of shopping—a benefit both to shoppers and merchants.

Social Layers. Social Shoppers virtually travel around the globe in search of shopping products or services, as well as bargains. Social Earths technology will drive content, promotions, online coupons, mobile services, Products, Goods & Services, entertainment shopping, penny auctions or online auctions, advertisements and affiliate advertising or services from merchants and sellers from around the world into a "virtual Earth" based upon their precise location and GPS technology. Social Shoppers will be able to view Social Earth™ Shopping from around the world by geo-target location, their hometown or another city around the world and virtually travel there. This one-of-a-kind website aggregates Social Earth™ Shopping from around the world and showcase them in their actual, physical location on the virtual Earth. Because the virtual Earth is "interactive," one can zoom in for a more detailed view or zoom out to gain perspective on where they are in the world. Social Earth™ Shopping can last for days, weeks or even months. What makes Social Earths website different from other group buying websites is that Social Earth's™ website allows Social Shoppers to search for promotions, online coupons, mobile services, Products, Goods & Services, entertainment shopping, penny auctions or online auctions, as well as advertisements and affiliate advertising or services from merchants and sellers from around the world on a virtual Earth. Users will be able to customize their buying preferences, engage in social networking, social networking communities, social networking activities and support worthwhile causes. Social Earth's™ website allows Social Shoppers to select from a menu of coupons based upon their preferences, which is integrated into the virtual Earth along with other layer location-relevant data as Social Shoppers shop online and interact with their friends on Facebook™ and Twitter™. Advertisers and merchants will send coupons to Social Shoppers based on geo-target location.

Social Earth™ develops layer applications, which are known as "social layers." These social layers allow Social Shoppers to customize their personal experience on SOCIAL EARTH™ as they search for Social Earth™ Shopping in their local area or just about anywhere else in the world based upon their interests or travels take them. Social Shoppers select from a menu of "Purchase" coupon categories such as. (Arts & Entertainment, Travel, Giving Back, Eat & Drink, Deal of the Day) and "Free" coupon categories such as: (Health & Beauty, Sports, Shopping, Groceries). Social Shoppers may be able to search for other products and services such as: Autos, Business, Classic Car Parts, Restoration and Maintenance Services, Collectibles & Art, Custom Car Parts, Restoration and Maintenance Services, Deals & Gifts, Education, Electronics, Fashion, Financial, Healthcare, Home, Outdoor & Décor, Travel & Hospitality Services, Insurance, Online Services, Other Legal, Marketing, Medical Facilities, Medical Insurance, Medical Retailers, Motors, Pets Physicians, Dentists, Other Practioners, Public Services, Psychics, Intuitives, Metaphysical, Mediums & Spiritual Advisors, Real Estate, Educational Services, Ancillary Services, Sports, Tourism, Wedding, Parties & Entertainment, Online Dating and Free Coupons). Social Earth™ drives traffic to its website by targeting Social Earth Shopping from around the world, based upon a users and members preference, which are displayed on a unique "live view" of planet Earth. Once a Social Shopper selects one or more coupon categories, entertainment shopping, penny auctions or online auctions, advertisements and affiliate advertising or services from merchants and sellers from around the world will populate the virtual Earth. Social Shoppers are able to double click on Social Earth Shopping and fly directly to its location on Earth. Social Shoppers can also click on one of the featured cities and take a tour of London, San Francisco or Denver and zoom down to street level to take a closer look. Social Shoppers enjoy the experience of virtually traveling around the world, zooming in and out to street level in search for great product or services deals and sharing the latest product, goods or services, penny auction or online auction with their friends.

In connection with a one-of-a-kind geospatial website aggregates Social Earth™ Shopping from around the world and showcases them in their actual, physical location on the websites unique live view of Earth. As Social Shoppers shop the world for bargains, they can view Social Earth Shopping from major brands for family fun, sports, restaurants, events and hundreds of top consumer packaged goods brands for groceries, apparel, beverages, books & magazines, foods, health care, household, office, personal care, pet care, photography and other embodiments. Social Shoppers can find great products, goods or services deals from the leading travel & hospitality industry, restaurants, toy and entertainment companies and top retailers around the world. Social Shoppers can use "a mobile device payment method and system for effectuating an online payment through a computer or mobile device equipped carrier or a mobile device equipped bank using a mobile users and members device in connection with e-commerce and mobile banking transactions on the host geospatial website or mobile device (e.g., mobile telephone, PDA, laptop computer, etc.); wherein users and members create and maintain a rich-media application via a geospatial mapping platform via the Internet comprising: mobile banking and electronic payments.

The delivery system for a host geospatial website (accessible via a mobile device or computer) will provide for a multidimensional representation of information and scalable version of web content for the delivery of Social Earth™ Shopping from around the world on a three dimensional geospatial platform using geospatial mapping technology. A host geospatial website will include realistic virtual landscape using satellite and aerial photography that will include many content layers of web based information, e-commerce and mobile banking links, social networking and virtual advertisements for a richer user experience. A host geospatial website shall store images, web-based content, social data, social plugins, social applications, penny auctions or online auctions, advertisements and share live social feeds from social networking giants such as Facebook™ and Twitter™ and other communications in real-time. Connecting Social Earth Shopping from around the world with users and members known as "Social Shoppers" in real-time on a geographical area across multiple social layers that are displayed as graphic animated color overlays on a three dimensional geospatial platform using geospatial mapping technology. More specifically, it relates to a method for users and members known as "Social Shoppers" to effectuate banking and electronic payments; accessing a user account, engaging in mobile social activities and viewing available options via a three dimensional geospatial mapping platform using geospatial mapping technology."

Giving Back: Social Shoppers will be able to help those who have been impacted by a natural disaster, live in impoverished conditions or are less fortunate in the world. Social Shoppers are able to purchase coupons from merchants who support humanitarian causes in developing countries and charities in their communities and local and global causes around our planet and relief efforts for natural and man made disasters including devastating earthquakes and tsunamis. For example, fly to Japan and view a video on the Japan relief effort. By tapping into the power of social networking and bringing together a collective consciousness with millions of Social Shoppers, Social Earth raises awareness for global issues and millions of dollars for microloans or microcredit, humanitarian aid and support other worldly causes.

Example 2

Further Description of Social Earth Example

What do you get when you combine the daily deal phenomenon, the social media revolution and the power of geo-mapping technology? You get a cutting-edge online experience that blends the best of daily deal sharing and social networking and takes it to a stratospheric new height called SOCIAL EARTH™ that also gives back to our planet.

Unlike any other shopping site, the Social Earth™ website will allow members to virtually travel around the globe in search of the best bargains, promotions, daily deal coupons, mobile services, Products, Goods & Services, entertainment shopping including penny auctions or online auctions, advertisements and affiliate advertising or services from merchants and sellers from around the world! In addition, members will be able to interact with their friends in Facebook™, Twitter™ and Skype™. This one-of-a-kind social networking website that will include social networking, advertisements, daily deal coupons, Products, Goods & Services showcasing them in their actual, physical location on the planet. Users will need to download a Google Earth™ plug-in before they will be able to virtually travel around Social Earth™. As of October 2011, Google Earth™ has been downloaded more than one billion times.

Social Shoppers will be able to select their favorite cities and choose from a menu of "Purchase Coupons" categories such as (Arts & Entertainment, Travel, Giving Back, Eat & Drink, Deal of the Day). Social Earth™ will offer "Free Coupons" categories for such items as: (Health & Beauty, Sports, Shopping & Groceries). As Social Shoppers make their selections, advertisements, daily deal coupons, Products, Goods & Services, including penny auctions or online auctions will populate the 3D globe based upon their preferences and geo-target location. Members will also be able to search for service providers in their local area or just about anywhere in the world. Click on any one of the featured City icons on Social Earth™ and virtually fly there to that city in an instant. This global shopping site is going to take the Internet by storm with its innovative 3D platform.

Social Earth™ plans to leverage Facebook™, Twitter™ and other platforms to build brand awareness and engagement by integrating "live social feeds" from these social networking giants in its website. Social Shoppers will also be able to "talk live" on Skype™. Social Earth™ is all about finding great bargains for savvy Social Shoppers and sharing them with your friends and feeling good knowing that a portion of each sale on Social Earth's™ website will go to provide microloans or microcredit, humanitarian aid and support other worldly causes through charitable donations or sustainable gifts to help those in need around the world.

Social Shoppers will be able to find great deals around the planet, and locally and globally, from leading brands, services providers, and top retailers. Social Shoppers will be able to select any desired geo-target location and zoom into the local landscape and view some of the best shopping in cosmopolitan cities. Because the Earth view comes live from satellite and webcam images, Social Shoppers will be able to zoom in and out for a closer look and gain a perspective on their precise location. Social Earth's™ website will feature top-notch content, stunning satellite imagery, aerial photography and graphic animated color overlays on top of Google Earth™ that will give Social Shoppers a wonderful perspective of our planet.[1] SOCIAL EARTH™ will deliver a delightful mash-up of advertisements, coupons, Products, Goods & Services and service providers on a geospatial platform.

Unlike Groupon™, Livingsocial™ or Google Offers™, SOCIAL EARTH™ will aggregate coupons and Products, Goods & Services from all over the world on its site daily, but they won't last just one day. SOCIAL EARTH™ deals can last for days, weeks or even months. Social Shoppers will be encouraged to share these deals with their friends. The global sharing capabilities will be built into SOCIAL EARTH's™ technology using sophisticated technology integrating geospatial mapping, web mapping, mobile mapping & layers of geographic information, layering location-relevant data and GPS technologies to pin point coupons and great bargains in their exact geo-target location on Earth.

Social Networking Community

The Company plans on capitalizing on the popularity of social networking giants Facebook™ and Twitter™, with a combined 900 million users worldwide, and leveraging the power of these social networking giants by launching an application to users in Facebook™ and Twitter™. On average people on Facebook™ install applications more than 20 million times per day. More than 350 million active users currently use Facebook™ through their mobile devices. The Company plans on integrating "live social feeds" from Facebook™ and Twitter™ into its website so Social Shoppers will be able to share their favorite deals with their friends in these popular social networks. By creating a highly engaged social networking community, the Company plans on creating "stickiness" that will keep Social Shoppers on the site for long periods of time interacting with their friends, as well as bringing them back again and again. In other words, SOCIAL EARTH™ will be about long-time customer loyalty, not just a one-off deal.

The social networking community aspect of SOCIAL EARTH™ will be the driver behind building awareness of the website and its featured deals. Imagine a business model where existing and potential customers do the advertising for you by spreading the word to their friends about the great deals they've found on a shopping site such as SOCIAL EARTH™. Add to that the power of collective buying and it's easy to see how the SOCIAL EARTH™ social networking community will be able to leverage group size in exchange for larger discounts.

Products, Goods & Services Description

Social Earth™ includes and delivers a user-friendly smooth desktop interface and mobile app for smart phones that allows Social Shoppers to enjoy a unique experience utilizing a multitude of Products, Goods & Services as they virtually tour around SOCIAL EARTH. They are able to: Use SOCIAL EARTH after installing Google Earth™ or similar plug-in; View promotions, online coupons, mobile services, Products, Goods & Services, entertainment shopping, penny auctions or online auctions, advertisements and affiliate advertising or services from merchants and sellers from around the world by geo-target location using GPS technology or anywhere in the world on SOCIAL EARTH's unique "live view" of the planet; View links to places and events, data on the landscape, interactive 360 panoramas, fly-through shopping tours with stunning 3D imagery and videos, advanced search for private and public information, user generated content, custom tools, apps, widgets. Search for the latest deals on Social Earth via the web or a mobile or portable device, which will open up an incredible opportunity to reach people at the point of shopping—a benefit both to shoppers and merchants; Search online for service providers; View "live social feeds" from social networking giants Facebook™ and Twitter™; Communicate with their friends on Skype; Zoom to birds-eye and human scale view and navigate around stunning 3D satellite images; Watch videos and news clips via RSS links; Have a unique interactive user experience, view live links to places and events; Learn how Social Earth plans to give back by providing information about microloans or microcredit, humanitarian aid and supporting other worldly causes through charitable donations or sustainable gifts.

Further non limiting examples of how the delivery system and software of the invention is interactive with the social shopper based upon the social shopper's preference, location, GPS, buying patterns, likes & dislikes, user profile, online communications, social networking, social networking communities, social networking activities, messaging, online communications, viewing public & private user profiles, advertising, bidding, bidding behavior, bidding results, purchasing, behavior, buying pattern and other criteria allowing the social behavior software to search for and filter and display related promotions, online coupons, mobile services, Products, Goods & Services, entertainment shopping penny auctions or online auctions, or advertisements and affiliate advertising or services from merchants and sellers on the 3D landscape. So when a social shopper searches for promotions, online coupons, mobile services, Products, Goods & Services, entertainment shopping, penny auctions or online auctions, advertisements and affiliate advertising or services on Social Earth, the social behavior software will keep track of online activity, location, online communications, search inquiries, social networking, social networking communities, social networking activities, messaging, viewing public & private profiles, advertising, bidding, bidding behavior, bidding results, social plugins, promotions, social applications, purchasing, behavior, buying patterns and other criteria and search for, filter and display related promotions, online coupons, mobile services, Products, Goods & Services, entertainment shopping, penny auctions or online auctions, advertisements and affiliate advertising or services from merchants and sellers on the 3D landscape based upon the desired location, GPS technology, behavior tracking, which can even predict future demand.

Each user's will have a unique experience on Social Earth based upon their online activity, location, online communications, search inquiries, social networking, social networking communities, social networking activities, messaging, viewing public & private user profiles, advertising, bidding, bidding behavior, bidding results, social plugins, promotions, social applications, buying preference, location and other criteria. So if someone is searching for a particular promotion, online coupon, mobile service, Product, Good or Service, entertainment shopping, penny auction or online auctions, advertisement and affiliate advertising or service on Social Earth, the social behavior software will track their online activity, location, online communications, search inquiries, social networking, social networking communities, social networking activities, messaging, viewing public & private user profiles, advertising, bidding, bidding, bidding behavior, bidding results, social plugins, promotions, social applications, purchasing, behavior, buying patterns and other criteria and filter and display related promotions, online coupons, mobile services, Products, Goods & Services, entertainment shopping, penny auctions or online auctions, advertisements and affiliate advertising or services from merchants and sellers on the 3D landscape based upon the desired location, GPS technology, behavior tracking, which can even predict future buying demand.

For example, if someone is searching for a sporting event or other type of entertainment on Social Earth and the social shopper previously purchased a coupon for a pizza, the social behavior software will locate nearby pizza restaurants, sporting events, sports venues, sports bars, hotels, and other points of interest etc. based upon the online activity, location, online communications, search inquiries, social networking, social networking communities, social networking activities, messaging, viewing public & private user profiles, advertising, bidding, bidding behavior, bidding results, social plugins, promotions, social applications, purchasing, behavior, buying patterns and other criteria and filter and display related coupons, products, goods, services, advertisements and service providers on the 3D landscape based upon the desired location, GPS technology, behavior tracking, which can even predict future shopping.

If someone is searching for a new or used car, motorcycle, recreational, RV or other type of motorized vehicle or transportation on Social Earth, the software will search for related services based upon GPS such as i.e. dealerships, manufacturers, insurance, tires, oil change, car wash, air conditioning, gas stations, etc. based upon the online activity, location, online communications, search inquiries, social networking, social networking communities, social networking activities, messaging, viewing public & private user profiles, advertising, bidding, bidding behavior, bidding results, social plugins, promotions, social applications, purchasing, behavior, buying patterns and other criteria and filter and display related promotions, online coupons, mobile services, Products, Goods & Services, entertainment shopping, penny auctions, or online auctions, advertisements and affiliate advertising or services from merchants and sellers on the 3D landscape based upon the desired location, GPS technology, behavior social software tracking, which can even predict future shopping.

If the social shopper has previously purchased a coupon for pet food, the social behavior software will keep track of online activity, location, online communications, search inquiries, social networking, social networking communities, social networking activities, messaging, viewing public & private user profiles, advertising, bidding, bidding behavior, bidding results, social plugins, promotions social applications, purchasing, behavior, buying patterns and other criteria and filter and display related promotions, online coupons, mobile services, Products, Goods & Services, entertainment shopping, penny auctions or online auction, advertisements and affiliate advertising or services, pet stores, veterinarians, grooming services, advertisements and other related pet services on the 3D landscape based upon the desired location, GPS technology, behavior tracking, which can even predict future shopping demand.

If someone is searching for a home, condo, apartment or other type of real estate on Social Earth, the social behavior software will track online activity, location, online communications, search inquiries, social networking, social networking communities, social networking activities, messaging, viewing public & private user profiles, advertising, bidding, bidding behavior, bidding results, social plugins, promotions, social applications, bidding, bidding behavior, bidding results, purchasing, behavior, buying patterns and other criteria and filter and display related promotions online coupons, mobile services Products, Goods or Services, entertainment shopping, penny auctions or online auctions, advertisements and affiliate advertising or services from i.e. brokers, agents, relocation services, lenders, moving and storage, furniture, lawn care or gardening, grocery stores, schools, doctors & physicians, parks, cleaning services, etc. on the 3D landscape, based upon the desired location, GPS technology, behavior tracking, which can even predict future buying demand.

If someone is searching for a school, college, university or other type of educational services on Social Earth, the social behavior software will track online activity, location, online communications, search inquiries, social networking, social networking communities social networking activities, messaging, viewing public & private user profiles, advertising, bidding, bidding behavior, bidding results, social plugins, promotions, social applications, purchasing, behavior, buying patterns and other criteria and filter and display related promotions, online coupons, mobile services, Products, Goods or Services, entertainment shopping, penny auctions or online auctions, advertisements and affiliate advertising or services for such items as i.e. online classes, student loans, financial aid, colleges, universities, private and public schools, tutoring, test preparation, etc. on the 3D landscape based upon the desired location, GPS technology, behavior tracking, which can even predict future buying demand.

If someone is searching for a particular travel destination on Social Earth, the social behavior software will track online activity, location, online communications, search inquiries, social networking, social networking communities, social networking activities, messaging, viewing public & private user profiles, advertising, bidding, bidding behavior, bidding results, social plugins, promotions, social applications, purchasing, behavior, buying patterns and other criteria and filter and display related promotions, online coupons, mobile services, Products, Goods or Services, entertainment shopping, penny auctions or online auctions, advertisements and affiliate advertising or services from merchants and sellers for such items as i.e. travel deals, airfare or ground transportation options, restaurants, sport venues, entertainment, airports, car rentals, limos, dry cleaners and other services, etc. on the 3D landscape based upon the desired location, GPS technology, behavior tracking, which can even predict future buying demand.

If someone is searching for an environmental-friendly or green product on Social Earth, the social behavior software will track online activity, location, online communications, search inquiries, social networking, social networking communications, social networking activities, messaging, viewing public & private user profiles, advertising, bidding, bidding behavior, bidding results, social plugins, promotions, social applications, purchasing, behavior, buying patterns and other criteria and filter and display related promotions, online coupons, mobile services, Products, Goods & Services, entertainment shopping, penny auctions or online auctions, advertisements and affiliate advertising services for such as items as i.e. eco-friendly home, office and business products that reduce the carbon footprint, made from recycled materials and do little harm to the environment, etc. on the 3D landscape based upon the desired location, GPS technology, behavior tracking, which can search criteria, social shopper's buying preferences, buying patters, likes and dislikes, online communications, transaction history, etc. and even predict future buying demand.

If someone is searching for a flight comparison on Social Earth by clicking on one of the travel links i.e. Expedia, Travelocity, Orbitz, Cheap Flights, Kayak, etc., the social behavior software will track online activity, location, online communications, search inquiries, social networking, social networking communities, social networking activities, messaging, viewing public & private user profiles, advertising, bidding, bidding behavior, bidding results, social plugins, social promotions, applications, purchasing, behavior and buying patterns and other criteria and filter and display related promotions, online coupons, mobile services, Products, Goods or Services, entertainment shopping, penny auctions or online auctions, advertisements and affiliate advertising or services for such services as fights, hotels, car rentals, restaurants, food & drink, entertainment and other related services on the 3D landscape based upon the desired location, GPS technology, behavior tracking, which can even predict future buying demand.

If someone is searching for a penny auction or online auction on Social Earth, the social behavior software will track online activity, location, online communications, search inquiries, social networking, social networking communities, social networking activities, messaging, viewing public & private user profiles, advertising, bidding, bidding behavior, bidding results, social plugins, promotions, social applications, purchasing, behavior and buying patterns and other criteria and filter and display related promotions, online coupons, mobile services, Products, Goods or Services, entertainment shopping, penny auctions or online auctions, advertisements and affiliate advertising or services on the 3D landscape based upon the desired location, GPS technology, behavior tracking, which can even predict future buying demand.

Advantages: SOCIAL EARTH's unique shopping experience on a live view of the planet offers multiple advantages over other e-tail, daily deal, coupon and social networking sites by: Aggregating promotions, online coupons, mobile services, Products, Goods & Services, entertainment shopping, penny auctions or online auctions, advertisements and affiliate advertising or services on its site daily, but they won't last just one day; Combining the power of a social networking community with a collective bargaining coupon site, currently the fastest growing business model on the Web; SOCIAL EARTH is going to help those in need around the world; Behavior tracking technology, Gathering promotions, online coupons, mobile services, Products, Goods & Services, entertainment shopping, penny auctions or online auctions, advertisements and affiliate advertising services from merchants and sellers from all over the world into one fun online 3D shopping experience; Social Shoppers will be able to search for a multitude of promotions, online coupons, mobile services, Products, Goods & Services, entertainment shopping, penny auctions or online auctions, advertisements and affiliate advertising or services from merchants and sellers based upon their precise location; Social networking integration with Facebook™ and Twitter™ will create "stickiness" and bring Social Shoppers back to the site again and again; Social Earth will be available in multiple languages to attract users outside of the United States and around the world; Giving Social Shoppers a fun, hip interactive experience on a live view of Earth with satellite imagery, aerial photography and graphic animated color overlays; and/or Having a unique interactive user experience, view live links to places and events.

What is claimed is:

1. A method for providing social networking interactions using internet and mobile websites and related mobile device or computer systems that provide end user customized interactive displays of three dimensional geospatial maps comprising end user customized promotions, online coupons, mobile services, products, goods & services and related company and local information, said first and second end user displays generated using a three dimensional geospatial platform using multi-dimensional and scalable geospatial mapping, said method comprising:

(a) electronically providing an integrated social networking and 2D and 3D geospatial mapping interactive website that provides geospatial mapping interactive displays interactive with social networking, where the geospatial interactive displays provide a multi-dimensional and scalable geospatial mapping functional tool, and where the social networking provides interactive emailing, instant messaging, texting, online auctions, social networking communities, online communications, user profiles, social plugins, social applications, entertainment shopping, bidding, advertisements, promotions, online coupons, mobile services, products, goods and services;

(b) electronically assigning on a computer system an identifier to a client mobile device or computer receiving a request from said end user via a client application operating on said client mobile device or computer system for internet access to websites or links;

(c) electronically providing on a mobile device or computer system access to said websites or links that provide three dimensional geospatial interactive displays including showing movement from one location to another, said mobile device or computer system comprising a combination of first consumer data sets used to generate first end user geospatial interactive displays using multi-dimensional and scalable geospatial mapping and integrated social networking, social networking communities, social networking activities, user profiles, messaging, online communications, said first end user geospatial interactive displays comprising (i) first promotional data collections for separate locations shown on said displays, said first promotional data collections comprising
  (a) promotions,
  (b) online coupons,
  (c) mobile services,
  (d) products,
  (e) goods,
  (f) services,
  (g) entertainment shopping,
  (h) online auctions,
  (i) bidding,
  (j) bidding behavior,
  (k) bidding results,
  (l) advertisements and affiliate advertising,
  (m) social networking,
  (n) social networking communities,
  (o) social networking activities,
  (p) user profiles,
  (q) messaging,
  (r) online communications,
  (s) viewing public & private user profiles,
  (t) service providers,
  (u) business centers and affiliates,
  (v) related company information; and
  (w) local information; and (ii) interactive links to social networks, social networking, social networking communities, social networking activities, user profiles, messaging, online communications, viewing public & private user profiles, social plugins, promotions, social applications, entertainment shopping, online auctions, bidding, bidding behavior, bidding results, advertisements and affiliate advertising; and (iii) interactive links to websites displaying said promotions, online coupons, mobile services, products, goods & services, entertainment shopping, online auctions, bidding, bidding behavior, bidding results, advertisements and affiliate advertising, social networking, social networking communities, social networking activities, messaging online communications and search inquiries for service providers, business centers and affiliates, and related company information and related local information;

(d) electronically displaying on said client computer said first end user geospatial interactive display provided in step (c);
(e) electronically monitoring, collecting and analyzing, using a mobile device or computer system data analysis system, said end user data relating to end user's
  (i) online activity,
  (ii) location,
  (iii) online communications,
  (iv) social networking plugins
  (v) search inquiries,
  (vi) social networking,
  (vii) social networking communities,
  (viii) social networking activities,
  (ix) user profiles,
  (x) messaging,
  (xi) viewing public & private user profiles,
  (xii) social plugins,
  (xiii) social applications,
  (xiv) entertainment shopping,
  (xv) online auctions,
  (xvi) bidding,
  (xvii) bidding behavior,
  (xviii) bidding results,
  (xix) advertisements and affiliate advertising,
  (xx) purchasing,
  (xxi) behavior,
  (xxii) preferences,
  (xxiii) IM, text and email messaging; and
  (xxiv) buying patterns on said websites or links, to provide end user output data;
(f) electronically processing said end user output data from step (e) to electronically generate second consumer data sets related to one or more of
  (i) said end users,
  (ii) additional end users, and
  (iii) target end user groups,
  said second consumer data sets comprising end user related consumer profiles, trends and target markets, based on said analyzing in step (d);
(g) electronically processing said first and second consumer data sets to generate second end user geospatial interactive displays using multi-dimensional and scalable geospatial mapping including showing movement from one location to another and integrated social networking, social networking community, user profiles, messaging, wherein said second promotional data collections are based at least in part on prior purchase history of one or more end users;
wherein said second end user geospatial interactive displays comprising:
  (i) customized second promotional data collections for separate locations shown on said displays, said customized second promotional data collections comprising
    (a) promotions,
    (b) online coupons,
    (c) mobile services,
    (d) products,
    (e) goods,
    (f) services,
    (g) entertainment shopping,
    (h) online auctions,
    (i) bidding,
    (j) bidding behavior,
    (k) bidding results,
    (l) advertisements and affiliate advertising,
    (m) social networking,
    (n) social networking communities,
    (o) social networking activities,
    (p) user profiles,
    (q) messaging,
    (r) online communications,
    (s) viewing public & private user profiles, and
    (t) local information; and
  (ii) interactive links to social networks, social networking, social networking communities, social networking activities, online communications, user profiles, messaging, viewing public & private user profiles, social plugins, promotions, social applications, entertainment shopping, online auctions, bidding, bidding behavior, bidding results, advertisements and affiliate advertising; and
  (iii) interactive links to websites displaying said promotions, online coupons, mobile services, products, goods & services, entertainment shopping, online auctions, bidding, bidding behavior, bidding results, advertisements and affiliate advertising, social networking; and
(h) electronically displaying on said client mobile device or computer system said second end user geospatial interactive display provided in step (g).

2. The method of claim 1, wherein said method further comprises providing remote computing or mobile device or computer system access and wherein said interactive links are selected from internet sites, feeds, pictures, videos, audio clips, social network, social networking, social networking communities, social networking activities, online communications, messaging, user profiles, entertainment shopping, online auctions, bidding, bidding results, advertisements and affiliate advertising, local promotional data based on end user's online activity, location, profile, online communication, purchasing, behavior, preferences and buying patterns, online behavior.

3. The method of claim 1, wherein said second consumer data sets further comprise at least three selected from contacts information, social network contact information, location, online communications, search inquiries, social networking, social networking communities, social networking activities, user profiles, messaging, social plugins, promotions, social applications, embedded advertisements and affiliate advertising, entertainment shopping, online auctions, bidding, bidding behavior, bidding results, purchasing, behavior, preferences, and buying pattern information.

4. The method of claim 1, wherein said method further comprises providing said second consumer data sets to a third party.

5. The method of claim 2, wherein said third party is selected from a government agency, a credit reporting agency, a company, or a regulatory agency according to applicable laws and regulations.

6. The method of claim 3, wherein said company is selected from a financial services company, a product company, a services company, a retailer, a real estate company, an entertainment company, an online auction, or other type of service company.

7. The method of claim 1, wherein said second consumer data sets further comprise one selected from statistics regarding donations, humanitarian aid and sustainable gifts made by the end users or other end users.

8. The method of claim 6, wherein said method further comprises providing said statistics to said end user, other end users, or third parties.

9. The method of claim 1, wherein said method further comprises said end user designating a portion of a purchase, or providing links or websites to said end user, to provide charitable contributions, humanitarian aid, or microloans.

10. A method of claim 1, wherein said product or service is selected from the group consisting of retail, wholesale, travel, hospitality, real estate, educational services, entertainment shopping services, online auction services, service provider services, loan services, loans or credit online or via a mobile device or wireless device through a server, business center services, affiliate services, or related products or services.

11. A method of claim 8, wherein said search inquiry is for real estate related online coupons, mobile services, products, goods or services, entertainment shopping, online auctions, bidding, bidding behavior, bidding results, advertisements and affiliate advertising, and wherein
   a. said real estate product or good is selected from social networking, social networking communities, social networking activities, online communications, user profiles, messaging, viewing public & private user profiles, social plugs, promotions, social applications, entertainment shopping, online auctions, advertisements and affiliate advertising, and search inquiries for the sale or lease of vacant land, residential real estate, commercial real estate, recreational real estate, retail, shopping, hotels, motels, golf courses, resorts, marinas, industrial real estate, vacation, time shares, condominiums, multifamily, dwellings;
   b. said real estate service is selected from social networking, social networking communities, social networking activities, user profiles, messaging, viewing public & private user profiles, social plugins, promotions, social applications, entertainment shopping, online auctions, advertisements and affiliate advertising and search inquiries for travel agents, brokers, agents, relocation services, internet marketing, concierge, transportation, travel and hospitality services, lenders, appraisers, education, developers, contractors, inspectors, home improvements/remodeling, basement designs, landscaping, home warranties, insurance, indoor and outdoor furniture, fixtures, windows, siding, roofing, heating/cooling, solar, plumbing, electrical, mechanical, HVAC, or repair, renovation or addition services.

12. The method of claim 1, wherein said Internet access in step (b) is subject to identity verification.

13. The method of claim 1, wherein the social networking links are provided as one selected from location, online communications, search inquiries, social networking, social networking communities, social networking activities, user profiles, messaging, viewing public & private user profiles, social plugins, promotions, social applications, entertainment shopping, online auctions, bidding, bidding behavior, bidding results, messaging, viewing public & private user profiles, social plugins, social applications user profiles, advertisements and affiliate advertising, SSLs, cookies, and embedded advertisements and affiliate advertising.

14. The method of claim 1, wherein promotion or service comprises (1) travel and hospitality related search inquiries; (2) real estate or ancillary services related search inquiries or (3) search inquiries related to one selected from education services, entertainment services, online auction services, business center services or affiliated services; or (4) job or employment search inquiries.

15. The method of claim 1, wherein said local information comprises information about people, places of information, companies, businesses, weather or roads, which can be added or removed as layers on said display showing said geospatial mapping.

16. The method of claim 1, wherein said method further comprises behavior tracking communications with social networking, social networking communities, social networking activities, online communications, user profiles, messaging, viewing public & private and other social networks.

17. A computer system for providing social networking interactions using internet and mobile websites and related computer systems that provide end user customized interactive displays of three dimensional geospatial maps comprising end user customized promotions, online coupons, mobile services, products, goods & services, and related company and local information, said first and second end user displays generated using a three dimensional geospatial platform using multi-dimensional and scalable geospatial mapping,
said system comprising:
   (a) electronically providing an integrated social networking and 2D and 3D geospatial mapping interactive website that provides geospatial mapping interactive displays interactive with social networking, where the geospatial interactive displays provide a multi-dimensional and scalable geospatial mapping functional tool, and where the social networking provides interactive emailing, instant messaging, texting, online auctions, social networking communities, online communications, user profiles, social plugins, social applications, entertainment shopping, bidding, advertisements, promotions, online coupons, mobile services, products, goods and services;
   (b) a system component for electronically assigning on a mobile device or computer system an identifier to a client computer receiving a request from said end user via a client application operating on said client computer for internet access to websites or links;
   (c) a system component for electronically providing on a mobile device or computer system access to said websites or links that provide three dimensional geospatial interactive displays including showing movement from one location to another, said computer system comprising a combination of:
      (i) first consumer data sets used to generate first end user geospatial interactive displays using multi-dimensional and scalable geospatial mapping and integrated social networking, said first end user geospatial interactive displays comprising
         (a) first promotional data collections for separate locations shown on said displays, said first promotional data collections comprising
            (i) promotions,
            (ii) online coupons,
            (iii) mobile services,
            (iv) products,
            (v) goods,
            (vi) services,
            (vii) entertainment shopping,
            (viii) online auctions,
            (ix) bidding,
            (x) bidding behavior,
            (xi) bidding results,
            (xii) advertisements and affiliate advertising,
            (xiii) social networking,
            (xiv) social networking communities & social networking activities, (xv) user profiles,
(xvi) messaging,
(xvii) online communications,
(xviii) viewing public & private user profiles,
(xix) service providers,
(xx) business centers and affiliated services,
(xxi) related company information,
(xxii) local information; and
  (b) interactive links to social networks, social networking, social networking communities, social networking activities, online communications, messaging, user profiles, viewing public & private user profiles, social plugins, promotions, social applications, entertainment shopping, online auctions, bidding, bidding behavior, bidding results, advertisements and affiliate advertising; and
  (c) interactive links to websites displaying said promotions, online coupons, mobile services, products, goods & services, entertainment services, online auctions, bidding, bidding behavior, bidding results, advertisements and affiliate advertising, social networking, social networking communities, social networking activities and search inquires for service providers, business centers and affiliated services, and related company information and related local information;
(d) a system component for electronically displaying on said client mobile device or computer system said first end user geospatial interactive display provided in step (c);
(e) a system component for electronically monitoring, collecting and analyzing, using a mobile device or computer data analysis system, said end user data relating to end user's online activity, location, online communications, search inquiries, social networking, social networking communities, social networking activities, online communications, messaging, user profiles, viewing public & private user profiles, social plugins, promotions, social applications, entertainment shopping, online auctions, bidding, bidding behavior, bidding results, advertisements and affiliate advertising, purchasing, behavior, preferences and buying patterns on said websites or links, to provide end user output data;
(f) a system component for electronically processing said end user output data from step (e) to electronically generate second consumer data sets related to one or more of
  i. said end users,
  ii. additional end users, and
  iii. target end user groups,
said second consumer data comprising end user related consumer profiles, trends and target markets, based on said analyzing in step (d);
(g) electronically processing said first and second consumer data sets to generate second end user geospatial interactive displays using multi-dimensional and scalable geospatial mapping including showing movement from one location to another and integrated social networking, wherein said second promotional data collections are based at least in part on prior purchase history of one or more end users;
said second end user geospatial interactive displays comprising
  (i) customized second promotional data collections for separate locations shown on said displays, said customized second promotional data collections comprising
    (a) promotions,
    (b) online coupons,
    (c) mobile services,
    (d) products,
    (e) goods,
    (f) services,
    (g) entertainment shopping,
    (h) online auctions,
    (i) bidding,
    (j) bidding behavior,
    (k) bidding results,
    (l) advertisements and affiliate advertising,
    (m) social networking,
    (n) social networking communities,
    (o) user profiles,
    (p) messaging,
    (q) online communications,
    (r) viewing public & private user profiles,
    (s) service providers;
    (t) business centers and affiliated services,
    (u) related company information; and
    (v) local information; and
  (ii) interactive links to social networks, online communications, social networking, social networking communities, social networking activities, messaging, user profiles, messaging, viewing public & private user profiles, social plugins, promotions, social applications, entertainment shopping, online auctions, bidding, bidding behavior, bidding results, advertisements and affiliate advertising; and
  (iii) interactive links to websites displaying said promotions, online coupons, mobile services, products, goods & services, entertainment shopping, online auctions, bidding, bidding behavior, bidding results, advertisements and affiliate advertising, social networking, social networking communities, social networking activities and search inquires for service providers, business centers, and affiliated services, and related company information and related local information;
(h) electronically displaying on said client mobile device or computer system said second end user geospatial interactive display provided in step (g).

* * * * *